(12) United States Patent
Shahar

(10) Patent No.: US 7,079,731 B2
(45) Date of Patent: Jul. 18, 2006

(54) ALL-OPTICAL BISTABLE DEVICES

(75) Inventor: Arie Shahar, Rye Brook, NY (US)

(73) Assignee: Prima Luci, Inc., Harrison, NY (US)

( * ) Notice: Subject to any disclaimer, the term of this patent is extended or adjusted under 35 U.S.C. 154(b) by 279 days.

(21) Appl. No.: 10/684,513

(22) Filed: Oct. 15, 2003

(65) Prior Publication Data

US 2005/0053333 A1 Mar. 10, 2005

Related U.S. Application Data

(60) Provisional application No. 60/420,112, filed on Oct. 21, 2002, provisional application No. 60/440,037, filed on Jan. 15, 2003.

(51) Int. Cl.
*G02B 6/26* (2006.01)
(52) U.S. Cl. .......................................... 385/48; 385/27
(58) Field of Classification Search .................... None
See application file for complete search history.

(56) References Cited

U.S. PATENT DOCUMENTS

| 4,910,737 A | * | 3/1990 | Payne et al. ........................ 372/6 |
| 5,414,548 A | * | 5/1995 | Tachikawa et al. ............. 398/87 |
| 5,694,114 A | * | 12/1997 | Udd ............................ 340/506 |
| 5,917,979 A | * | 6/1999 | Prucnal ........................ 385/122 |

* cited by examiner

Primary Examiner—Juliana Kang
(74) Attorney, Agent, or Firm—Pearl Cohen Zedek Latzer, LLP

(57) ABSTRACT

An all-optical bistable device, comprising:

a splitting device having first and second inputs and first and second outputs, for receiving first light beam at the first input and directing the first beam as second and third beams propagating through respective first and second outputs; first optical path between the first output and the second input and second optical path between the second output and the second input for creating combined optical path for the first and second beams at the second input; the combined optical path includes a saturable optical amplifier for enhancing and diminishing one of the second and the third beams for driving the optical amplifier into a saturation state to create one of two stable states in which one of the second and the third beams is an enhanced beam and the other beam is a diminishing beam; at least one tapping device for tapping output signal from one of the first and the second optical paths, and at least one coupling device for coupling input signal into one of the first and the second optical paths to flip between the two stable states by converting the enhanced beam into the diminishing beam.

10 Claims, 57 Drawing Sheets

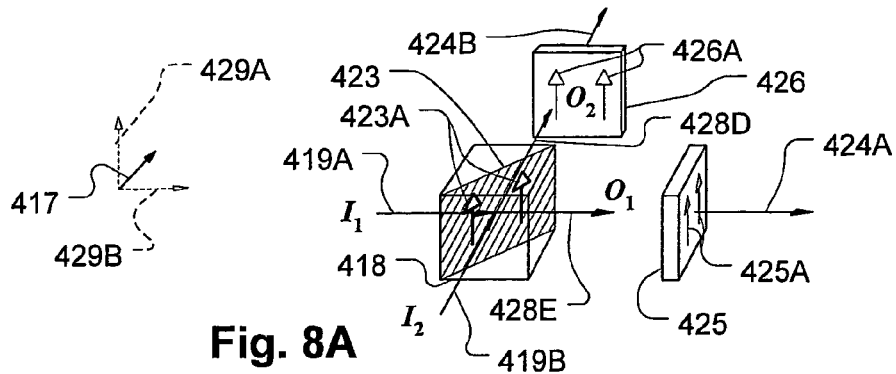
Fig. 8A
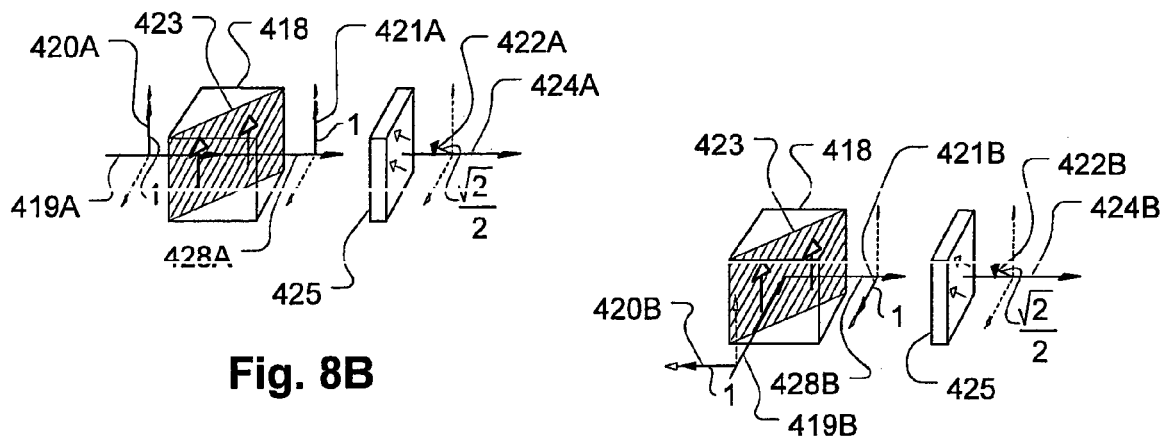
Fig. 8B
Fig. 8C
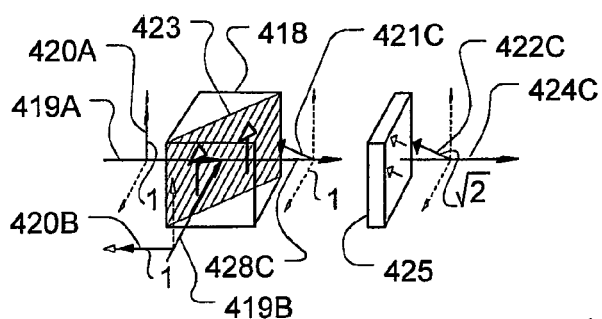
Fig. 8D
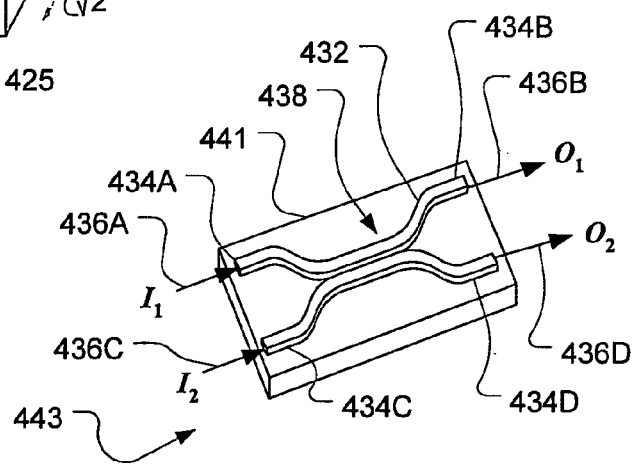
Fig. 8E

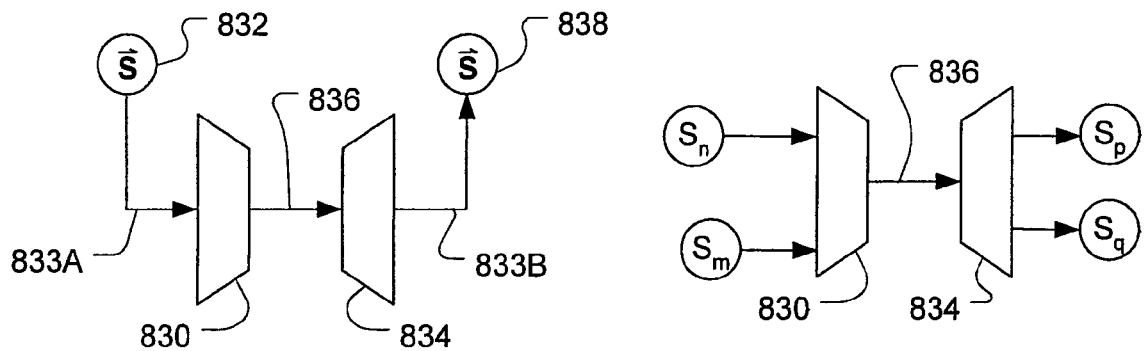
Fig. 15K
Fig. 15M
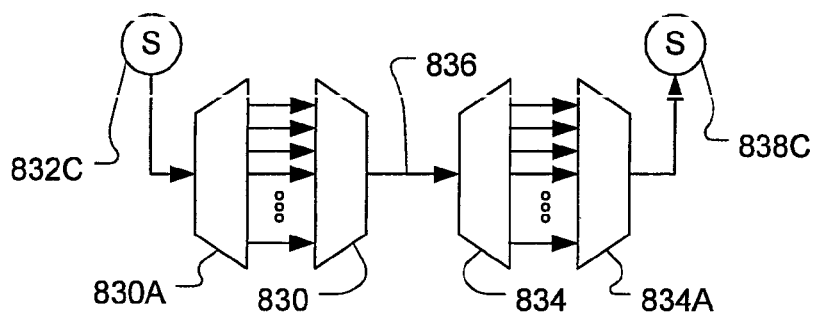
Fig. 15N
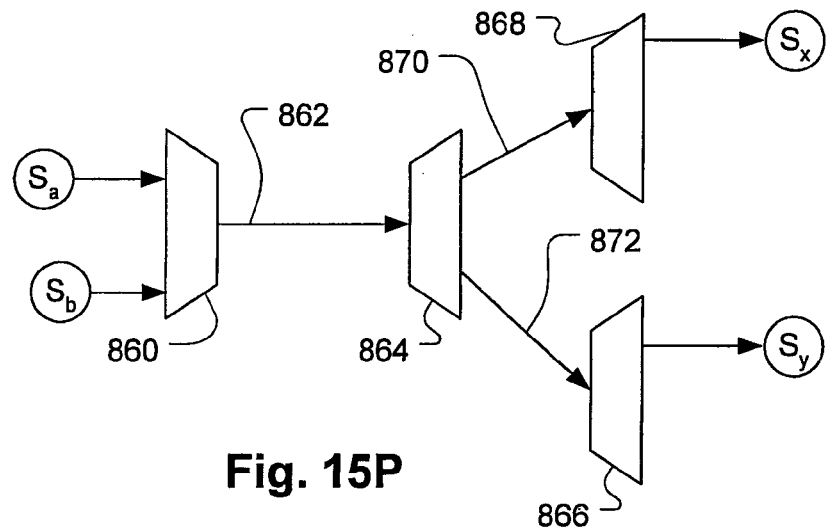
Fig. 15P

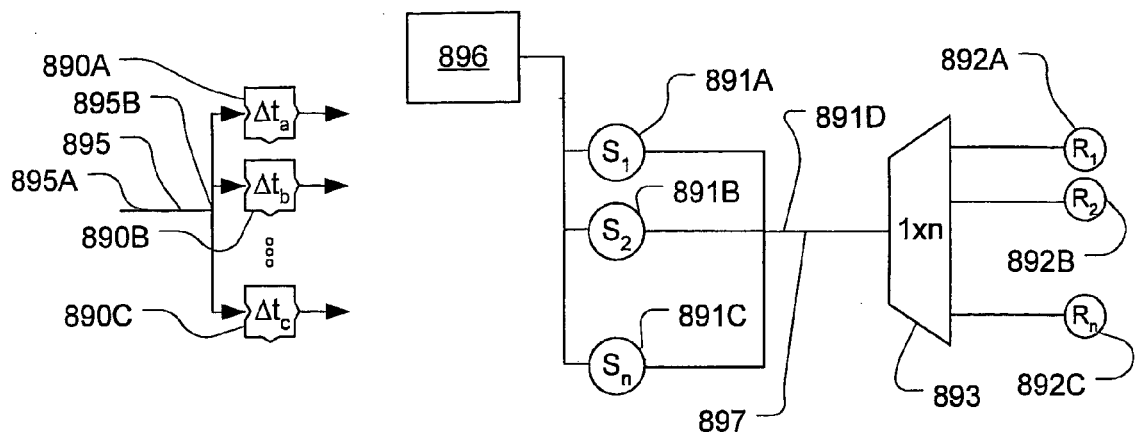
Fig. 15Q
Fig. 15R
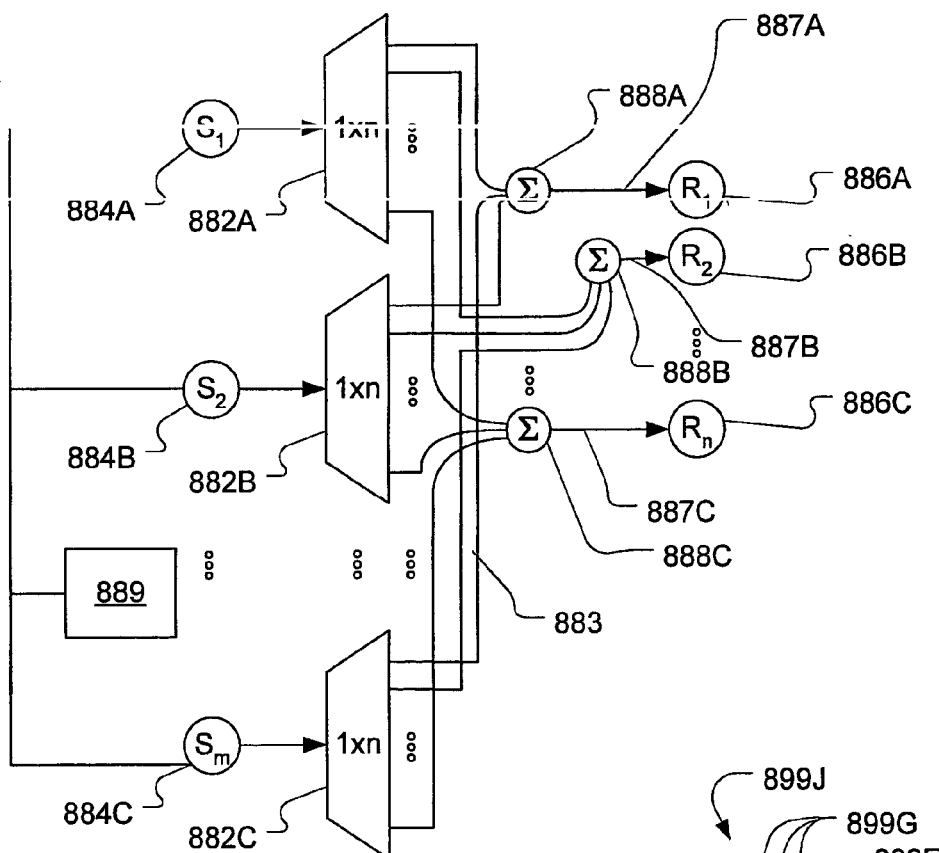
Fig. 15S
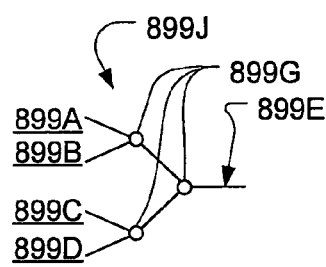
Fig. 15T

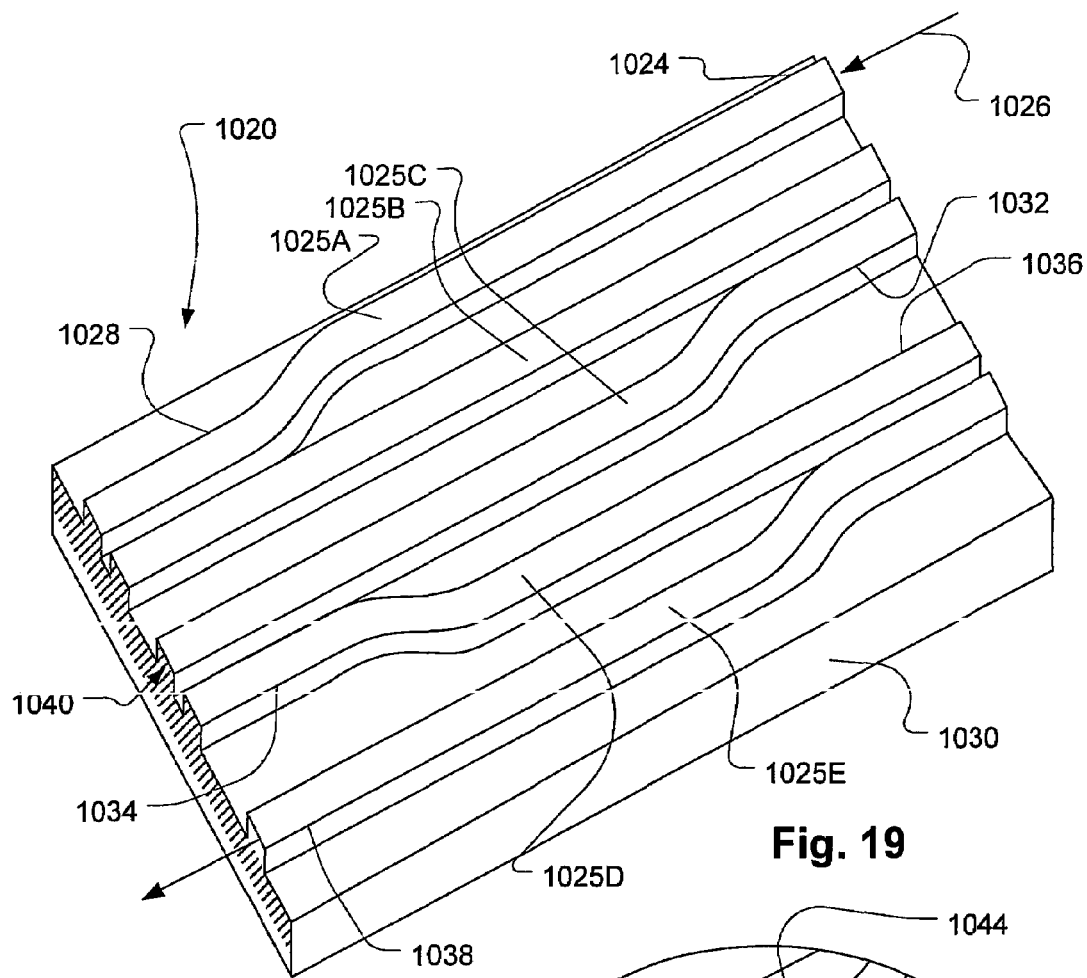
Fig. 19
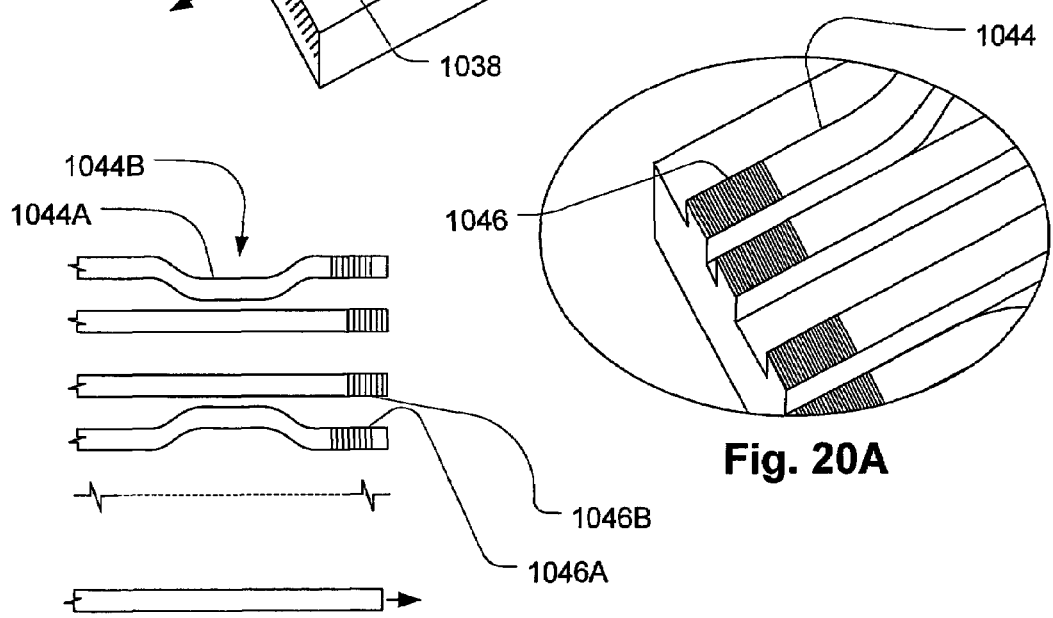
Fig. 20A
Fig. 20B

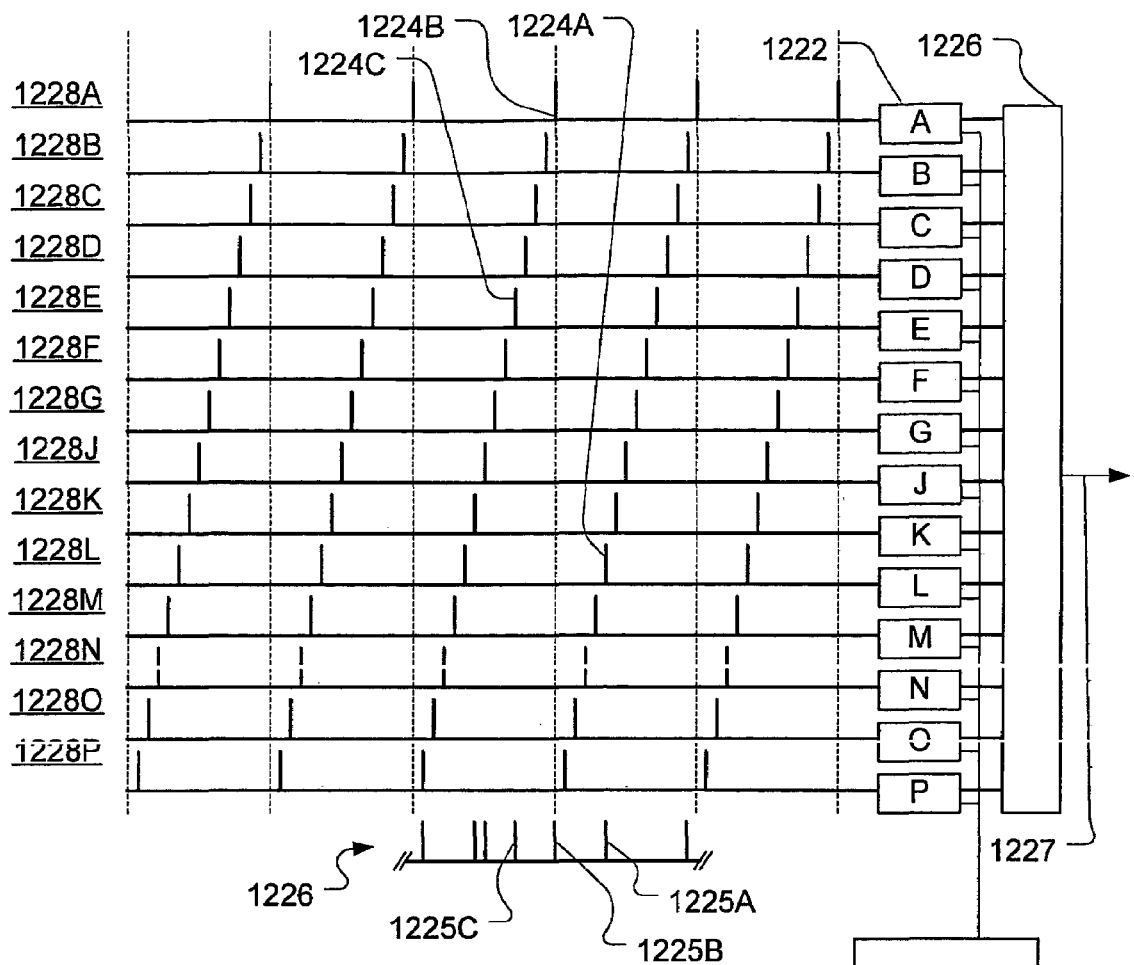
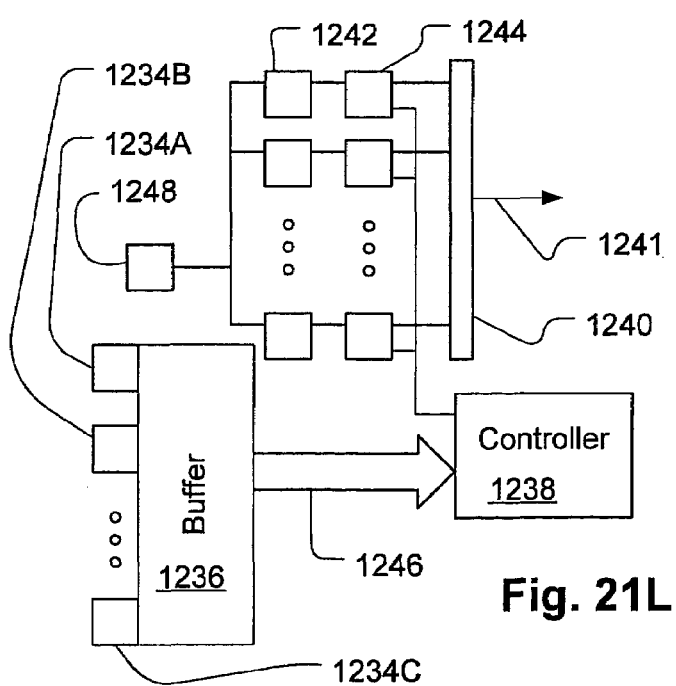
Fig. 21K
Fig. 21L

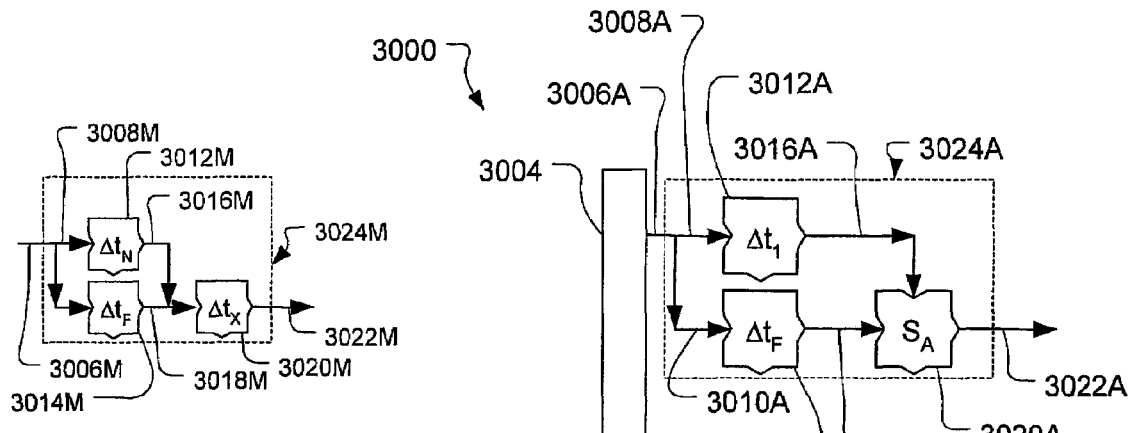
Fig. 22E
Fig. 22D
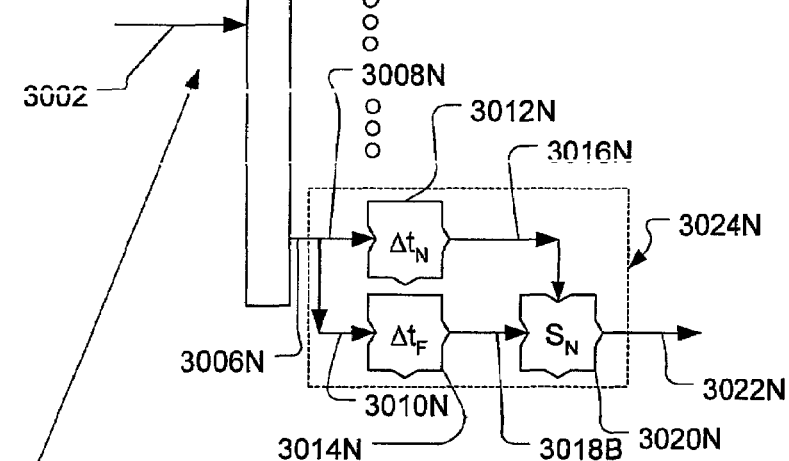
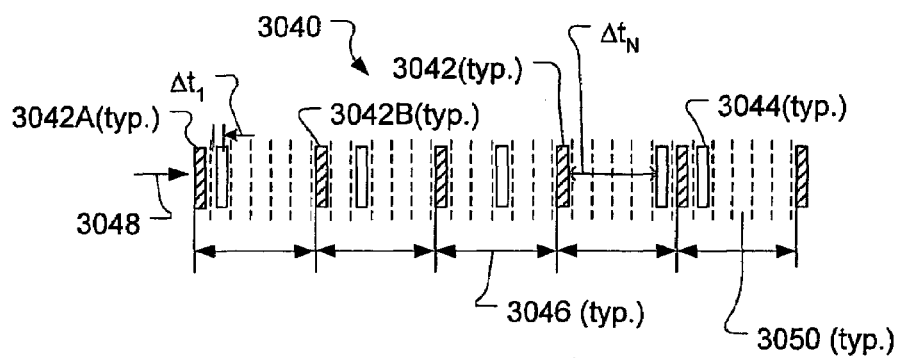
Fig. 22F

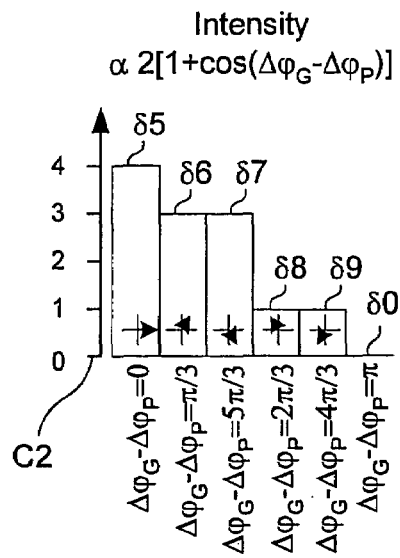
Fig. 23U
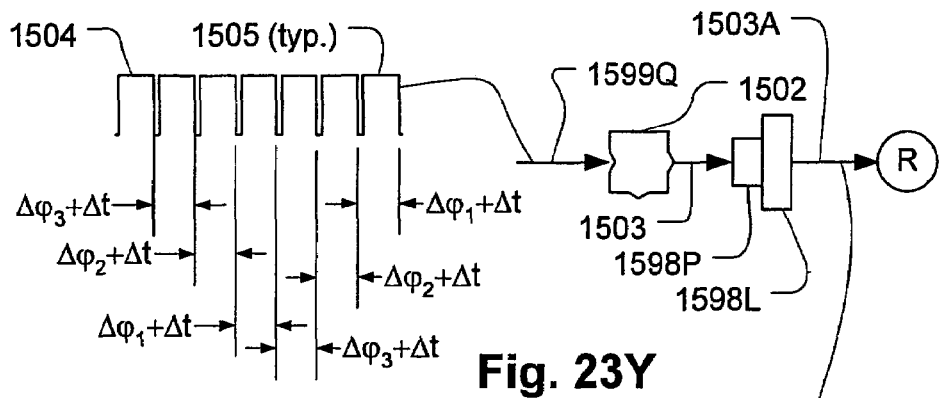
Fig. 23Y
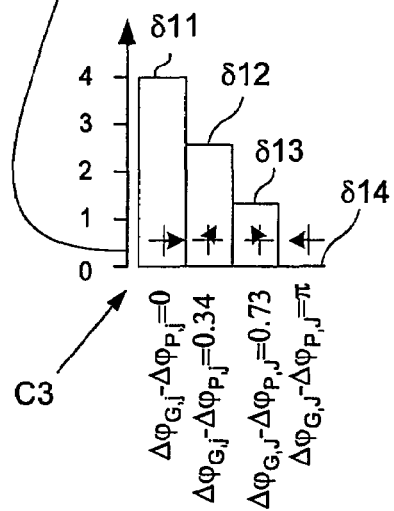

ALL-OPTICAL BISTABLE DEVICES

REFERENCE TO OTHER APPLICATIONS

This application claims the benefit of U.S. Provisional Patent Application Ser. No. 60/420,112, filed Oct. 21, 2002, entitled "Streaming signal control system for digital communications" and of U.S. Provisional Patent Application Ser. No. 60/440,037, filed Jan. 15, 2003, entitled "Streaming signal control system for digital communications".

FIELD OF THE INVENTION

The invention relates to optical communications systems and optical computing and more particularly to all-optical data bistable devices.

BACKGROUND AND PRIOR ART

In the field of optical communication, there is a pressing need to improve the capacity of optical networks. Increasing the capacity of the optical networks may be achieved by moving toward all-optical communication systems. Similar demand, for higher speed exists in the computing field. The need for higher speed in the computing field may also benefit from the move towards optical computing. However, in both fields, the communication and the computing, there are some optical technologies needed but, still did not reach the level of maturity to be used. One of these desired technologies is the technology for optical bistable devices. These devices can be used to perform logic functions, at a very high speed, in the field of optical computing and may be used as ultra-fast activating devices to drive optical switches and gates used in the field of all-optical communication systems for all-optical packet routing.

Accordingly, it is an object of the present invention to provide all-optical bistable devices;

Another object of the present invention is to provide all-optical bistable devices including optical feedback paths;

Another object of the present invention is to provide all-optical bistable devices including optical feedback paths having fast optical amplifiers, such as, Solid state Optical Amplifiers (SOA) and Linear Optical Amplifiers (LOA), and Still another object of the present invention is to provide all-optical bistable devices having on-chip manufacturability.

SUMMARY OF THE INVENTION

The present invention provides an all-optical bistable device, comprising:

a splitting device having first and second inputs and first and second outputs, for receiving first light beam at the first input and directing the first beam as second and third beams propagating through respective first and second outputs;

first optical path between the first output and the second input and second optical path between the second output and the second input for creating combined optical path for the first and second beams at the second input;

the combined optical path includes a saturable optical amplifier for enhancing and diminishing one of the second and the third beams for driving the optical amplifier into a saturation state to create one of two stable states in which one of the second and the third beams is an enhanced beam and the other beam is a diminishing beam;

at least one tapping device for tapping output signal from one of the first and the second optical paths, and at least one coupling device for coupling input signal into one of the first and the second optical paths to flip between the two stable states by converting the enhanced beam into the diminishing beam.

In another version the present invention provides an all-optical bistable device, comprising:

first comparator having first activating input, first threshold input and first clamping output, the first comparator arranged to produce a high level clamped output signal at the first clamping output when the signal at the first activating input is stronger than the signal at the first threshold input and to create a low level output signal at the first clamping output when the signals at the first activating and the first threshold inputs are similar;

second comparator having second activating input, second threshold input and second clamping output, the second comparator arranged to produce a high level clamped output signal at the second clamping output when the signal at the second activating input is stronger than the signal at the second threshold input and to create a low level output signal at the second clamping output when the signals at the second activating and the second threshold inputs are similar;

first optical path between the first clamping output and the second threshold input and second optical path between the second clamping output and the first threshold input for creating one of two stable states in which one of the first and second clamping outputs produces the high level clamped output signals and the other clamping output produces the low level signal;

at least one tapping device for tapping output signal from one of the first and the second optical paths, and at least one coupling device for coupling input signal into one of the first and the second optical paths to flip between the two stable states by converting the high level clamped output signal into the low level signal.

While some of the embodiments of the invention are illustrated as being constructed in one of the media of open space, fiber optics, radiation guides, waveguides, and planar waveguides on a chip, each of them may be fabricated in any of these media. It also should be clear that while the descriptions below describe coincidence gates they are also decoding devices. While the optical encoded data symbols may also be described, below, as encoded signals, signals including information and control pulses, symbols, symbol signals, spaced-pulse symbols, pulse patterns and signals, it should be clear that they all may represent optical encoded data symbols as well as other signals defined by other terms that may describe equivalents to optical encoded data symbols.

The invention will be described in connection with certain preferred embodiments, with reference to the following illustrative figures so that it may be more fully understood. With reference to the figures, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

BRIEF DESCRIPTION OF THE DRAWINGS

The invention is herein described, by way of example only, with reference to accompanying drawings, wherein:

FIGS. 8A, 8B, 8C and 8D are figurative illustrations of a gate including a polarizing beam splitter device and two output polarizes having two inputs and two outputs and showing the output signals at the gate outputs for different combinations of the input beams received at the gate inputs;

FIG. 8E is a schematic illustration of a gate produced by a directional coupler exhibiting behavior similar to the behavior of the gates illustrated by FIGS. 1A–1D, 2A–2C, 3A–3C, 4A–4E, 5A–5C, 6A–6C, 7A–7B and 8A–8D;

FIG. 15K schematically illustrates the foregoing multiplexer/demultiplexer combinations as a generic schematic;

FIGS. 15M and 15N are schematic illustration of the generic multiplexers and demultiplexers of FIG. 15K that may have multiple inputs and outputs and arranged in different configurations;

FIG. 15P schematically illustrates a system for self demultiplexing over multiple layers;

FIGS. 15Q and 15R schematically illustrate self demultiplexers with and without data control, respectively;

FIG. 15S schematically illustrates a system for self n-by-m routing connection;

FIG. 15T schematically illustrates a many-to-one combiner alternative to the star combiner used in FIG. 15S;

FIG. 19 schematically illustrates an optical delay line fabricated on a chip that includes optical couplers and mirror like edge surfaces;

FIGS. 20A and 20B schematically illustrate the configuration of FIG. 19 where the mirror-like edge surfaces are replaced by Bragg reflector gratings;

FIG. 21K schematically illustrates narrow pulses arriving from multiple parallel channels and shows their multiplexing (interleaving) into a common channel in a form of symbol signals;

FIG. 21L is a schematic illustration of a multiplexing system that performs the multiplexing illustrated by FIG. 21K;

FIG. 22D schematically illustrates a switching/routing/demultiplexing system that eliminates the need for time guard bands between the data symbols and including combined coincidence gates;

FIG. 22E is a schematic illustration of an alternative design for a combined coincidence gate that may be used in the system of FIG. 22D;

FIG. 22F schematically illustrates the symbols that are demultiplexed by the system of FIG. 22D and shows that the symbols do not include time guard band and are closely packed;

FIG. 23U schematically illustrates the coincidence amplitudes generated as a function of the phase difference between the phase shifts of the encoded signals and the phase shifts of the gates;

FIG. 23Y is an illustration of an optical data compression system using input encoded signals similar to the encoded signals illustrated by FIG. 23R;

DETAILED DESCRIPTION OF THE EMBODIMENTS

FIGS. 1A, 1B, 1C and 1D are figurative illustrations of a gate 100 that directs applied energy, for example, optical energy, based on an interaction between two sources, such as a control source and a source representing data. As discussed below, the gate 100 may permit the selective application of higher energy to an output port based on the timing and configuration of inputs by interaction of the inputs and without the requirement for a state change of the gate 100. A discussion of various embodiments that exhibit this behavior follows the discussion of FIGS. 1A, 1B, 1C and 1D.

Figure 1A:
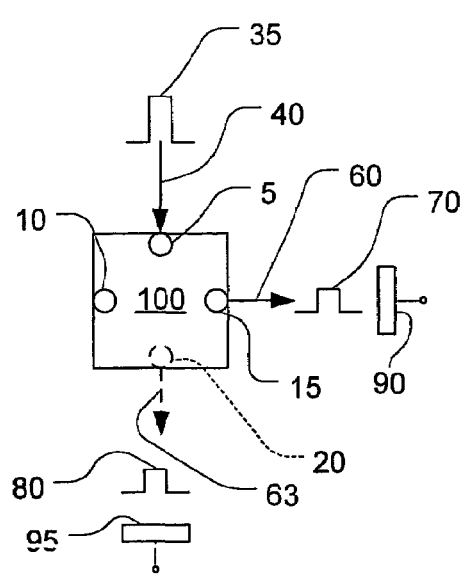
FIGS. 1A, 1B, 1C and 1D are figurative illustrations of a gate having two inputs and two outputs showing the output signals at the gate outputs for different combinations of the input beams received at the gate inputs.

Referring to FIG. 1A, a gate 100 has two inputs 5 and 10 and is configured such that when compatible energy signals are received simultaneously at the inputs 5 and 10, responsive outputs, at an output port 15, is obtained. For example, the inputs may be optical energy pulses whose phases are aligned to constructively interfere within the gate 100 or light beams whose polarization angles are in a predetermined relationship relative to each other and to filters within the gate 100. The gate 100 may be further configured such that if the energy received at the inputs has some other relationship (polarization angles, phase, or relative timing, for example) then a different output is obtained. The gate 100 may also, in embodiments, be configured to generate a different output signal at another output, for example output 20 where some of the energy is directed. For example, when a different relationship between the signals received at the inputs 10 and 5 exists, different signals may be output at such an additional output 20. Although only one additional output 20 is shown, more may be provided, depending on the embodiment.

In FIG. 1A, an input signal 40 includes an input symbol, represented here by a pulse 35 applied to input 5 of the gate 100. A second input 10 receives a different input symbol, represented here by the absence of a coinciding pulse (i.e., no input signal). An output signal 60, and where present other output signals represented by output 63, are responsive to the input signals. Here the output signals are represented by pulses 70 and 80 generated at outputs 15 and 20, respectively. The output signals are detected by sensors 90 and 95. Although gate 100 has two outputs 15 and 20 from which signals 60 and 63 are emitted and detected by sensors 90 and 95, respectively, a greater or lower number of outputs may be provided as will be clear from the discussion of specific embodiments below.

Figure 1C:
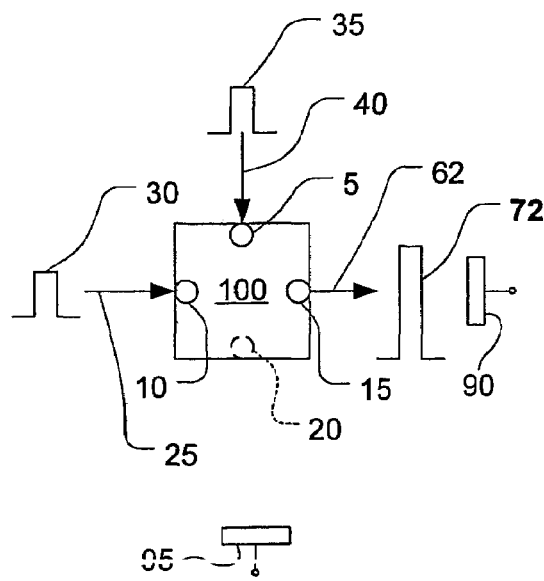
Figure 1B:
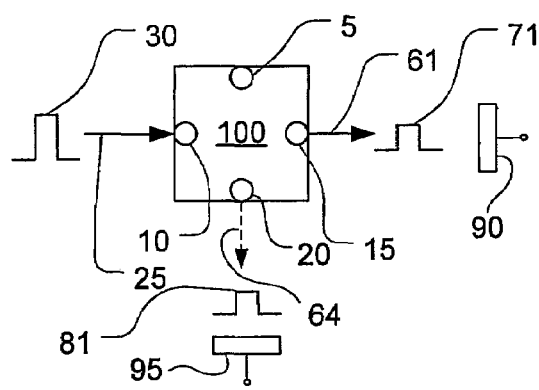

Referring now to FIG. 1B, the inputs signals change. Here, a different input signal 25 is represented by a pulse 30 applied to the input 10 of the gate 100 and no signal at input 5. A changed output signal 61 is represented by a pulse 71 generated at the output 15. In the illustrated case, the output may be substantially the same whether there is a pulse at input 5 or at input 10, but not coincident. Referring to FIG. 1C, when pulses 30 and 35 are applied to both inputs 10 and 5, respectively, a different output 62 results, which includes a pulse 72, which is different from either pulse 70 or 71.

By providing an appropriate detector, such as, detector 90, to the gate 100, it can be determined whether a signal was applied to either input 5 or 10 independently or to both in a certain temporal relationship. This may be determined by detecting the presence of a pulse 72 versus either pulse 70 or 71, for example, by comparing an intensity level of the respective pulses. Thus, for example, if a receiver is configured to detect only pulses of the form 72, a signal modulated to carry data and applied at one of the inputs 5 or 10 may be detected as such at the output 15 only when a "control signal" is applied at the other input 10 or 5 simultaneously and respectively. In this case, for example, a data signal at input 5 may be considered to be passed or blocked depending on the coincidence of a signal at input 10. Thus, one of the inputs can be regarded as a control input and the other as a data input. In FIG. 1C, signals 25 and 40 might be coherent and the relative phase between them might be adjusted in a way that output 20 might not emit any radiation. Note that, depending on the nature of the signals applied at ports 5 and 10, which output is used as the output of interest may be changed. For example, the phase relationship between the input signals 25 and 40 may affect which port 15, 20 would be better used as a more effective one for signaling.

Figure 1D:
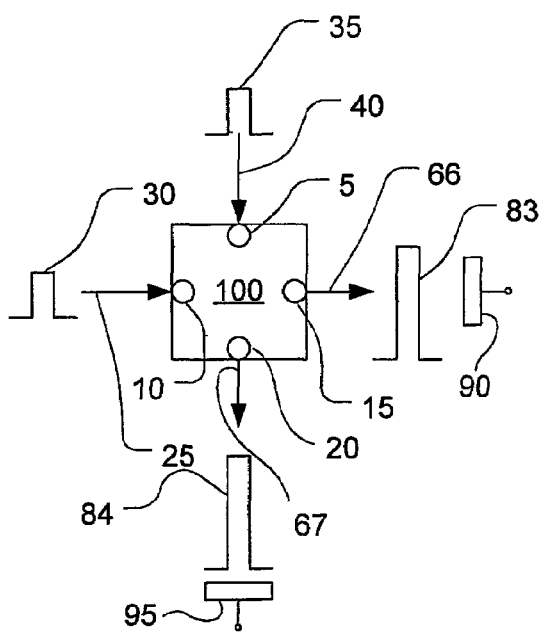

FIG. 1D illustrates a configuration, similar to that of FIG. 1C, except that both outputs, 15 and 20, are used for signaling. The nature of the signals applied at ports 5 and 10 may create useful signals at both outputs 15 and 20 that may be in a form of signals 83 and 84 carried by beams 66 and 67, respectively. For example, the relative phase between beams 25 and 40 may determine at which output port an enhanced output due to constructive interference appears.

Figures 2A, 2B, 2C:
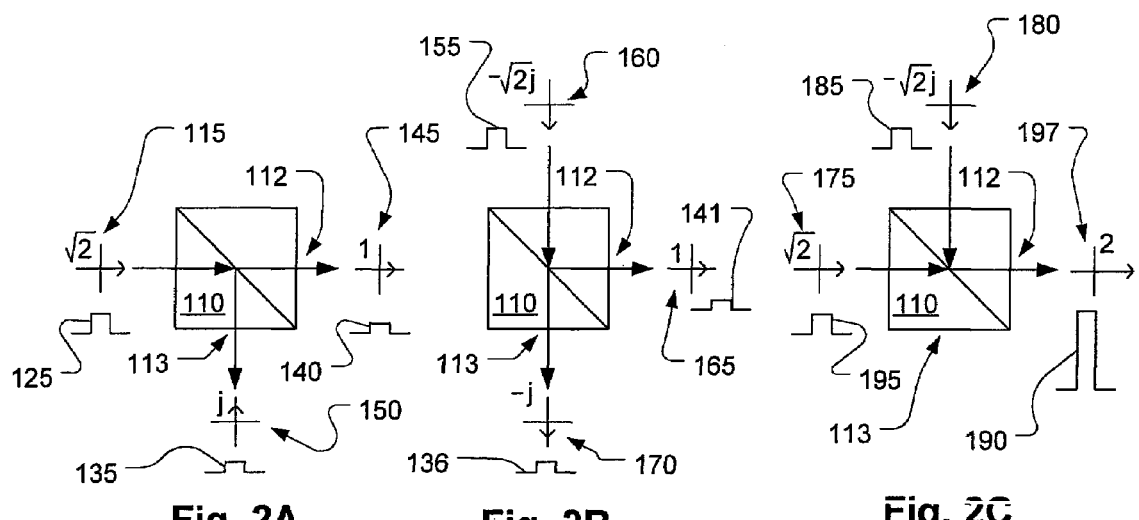
FIGS. 2A, 2B and 2C are schematic illustrations of a gate including a dielectric beam-splitter device having two inputs and two outputs and showing the output signals at the gate outputs for different combinations of the input beams received at the gate inputs.

Referring to FIGS. 2A, 2B and 2C, an embodiment of a device that may exhibit behavior such as gate 100 is a dielectric beam splitter 110. In such an embodiment, the inputs are optical energy. One input 115 the relative strengths of all inputs and outputs are represented by a complex number indicating relative peak amplitude of their electric fields E-field) is a beam incident from one angle, which results in the generation of reflected and transmitted output ports 112 and 113 with output signals 145 and 150. The phase of the reflected output 150 is shown as $\pi/2$ radians ahead of that of the input 115 to indicate that a relative change of phase occurs depending on the presence and phase of a second input 160. Each output in FIG. 2A has an intensity of about half that of the input beam intensity due to the effect of the beam splitter 110. The intensity is proportional to the square of the E-field. In FIG. 2B, the input 160 includes pulse 155 whose phase is shown arbitrarily as being $\pi/2$ radians behind of that of the input 115, produces a similar result of two output signals 165 and 170 emanating from output ports 112 and 113, respectively. The intensities of each of these output signals is about half that of the input 160. Each of the inputs may include respective pulses 125, 155 as illustrated.

It is assumed that the energy incident on the dielectric beam splitter 110 consists, at least substantially, of a single wavelength of light, although, as discussed below, in further embodiments, they consist of non-coherent radiation such as multiple wavelengths, propagation modes, phases or any combination of them. Where the light signals are non-coherent, the power combination effect is correspondingly different with simple power summing, rather than field summing, taking place.

Referring to FIG. 2C, when inputs 175 and 180 are incident simultaneously on the dielectric beam splitter 110, an output 197 is generated at output port 112 whose field corresponds to the sum of power of the two inputs 180 and 175. The intensity of the pulse 190 of output 197, being proportional to the square of the field amplitude, is thus four times the intensity of either output 145, 150 165, 170 when only one input signal 115, 160 is applied alone. If an incident signal 115 or 160 contains a pulse 125, 155, then the amplitude of an output pulse 135, 140, 136, 141, is half that of the input pulse 125, 155 when the latter is incident alone. If incident input signals 175 or 180 contain pulses 185, 195, then the amplitude of an output pulse 190, is twice that of either input pulse 185, 195 when the pulses 185, 195 are incident simultaneously. If the beam 197 is taken as the output, the behavior of dielectric beam splitter 110 can be seen to fall within the description of the gate 100 (FIGS. 1A–1D).

Note that the output may be taken as 145, 165 or 150, 170 as well and still fall within the description of the gate 100, depending on the interpretation of the received signal, the relative phase between input beams 115 and 160, and how data is represented. When using coherent energy, such as light, the energy ratio between the energy of the coincidence pulse, at the coincidence output, and the energy of the non-coincidence pulse at that output is up to four. When using non-coherent light this ratio is up to two. The differences between the above ratios is due to the fact that when using coherent light the control device (gate 100) acts as a field combiner while it acts as a power combiner when using non-coherent light. In addition, when using coherent radiation, the coincidence signal is produced at only one output and the non-coincidence signal is null. Thus the energy that is divided between two outputs, in a non-coincidence situation, is emitted from only one output, in a coincidence situation.

Note that if the phase of either input signal 175 or 180 is changed by is, the coincidence output pulse will emanate from the port 113 rather than the port 112. This effect may be used to "direct" the coincidence pulse 190 based on a phase encoding of one or both of the input signals. As will be discussed below, this along with the selective gating effect may be used to perform a communications function as performed by a switch or multiplexer/demultiplexer.

Figures 3A, 3B, 3C:
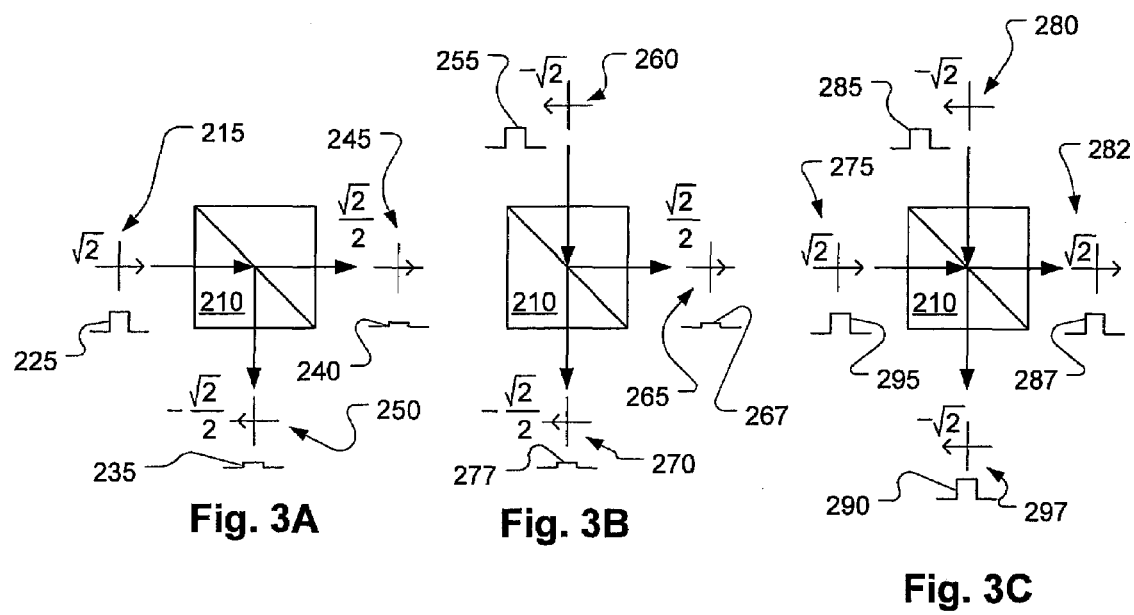
FIGS. 3A, 3B and 3C are figurative illustrations of a gate including a metallic beam-splitter device having two inputs and two outputs and showing the output signals at the gate outputs for different combinations of the input beams received at the gate inputs.

Referring to FIGS. 3A, 3B and 3C, a further embodiment of a device that may exhibit behavior such as gate 100 is a metallic beam splitter 210. In this embodiment, again, the inputs are assumed to be optical energy with the electric field represented by vectors in complex coordinates. The field magnitude is indicated by a number near the field vector. One input 215 is a beam incident from one angle, which results in the generation of reflected and transmitted outputs 245 and 250. Some loss of energy occurs in the material of the metal film of the beam splitter so the sum of the power of the outputs 245 and 250 is about half that of the input 215. The phase of the reflected output 250 is shown as π radians ahead of that of the input 215, which is typical of reflection from a metal. Output energy 245 is transmitted by metal beam splitter 210 due to the tunneling effect and thus suffers from attenuation. The metal attenuation can be adjusted by varying the metal thickness. The type of metal and its thickness are chosen to produce 50% attenuation and 50% reflectance. In FIG. 3B, the input 260 whose phase is shown arbitrarily as being π radians ahead of that of the input 215, produces a similar result of two outputs 265 and 270 whose intensities are about a quarter that of the input 260. Outputs 265,270 adjusted to have the same intensity and equal to quarter of the input intensity. This adjustment is done by choosing the reflectivity of the metal to be equal to its attenuation. Each of the inputs may include respective pulses 255 and 225, as illustrated. Again, it is assumed that the energy incident on the metallic beam splitter 210 consists, at least substantially, of a single wavelength of light, although, as discussed below, in further embodiments, they consist of non-coherent radiation that may contain multiple wavelengths, propagation modes, phases, or any combination of them.

Referring to FIG. 3C, when inputs 275 and 280 are incident simultaneously on the metallic beam splitter 210, outputs 282, 297 are generated whose fields are equal to that of either input 280 and 275. The intensity of the outputs 282, 297 is higher by a factor of four relative to the outputs 265, 270, 245, 250 because no loss occurs in the metal when the phases of the incident beams 275 and 280 are in a particular relationship and coincident on the beam splitter 210 as illustrated. The loss in the metal is reduced, incoincidence, due to a free path created by the joint and overlap between the two skin-depths on both sides of the metal, which are produced simultaneously by the two beams that coincide. If incident signals 215 or 260 contain pulses 225, 255, then the amplitude of any output pulse 235, 240, 267, 277, is a quarter that of the input pulse 225, 255 when the latter is incident alone. If incident signals 275 or 280 contain pulses 285, 295, then the amplitude of an output pulse 290 (or 287), is equal to that of either input pulse 285, 295 when the pulses 285, 295 are incident simultaneously. When using coherent light, the energy ratio between the energy of the coincidence pulse, at the coincidence output, and the energy of the non-coincidence pulse at that output is up to four as a result of field combining. When using non-coherent light this ratio is up to two as a result of power combining and no change of the loss in the metal of the beam splitter. If the beam 282 (or 297) is taken as the output, the behavior of metallic beam splitter 210 can be seen to fall within the description of the gate 100 (FIGS. 1A–1D).

Figure 4A:
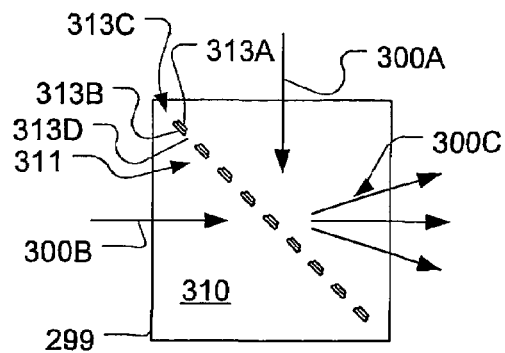
FIGS. 4A, 4B, 4C, 4D and 4E schematically illustrate a gate made of a dual grating device having transmitting and reflecting gratings illustrated within a prism having two inputs and two outputs and showing the output signals at the gate outputs for different combinations of the input beams with different relative phases received at the gate inputs.

Referring now to FIG. 4A, a dual grating device 310 has a grating 311, illustrated within a prism 299. The grating has intermittent reflective 313A surfaces. Light beams 300A and 300B incident from opposite sides of the grating 311 generate a diffraction pattern 300C that, for example, is of one order when only one beam 300A or 300B is incident and of another when both beams 300A and 300B are simultaneously incident. This is because when beam 300B is incident alone, light passes through only the gaps 313D between grating elements 313C and when beam 300A is incident alone light is reflected only from the reflective surfaces 313A. As a result, the effective grating pitch is of a certain order and substantially the same due to the identical spacing of reflective surfaces 313A and gaps 313D. However, when both beams 300A and 300B are incident, the effective grating pitch is doubled because the gaps 313D are interleaved with the reflective surfaces 313A.

Figure 4B:
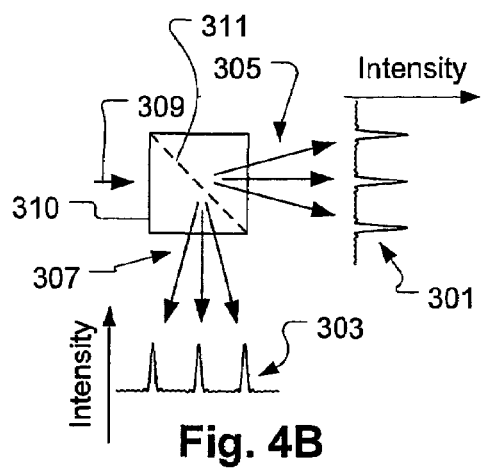
Figure 4C:
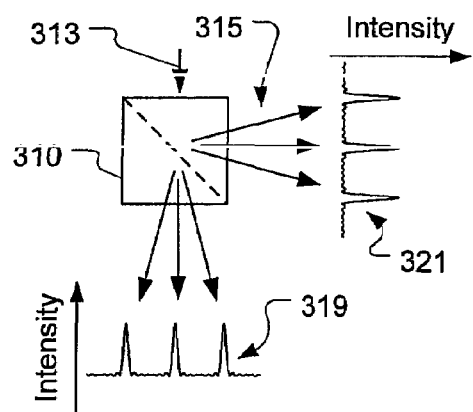
Figure 4D:
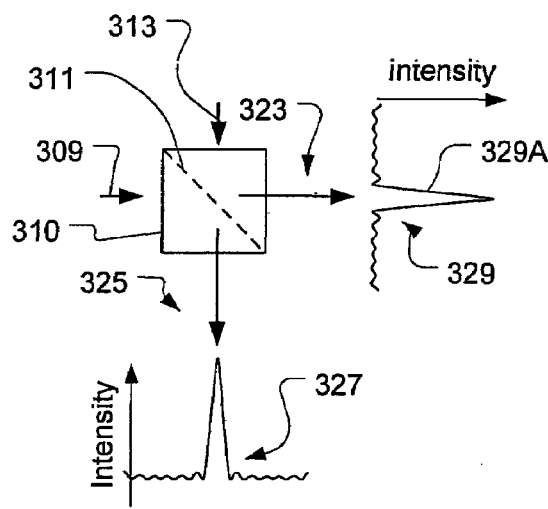

Referring to FIGS. 4B, 4C and 4D, yet a further embodiment of a device that may exhibit behavior such as gate 100 (FIG. 1) is a dual grating 310. In this embodiment, again, the inputs are assumed to be optical energy. One input 309 is a beam incident from one angle, which results in the generation of reflected and transmitted outputs 307 and 305. The resulting interference patterns 301 and 303, may have three lobes if the wavelength of the light and the grating 311 pitch are appropriately selected. As shown in FIG. 4C, a similar result obtains if a beam 313 is incident from another angle with transmitted and reflected interference patterns 319 and 321 being generated. Again, it is assumed that the energy incident on the dual grating device 310 consists, at least substantially, of a single wavelength of light, although, as discussed below, in further embodiments, they consist of multiple wavelengths, modes, or phases.

Referring to FIG. 4D, when inputs 309 and 313 are incident simultaneously on the dual grating device 310, an interference pattern 329 of lower order is generated. If the pitch of the grating 311 is selected appropriately as well as the phase between beams 313 and 309, the intensity of a given part of the interference patterns 329, 327, produced when both inputs 309 and 313 are incident simultaneously, may be four times greater than of interference patterns 301, 321, 303, 319 produced when either of beams 313 or 309 is incident alone. Illustrated is the situation for zero and first order interference patterns where the central lobe of the interference pattern exhibits this effect. If incident signals 309 and 313 contain pulses then the amplitude of a corresponding output pulse has a first magnitude when the latter is incident alone. If incident signals 309 and 313 contain pulses then the amplitude of an output pulse having four times the first magnitude when the pulses are incident simultaneously. If light from the central lobe 329A is collected and treated as an output, then the behavior of the dual grating device 310 can be seen to fall within the description of the gate 100 (FIGS. 1A–1D).

The intensity of the lobes in interference patterns 301, 303, 319, 321, 327 and 329 are schematically illustrated and do not represent the actual relative intensity of the lobes where, actually, the side lobes are smaller than the central lobe. The transmitting gaps 313D and the reflecting elements of surface 313A can be broadened to convert grating 310 into transmitting and reflecting binary grating. In such a case the side lobes has half of the intensity of the central lobe.

When using coherent light the energy ratio between the energy of the coincidence pulse, at the coincidence output, and the energy of the non-coincidence pulse at that output is up to four as a result of the reduction of the number of lobes due to field interference. When using non-coherent light the number of lobes in the interference pattern does not change and the above ratio is up to two as may be predicted since the energies are summed.

Figure 4E:
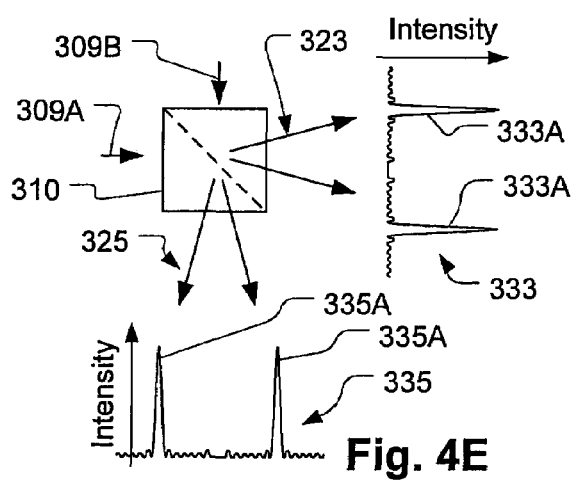

Referring now to FIG. 4E, when the relative phases of the input signals are changed by π, the interference patterns 333 and 335 corresponding to coinciding inputs 309A and 309B will change from a single lobe 329A to two large lobes as indicated at 333A and 335A. The total energy output during coincidence and non-coincidence follows the same relationship, but the energy is divided between two lobes. With suitably located optical pickups and a combiner, for picking up the total energy in the pair of lobes, e.g., 333A, and one located to pick up the energy in a single lobe such as at 329A, this effect may be used to "direct" the coincidence pulse 190 based on a phase encoding of one or both of the input signals. As will be discussed below, this along with the selective gating effect may be used to perform a communications function as performed by a switch or multiplexer/demultiplexer.

Figure 5A:
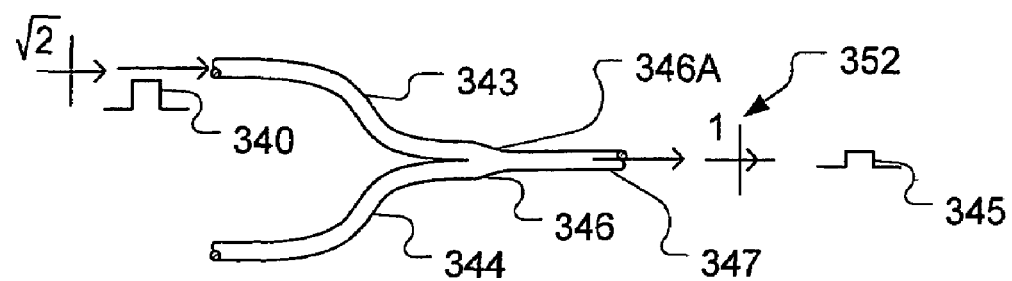
FIGS. 5A, 5B and 5C are figurative illustrations of a gate made of a Y-junction combiner device having two inputs and one output showing the output signal at the gate outputs for different combinations of the input beams received at the gate inputs.
Figure 5B:
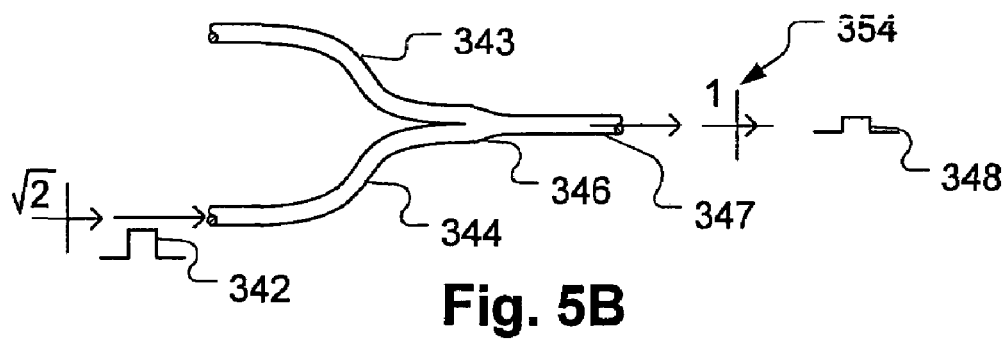
Figure 5C:
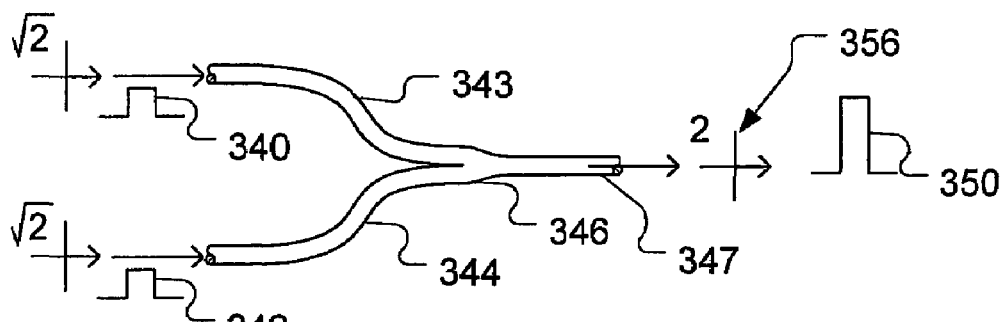

Referring to FIGS. 5A, 5B and 5C, an optical Y-junction 346 may also exhibit the described properties of the gate 100 of FIGS. 1A–1D. A first input signal 340 may be applied to a first leg 343 with no coincident signal applied to the second leg 344. An output signal 345 may have an intensity magnitude of half that of the input signal 340. Similarly, a second input signal 342 may be applied to the second leg 344 with no coincident signal applied to the first leg 343. In that case, again, an output signal 348 may have an intensity magnitude of half of the input signal 342. Note that half of the energy is lost to the second propagation mode, in the coupling region 346A, and constitutes a loss, from the device at output 347. When both input signals 340 and 342 are incident simultaneously and in phase, the magnitude of an output signal 350, at output 356, may be sum of the magnitudes of the input signals 340 and 342. In the latter case, the energy in inputs 340 and 342 is coupled only to the first propagation mode, in junction 346A, and all propagates through output 347. Accordingly, when using coherent radiation, the energy of the coincidence output pulse 350 is up to four times higher than the non-coincidence pulses 345, 348, depending on the relative phases of inputs 340 and 342. When using non-coherent radiation for pulses 340, 342 the energy of the coincidence pulse 350 is only up to twice the energy of pulses 345, 348. Vector diagrams 341, 339, 352, 354 and 356 are vectorial presentations of signals 340, 342, 345, 348 and 350, respectively. The values accompanied to the vector diagrams indicate the field amplitudes of the vectors corresponding to the signals that they represent.

Figures 6A, 6B, 6C:
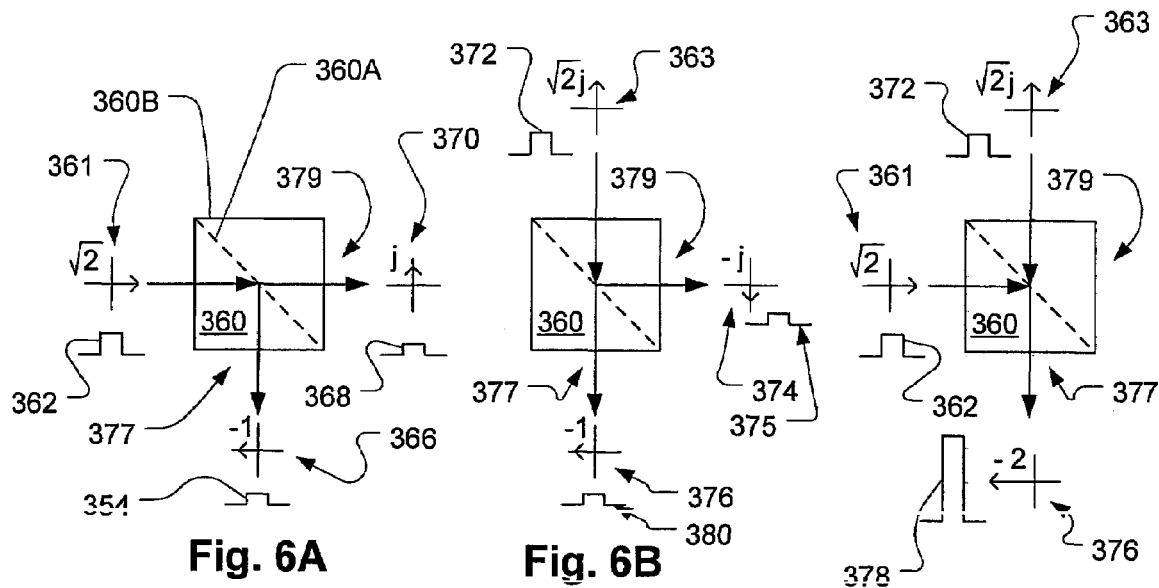
FIGS. 6A, 6B and 6C are schematic illustrations of a gate constructed by a high pitch grating device illustrated within a prism having two inputs and two outputs showing the output signals at the gate outputs for different combinations of input beams received at the gate inputs.

Referring to FIGS. 6A, 6B and 6C, yet another embodiment of a device that may exhibit behavior such as gate 100 of FIGS. 1A–1D is a high pitch grating 360 device with a high-pitch grating 360A within a transparent prism 360B. In this embodiment, the inputs 361 and 363 are, again, optical energy. One input 361 (as in the embodiment of FIGS. 2A–2C, the relative strengths of all inputs and outputs are represented by a complex number indicating relative peak amplitude of their electric or magnetic fields) is a beam incident from one angle, which results in the generation of reflected and transmitted outputs 366 and 370 from output ports 379 and 377, respectively. The phase of the reflected output 366 from the port 377 is shown as π radians behind that of the input 361 as should be for a reflection from a metal. Transmitting and reflecting metal grating 360A is a zero order grating, which means that its transmitting openings are smaller than the radiation wavelength. Thus, the openings behave as a metallic waveguides near cutoff conditions and produce small attenuation and a phase shift of π/2 radians, to transmitted output 370, relative to input 361. Each output in FIG. 6A has an intensity of about half that of the input beam intensity 361 due to the effect of the grating 360A, and the fact that the intensity is proportional to the square of the E-field. In FIG. 6B, the input 363 whose phase is shown arbitrarily as being π/2 radians out of phase with input 361, produces a similar result of two outputs 374 and 376 whose intensities are half that of the input 363. Each of the inputs 361 and 363 may include respective pulses 362, 372 as illustrated. Again, it is assumed that the energy incident on the grating device 360 consists, at least substantially, of a single wavelength of light, although, as discussed below, in further embodiments, they consist of multiple wavelengths or other forms of non-coherent radiation. While the radiation transmitted by grating 360A may suffer attenuation, it still can have an intensity that is equal to the intensity of radiation reflected from grating 360A. Equalizing the intensities of reflected from and transmitted through grating 360A can be done by selecting the reflectivity, the gap size, and the thickness of grating 360A.

Note that the port from which the coincidence pulse emerges 377 or 379 can be selected based on the phase relationship of the input signals 361 and 363. As in the embodiments of FIGS. 2A–2C and FIGS. 4A–4E, when the phase difference between the input signals 361 and 363 is changed by π, the port from which the coincidence pulse emanates switches. In the further embodiments discussed below, it should be understood that the phase-selection may be obtained by suitable change in the phase of one or both inputs and it will not be specifically referred to in the attending discussion.

Referring to FIG. 6C, when inputs 361 and 363 are incident simultaneously on the grating device 360, an output 376 is generated whose field corresponds to the sum of power of the two inputs 361 and 363. The intensity of the output 376 is thus four times the intensity of either output 366, 370, 376, 374 when only one input signal 361, 363 is applied alone. If an incident signal a pulse 362, 372, then the amplitude of an output pulse 354, 368, 375, 380 is half that of the input pulse 361 and 363 when the latter is incident alone. If input pulses 362 and 372 are incident together, the amplitude of an output pulse 378 is twice that of either input pulse. Thus, the grating device 360 can be seen to fall within the description of the gate 100 (FIGS. 1A–1D). Note that the output 374 may be taken as the output and still fall within the description of the gate 100, depending on the interpretation of the received signal and how data is represented. In the other embodiments discussed above employing gate 100 (FIGS. 1A–1D), grating 360A can be used with non-coherent light to produce a coincidence signal so that its coincidence signal intensity is up to double the non-coincidence signal.

Figure 7A:
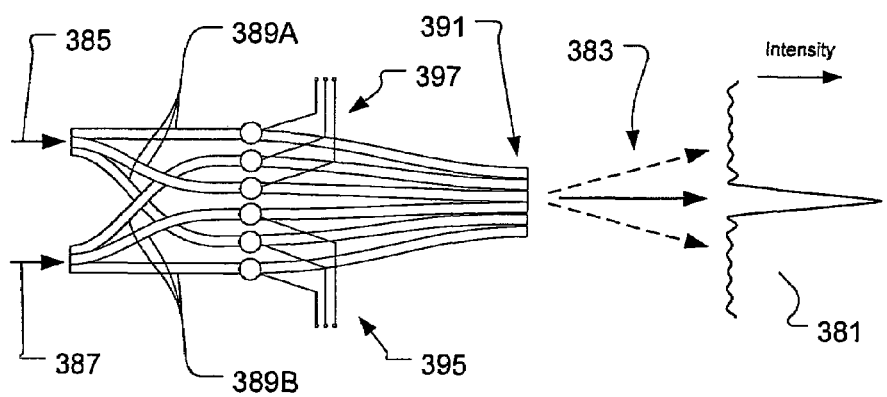
FIGS. 7A and 7B schematically illustrate a gate made of an array of interleaved light guides having two inputs and one output and showing the gate where it is fabricated by optical fibers and planar waveguides, respectively.

Referring to FIG. 7A, an alternative structure for creating the low and high order interference patterns exhibited by the grating of device 310 of FIGS. 4A–4D uses an array of interleaved light guides 391 to project a diffraction pattern 383 whose order depends on the coincidence of two inputs 385 and 387. The first input 385 directs light into one set of light guides 389A which are established at a first spacing. The second input 387 directs light into another set of light guides 389B which are established at the same spacing, but offset by one half that spacing from the first set and interleaved. When a light signal is applied to the first or second input 385, 387 a higher order interference pattern results than when both receive light signals simultaneously. The behavior of this embodiment in conformance with the description of the gate 100 is substantially as discussed with respect to the embodiment of FIGS. 4A–4D. Phase shifter 395 and 397 ensure that the proper phase relationships exist at the grating output. Phase shifter 395 and 397 may be of various types, such as, stretchers or thermal phase-shifters.

Figure 7B:
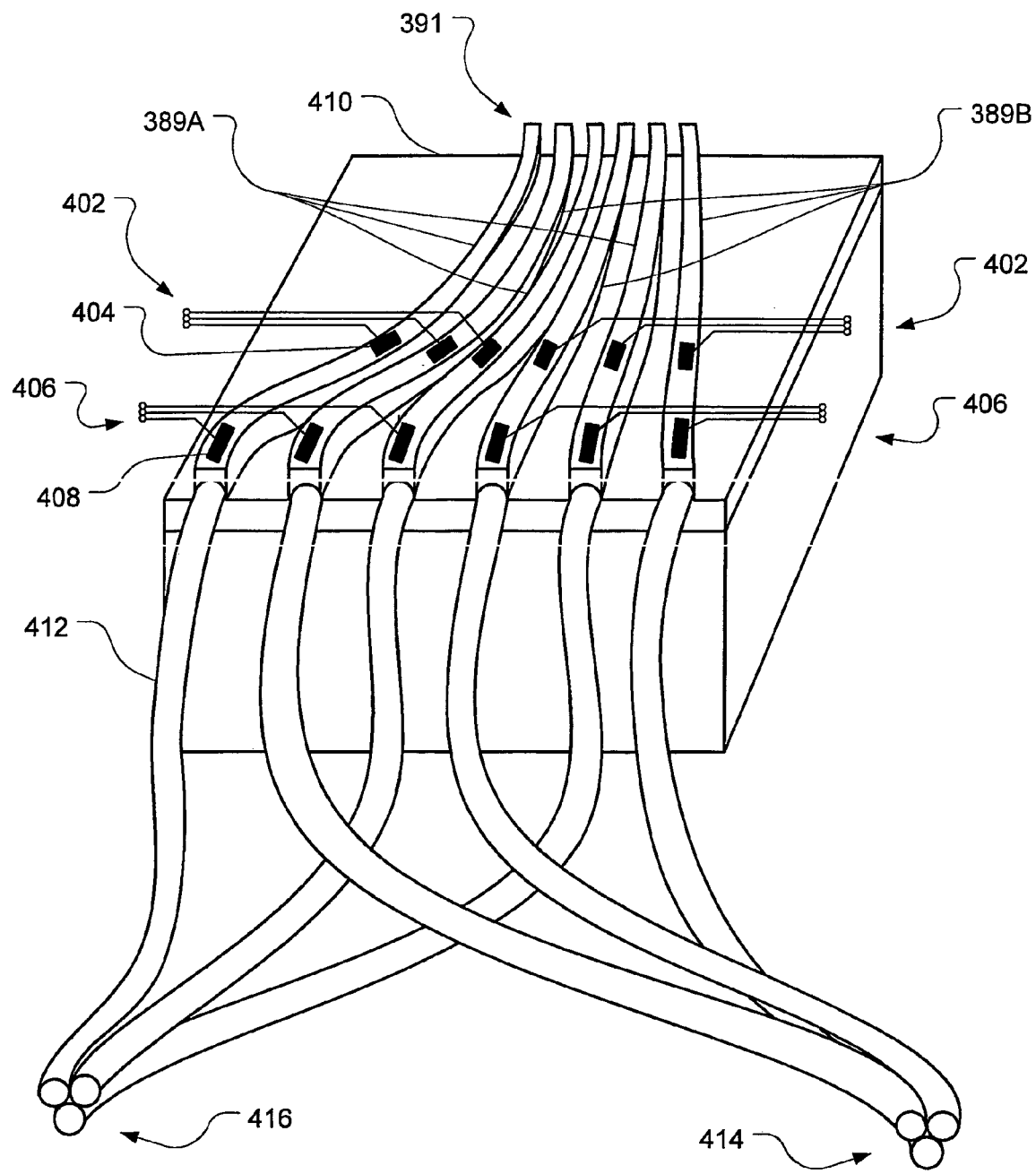

Referring now also to FIG. 7B, the light guides 389A and 389B may be fabricated as laminar waveguide structures 389A and 389B using lithographic techniques on a substrate 410 for mass production. Since, in all of the above embodiments discussed above, the maintenance of a precise phase relationship may be essential, adjustable delay portions (phase shifter) as indicated for example at 408 may be formed on the waveguide structures 389A and 389B which are independently controllable via control leads 406 and 402. Various mechanisms for adjusting the index of refraction of materials suitable for waveguide structures 389A and 389B are known, for example, ones depending on the strength of an applied electric field or ones depending on temperature. Thus, the adjustable delay portions 408 (typ.; Note that the nomenclature "typ." which stands for "typical," indicates any feature that is representative of many similar features in a figure or in the text) may include appropriately treated materials and electrical contacts to permit the control of the phase (and more coarsely, the timing) of the signals such that the required interference effects are obtained. Fibers, for example as indicated at 412, are shown connecting the waveguides to input ports 414 and 416, however, the same function of routing may be provided by a three-dimensional lithographic techniques as well. Other optical optically-interference generating structures may be created to provide similar effects and the above set of embodiments is intended as being illustrative rather than comprehensive. All of the above drawings are figurative and features are exaggerated in scale to make the elements and their function clearer.

Referring now to FIG. 8A, a polarizing beam splitter device 418 includes a polarization filter 423 that transmits and reflects incident optical inputs 419A and 419B. An orientation of the polarization filter 423 is indicated by arrows 423A. As is known in the art, when an optical input 419A or 419B is transmitted through the polarization filter 423, the input field of beams 419A, 419B is reflected in proportion to the sine of the angle between the input's 419A or 419B polarization and that of the filter 423. That is, only the component of the input 419A or 419B polarization aligned with the filter's 423 polarization is transmitted, the remainder is reflected. In the figures that follow, an optical signal's polarization is indicated by an arrow as shown at 417 illustrated in Cartesian coordinate 429A and 429B, and that of the polarization filter 423 by arrows such as indicated at 423A.

Further polarization filters 425 and 426, with respective orientations 425A and 426A, may be used to enhance the difference between coincidence and non-coincidence outputs. That is, the outputs 428E and 428D may be further filtered by polarization filters 425 and 426 to produce outputs 424A and 424B. Two input ports $I_1$ and $I_2$ and two output ports $O_1$ and $O_2$ are defined as illustrated. As discussed below, one of the two output ports $O_1$ and $O_2$ may be used alone as a selecting blocking gate or in combination so that the polarization device can be used as an output switch. In FIGS. 8B–8D, it is assumed that output port $O_1$ for purposes of discussion, but suitable orientation of the polarizations of the optical inputs generates the same behavior at the output port $O_2$. In particular, the output port behavior is switched each time the polarizations of both optical inputs 419A and 419B are rotated by π/2. As will become clear shortly, the present embodiment is thus similar to the embodiments of FIGS. 2A–2C, 3A–3C, 4A–4E, 6A–6C and 7A, 7B, except that polarization is used for signal attenuation/augmentation rather than energy or field summing.

Referring now to FIG. 8B, an optical input 419A with polarization 420A is applied to polarization filter device 418 with the polarization of the optical input 419A as indicated at 420A. The orientation of the polarization filter 423 is the same as that of the optical input 419A. Therefore, substantially all of the energy of the optical input 419A is transmitted as output 428A, with the polarization orientation, indicated at 421A, being the same as the optical input 420A. As indicated by the boldface numerals, the field amplitude of the optical input 419A and output 428A are both substantially the same and equal to 1 in arbitrary units.

The output 428A, according to a further embodiment, may be filtered by polarization filter 425 with the polarization orientation indicated. The latter, as shown, forms an approximately π/4 angle with the orientation of the polarization filter 425 so that the output signal 428A is attenuated accordingly, causing the magnitude of the output E-field 424A to be $\sqrt{2}/2$ and its orientation to be aligned with that of the filter 425 as indicated at 422A.

Referring now to FIG. 8C, an optical input 419B with polarization 420B is applied to polarization filter device 418 with the polarization of the optical input 419B as indicated at 420B. The orientation of the polarization filter 423 is perpendicular to that of the optical input 419B. Therefore, substantially all of the energy of the optical input 419B is reflected as output 428B, with the polarization orientation, indicated at 421B, being the same as the optical input 420B. As indicated by the boldface numerals, the field amplitude of the optical input 419B and output 428B are both substantially the same and equal to 1 in arbitrary units.

As in the embodiments of FIG. 8B, the output 428B, according to a further embodiment, may be filtered by polarization filter 425 with the polarization orientation indicated. The latter, as shown, forms an approximately π/4 angle with the orientation of the polarization filter 425 so that the output signal 428B is attenuated accordingly, causing the magnitude of the output E-field 424B to be $\sqrt{2}/2$ and its orientation to be aligned with that of the filter 425 as indicated at 422B.

Referring now to FIG. 8D, optical inputs 419A and 419B with polarizations 420A and 420B, respectively, are applied to polarization filter device 418 simultaneously. The polarizations of the optical inputs 419A and 419B are as indicated at 420A and 420B. The orientation of the polarization filter 423 is the same as that of the optical input 419A and perpendicular to that of optical input 419B. Therefore, the transmitted field of optical input 419A is combined with the reflected optical input 419B in the manner of the beam splitter embodiments and a combined output 428C obtained, with the polarization orientation, indicated at 421C, being the vector sum of those of the tow inputs 419A and 419B. The power of the output 428C is the sum of the powers of the optical inputs 420A and 420B. Therefore, its field amplitude is equal to $\sqrt{2}$, as indicated by the boldface numerals showing arbitrary units.

As in the embodiments of FIGS. 8B and 8C, the output 428C in FIG. 8D, according to a further embodiment, may be filtered by polarization filter 425 with the polarization orientation indicated. The latter, as shown, forms an approximately zero angle with the orientation of the polarization filter 425 so that the output signal 428C is not attenuated. Thus, the magnitude of the output E-field 424C is $\sqrt{2}$ and its orientation is aligned with that of the filter 425 as indicated at 422C.

As should be clear from the above discussion, an output 424C is obtained, when inputs 419A and 419B are coincident, whose intensity magnitude is four times that of the output 424A or 424B when either input 419A or 419B is incident by itself. This behavior is similar to embodiments previously discussed. If light having multiple frequencies or phases (or multimode light) is used, the polarization device 418 acts as a simple power summer rather than a field summer. Thus, the power of the output will not be as great as when coherent light, suitable phase-aligned, is used. As should also be clear from the properties of the polarization filter device 418, if the polarization angles of the inputs 419A and 419B are rotated by $\pi/2$ (in either direction), similar results will be obtained as above, except that instead of the outputs 428A, 428B and 428C being generated at output $O_1$, they will be generated at $O_2$, such as illustrated by output 428D of FIG. 8A.

Using the configuration of FIG. 8D when polarization filter 425 is removed, resulting in a signal 424C, at the coincidence output, that its intensity, when beams 419A and 419B are applied simultaneously, is only twice the intensity when only one input of inputs 419A or 419B is applied.

FIG. 8E illustrates a directional coupler device 443. Device 443 is constructed from a directional coupler 438 that has two input ports $I_1$ and $I_2$ indicated at 434A and 434C, respectively, and two output ports $O_1$ and $O_2$ indicated at 434B and 434D, respectively. Waveguide portions 432 (typ.) interconnect the directional coupler 438 with the ports 434A through 434D as illustrated. The directional coupler device 443 may be formed on a substrate 441 using lithographic techniques or manufactured in any suitable manner as a discrete component or one of many on a single optical chip, as desired.

The directional coupler device 443 may also be used as a gate device conforming to the description for gate 100, as discussed with reference to Table 1, below.

TABLE 1

Field magnitudes of inputs and outputs for directional coupler-based gate

| | $I_1$ | $I_2$ | $O_1$ | $O_2$ | $Q_1$ Power |
|---|---|---|---|---|---|
| Field | $\sqrt{2}$ | 0 | 1 | j | 1 |
| Magnitude/ | 0 | $-\sqrt{2}j$ | 1 | $-j$ | 1 |
| phase | $\sqrt{2}$ | $-\sqrt{2}j$ | 2 | 0 | 4 |
| | 0 | $\sqrt{2}$ | j | 1 | 1 |
| | $-\sqrt{2}j$ | 0 | $-j$ | 1 | 1 |
| | $-\sqrt{2}j$ | $\sqrt{2}$ | 0 | 2 | 0 |

When the indicated inputs $I_1$ and $I_2$ are applied in combination in a given row, the corresponding outputs $O_1$ and $O_2$ are given in the same row result. The phase relationships are relative and depend on the precise structure and materials of the directional coupler device 443, which determine delays, coupling length, etc. As will be clear to those of skill in the relevant fields, a structure may be created to provide the above behavior or a simile. As should be immediately clear, the ratio of power at output port $O_1$ when the input signals are coincident is four times that when one signal arrives at a time, as indicated in Table 1. Also, if the phases of the inputs are rotated by $\pi/2$, as indicated in the last three rows, the large coincidence output is generated at port $O_2$ instead of port $O_1$. When non-coherent radiation is used, both outputs $O_1$ and $O_2$ produce output signals, even when both inputs applied simultaneously, resulting in a coincidence output signal that its intensity is only up to twice the intensity when only one input is applied alone.

In general it should be understood that for all the embodiments described above (2A–2C, 3A–3C, 5A–5C, 4A–4E, 6A–6C, 7A–7B and 8A–8E) in accordance to FIGS. 1A–1D, and when using coherent radiation, the coincidence output, when the two inputs are applied simultaneously, may produce a signal that its intensity is within a range between 0 up to four times the intensity when either input is applied alone. The coincidence output signal may be adjusted, to be at any intensity value within the above described range, by the relative phase and polarization between the two input beams. For non coherent radiation the intensity of the coincidence output, when the two input beams are applied together, may be higher up to twice the intensity, at this output, when either input beam is applied alone.

Accordingly, it can be seen that the above described summing gates, which are all represented by gate 100 of FIGS. 1A–1D, produce low and high level amplitude signals, at their coincidence output, corresponding to non-coincidence and coincidence states, respectively.

Thus the input state (coincidence or non-coincidence state) of gates 100 can be detected at their outputs by monitoring their output signal using detectors such as detectors 90 and 95 of FIGS. 1A–1D.

Alternatively, the input state of gates 100 can be detected at their outputs using threshold devices. The lower and the higher level signals at the outputs of gates 100, corresponding to non-coincidence and coincidence states at the inputs of gate 100, can be adjusted to be below and above the threshold level of a threshold device into which these signals are fed in order to detect the input states.

The use of a threshold device that follows the summing gate produces an AND logic gate that its output is in logic states "1" or zero when its inputs are in coincidence or non-coincidence states, respectively. The AND gate includes two major units, a summing gate (such as the summing gates 100 described above) and a threshold device (such as described below). The combination of summing gates with threshold devices to produce AND gates, is described, in details, below.

Figure 9A:
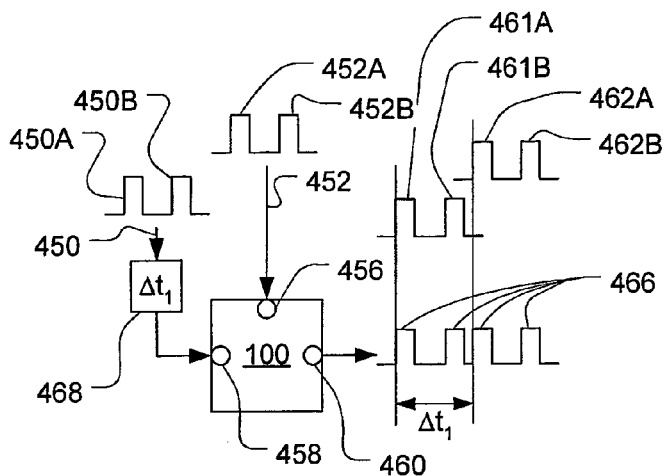
FIGS. 9A and 9B illustrate coincidence gates for symbol-selection mechanism in a situation where the gates are in non-coincidence and coincidence states, respectively.
Figure 9B:
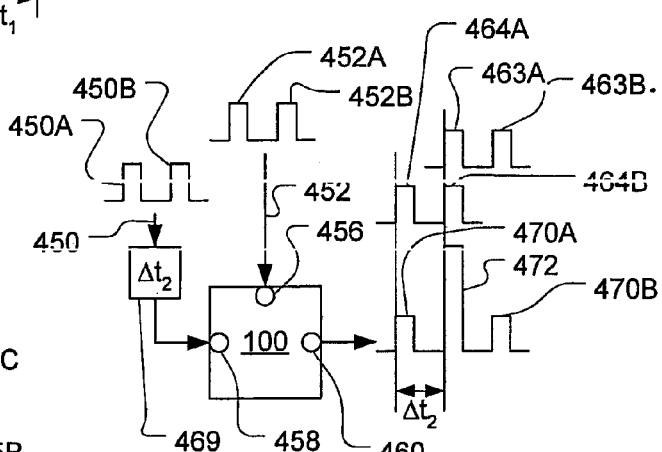

Referring now to FIGS. 9A and 9B, a symbol-selection mechanism can cause the output of a first signal level pulse when a particular spaced-pulse symbol (to be described presently) is applied to a matching gate and a second signal level pulse when the symbols is applied to a non-matching gate. To illustrate this, refer to the identical signals 450 and 452 applied to a gate 100 through inputs 458 and 456, respectively. Each signal 450 and 452 containing a pair of pulses 450A and 450B and 452A and 452B, respectively. The time spacing between the signal pulses 450A and 450B is equal to $\Delta t_2$. The same time spacing $\Delta t_2$ also separates signal pulses 452A and 452B. One signal 450 passes through a time delay 468 and the other does not. If the temporal spacing between the pulses matches the delay, two pulses will be coincident on the inputs 456 and 458 producing a coincidence output at port 460.

In FIG. 9A, the situation where the spacing between pulses 450A and 450B (which is identical to the spacing between pulses 452A and 452B) does not match the delay of the time delay 468. The latter may be simply a delay line (delay guide). At output 460, the alignment of the signals 450 and 452 is illustrated by pairs of pulses 461A and 461B and 462A and 462B, respectively, showing that neither of the pulses 461A, 461B, 462A or 462B is aligned with another pulse, in this group of pulses, due to the difference between the time space between the pulses of signals 450 and 452 and the delay time $\Delta t_1$ of delayer 468. The output generated is simply the sum of the non-coincidence outputs of the respective input signals 450 and 452 which is shown at output 460 as a string pulses 466 of relatively low amplitude compared to the situation in FIG. 9B, discussed next.

In FIG. 9B, the situation where the spacing between pulses 450A and 450B (which is identical to the spacing between pulses 452A and 452B) matches the delay $\Delta t_2$ of the time delayer 469. At output 460 the alignment of the signals 450 and 452 is illustrated by pairs of pulses 464A and 464B, and 463A and 463B, respectively showing that two of the pulses 463A and 464B are aligned due to the matching between the time space between the pulses of signals 450 and 452 and the delay time $\Delta t_2$ of delayer 469. As a result, a sequence of pulses such as shown at 470A, 472 and 470B is output at the output port 460, with the pulse 472 being a result of the coincidence of pulses 452A and 450B (corresponding to the coincidence between pulses 463A and 464B) as illustrated at output 460. This coincidence situation corresponds to the situation illustrated in FIG. 1C in that pulse 472 may be substantially greater due to the augmentation due to the summing performed by gate 100. Pulse 472 may be detected in a suitable receiver configured to, for example, register pulses of an amplitude of the coincidence pulse 472 and screen cut any smaller pulses, such as non-coincidence pulses 470A, 470B and 466 of FIG. 9A.

FIGS. 9A and 9B illustrate situations in which the input signals 450 and 452 may be generated by independent sources or carried on independent media (fibers, channels) from different locations.

Figure 9D:
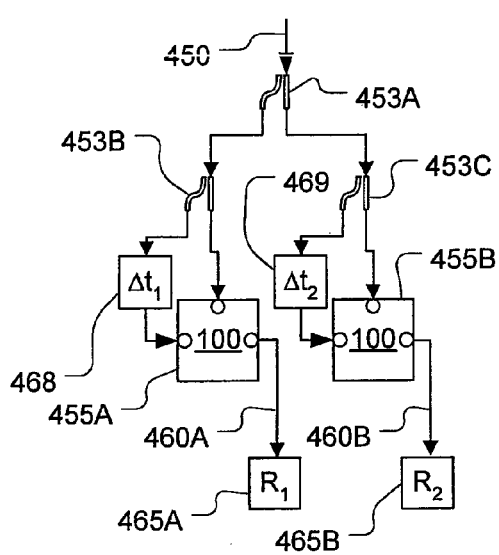
FIG. 9D schematically illustrates a one-to-two demultiplexer representing in general any one-to-many demultiplexer having output ports that each of them has a corresponding receiver that respond only to a specific corresponding symbol at the input.
Figure 9C:
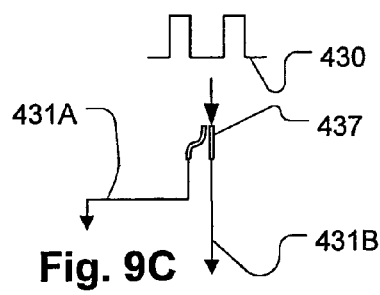
FIG. 9C is a schematic illustration of a symbol copier that duplicates a single symbol to produce input symbols for a coincidence gate.

Referring now also to FIG. 9C, the separate signals 450 and 452 of FIGS. 9A and 9B could be derived from a single signal 430 by means of splitter 437, such as an optical Y-junction or directional coupler. Splitter 437 generates two outputs 431A and 431B, each an image of the applied signal 430 and containing up to half the power of the applied signal 430. Instead of a Y-junction or directional coupler, a beam splitter or other suitable device may be used. Signals 431A and 431B may be applied, as signals 450 and 452, to delayer 468 (469 in case of FIG. 9B) and input 456 of gate 100 of FIGS. 9A and 9B, respectively. Thus, a time delay $\Delta t_1$ or $\Delta t_2$ for delayers 469 or 468, respectively, delays one signal 450, which is applied to one of the input ports 458 of gate 100. The non-delayed signal 452 is applied at the other input port 456. If the timing of the signals is such that none of the pulses 450A, 450B coincides with a pulse 452A, 452B in gate 100, a sequence of pulses, such as shown at sequence of pulses 466 of FIG. 9A is output at the output port 460. If, however, the magnitude of a time delay 469 matches the pulse spacing $\Delta t_2$ one pulse of pulses 450A, 450B will coincide with a pulse of pulses 452A, 452B coincide in gate 100 causing a coincidence pulse 472 of FIG. 9B to be generated.

Further below it will describe in more detail how a variety of communications systems may be configured around the effect described with respect to FIGS. 9A and 9B. For the moment, it may be helpful to review a basic switch mechanism with reference to FIGS. 9A, 9B, 9C and 9D. First, it may be observed how the above coincidence effect may enable the high-speed demultiplexing of a signal 450. The signal 450, containing pulses 450A and 450B separated by a time difference $\Delta t_2$ is applied to a splitter 453A, sending images of signal 450, to a second layer of splitters that includes splitters 453B and 453C. Thus, images of the signal 450 are applied to all the input ports (See ports 456 and 458 in FIGS. 9A and 9B) of two identical gates 455A and 455B of the type indicated as gate 100 and described with reference to FIG. 9A.

By applying the signal 450, via splitters 453A, 453B and 453C to two gates 455A and 455B, each with a different delay device 468 and 469, pulses of magnitude 472 ("coincidence pulses") will be output in output signals 460A or 460B only if the corresponding time delay $\Delta t_1$ or $\Delta t_2$ of respective time delay device 468 or 469 of gate 455A or 455B matches the delay between the pulses 450A and 450B. Thus, coincidence pulses will only be transmitted to the receiver 465A and 465B whose corresponding time delay device 468 and 469 matches the delay between the pulses 450A and 450B. If receivers 465A and 465B are configured to be unresponsive to signal levels of magnitude below a predefined threshold that is above that of non-coincidence pulses 466 of FIG. 9A and below that of coincidence pulse 472 of FIG. 9B, only pulse-pairs spaced apart by a delay that matches the time delay of a corresponding time delay device 468 or 469 will produce a signal at corresponding receiver 465A, 465B. The number of receivers that could be distinguished is equal to any number of allowed pulse spacing according to this symbols scheme.

Any number of gates 100 may be added in parallel to the configuration of FIG. 9D as will be shown in more detailed examples below. Pulse-pairs with different time spacing between their pulses may be added to the signal 450. Each pulse pair may correspond to a different coincidence gate having time delay device added to time delay devices 468 and 469, each delay device being connected as illustrated to a respective gate 100. Each gate 100 output may have a respective receiver such as receivers 465A and 465B. In that case, the receivers will only receive coincidence pulses if the pulse spacing Or d pulse pair matches the time delay of delay device of a corresponding gate 100. Thus, such a system acts as a demultiplexer, a two port demultipler being the configuration of FIG. 9D, but expandable to arbitrary number of outputs.

Figure 9E:
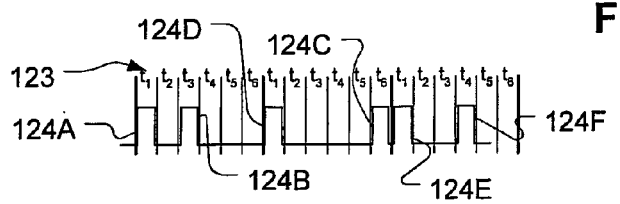
FIG. 9E is a schematic illustration of series of symbols configured to produce time synchronized coincidence signals.

Referring now to FIG. 9E, for some configurations, when using the pulse spacing symbology, it may be preferred for the coincidence pulses of a series of symbols to occur at regular intervals. For example this may be useful for synchronization recovery in a system that receives signals from multiple transmitters each coming from different switches with different gate arrays (note the discussion of multiplexers and demultiplexers below). To ensure the coincidence pulses occur at regular intervals irrespective of the spacing, one of the pulses of every pair forming a symbol may always be placed at the last time slot and the pulse in front of it used to control the spacing. For example, pulse 124A pairs with pulse 124B to form a symbol. The allowed time paces (including times slots $t_1$ to $t_6$) are shown at 123 (typ.). Pulse 124C and 124D form another pair defining another symbol. Pulses 124E and 124F form yet another pair. In all cases, the trailing symbol 124A, 124D and 124E are in time slot $t_1$. This means that even though the delay may vary, the coincidence pulses occur at regular intervals (at time slots $t_1$). The figure assumes the pulses pass through a gate from left to right. It should be clear that any symbol including pair of spaced pulses may cause the coincidence gate to produce only one coincidence signal. Accordingly, each symbol includes one data pulse and one control pulse. Defining the control pulse and the data pulse within the pulse pair is arbitrary and may be arranged in any configuration. For example, the data pulse may be the first pulse and the control pulse may the second delayed pulse or vice versa.

Figure 9F:
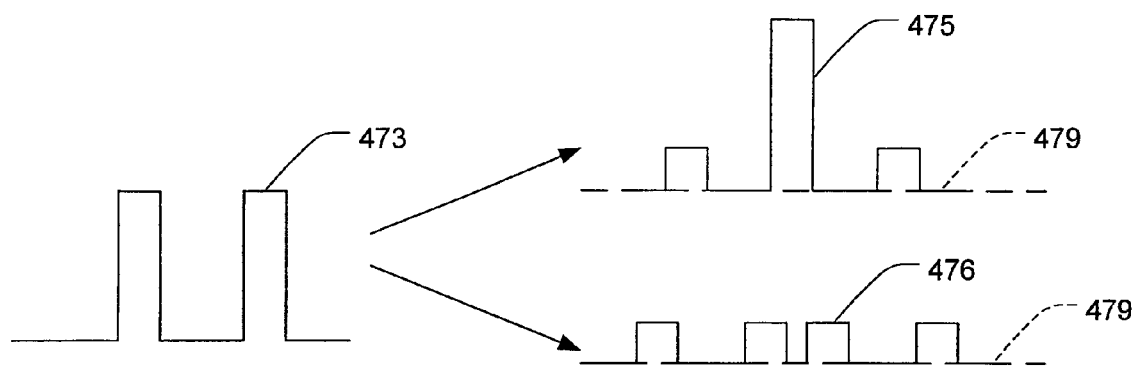
FIGS. 9F, 9G and 9H illustrate the coincidence and non-coincidence signals produced at the outputs of coincidence gates in response to input signals in the from of spaced-pulses symbol, spaced-notches symbol with non zero background, and spaced-pulses symbol including pulses with different widths, respectively.
Figure 9G:
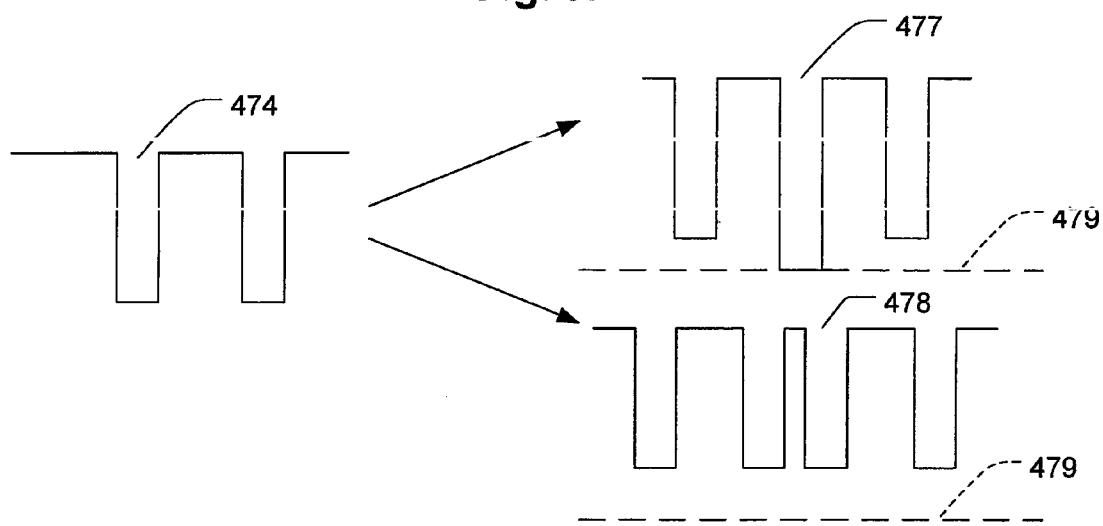

Referring to FIGS. 9F and 9G, there are various ways of forming the symbols that may allow symbol selection as discussed above. For example, FIG. 9F shows input symbol 473, corresponding to input signal 450 of FIGS. 9A and 9B, blocked data symbol 475, corresponding to coincidence pulse 472 formed at the output of the coincidence gate of FIG. 9B, and passed data symbol 476, corresponding to signal 466 produced at the output of the coincidence gate of FIG. 9A, all produced by the spaced-pulse modulation scheme discussed above. The zero-level is indicated at 479. But the mirror image of this format, as shown in FIG. 9G, would work equally-well. That is, notches 474 in an otherwise elevated signal level (e.g., voltage, current, intensity, etc.) rather than pulses, may be spaced apart by selected a spacing to create a zero-level 477 (or a level below some maximum threshold) signal that is registered by a receiver as representing data directed to it. Non-zero notches would be treated as artifact. Again, the zero-level is indicated at 479.

Figure 9H:
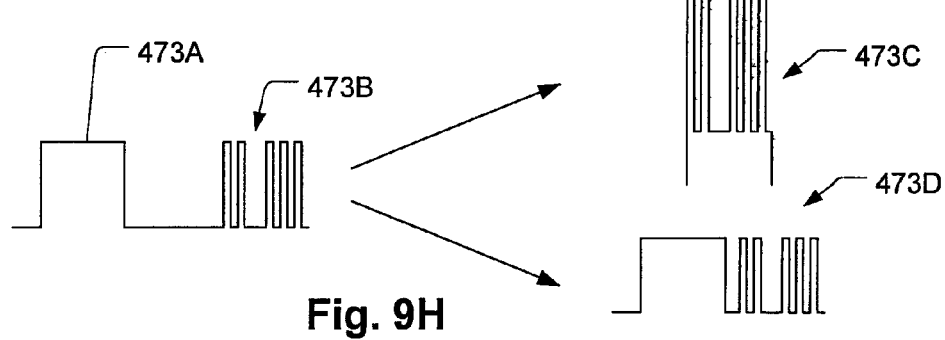

FIG. 9H illustrates another scheme for controlling the output from a coincidence gate to provide for coincidence between a single broad pulse 473A and a series of pulses 473B representing multiple data bits. It may be confirmed by inspection that with appropriate time delay, the broad pulse 473A may be made to coincide with all of the series of pulses 473B to form a series of coincidence pulses 473C. Here the allowed time slots would have to be broad enough ensure that when passed through a gate with a time delay different from that for which the symbol (473A and 473B) was formed (not shown), the non-coincidence output indicated at 473D is formed.

Figure 9I:
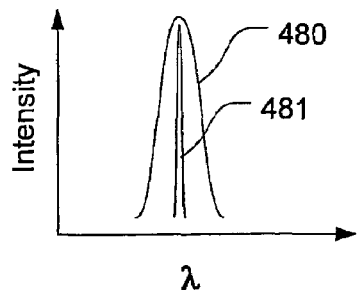
FIG. 9I illustrates the spectral distributions of wide band non-coherent and narrow band coherent signals.

Referring to FIG. 9I, note that while in the foregoing embodiments, it has been assumed that each embodiment of a gate (e.g., 100) caused an interference effect that required the use of a narrow band of frequencies and a proper phase match, this is not essential. The behavior described with respect to the gate 100 with reference to FIGS. 1A-1D may be obtained by using light having a range of wavelengths with a non-coherent summing process providing the behavior described with reference to FIGS. 1A–1D. That is, the identical components may be used (although the relative cost/value equation of them may be shifted somewhat) to achieve up to a 2:1 ratio between coincident and non-coincident signals rather than up to a 4:1 (or up to a 9:1 ratio in embodiments discussed further below) as where coherent summing is used. FIG. 9I is a figurative illustration of a signal 480 that has its power distributed over a relatively wide range of frequencies (e.g., wave packet) and a narrow-band signal 481 one in which the range is very narrow (e.g., "single" wavelength channel of a wavelength division multiplexing (WDM) optical system). Signals 480 and 481 may be produced by Light Emitting Diode (LED) and Distributed Bragg Reflector (DBR) laser, respectively.

Figure 10B:
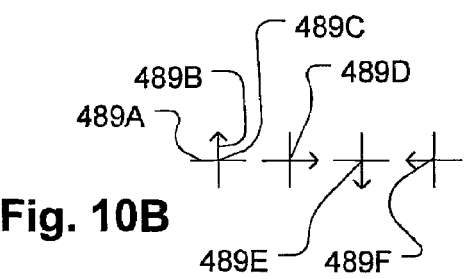
FIG. 10B illustrates exemplary presentation of vectors illustrated by their magnitude and phase in a complex plane.
Figure 10A:
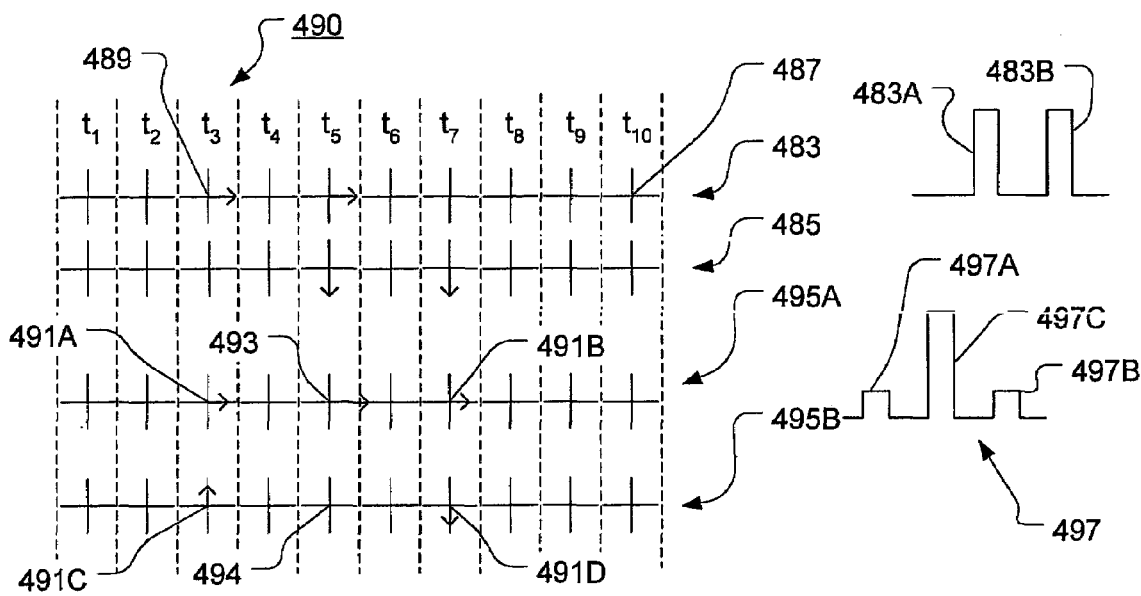
FIG. 10A is a schematic illustration of the field vectors of the signals received by a coincidence gate and their delayed vectorial coherent summing produced at the outputs of the coincidence gate.

Referring now to FIG. 10A, coherent summing of narrow-band (narrow spectrum) signals preferably takes account of the relative phases of signals being added. In FIG. 10A, one signal with a spaced-pulse symbol having pulses 483A and 483B is represented by 483 and a time-delayed copy (with a phase shift of $-\pi/2$ radians) of the same signal by 485. The time delay between signal 483 and 485 is equal to the time space between pulses 483A and 483B. The coherent sum of signals 483 and 485 produced by gate 100, such as gate 110 illustrated in FIGS. 2A to 2C, is represented by 495 (495A and 495B). Each signal 483, 485, 495 is represented by a series of icons 490 positioned in their corresponding time slots $t_1$–$t_{10}$ (illustrated in a complex plane), for example the one indicated at 489, which indicates the magnitude and phase of the field at a particular time instant (either electric or magnetic). FIG. 10B, illustrates the presentation of the field vectors. Each icon 489C–489F has a vector such as indicated at 489B, in a complex plane indicated by axes such as at 489A. Thus, vector 489B represents the magnitude and phase of the field, which may arbitrarily be designated as the electric field, but it does not matter since it is the relative phases of summed signals that are of concern. The first icon 489C indicates the signal has a phase of j (with $j=\sqrt{-1}$ representing the imaginary axis) and a certain magnitude, which may be assumed here to be unity for convenience. The second, third, and fourth (489D, 489E and 489F) indicate a signal of identical magnitude as 489C, but having phases of 1, –j, and –1, respectively (a numeral alone might be added for indicating only the magnitude with no reference to the phase).

Referring again to FIG. 10A, when signals 483 and 485 are summed coherently, the result is the signal 495 which has two pulses 491A and 491B whose field magnitudes are equal to $1/\sqrt{2}$ and signal 493 whose field magnitude is equal to twice that magnitude. Thus, the signal that is output is equal as shown at 497. The summing process represented is assumed to be modeled on the dielectric beam splitter of FIGS. 2A–2C where the reflected beam is rotated by $\pi/2$ radians (Phase shift) and the transmitted beam is not rotated (no phase shift). Thus, the total energy in the coincidence pulse 497C is equal to the total energy in the applied pulses 483A and 485B (485B is the delayed copy of pulse 483B and is not shown) and that in the non-coincidence pulses 497A and 497B is half the energy in one of the applied pulses 483A and 483B with the phases of the output as shown. Thus, the total energy of the coincidence pulse 497C is four times that of the non-coincidence pulses 497A and 497B.

Referring again to FIG. 10C, a signal 501 has a non-zero base level such that the field amplitude of the pulse is three times higher than that of the background level and with opposite phase. Arbitrarily choosing the phase of the pulse in signal 501 to be zero, results in a background having a phase of $\pi$. The relative intensity of a resulting coincidence pulse 511 is nine times the intensity of the signal anywhere else. In this case, the non-coincidence pulses in the signal, at the coincidence output, have the same intensity as the constant flat background. For example, the input signal 501, which may be applied as signal 115 (in FIGS. 2A–2C), has a pair of pulses, such as indicated at 499 and 499A (499 typ.), at time slots $t_3$ and $t_5$, respectively. The field magnitude of pulses 499 (typ.) is arbitrarily chosen as unity. Elsewhere, (e.g., time slot $t_1$, $t_2$, $t_4$, and $t_6$–$t_{10}$, (which may be identified as a background level) the input signal 501 has a field magnitude of one-third and with a phase difference of $\pi$ radians relative to the pulses 499 (typ.).

Input signal 503 also does not have a zero level. The field amplitude of the pulse is in opposite phase relative to the field amplitude of the background level and is three times higher. Input signal 503, which may be applied as signal 160 (in FIGS. 2A–2C), is a time and phase shifted version of signal 501, which may provided by choice of a suitable delay as discussed with reference to FIG. 9B and elsewhere. The phase difference between the signal 501 and 503 is $-\pi/2$ radians, which means that the pulse of signal 503 has a phase –j and the background of that signal is in a phase of +j, as illustrated by the clockwise rotation of the vectors 489E (FIG. 10B).

Note that there are only four distinct field sums that arise in the above context;

1. The background of signal 501 is added to the background of 503 as in time slot 1.
2. The pulse of signal 501 is added to the background of signal 503 as in time slot 3.
3. The pulse of signal 501 is added to a pulse of signal 503 as in time slot 5.

4. The background of signal 501 is added to the pulse of signal 503 as in time slot 7.

In general all the situations result by vectorialy adding the signals in the corresponding time slots in the manner of the dielectric beam splitter of FIGS. 2A–2C (i.e., summing the fields of signals 501 and 503 after dividing them by $\sqrt{2}$ and rotating the phase of signal 503, reflected by the beam splitter, by $\pi/2$ radians).

In situation 1, at time slot $t_1$, for example, where two background levels line up, the resulting magnitude and phase of the signal output at 197 of FIG. 2C, is obtained by adding the field magnitudes after multiplying the background field of signal 503 by j (equivalent to a phase rotation of $\pi/2$ radians) and dividing the result by $\sqrt{2}$ to get:

$$\frac{\left(-\frac{1}{3} + j * \frac{j}{3}\right)}{\sqrt{2}} = -\frac{\sqrt{2}}{3}$$

and the energy is 2/9.

In situation 2, at time slot $t_3$, adding the pulse 499 in slot $t_3$ to the time and phase shifted background level signal 503 in the same way gives a field magnitude of:

$$\frac{\left(1 + j * \frac{j}{3}\right)}{\sqrt{2}} = \frac{\sqrt{2}}{3}$$

and the corresponding energy is 2/9.

In situation 3, at time slot $t_5$, a pulse 511 is generated with a magnitude that is:

$$\frac{(1 - j * j)}{\sqrt{2}} = \sqrt{2}$$

and the corresponding energy of the coincidence signal at the coincidence output is 2.

In situation 4, at time slot $t_7$, the field amplitude is derived in a similar way to given:

$$\frac{\left(-\frac{1}{3} - j * j\right)}{\sqrt{2}} = \frac{\sqrt{2}}{3}$$

and the corresponded energy is 2/9.

It can be seen that only situation 3 produces a coincidence signal with intensity of 2. All the other situations are related to the background level and are with equal intensity of 2/9. This means that the background is flat and that the energy of the coincidence pulse is nine times the intensity level of the background.

The output 507B from the non-coincidence output has a zero magnitude at all points except in time slots $t_3$ and $t_7$, where the intensity magnitude of pulse portions 513A and 509A, respectively, is 8/9 and the pulse field magnitudes are $$2 \cdot \frac{\sqrt{2}}{3} j \text{ and } -2 \cdot \frac{\sqrt{2}}{3} j,$$

respectively. Note that if the time shift of signal 503 is not such that any pulses line up, the resulting signal from the coincidence output and the non-coincidence output will have a flat intensity magnitude of 2/9 and serial of four pulses with intensity magnitude of 8/9, respectively. It can be seen that in any situation the sum of the energies at the outputs is equal to the sum of the energies in the inputs.

The advantage of a 9:1 ratio in magnitude between pulse signal 511 corresponding to pulse portion 509 at output 507A (at time slot $t_3$) and background level 512, constructed by artifact pulses, such as, signal portion 513 in time slot $t_3$ of output 507A should be clear from the foregoing where a gate exhibiting these properties is used as a mechanism for switching such as discussed with reference to FIG. 9D and elsewhere. In particular, in such a system, less precision and accuracy are required in a receiver to distinguish a transmitted coincidence data pulse 511 from the background or from a symbol 430 (FIG. 9C) that is not transmitted because of a failure of gate 100 to provide the perfect conditions, such as, phase and time matching needed to produce the highest coincidence signal.

Figure 10C:
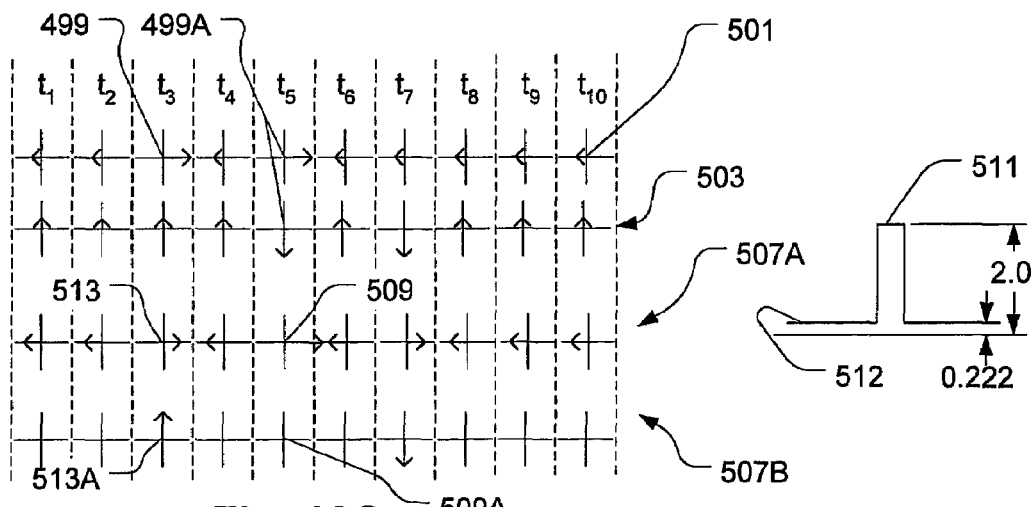
FIG. 10C is a schematic illustration of the field vectors of the signals and their non-zero background received by a coincidence gate and their enhanced delayed vectorial coherent summing produced at the outputs of the coincidence gate.
Figure 10D:
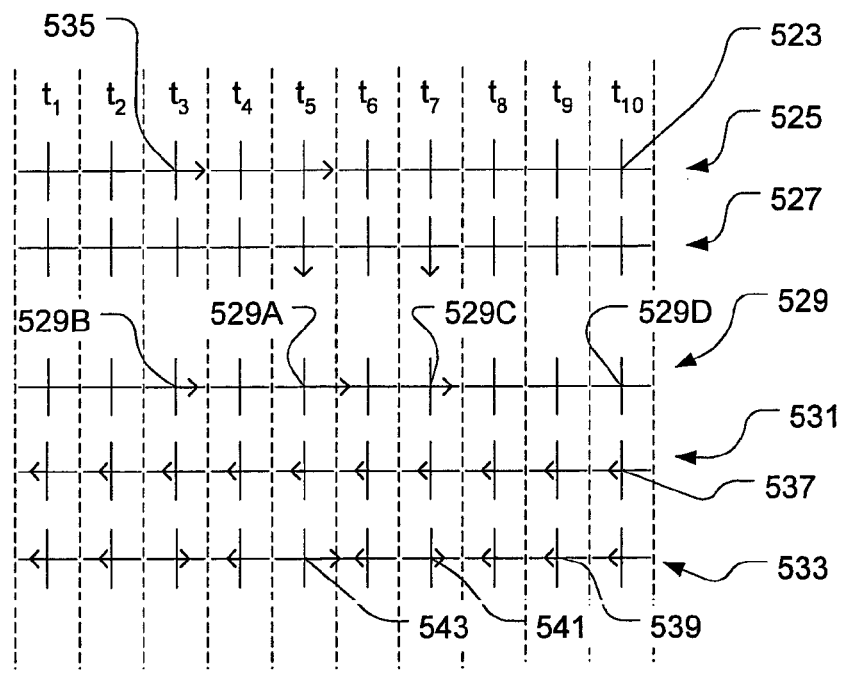
FIG. 10D is a schematic illustration of the field vectors of the signals received by a coincidence gate and their vectorial coherent summing produced at the coincidence output of the coincidence gate that is vectorially summed in opposite phase with CW radiation to produce enhanced contrast between the coincidence signal and the background signals.
Figure 10E:
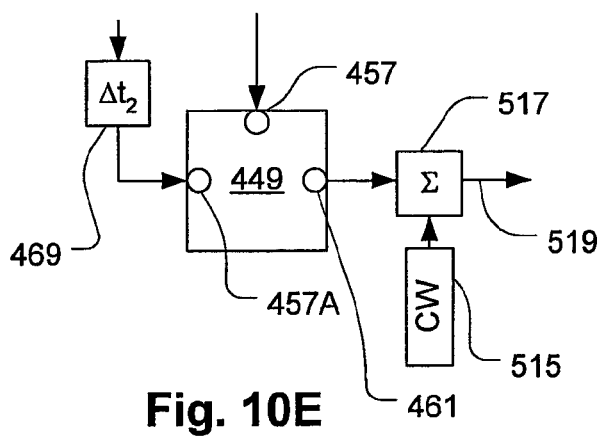
FIG. 10E schematically illustrates the embodiment for producing the vectorial summing illustrated by FIG. 10D.

Referring now to FIGS. 10D and 10E, the contrast in a signal 529 from a coincidence output of a coincidence gate (e.g., any embodiments of gate 100) having a coincidence pulse 529A flanked by vestigial pulses 529B and 529C may be enhanced by an amplification process. The signal 529 has an intensity ratio between coincidence pulse 529A and artifact or background level 529D (artifact including any vestigial pulses 529B and 529C) of 4:1. A device for providing the enhancement process is illustrated in FIG. 10E. Here, a continuous wavelength (CW) laser source 515, whose amplitude is adjusted to half the field amplitude of the vestigial pulses 529B and 529C is added to them, with a phase angle difference of $\pi$ radians, by means of a summer 517. To accomplish this, a signal from an output 461 of a gate 449 (which gate 449 may be as described with reference to gate 100, earlier) receives a signal at a first input 457 having pulses (e.g., signal 523 of FIG. 10D having pulses 535 (typ.)) and a time-delayed version thereof, via time delay 469, at port 457A. A coincidence signal, 529A (FIG. 10D), is generated at coincidence output port 461. The summer 517 may include a reverse Y-junction waveguide, a directional coupler, a beam-splitter, or any suitable device, adjusting the phase of the signal being injected, by laser 515, to ensure the summation is as illustrated in FIG. 10D and discussed presently.

Figure 10F:
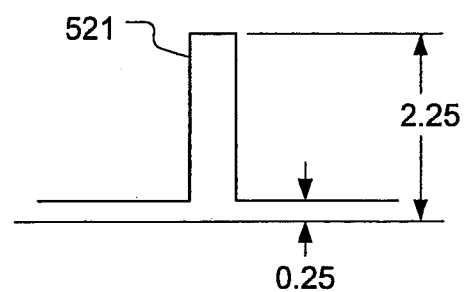
FIG. 10F is a schematic illustration of the output signal produced by the embodiment of FIG. 10E.

Referring specifically to FIGS. 10D, 10E and 10F the input signal 523 has a pair of pulses 535 (typ.) which may be added to a time and phase-rotate version of itself 527, as discussed above, to generate an output signal 529 on a coincidence output 461. The latter signal 537 added by means of the CW laser source 515 and summer 517 results in the signal 533 being output at 519. As may be confirmed by inspection, the resulting signal has a pulse 543 whose intensity is nine times the intensity level of the flanking artifact 541 and that of the background 539 signal.

The field amplitudes of the coincidence pulse and the non-coincidence pulses are 2 and 1, respectively. The signal has a zero background level. After subtracting the CW field that has magnitude of ½, the fields magnitudes of the coincidence pulse, the non-coincidence pulses, and the background level are 1.5, 0.5 and −0.5, with their corresponding intensities of 2.25, 0.25 and 0.25, respectively.

It can be seen that all the possible situations, excluding coincidence, are characterized by a power level of 0.25, which creates a flat background level. The coincidence pulse has an energy of 2.25 which is nine times higher than the energy of the background level.

Note that although in the embodiments discussed above the signals added were derived from a common source, it is clear that they may be generated from independent sources. For example, a data signal applied at one port of a gate such as gate 100 could be switched by a locally-generated control signal applied at the other port. In such a case, it may be necessary to provide timing and phase recovery (Phase Lock Loop (PLL)), topics that are discussed in more detail below to provide the above result. FIG. 10F shows the intensity of the output signal 521.

Figure 11A:
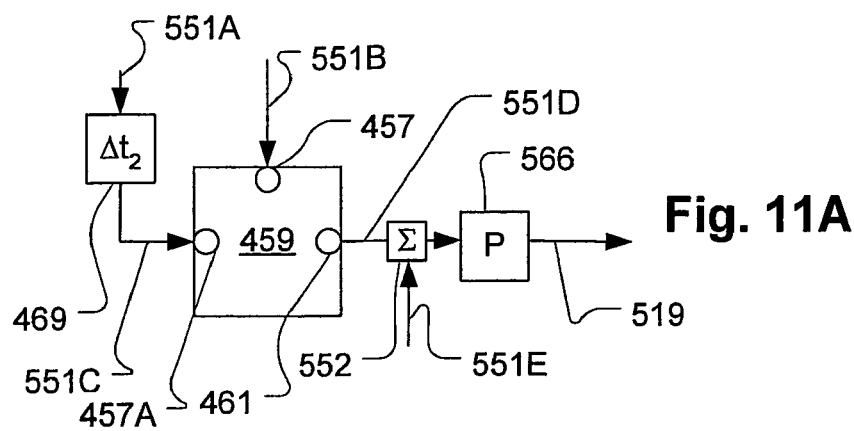
FIG. 11A illustrates a polarization based coincidence gate combined with contrast enhancer device to increase the contrast between the coincidence signal and the background.

Referring now to FIG. 11A, a gate 459 receives signal input 551B at gate input 457 and signal input 551C at gate input 457A delayed by $\Delta t_2$ after delayer 469, which should be understood as being from a single source as discussed relative to FIG. 9C, or from separate signal and control sources. Gate 459 is assumed to exhibit the behavior of the polarization beam splitter of FIGS. 8A–8D, for purposes of illustration, but may be made in accord with many of the other embodiments discussed herein. A coincidence output port 461 applies an output signal 551D to a polarization filter. When coherent summing takes place within gate 459, the transverse polarization of the signals results in a vectorial addition of the fields such that output signal 551D obeys the cosine law in dependence on the polarization orientation of the signals at inputs 551B and 551C. Output signal 551D is then filtered by polarization filter 566 to produce final output 519.

Figure 11B:
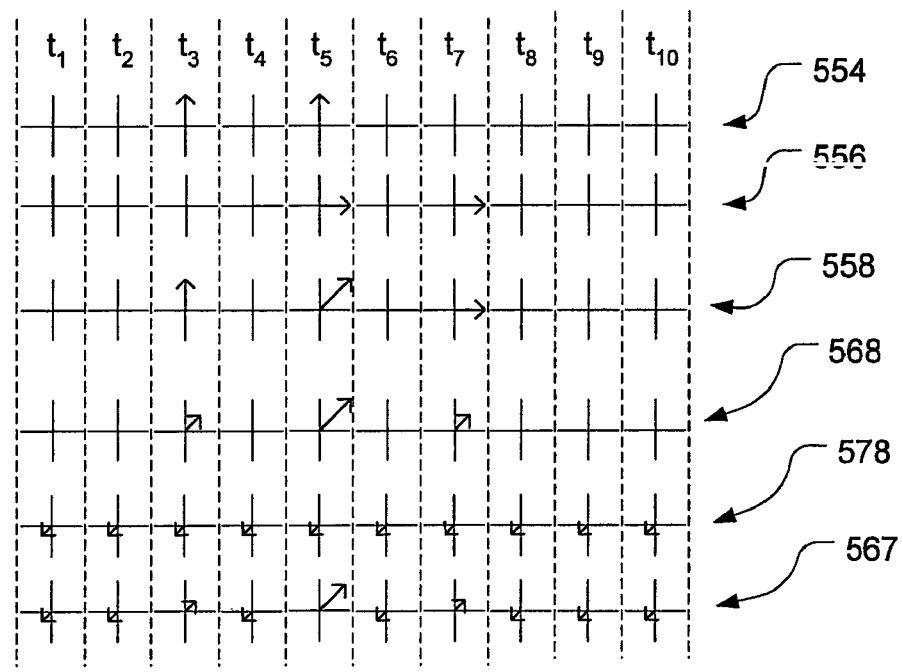
FIG. 11B is a schematic illustration of the field vectors in various locations of the device of FIG. 11A shown in their corresponded time slots.
Figure 11C:
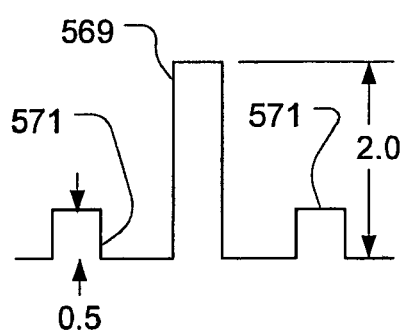
FIGS. 11C and 11D show the intensities of the signals in various locations of the device of FIG. 11A.

The functionality of the embodiment of FIG. 11A is similar to that of FIGS. 8A–8D, as can be confirmed by reference to FIG. 11B which shows the polarization angles and field magnitude rather than the phase and field magnitude in a set of time slots $t_1$–$t_{10}$, but is otherwise similar to FIGS. 10A, 10C and 10D. Here, signals 551C and 5511B correspond to the signals 554 and 556. These are added coherently to produce signal 558. The effect of filtering by the polarization filter 566 is illustrated at 568 and in FIG. 11C. In signal 568, as may be confirmed by inspection, the ratio of the power magnitude of the coincidence pulse 569 (in time slot $t_5$) is four times that of the artifact (571 and in time slots $t_3$ and $t_7$).

Figure 11D:
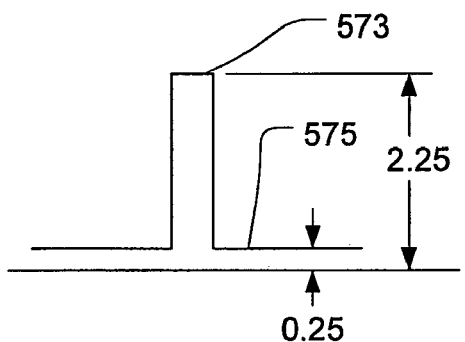

As discussed with respect to signal 533 of the embodiment of FIG. 10D, and illustrated by signal 521 in FIG. 10F, the ratio of coincidence pulse 573 to artifact 575 of FIG. 11D, can be raised in signal 568 of FIG. 11B to up to 9:1. This is achieved by adding a constant level signal 578 (similar to signal 531 of FIG. 10D) received from terminal 551E to be combined coherently with opposite phase to signal 551D, by combiner 552, to obtain the enhanced signal 567. Also, as in the situation of FIG. 10C, the constant level signal 578 can be distributed to the original signals 554 and 556 of FIG. 11B such that the 9:1 ratio is obtained at output signal 551D at the point of coherent summing in the gate 459, so that a separate step is avoided.

Figure 12A:
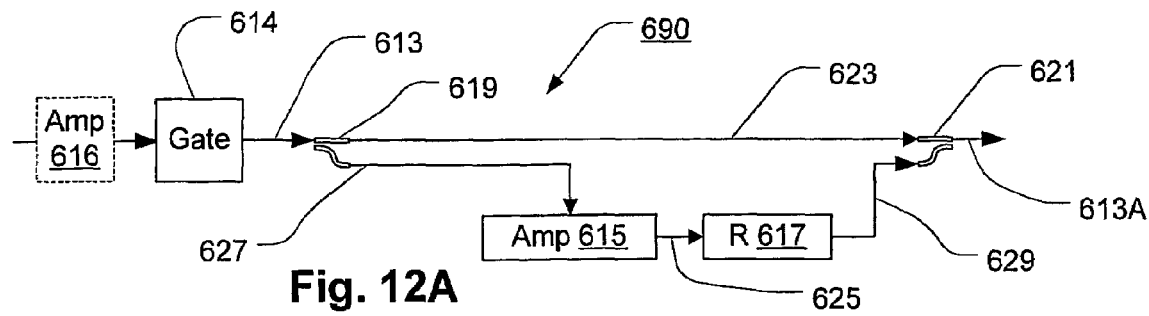
FIG. 12A is a schematic illustration of an embodiment including a coincidence gate combined together with an optical threshold device to increase the contrast between the coincidence and the non-coincidence pulses.

Referring now to FIG. 12A, another refinement of the gate 100 is to use an effect, such as amplification (or limiting) processes, to reduce background and artifact in a signal to zero so that transmitted pulses (such as 521 at FIG. 10F) have, in principle, up to an infinite ratio of intensity to that of artifact or background level. This may be done by a cancellation device (optical threshold device) illustrated at 690. Signal 613 from gate 614 (such as a gate 100 with a time delay and splitter as discussed above) is split into two parallel signal paths 627 and 623 by a splitter 619. An optical Non Linear Element (NLE), such as optical amplifier 615, amplifies signals on one of the signal paths 627 and adjusts the resulting signal on an output path 625 by means of a signal attenuator 617. The delay of signal path 627, 615, 625, 617 and 629 is assumed equal to the delay of signal path 623 with a π/2 phase difference whose significance will be explained below. A summer 621 adds the signals on signal paths 629 and 623 to provide a conditioned signal output at 613A.

Figure 12B:
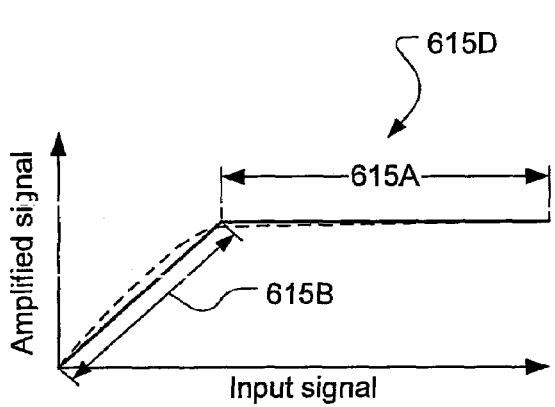
FIGS. 12B and 12C illustrate the combined transmission function of an optical amplifier and an attenuator and the transmission function of an optical amplifier alone, respectively.
Figure 12C:
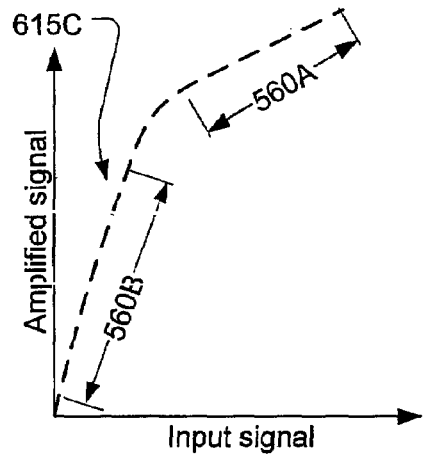

Referring now to FIG. 12B, the amplifier 615 and attenuator 617 of FIG. 12A, in combination, are characterized by a gain curve 615D exhibiting saturation when the magnitude of the signal on its input (path 627) goes beyond a certain level. Ideally, the gain curve is as indicated at 615D. This can be achieved approximately because of the behavior of certain optical amplifiers, such as Erbium Doped Amplifier Fiber (EDAF), Solid-state Optical Amplifier (SOA), Linear Optical Amplifier (LOA) and Raman Amplifier, which has a gain curve 615C as illustrated in FIG. 12C. The gain curve 615C has two main regions, one 560B in which the gain is substantially constant with high-valued and another 560A, identified as a saturation region, whose slope is substantially constant, but much shallower. The gain curve of FIG. 12B, reduces the slopes of both gain curves by means of the attenuator 617 so that the region 560A is made relatively horizontally flat as is the region 615A, while the gain in region 560B is still effective to amplify as in the region 615B.

Figure 12D:
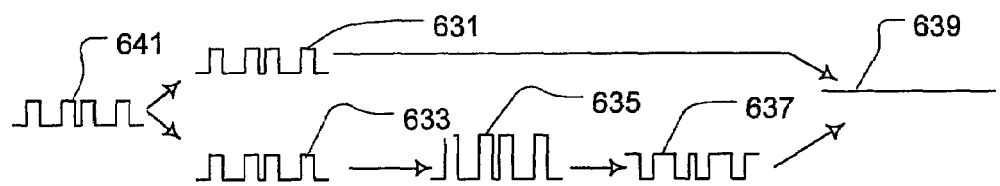
FIGS. 12D and 12E illustrate the signals propagating in the embodiment of FIG. 12A in various locations for non-coincidence and coincidence signals, respectively.
Figure 12E:
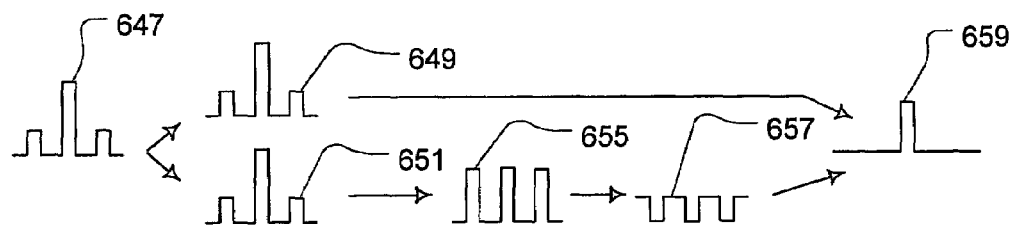

FIGS. 12D and 12E illustrate the effect of the configuration of FIG. 12A at each stage when signal 613 has only artifact pulses, as illustrated at 641, and when the signal contains a coincidence pulse, as illustrated at 647. The signals of FIGS. 12D and 12E are illustrated by a scheme where a signal with a π radians phase shift is drawn upside down. In the first case, the signal 641, which has only artifact and background, is placed on signal paths 623 and 627. The signal 633 on path 627 is amplified by the optical amplifier. The optical amplifier saturation level is such that artifact is amplified linearly and any level above the highest anticipated artifact results in saturation. The saturation point can be higher, however, as will be clear from the following description. As a result of the gain curve characterized above, when a signal 641 containing only artifact passes through the configuration of FIG. 12A, the incoming signal 641 is divided into duplicate copies 631 and 633 (except for energy loss in the splitting)

Signal 633, propagating through path 627 is amplified, by amplifier 615 in the linear region to produce a higher-level signal 635 with additional phase shift of π/2 radians. Signal 635 is then attenuated, by attenuator 617 to produce signal 637. The phase of signal 637 is coherently shifted by π/2 radians out of phase with respect to signal 631, at the input of combiner 621. Signal 637 is then added, with opposite relative phases, to signal 631, by combiner 621, resulting in a zero level output 639. The phase shift of π/2 radians between beams 629 and 623, causes subtraction when the combiner 621 is a directional coupler. For a y-junction-based combiner 621 the phase difference should be π radians.

When a signal 647 containing a coincidence pulse and artifact passes through the configuration of FIG. 12A, the incoming signal 641 is divided into duplicate copies 649 and 651 (except for energy loss in the splitting) one of which is amplified, by amplifier 615, to produce a higher-level signal 655 with additional phase shift of π/2 radians. However, in this case, as the coincidence pulse passes through, the optical amplifier saturates, thereby limiting the level of the copy of the coincidence pulse in the applied signal 651. The output 655 is then attenuated, by attenuator 617, and coherently added with opposite phase to the other copy 649 resulting in only partial cancellation. Only the portion of the coincidence pulse exceeding the saturation input level remains in the output signal 659 and the artifact is canceled. Amplifier 615 may not maintain the same phase shifts for both linear region 615B and saturated region 615A, resulting in a substantial output cancellation for the artifact pulses and enhanced output of the coincidence pulses that exceeded the saturation level of amplifier 615.

The configuration of FIG. 12A can be simplified by removing attenuator 617 and adjusting the design of asymmetric combiner 621 to combine only a small fraction of signal 627 with signal 623 (with opposite phases). Combining only a small fraction of the signal 627 with signal 623 is equivalent to the attenuation of attenuator 617. Thus, when using asymmetric combiner, attenuator 617 can be removed while maintaining the functionality of the configuration in FIG. 12A.

To assure that the coincidence signal 647 of FIG. 12E, at path 627, will be able to drive amplifier 615 into a saturation state, amplifier 616 may be placed at the input to gate 614. In such a case, the saturation level of amplifier 616 may be chosen to be much higher than the saturation level of amplifier 615, so amplifier 614 will allow amplifier 615 to be driven into saturated state by the coincidence portion of signal 647.

It should be understood that the cancellator of artifact pulses (or optical threshold device) 690 of FIG. 12A or its modified version of FIG. 12G, as described below, may be located in close vicinity to coincidence gate 614 to form an optical logical AND gate. However, optical threshold, such as device 690, may be a part of a customers' end unit, connected to an optical communication network where the network includes coincidence gates 614. In such a case the threshold device may be located far away from coincidence gate 614 and may be separated from gate 614 by multiple switching layers.

Figure 12F:
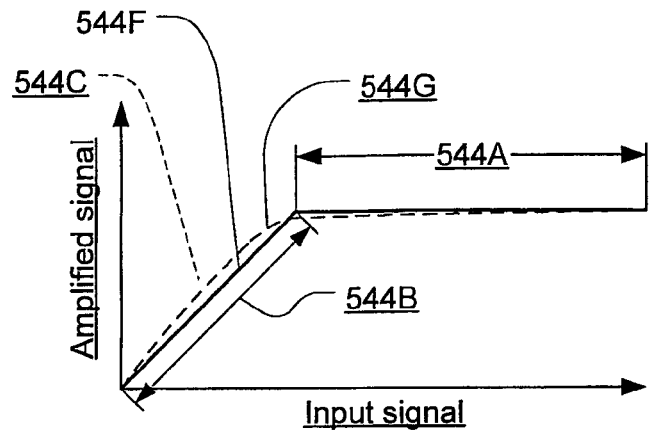
FIG. 12F illustrates an ideal and practical transmission function of an optical amplifier.
Figure 12G:
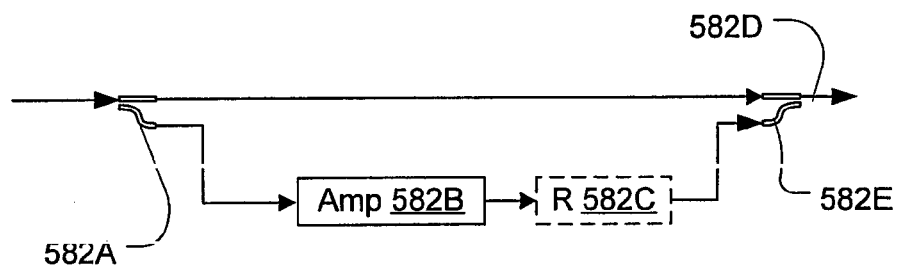
FIG. 12G is a schematic illustration for a modified design of the embodiment of FIG. 12A.

Referring to FIGS. 12F and 12G, an alternative method of artifact elimination (thresholding) employs an amplifier 582B with a gain characteristics in which output phase varies with input amplitude. Here the substantially linear region 544B (idealized version shown at 544F) of the gain curve with regions 544C and 544G may be used for both amplifying both artifact and coincidence signal. Near the "knee" of the gain curve, a region 544G is characterized by nonlinear amplification in which the phase of the output signal in this region 544G shifts by r radians relative to the output in the lower and linear regions of the gain curve 544C. The phase shift that is produced in region 544G relative to linear region 544C depends on the relative change, in the index of refraction, between these regions and on the length of the amplifier 582B. The flat region 544A beyond may or may not used.

An attenuation 582C may or may not be used to attenuate the energy received from amplifier 582B depending on design characteristics of the circuit. Combining, in coupler 582E, only a fraction of the energy received from amplifier 582B is equivalent to attenuating this energy prior to its entrance to coupler 582E. For example, a combiner 582E may couple a chosen fraction of energy from the output signal of amplifier 582B into port 582D so that a corresponding amount, or no, attenuation may be required. The amplified signal and original signal are combined by a combiner 582E to generate an output.

Figure 12H:
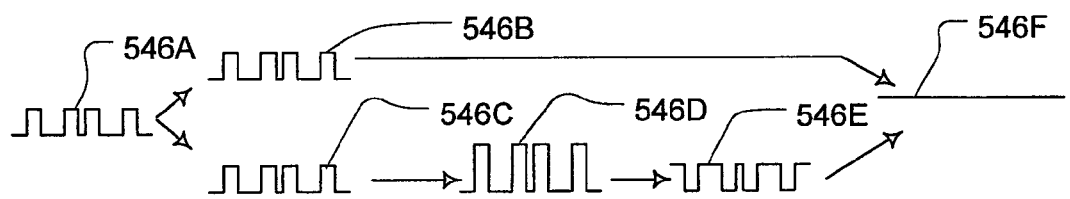
FIGS. 12H and 12K illustrate the signals propagating in the embodiment of FIG. 12G in various locations for non-coincidence and coincidence signals, respectively.
Figure 12K:
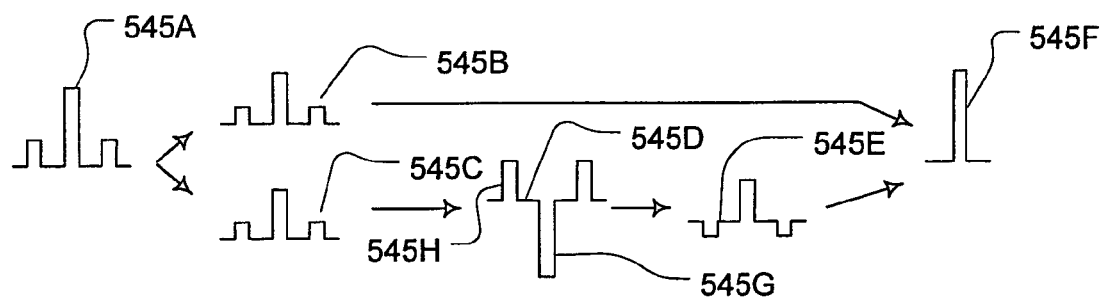

The result of using the amplifier 582B is illustrated in FIGS. 12H and 12K. The signals of FIGS. 12H and 12K are illustrated by a scheme where a signal with a or radians phase shift is drawn upside down. Here the input signal 546A includes only artifact and no coincidence pulses. A portion 546C of signal 546A is amplified to produce signal 546D and then combined, with the other portion 546B of original signal 546A having π radians out of phase with it. The amplitude range of the input signal fraction 546A is chosen so that artifact always lies below a point at which a phase of the signal 546E results in a cancellation as shown (FIG. 12H). That is, the intensity levels of the artifact pulses and the coincidence pulses are adjusted to be in the linear gain region 544C and in the nonlinear region 544G, respectively. The same amplitude range is also chosen such that the behavior illustrated in FIG. 12K is exhibited when an input signal 545A having a coincidence pulse level is incident. Again, a portion 545C of input signal 545A is amplified to produce signal 545D. The non-coincidence pulses 545H (typ.) are combined, with their corresponding non-coincidence pulses in other portion 545B of original signal 545A, having π radians out of phase with them. But now, the amplification of the coincidence pulse 545G results in a phase change relative to the lower level portions 545H (typ.) of the same signal (which include artifact). As a result, the coincidence pulse is enhanced, as indicated at 545F, by the summation and the artifact is canceled. To assure that the intensity of coincidence pulse 545G will be in the non linear gain region 544G, the embodiment of FIG. 12G may include an amplifier as part of the combined structure.

The amplifier 615 of FIGS. 12A and 582B of FIG. 12G need not necessarily be different structures, as will be recognized by persons skilled in the field of optical amplifiers. They may simply be the same type of amplifier operated in different modes, one in which the saturated region may be used in which other may not. The use of the operation mode which includes the saturated region has the advantage that there is no need to accurately adjust the phase relations between the artifact and the coincidence pulses. The operation mode that does not include the saturated region 544A has the advantage of being potentially faster and producing higher intensity of output signals 545F.

Note that the amplifier 582B may also be replaced by a material or NLE whose properties are such as to produce a phase shift that is proportional to the intensity. The latter may include an amplifier as part of the combined structure. For example, such a nonlinear property may be employed by choosing a material and signal level such that the high energy level of the coincidence pulses, produce refractive-index change that will be resulted in a phase inversion relative to the artifact pulses having lower intensity level.

From the observation of the transmission-function shown in FIG. 12F it will be observed that it is similar to that of an optical-limiter. An optical limiter is a device that has a linear (or close to linear) transmission curve, such as region 544B, corresponding to low signal intensities, a saturated region, such as region 544A, corresponding to high signal intensities, and a transition region, such as region 544G. Optical limiters are usually produced from materials whose optical properties, such as, index of refraction, scattering, or absorption change under high radiation intensity and are used to limit the output intensity of the device at high intensity levels. Accordingly amplifier 582B can be replaced, without affecting the above-described operation, by an NLE or any other limiter device that has a transmission curve similar to that shown in FIG. 12F In such a case the optical limiter, similar to amplifier 582B, can be operated in the two above mentioned modes, i.e., one in which saturation region 544A is used and the other in which it is not.

Figure 16A:
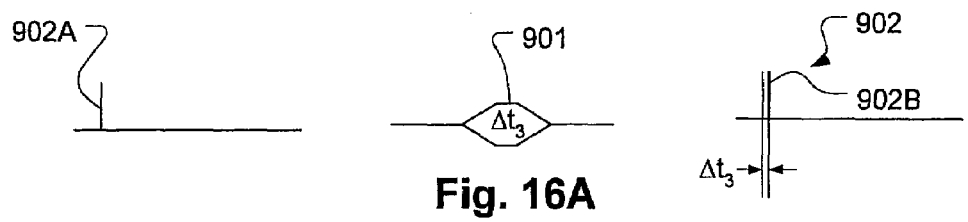
FIGS. 16A, 16B and 16C schematically illustrates the construction of symbols designed for self demultiplexing/switching across multiple layers.
Figure 16B:
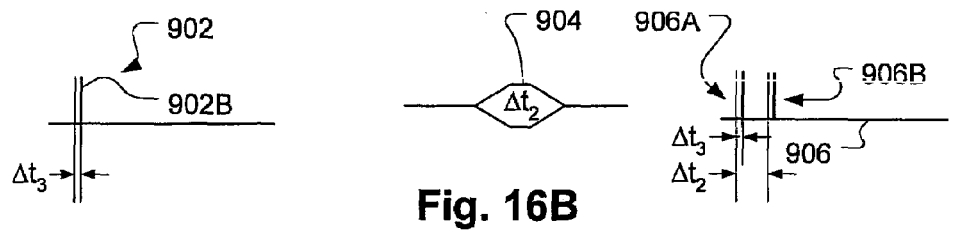
Figure 16C:
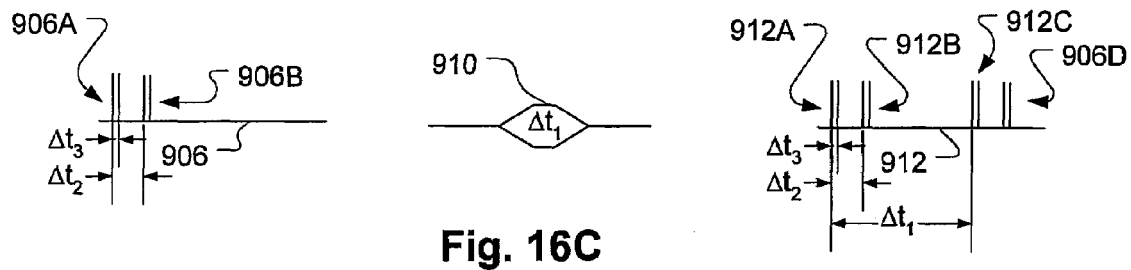
Figure 16D:
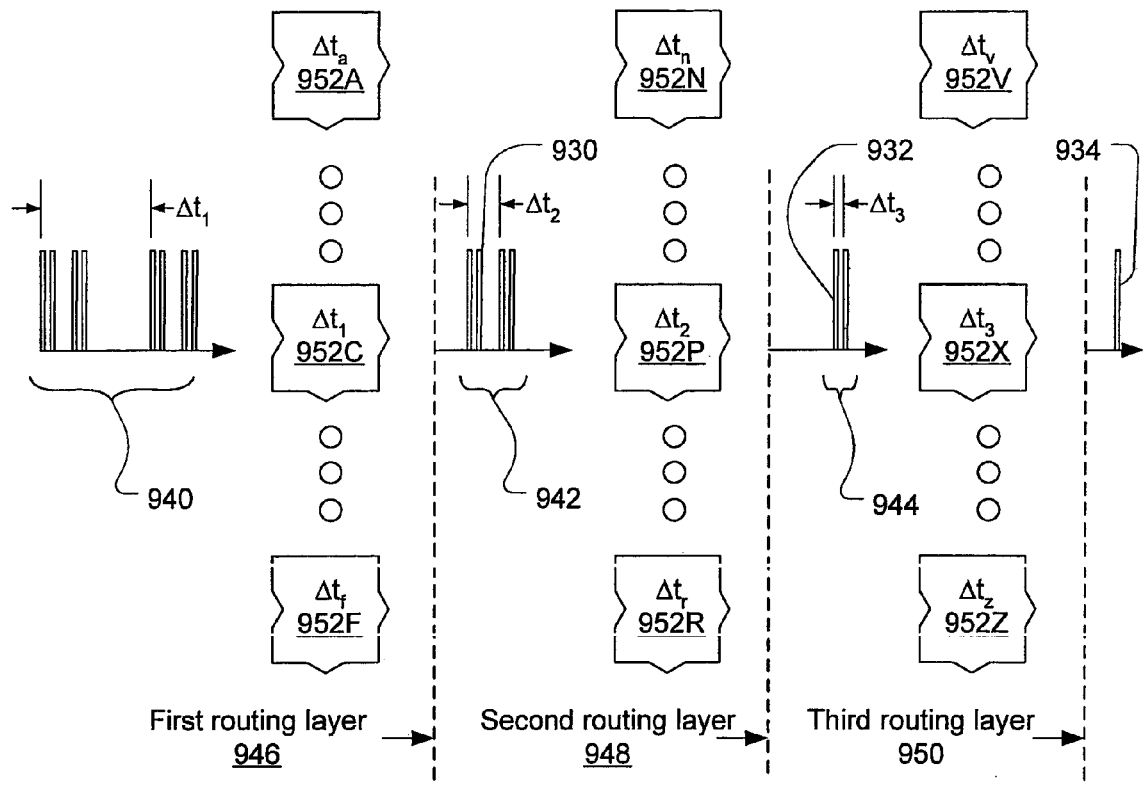
FIG. 16D is a schematic illustration of self demultiplexing/switching system across multiple layers.
Figure 16E:
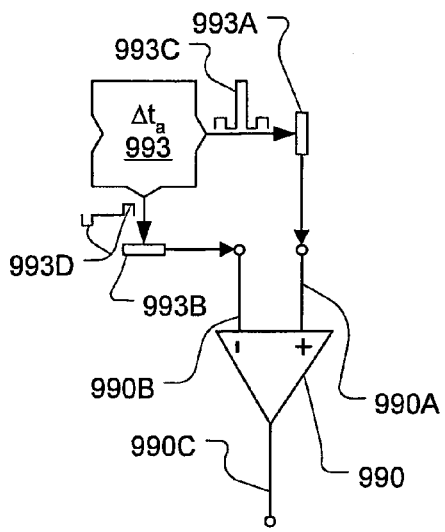
FIG. 16E schematically illustrates a coincidence gate combined with electronic detectors and comparator (differential amplifier) to increase the contrast between the coincidence and the non-coincidence pulses.
Figure 16F:
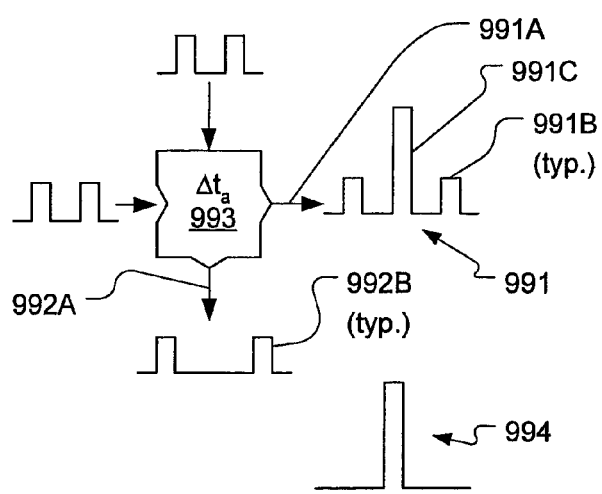
FIG. 16F illustrates the intensities of the signals at the coincidence and the non-coincidence outputs of the coincidence gate of FIG. 16E and shows the coincidence signal produced at the output of the comparator of FIG. 16E.

Referring now to FIGS. 16E and 16F, another way to enhance coincidence pulses relative to artifact at the receiver is to use a comparator (differential amplifier) 990 to subtract the power of the coincidence signal 993C from that of the non-coincidence signal 993D emanating from gate 993. Coincidence and non-coincidence signals 993C and 003D, respectively, are incident on respective detectors 993A and 993B. The detectors 993A and 993B are insensitive to the phase of the E-field and convert the energy of optical signals to electrical signals and the result is applied to the different inputs 990A and 990B of a comparator 990. Signals 993C and 993D are illustrated by a scheme where E-fields with or radians phase shift are drawn upside down. At the output 990C of the comparator 990, the coincidence pulse remains but the non-coincidence, or artifact, pulses are canceled as shown with reference to FIGS. 16E and 16F. It will be recalled that when a signal is incident alone on a gate 993, such as gate 100 of FIGS. 1A–1D, the power profiles include only artifact pulses and no signal will be produced at output 990C of comparator 990. Exemplary signals are shown at gate 993 outputs 991A and 992A of FIG. 16F with a coincidence pulse 991C and artifact pulses 991B (typ.) emanating from the coincidence output 991A and only artifact pulses 992B (typ.) emanating from the non-coincidence output 992A. The signals at outputs 991A and 992A are illustrated by their intensity with no indication to the phase of their electrical field, in a way similar to the way that they are detected by detectors 993A and 993B of FIG. 16E. It may be confirmed by inspection that when the corresponding electrical signals are applied to the inputs of a comparator 990 of FIG. 16E, with suitable synchronization, that the electrical signal portions corresponding to the non-coincidence pulses 9911B (typ.) and 992B (typ.) will align and cancel but that the electrical signal portions corresponding to the coincidence pulse 991C will not. Thus, the output of the comparator 990 will be as indicated figuratively at 994.

It should be understood that detectors 993A and 993B and comparator (differential amplifier) 990 may be located in close vicinity to coincidence gate 993 to forms a logical AND gate. However, detectors 993A and 993B and comparator 990 may be part of a customers' end unit, connected to an optical communication network where the network includes coincidence gates 993. In such a case detectors 993A and 993B and comparator 990 may be located far away from coincidence gate 993 and may be separated from gate 993 by multiple switching layers.

Figure 22A:
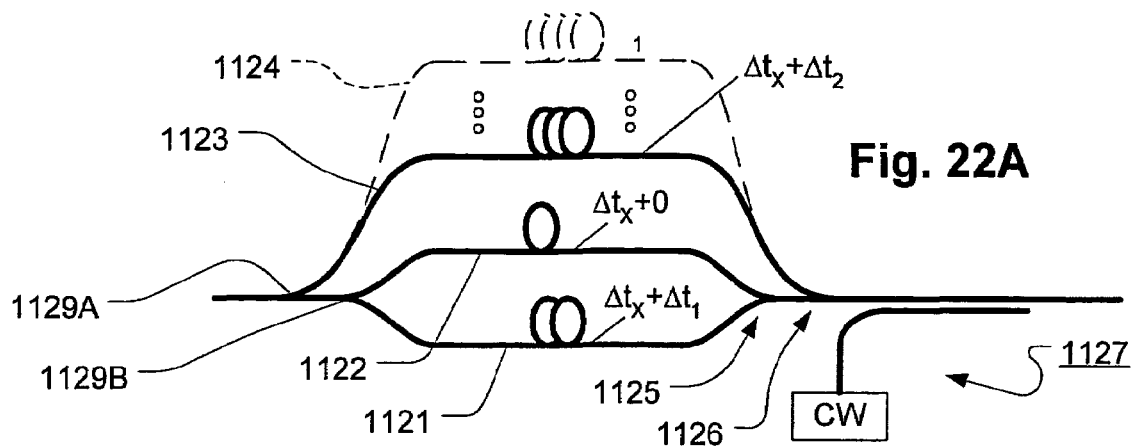
FIG. 22A is a schematic illustration of a coincidence gate designed to receive symbols containing more than two pulses for enhancing the contrast between coincidence and non-coincidence signals.
Figure 22B:
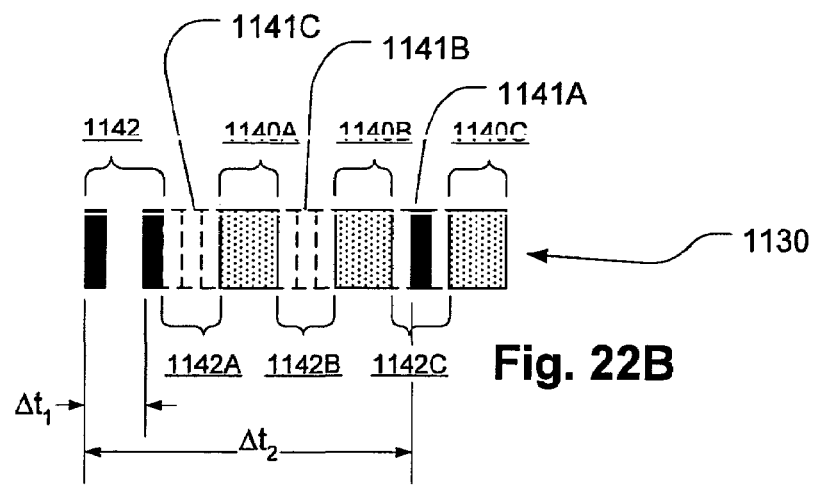
FIGS. 22B and 22C illustrate the signals propagating in the embodiment of FIG. 22A in various locations.

Referring now to FIGS. 22A and 22B, another mechanism for enhancing the ratio of coincidence signals to artifact is to provide a trailing pulse that coincides only with the coincidence pulse, thereby enhancing it further relative to the artifact, but producing artifact that still has the same maximum level. In FIG. 22B, a first pulse-pair 1142 defines a symbol by which a coincidence pulse can be generated by a first summation using a gate 1125 indicated in FIG. 22A. A third pulse 1141A coincides with the coincidence pulse, produced by gate 1125, in a second summation that occurs in a following gate 1126 (FIG. 22A) after the first summation (as provided by a delay line 1123 of $\Delta t_2$, shown in FIG. 22A), which produces the coincidence pulse, thereby enhancing the first coincidence pulse produced by the first gate 1125. The second summation can be the summing of the output of a first summation with a signal proportional to the original signal (i.e., a duplication of it).

Figure 22C:
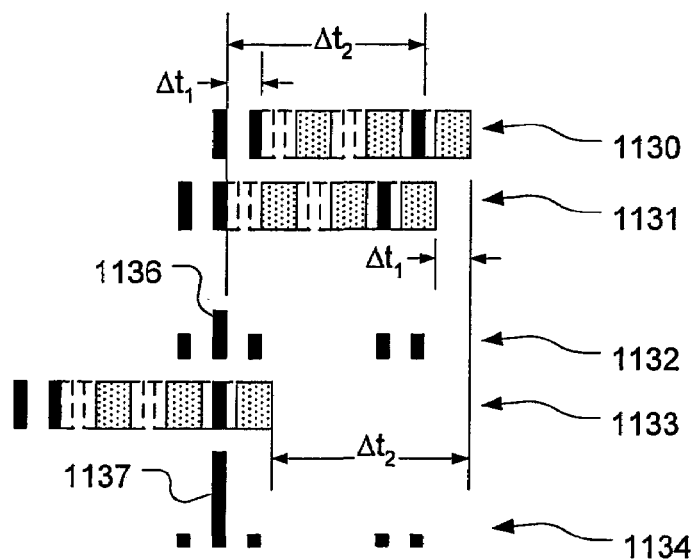

Referring to FIGS. 22A and 22C, first, an original signal 1130 is applied at an input of a first Y-junction 1129A which splits approximately 1/3 of the input energy into a first branch 1123 sending 2/3 into an input of a second Y-junction 1129B which forms part of a gate with second and third delay branches 1121 and 1122. The difference ($\Delta t_1$) between the delays of the second and third delay branches 1121 and 1122 causes a coincidence pulse at an output of a first reverse Y-junction 1125 if that difference matches the delay between the two pulses defining the symbol 1142. Copy 1131 of signal 1130 is delayed at branch 1121 by a time difference of $\Delta t_1$ compared to signal 1130 of branch 1122. Signal 1132 show the output at Y-junction 1125 after experiencing second and third delay branches, having a time delay difference of $\Delta t_1$. Signal 1132, now flowing into reverse Y-junction 1126, is summed with the signal of branch 1123, which experienced a $\Delta t_2$ delay. Copy 1133 of signal 1130 is delayed at branch 1123 by a time difference of $\Delta t_2$ compared to signal 1130 of branch 1122. Signal 1133 has a delay that causes the duplicate of the pulse 1141A in the original signal delayed to sum with the coincidence pulse 1136 of coincidence signal 1132 in second Y-junction 1126. The output at 1126 is shown at 1134 and is the result of summing signal 1133 (delayed original signal) with the output at 1125 creating a larger coincidence pulse 1137 in the final output 1134. An enhancement device 1127 of FIG. 22A like that shown and described, for example with reference to FIGS. 10D and 10E, may further enhance the coincidence pulse. The enhancement may be provided by any number of enhancement pulses in similar branches with corresponding delays as indicated at 1124 with the ellipses shown.

It may be observed by inspection that suitable delays need to be incorporated after each symbol including its enhancement pulse to prevent inter-symbol interference. This may be necessary also to prevent undesired interaction in other gates used in the same system (not shown). The precise length of the required guard band will depend on the modulation scheme employed.

Note that junctions 1129A and 11 29B may be combined into a single star junction and gates 1125 and 1126 can be implemented as a single combiner, the particulars of the embodiment of FIG. 22A having been chosen for illustration purposes.

Each branch 1124 (typ.) in the device of FIG. 22A forms a coincidence gate with another branch 1124 (typ.) and has its specific enhancement pulse. Accordingly the device of FIG. 22A may represent a combined coincidence gate including multiple coincidence gates connected in parallel. Such a combined coincidence gate responds, to form main coincidence signal, only for a specific symbol constructed by specific spaces between its pulses that match the specific combined gate and represent a specific address (predetermined destination). Such a symbol includes multiple pulses with a number of pulses greater than two. The main coincidence signal is the coincidence pulse with the highest intensity that exists in the system for a specific symbol. Due to inter-symbol coincidence events, some other coincidence signals may be produced in any gate. Still, the main coincidence pulse is the pulse with the highest intensity produced in the system. This highest level main coincidence occurs only at a specific gate that matches the time delays between the pulses of a specific address of a specific symbol.

It should be clear that the symbols that include multiple enhancement pulses may be used as multiple control pulses.

In such a case the address (destination) of the symbol is determined by the specific time spaces between the multiple control pulses and the data pulse in the symbol. The enhanced coincidence pulse, discussed above, is in this case a main coincidence pulse, produced by a specific combined gate that responds to this specific symbol.

The combined coincidence gate may be constructed from parallel multiple gates, each responding to a different time space between the pulses of the symbol. Each parallel coincidence gate that constructs the combined gate, may be identified by any number, greater than two, of delay branches 1124 (typ.) of FIG. 22A. For example, the shortest delay branch may be a common branch for all the parallel gates. In this specific example, the branch with the shortest delay together with any number (including 1) of parallel branches 1124 (typ.) may represent one parallel gate. The data pulse and the control pulses in the symbol can be identified arbitrarily.

From FIG. 22C it can be seen that when no threshold mechanism is used, the combined coincidence gate may produce artifact pulses (non-coincidence or non-main coincidence pulses) that may interfere with the pulses of the next following symbol to produce unwanted coincidence pulses. To avoid the creation of unwanted coincidence pulses, a time guard band should be maintained between the data symbol signals. The use of such guard bands reduces the efficiency of the information transmission.

FIGS. 22D, 22E and 22F illustrate a demultiplexing system that eliminates the need for time guard bands, the closely packed data symbols, and the combined coincidence gates used to demultiplex the complex multiple pulse symbols.

Referring to FIGS. 22D and 22F, FIG. 22D illustrates a demultiplexing system 3000 designed to receive and demultiplex signals of data symbols 3040, illustrated by FIG. 22F, arranged within time frames 3046 (typ.) The use of demultiplexing system 3000 eliminates the need for guard bands between the symbols. Demultiplexing system 3000 of FIG. 22D including multiple combined coincidence gates 3024A–3024N constructed by a combination of parallel and series connections between discrete coincidence gates 3012A–3012N, 3014A–3014N and 3020A–3020N, respectively. It can be seen that coincidence gates 3012A and 3014A are connected in parallel and each of them is connected in series to coincidence gate 3020A.

Signal 3040 of FIG. 22F is received at input 3002 of system 3000 of FIG. 22D. Dividing device 3004 splits signal 3040 and simultaneously emit copies of signal 3040 into ports 3006A–3006N. Ports 3006A–3006N are also the inputs of combined coincidence gates 3024A–3024N having respective output ports 3022A–3022N.

Referring momentarily to FIG. 22F, illustrating signal 3040 constructed by time-frame pulses 3042 (typ.) (shown with diagonal hatch filling) and information pulses 3044 (typ.) (shown with clear filling). Time frames 3046 (typ.) includes time slots 3050 (typ.) and are constructed, for example, by the space between pulses 3042A (typ.) and 3042B (typ.). Information pulses 3044 (typ.), located within frames 3046 (typ.) between pulses 3042A (typ.) and 3042B (typ.), are spaced apart by an integral number of timeslots 3050 (typ.).

Each pulse 3042 of time frames 3046 has double duty to serve both, as a reference pulse for the currently demultiplexed time frame 3046 and as a control pulse for the next following time frame 3046. Signal 3040 propagates in the direction shown by arrow 3048 thus, delayed pulses 3042A and leading pulses 3042B (ahead in time) may serve as the reference and the control pulses for the currently demultiplexed time frame 3046, respectively. Pulses 3042A may also serve as the reference pulses for the leading information pulses 3044 to create data symbols formed by the time delays $\Delta t_1$–$\Delta t_n$ between pulses 3044 and 3042A. Delays $\Delta t_1$–$\Delta t_n$ are equal to the delays of coincidence gates 3012A–3012N in combined coincidence gates 3024A–3024N, respectively. The time delay $\Delta t_F$ between pulses 3042A and 3042B of frames 3046 is equal to the time delay of gates 3014A–3014N of combined gates 3024A–3024N, respectively. All frames 3046 are closely packed and do not include time guard bands between them.

Referring now back to combined gate 3024A of system 3000 of FIG. 22D. The analysis for gate 3024A represents the process occurring in all combined gates 3024A–3024N, and thus only gate 3024A will be discussed without repeating the analysis for the rest of the combined gates. The copy of signals 3040 at inputs 3006A of combined gate 3024A is copied again, by radiation guides 3008A and 3010B, into coincidence gates 3012A and 3014A, respectively. Gate 3014A produces a coincidence signal related to frame pulses 3042 (typ.) every time period equal to delay $\Delta t_F$. Gate 3012A produces a coincidence signal only where the time space between information pulse 3044 (typ.) and reference pulse 3042A is equal to $\Delta t_1$. The coincidence signals from gates 3012A and 3014A are feed into the inputs of coincidence gate 3020A that produces output signal at output port 3022A of combined gate 3024A only if the coincidence signals from gates 3012A and 3014A arrive to gate 3020A with a delay equal to delay $S_A$ of gate 3020A.

Note that if the total length of the optical path through guides 3008A, gate 3012A and guide 3016A matches the total length of the optical path through guides 3010A, gate 3014A and guide 3018A, then delay $S_A$ of gate 3020A may be equal to zero. Assuming, without any limitation, that $S_A = 0$. In such a case, for producing coincidence signal at output port 3022A, the coincidence signals of gates 3012A and 3014A should occur simultaneously. Simultaneous coincidence at gates 3012A and 3014A can occur only with information pulses 3044 (typ.) related to the currently demultiplexed time frame 3046. Information pulses 3044 related to adjacent time frames 3046 are delayed from reference pulses 3042A by a time space that is greater than the largest delay $\Delta t_F$ in system 3000 and thus can not produce a coincidence pulse in gate 3012A at the same time gate 3014A produces a coincidence.

Accordingly, similar to the discrete coincidence gates in the demultiplexing systems of FIGS. 14A–14D discussed below, combined gate 3024A produces output signals only for symbols having a time delay equal to its time delay $\Delta t_1$. However, unlike the system of FIGS. 14A–14D, demultiplexing system 3000 prevents any unwanted coincidence signals between the pulses of different time frames even where there is no time guard band between time frames 3046.

FIG. 22E illustrates coincidence gate 3024M having alternative structure to the structure of combined gates 3024A–3024N. In combined coincidence gate 3024M of FIG. 22E, gates 3012M and 3014M are connected in parallel and both of them are connected in series to gate 3020M. Combined gate 3024M may produce results similar to combined gates 3024A–3024N whenever delay $\Delta t_X$ of gate 3020M is adjusted to be equal to the relative delay caused by the different lengths of the optical paths from port 3006M to port 3022M, via gates 3012M and 3014M, respectively.

Gates 3012A, 3014A and 3020A of FIG. 22D have similar functionality as gates 3012M, 3014M and 3020M, respectively.

It should be understood that coincidence gates 3012A–3012N, 3014A–3014N, 3020A–3020N, 30012M, 3014M and 3020M are all of the various types of coincidence gates 101 of FIG. 13I discussed below, For example they may or may not have a threshold mechanism or may have electrical or optical threshold devices. In a situation where gates 3012A–3012N, 3014A–3014N, 3020A–3020N, 30012M, 3014M and 3020M have no threshold mechanism, the information demultiplexed to designated ports 3024A–3024N is identified by main coincidence signal. The main coincidence signal is the signal with highest intensity in the system. Other coincidence signals may exist either in the same designated gate in which the main coincidence signal is produced or in any other gates of system 3000, but these have lower intensity than the main coincidence signal.

It should also be understood that all the discrete coincidence gates of the demultiplexing system related to the present invention such as the demultiplexing system of FIGS. 14A–14D and 15K–15R including the cross-connection box of FIG. 15S may be replaced by combined coincidence gates, such as the combined coincidence gates illustrated by FIGS. 22D and 22E. Such combined coincidence gates may include any combination of parallel and series connections between discrete coincidence gates.

Note that the data symbol signals for the combined coincidence gates of system 3000 include time-frame pulses 3042A (typ.) and 3042B (typ.) and information pulses 3044 (typ.) thus is constructed by more than two pulses. The number of pulses that may be used in the data symbol signals increases with the number of discrete coincidence gates used to construct the combined coincidence gate that uniquely decodes the data symbol signals.

Figure 13A:
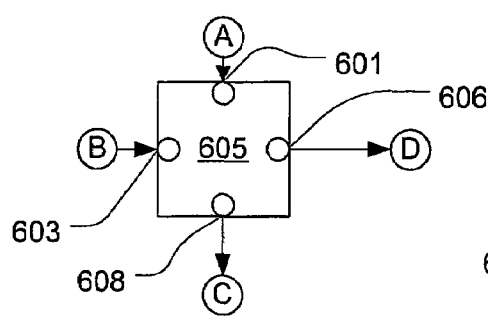
FIG. 13A is a general schematic illustration of a coincidence gate having two inputs and two outputs.

A variety of embodiments of a gate 100 were discussed previously and will be summarized presently along with some others. As shown in FIG. 13A, a gate mechanism 605 which may be any device that accepts input signals at input ports 601, 603 and generates output signals at output ports 606, 608 such that at least one of the output signals is responsive to an interaction between the input signals and preferably without requiring a change of state of gate mechanism 605. The input signals A and B may come from a variety of sources and the output signals C and D may be conditioned in a variety of ways to achieve one or more final outputs. As will become clear from the detailed description below gate, 100 may be used as a decoding device as well.

Figure 13F:
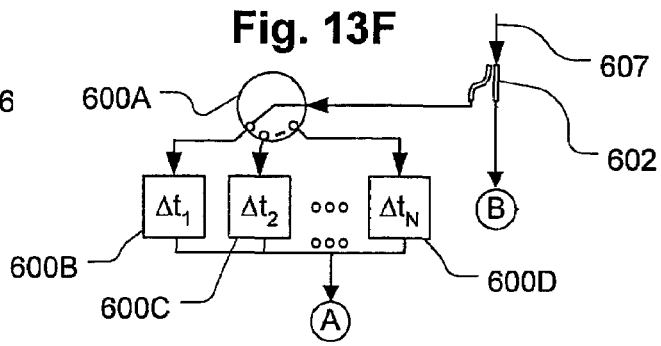
FIG. 13F schematically illustrates a system for selecting a desired time delay for a coincidence gate.
Figure 13B:
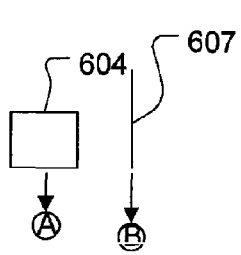
FIG. 13B illustrates a coincidence gate receiving input signals from different sources.

For example, referring to FIG. 13B, the inputs A and B may be from independent sources such as an incoming information signal 607 from a remote sender (not shown) and a local external signal from a local controller 604. In such a case, a synchronization and phase recovery control loop may be incorporated in the configuration as shown in FIG. 13B. Various processes for synchronization and phase recovery are discussed in the following sections.

Figure 13G:
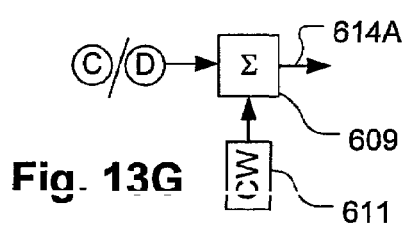
FIG. 13G is a schematic illustration of a system for enhancing the contrast between the coincidence signal and the background at the output of a coincidence gate.
Figure 13H:
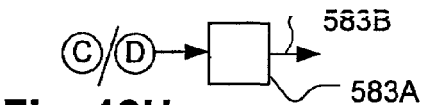
FIG. 13H schematically illustrates a system including an optical threshold device for enhancing the contrast between the coincidence signal and the background at the output of a coincidence gate.
Figure 13D:
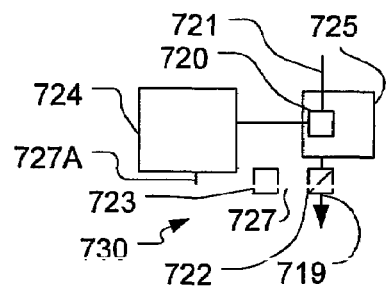
FIGS. 13C, 13D and 13E schematically illustrate specific design for closed loop phase control, general design for closed loop phase and clock recovery control, and closed loop phase and clock recovery control for multiple clients, respectively.
Figure 13C:
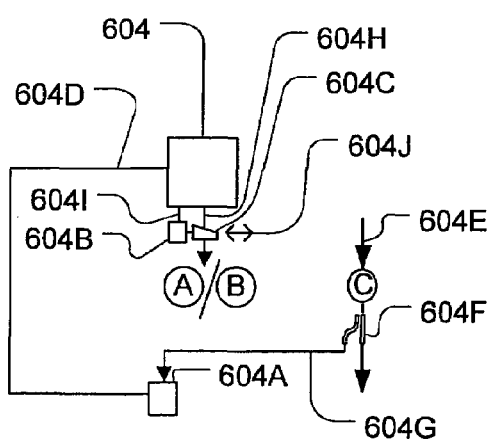

Referring now to FIG. 13C, a portion 604G of the output signal 604E from output 608 (designated C) of gate 605 of FIG. 13A is coupled out, by coupler 604F, and is sent to a detector 604A. Detector 604A generates an electrical signal to be transmitted, via electrical lead 604D, to controller 604. Controller 604 drives actuator 604B via electrical lead 604I. Controller 604 and actuator 604B drive a wedge prism 604C. The movement of wedge prism 604C in the directions indicated by arrows 604J changes the optical path of signal 604H to control its phase. The movement of prism 604C changes the phase of the input signal 604H applied to one of the input ports 601 or 603 (designated A or B, respectively) of gate 605 of FIG. 13A to change the relative phases of the signals incident on ports 601 and 603. This function of phase-alignment may be accomplished by various means, here figuratively illustrated by a wedge of material 604C with a different index of refraction from upstream or downstream media. The detector outputs the same or another signal at electrical lead 604D for synchronization recovery which is applied to the controller 604 to synchronize the output of the local signal with that of the incoming signal. The signal at lead 604D may be one that is responsive to the precise coincidence of aligned pulses. Controller 604 controls stage 604B that moves wedge prism 604C along arrows 604J. The movement of wedge prism 604C in the directions 604J changes the optical path of signal 604H to control its phase. The described construction is a closed-loop scheme that maintains the synchronization of the local signal and the incoming signal over time.

The mechanical phase-shifting technique described with reference to FIG. 13C may be replaced by any suitable mechanism. Referring now to FIG. 13D, a controller 724 sends an actuation signal to a phase shifter 720, essentially any kind of transmission component that changes its delay of transmission by a phase angle according to the applied signal. The signal may be a feedback control based on a signal from a sensor device 730. One example of a sensor device 730 is illustrated. A client device 725, receives signal energy phase-shifted by the phase shifter 720. The client device 725 may be, for example, a gate. A beam splitter 722 captures some of the energy output by the client device 725 and applies this sample signal 727 to a detector 723. The detector 723 generates an electrical signal indicating the intensity of the sample signal 727 for example by time-integrating the signal and outputting an average or RMS power level indication thereof or by detecting and latching a peak intensity or by any suitable means. The signal generated by detector 723 is transmitted via electrical lead 727A to controller 724. The phase shifter is driven by controller 724 according to the signal produced by detector 723. The phase shifter may include various means for changing phase such as by means of an electric field or thermal effect or a mechanical mechanism 604B/604C as discussed with reference to FIG. 13C. A piece of material whose index of refraction changes with applied electric field or temperature may be activated by a device that applies an electric field or a heater. Alternatively, different delay lines may be electronically switched in and out of a signal path to generate a cumulative selected delay.

The client output signal 719 emerging from the beam splitter 722 is used in a system requiring the phase compensation provided by the phase shifter 720. Alternatively, the whole control apparatus of FIG. 13D may be used to generate a control signal for a series of clients in which the client 725 is a model.

Figure 13E:
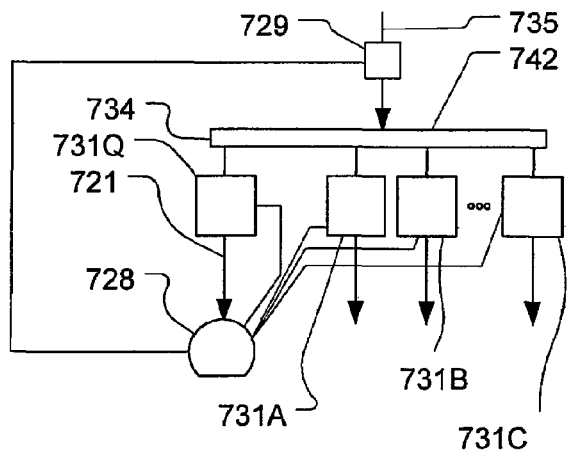

Referring now to FIG. 13E, a phase recovery device 728 encapsulates the functionality of sensing the signal phase alignment, for example, 722, 723 and 724 of the embodiment of FIG. 13D. A phase shifter 729 may correct the phase angle for all recipient clients 731A–731C connected to a distributor 742 and a model client 731Q. Alternatively, phase shifters (not shown) internal to each of the clients 731Q and 731A–731C may be controlled instead, depending on the type of device that is used for the clients. The model client 731Q has properties as recipient clients 731A–731C and therefore the correction for client 731Q would be therefore correct for clients 731A–731C. For example, 731A–731C and 731Q may be of the same materials and maintained at identical environmental conditions. The properties of 731Q need not be identical to those of 731A–731C, but the compensation may be derived from the changes in the phase required to compensate 731Q. For example, if each client has a gate with a delayed input and a non-delayed input, the delays of each gate may need to be compensated differently and therefore the correction may need to be applied to a phase shifter (not shown) internal to each gate.

An example of a client, e.g. 731A, is a gate 101 as described below with reference to FIG. 13I, which may have a gate 100 with a particular delay. As will become clear from the detailed description below gate 101 may be used as decoding device as well.

The process of synchronization and phase recovery may be reserved to a regular calibration process that is done at intervals sufficient to ensure the phase and synchronization remain proper. It is assumed that the processes upstream of the ports 601 and 603 of FIG. 13A (or any ports of gates described anywhere in the instant specification in which coherent summing takes place) are synchronized with a system such as the system of FIG. 13D by this process and they only fall out of synch and phase alignment due to slow drift processes. Thus, the above method is not suggested as being suitable for the instantaneous recovery of phase and timing alignment of asynchronous signals.

Referring to FIG. 13F, the inputs A and B may also come from a single source 607 that has been split by a splitter 602 with one input A having a different time-delay from the other B. As indicated, a selector device 600A may be provided to choose among multiple time delay components 600B, 600C and 600D to allow automatic selection of the time delay. The time-delays selection may be performed remotely. A time-delay selector is schematically illustrated and described below by FIG. 13J.

Figure 13I:
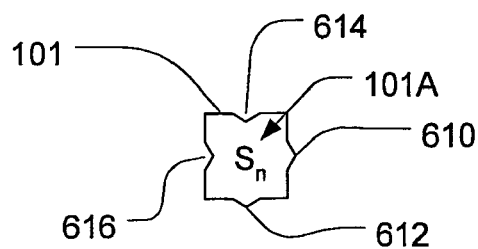
FIG. 13I is a general schematic illustration of a coincidence gate that may or may not include any combination between a coincidence gate and any other means accompanied to the gate.
Figure 13J:
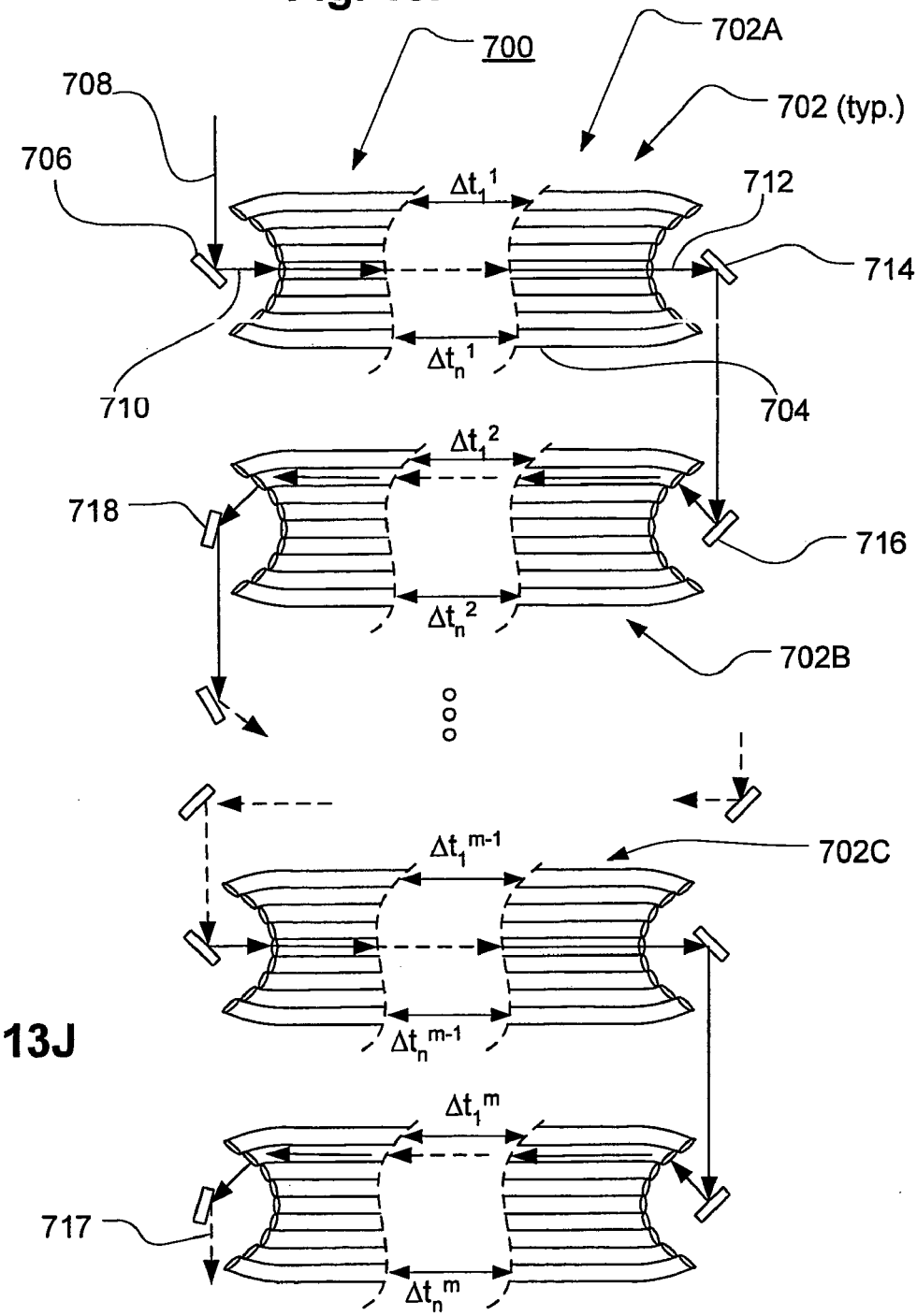
FIG. 13J illustrates a design for a time delay selector.

FIG. 13J is a schematic illustration of a configuration for a time-delay selector 700, which may be used, for example, for selector device 600A of FIG. 13F. Selector 700 includes m subunits 702 (typ.), each of which includes n delay lines 704 having respective delays. An input signal 708 is directed to a controllable mirror 706, such as controlled by a MEMS switch, which may be controlled locally or remotely. Mirror 706 directs a reflected signal 710 to one of delay-lines 704 of a first subunit 702A which relays it to mirror 714, which is also controlled. Mirror 714 reflects the signal to mirror 716, from which further redirects the signal into another subunit 702B and the process is repeated with mirror 716 directing the signal through a selected delay and mirror 718 relaying to another subunit 702C and so on. Each subunit 702 provides n different delays. With m subunits 702, each having n delays, selector 700 may select $n^m$ delays for a final output 717. Of course, although each subunit 702 is shown with n delays, it is possible for each to have a different number of delays. Note that the most effective use of the structure 700 is to have one of the subunits 702, for example the first subunit 702A, provide course delays, with each successive subunit 702B, etc., providing successively finer levels of delay.

Referring to FIG. 13G, signals C, D from one or both of the outputs, such as of FIG. 13A, individually or together, may be conditioned by a process to enhance the distinctiveness of information symbols relative to artifact. For example, one or both outputs may be combined coherently with a signal from a CW laser 611 via a summer 609 to generate a conditioned output 614A.

Referring to FIG. 13H, the output signals C and D may also be conditioned to eliminate artifact entirely by the process described with reference to FIGS. 12A–12K. That is, one or both outputs, together or independently, may be applied to such a filter as described with reference to FIGS. 12A–12K, illustrated symbolically at 583A to yield a filtered signal 583B.

Referring to FIG. 13I, to facilitate the discussion of the application of such embodiments, given that a variety of embodiments may all be employed in each application, an iconic representation of a gate 101 may be used in the remainder of the instant specification to identify variations of such gates that may be used as coincidence gates and decoding devices. The iconic representation of a gate 101 (or hereafter, simply "gate") has two inputs 614 and 616 which may correspond to any of the inputs A, B, 601, 603, 604 or 607 represented above in FIGS. 13A–H or others and two outputs 610 and 612, which may represent either of the outputs 606, 608, C, D, 614A or 583B in FIGS. 13A–13H or others. A symbol–selection symbol $S_n$ indicated by 101A may be placed on the face of the gate 101 to identify a characteristic that selects for output at a predetermined output only one of multiple symbols. For example, it may represent one of a set of time delays of respective time delay devices such as one of 600B, 600C, or 600D (FIG. 13F). In that case, the gate 101 may be taken to represent one with a single input that is split with one being subject to a time delay to make a symbol selector as discussed with reference to FIG. 9B. The label $S_n$ indicates the symbol that selects the channel, for example, using modulation based on polarization, phase, time delay $\Delta t_n$ etc. or a combination thereof.

It should be understood that gate 101 may represent any combination of coincidence gate 100 with or without its accompanied means described elsewhere according to the present invention. Such a combination may include coincidence gate 100 with more than one accompanied means. For example, gate 101 may include gate 100 with or without optical threshold device, contrast enhancers of various types used to enhance to increase the ratio between coincidence and non-coincidence signals or background, variable time delays, closed loop phase controls, closed loop clock recovery control, and other means described according to the present invention.

It should be noted that the inputs of gate 101, input 614 and input 616 are also schematically designated as lettered circles A and B. The outputs of gate 101, output 610 and output 612 are also schematically designated as lettered circles C and D. This notation shall be used throughout the various illustrations.

Figure 14A:
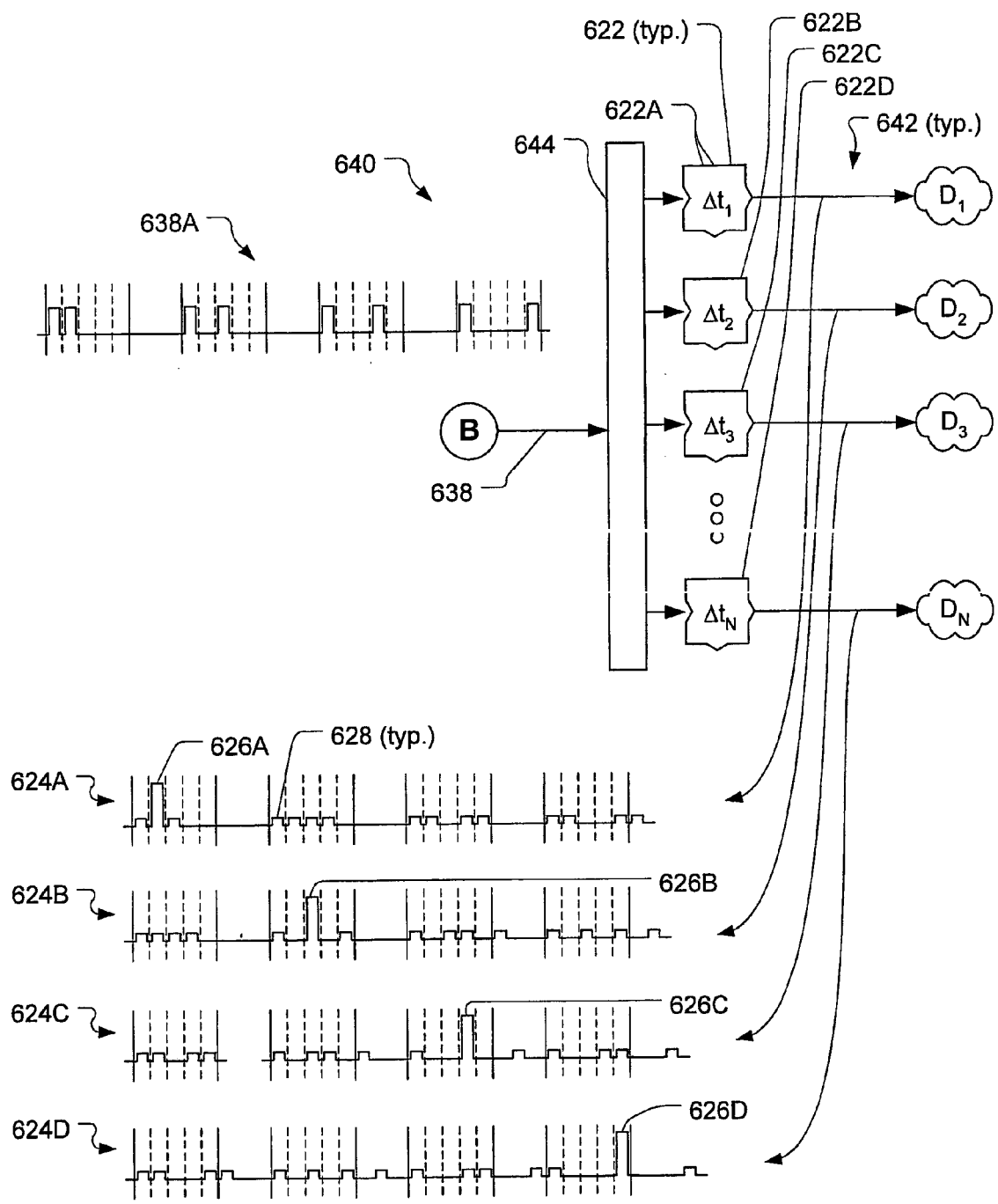
FIG. 14A schematically illustrates a self demultiplexer system designed to demultiplex the input information having different symbols, into designated outputs port according to the predetermined destination encoded in the input symbols.

Referring to FIG. 14A, gate 101 may be applied in a variety of communications systems, a simple one of which may employ a demultiplexer (encoder) 640. FIG. 14A illustrates the use of coincidence gate (or gate) 101 as a decoding device for decoding encoded data symbols 638A (typ.) in multiplexing system 640. It should be understood that in every demultiplexing system according to the present invention coincidence gates (or gates) 100 and 101 may represent decoding devices as well. An input signal line 638 (designated B) carries a signal 638A (typ.) with a mix of symbols such as spaced-pulse symbols as illustrated. Signal 638A is distributed among N gates 622 (typ.), by dividing device 644, with different characterizations $S_n$ (e.g. time delay) selectors (not shown explicitly) therewithin, for example time delay $\Delta t_n$ symbol selectors as indicated. The signal is modified by the action of the respective gates 622A, 622B, 622C and 622D. The resulting respective signals illustrated at 624A, 624B, 624C and 624D each include a coincidence symbol, in this case a pulse 626A, 626B, 626C, 626D, only for symbols corresponding to the symbol the respective gate 622A, 622B, 622C and 622D is configured to select. The signals 624A, 624B, 624C and 624D include at least one coincidence pulse, 626A, 626B, 626C and 626D and artifact, for example as indicated at 628. However and without limitations, signals 638A and gates 622A–622D may be selected in a way that results with no coincident signals. Note that the artifact 628 (typ.) may or may not be present depending on the configuration of the gates 622A, 622B, 622C and 622D. For example, a gate that is incorporated with the device, shown in FIG. 13H, designed to optically cancel the artifact pulses will not produce artifact pulses such as pulses 628. Each signal 624A, 624B, 624C and 624D is sent to a respective destination $D_1$, $D_2$, $D_3$ and $D_N$. The destinations may include receivers (not shown) that are selectively responsive only to the high intensity coincidence symbols 626A, 626B, 626C and 626D. As a result, in effect, only the coincidence symbols are received by the receivers and the data is, by definition, demultiplexed by this scheme.

It will be observed that the system may be configured such that the spacing of the coincidence symbols 626A, 626B, 626C and 626D is higher than the spacing of symbols in the signal 638A, not only by virtue of having been stripped of the pulse-spacing symbology, but, more importantly, as a result of reduction in the duty cycle (and therefore, the data rate) of each channel 642 (typ.) and therefore a reduction in the duty cycle of each receiver. As a result, if the spacing of symbols in the signals 638A is too low for any receiver to handle, for example, a receiver with an optical to electrical signal conversion process that includes transfer to storage, the incoming signal 638A will be divided among multiple parallel signals 624A–624D, providing a slower symbol rate in each than the combined signal 638A allowing the receiving processes to occur in parallel. Note that the signal 638A may necessarily lose intensity as a result of being divided among multiple channels and this may be compensated for by inclusion of an optical amplifier, in input B (not shown), without changing the operation of the device.

It should be clear that system 640 is a self demultiplexer that demultiplexes the information pulses in the symbols of input signal 638A. Each symbol of signal 638A includes an information (data) pulse and a control pulse. The self demultiplexing of the information in the symbols of signal 638A is performed by producing a coincidence pulse in a specific designated port (destinations $D_1$–$D_N$) that is responsive only to a specific predetermined destination encoded in the input symbols constructed by selecting the time space between the information (data) pulse and the control pulse.

Divider device 644 may represent any means for distributing the input signal from one input into multiple ports. Device 644 may be, for example, a star splitter/coupler, a cascade of one-to-two spliters/couplers, a cascade of one-to-many splitters, a loop having multiple ports, and a combination between all the means above.

Figure 14C:
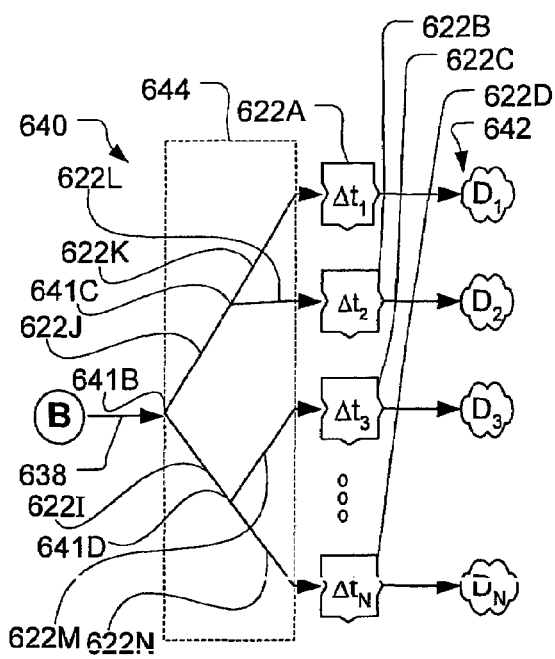
FIGS. 14B, 14C and 14D illustrate exemplary internal structures of the dividing device of the self demultiplexing system of FIG. 14A.
Figure 14B:
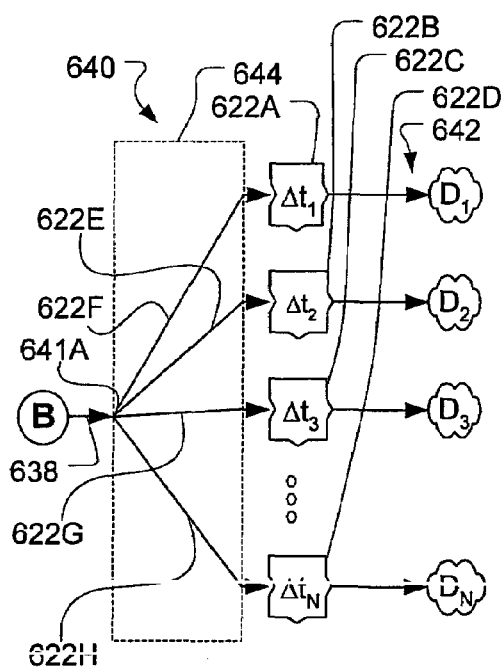
Figure 14D:
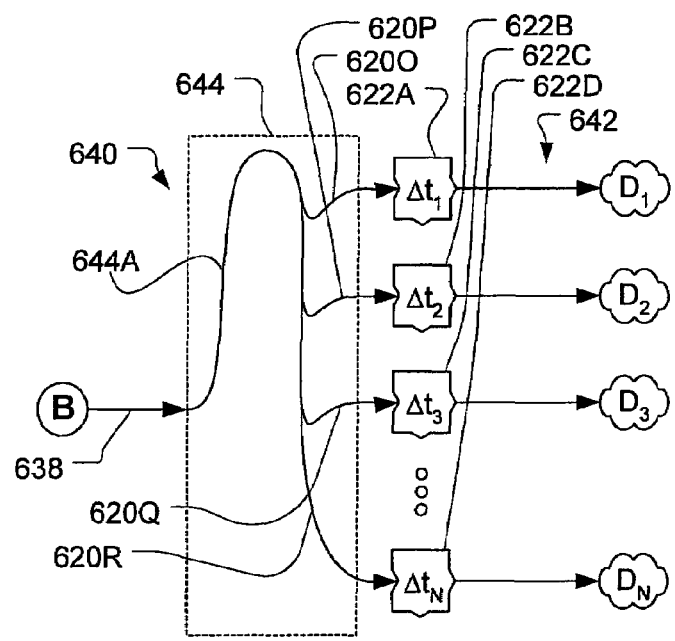

FIGS. 14B, 14C and 14D illustrate the system of FIG. 14A when showing, for example, several of the interior optional structures of divider 644. FIG. 14B shows, for example, device 644 that is constructed from a star splitter 641A including ports 622E–622H. FIG. 14C illustrates, for example, device 644 that is constructed from a cascade of one-to-two splitters 641B, 641C and 641D having ports 622I–622N. One-to-many splitters 641B, 641C and 641D of FIG. 14C may be of the type of star splitters, directional couplers, or Y-junctions. FIG. 14D illustrates, for example, device 644 that is constructed from loop 644A including multiple splitting ports 622O–622R.

It should be clear that while some of the splitters in FIGS. 14B, 14C and 14D are illustrated as one-to-two splitters, they may represent one-to-many splitters as well.

Figures 15A, 15B:
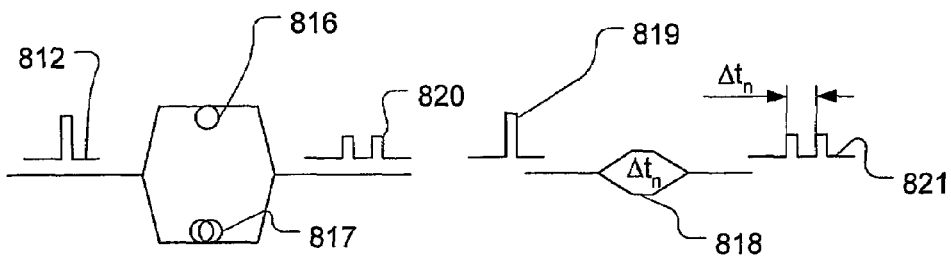
FIGS. 15A and 15B illustrate a device and an icon representing this device, respectively, designed for converting a single pulse into a symbol signal including pair of pulses.

Referring now to FIG. 15A, a simple mechanism for creating time pair symbols 820 with different time separations is to provide two parallel delays 816 and 817 to which a single data pulse 812 is applied. The difference between the time delays of delays 816 and 817, here illustrated as fiber loops, determines the pulse spacing of the resulting symbol 82U. Referring to FIG. 15B, a parallel delay device as illustrated in FIG. 15A may be represented by an iconic representation of a symbolizer 818, which may have an indicator representing a unique symbol, such as a unique magnitude of the pulse spacing produced. A signal 819 passing through the symbolizer 818, characterized by a delay $\Delta t_n$, is converted into, or attached to, a symbol resulting in a labeled symbol 821, for example a pulse-pair, spaced by a delay $\Delta t_n$, as illustrated. In some embodiments, a symbolizer is also referred to as a duplicator.

Figure 15C:
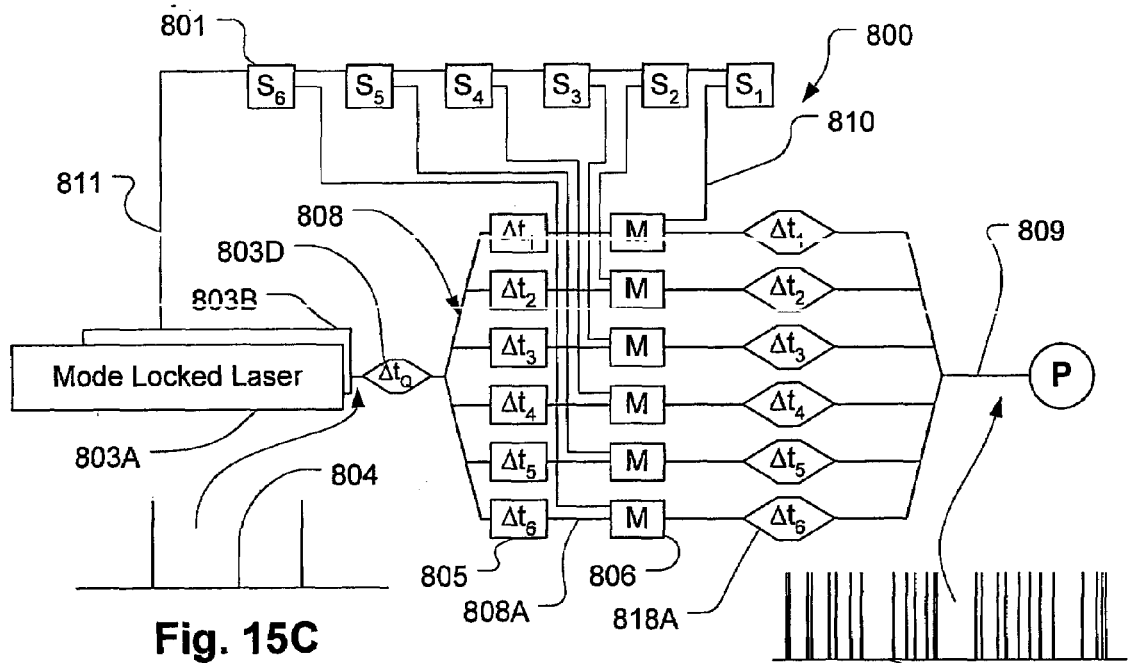
FIG. 15C schematically illustrates a multiplexing system for interleaving symbols signals to form a dense stream of symbols that may be arranged in form of Time Division Multiplexing (TDM)

Referring now to FIG. 15C, a multiplexer 800 places the signals from six separate data channels onto a single data channel that may be in form of Time Division Multiplexing (TDM) in which each TDM channel is "labeled" with a different symbol. Thus, a demultiplexer such as 640 in FIG. 14A may be used to distribute the multiplexed signal among six parallel channels each receiving and processing data at a lower rate. A mode locked laser 803A is used as a source of narrow pulses. It is characteristic of mode locked lasers that they produce outputs of narrow pulses with relatively long delays as illustrated by signal 804 at the output of laser 803A. The mode locked laser 803A output is distributed by a splitter 808 to six channels 808A (typ.), each with a respective time delay as indicated at 805 (typ.). A modulator 806 (typ.) on each channel 808A (typ.) determines whether a pulse is passed on that channel or not in response to a control signal from a respective data source 801 (typ.), such as sources $S_1$–$S_6$. A respective symbol is applied to the signal on each channel 808A (typ.) by a respective symbolizer (duplicator) 818A (typ.). The resulting output signal 807 is illustrated at output 809 and may include a highly dense series of pulses in a form of numerous symbol signals that may be distributed in a form of TDM. The duplicator 803D represents an arbitrary number of implicators connected in series, parallel, or any combination of serial and parallel connections and having situations delays. The symbolizers included in and represented by symbolizer 803D may optionally be added to so that the delay between pulses of the mode locked laser 803A may be matched against the number of channels 808A (typ.) by duplicating the pulses the required number of times. This may be done, as indicated, by means of one or more duplicator 803D, which includes a summer and suitable delays (not shown in the present drawing, but described by FIGS. 15A and 15B and elsewhere) to make any required density of pulses in the signal prior to being split by the splitter 808. A synchronization recovery circuit 803B may be provided to ensure that the modulators 806 (typ.) are controlled such that the signals from data sources 801 (typ.) are properly synchronized with the output of the mode locked laser 803A. For example, a synchronization signal 811 may be generated by a detector in 803B that receives a small portion of the signal that laser 803A emits (not shown separately).

Note that instead of using a single mode locked laser to form a stream of pulses to multiple modulators, signals can be obtained from multiple mode locked lasers with a common cavity such that their signals are synchronized.

Note that six data channels have been chosen for illustration purposes only. This number, six, is chosen arbitrarily and has no practical limitation to the number of data channels (along with respective delays, modulators and symbolizers) that can be used.

Figure 15D:
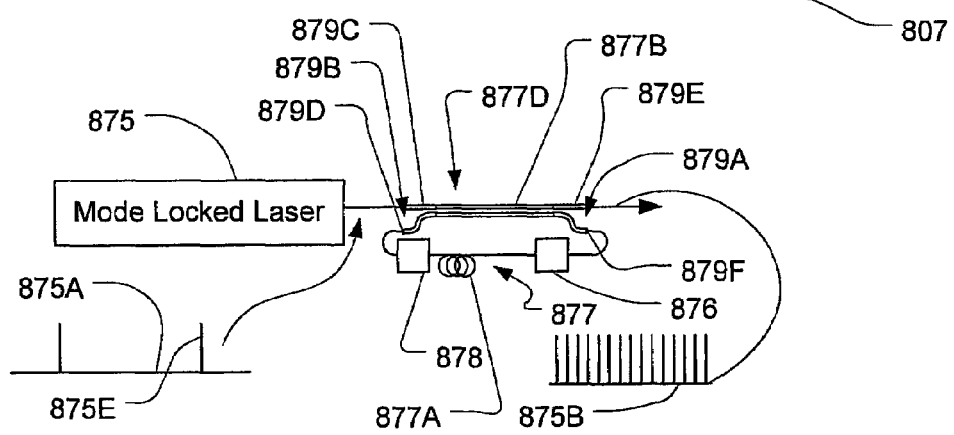
FIG. 15D is a schematic illustration of a duplicating device including circulating loop used to increase the density (rate) of the pulses.

In another alternative, a single mode locked laser 875 as shown in FIG. 15D feeds a pulse-signal 875A into upper branch 879C of input 879B of directional coupler 877D. Input branch 879C is coupled to upper and lower branches 879E and 879F of output 879A of coupler 877D. Lower branch 879F is connected, by loop 877, to lower branch 879D of input 879B of coupler 877D. Loop 877 includes controllable delay loop 877A, amplifier 876, and gate 878. At a certain starting time, the first pulse-signal 875E of signal 875A is received by the upper branch 879C of input 879B of coupler 877D. Directional coupler 877D divides the energy of the first and subsequent pulses 875E in signal 875A into an output pulse propagating through branch 879E and a returned pulse propagating toward loop 877 via branch 879F. The part of energy of pulse-signal 875A that is directed through output 879E appears as the first output signal. The other part of the energy of signal 875A enters into loop 877 which sends its energy back to branch 879D in input 879B. The part of pulse-signal 875A propagates along loop 877 (the returned signal) is amplified by amplifier 876 and passes through loop 877A and gate 878 to return to coupler 877D. The returned signal 875A that returned to branch 879D, through loop 877, is divided, by coupler 877D into an output signal at the upper branch 879E and a returned signal directed back into loop 877. This process may repeat itself in a steady-state condition to produce a train of duplicated narrow output signals. To provide a steady train of pulses, the intensity of all the recirculated pulses should be equal to the first signal that entered loop 877. In addition the first output signal, at branch 879A, should be equal to the next output pulses that follow after the delay imposed by loop 877. Thus, each fraction of the energy from each pulse 875E that leaves at 879E is followed by another portion that has recirculated through the loop 877 resulting in a continuous train of pulses. The recirculating pulse may be amplified by an amplifier 876. A delay loop 877A determines the spacing between an exiting pulse and the following pulse that flows through the loop 877. The amplification of amplifier 876 and energy partitioning of coupling of directional coupler 877D are preferably such as to ensure the pulses in the train exiting at 879E has substantially the same amplitude. For example, this may be obtained if coupler 877D is of a type characterized by 50/50 power splitting and amplifier 876 has a gain that compensates for loop loss (including propagation and bend loss) and coupler loss (50%) to assure that the product between the combined effect of gain and the overall attenuation loss of a round trip along the loop 877 is equal to one.

In a steady state, the process of duplicating the pulses by loop 877 produces a train of identical narrow pulses. The process continues till another pulse 875E appears in signal 875A of mode locked laser's 875 output. Just before the appearance of such pulse, gate 878 may be turned activated to stop recirculation of a returned signal (pulse) in loop 877. After the termination of the pulse duplication and before the arrival of the next pulse 875E, gate 878 activated to block the pulse circulating in the loop 877 and to allow the beginning of a new duplication process. Again this continues till the next activation of gate 878 and the appearance of the next pulse of signal 875A. Gate 878 can be a shutter, an LCD window, a coherent summer receiving light from a source such that the pulse in the loop 877 is canceled, or any suitable device.

The interval between duplicated pulses is the time-space between duplicated pulses and is equal to the total delay of loop 877. To create a train of pulses equally spaced, the space between two following pulses 875E of signal 875A should be equal to an integral number of spaces between duplicated pulses and the delay of loop 877 has to satisfy this condition.

Gate 878 is activated to halt the last pulse to be repeated before a new pulse is generated by the mode locked laser 875. Gate 878 is deactivated to allow the passage of the new pulse generated by laser 875 which propagates in loop 877. Thus a narrower train of pulses 875B can be generated at output port 879E with only one delay device. This may allow the pulse train 804 (FIG. 15C) to be generated by the device of FIG. 15D and to be arbitrary distances apart within the scope of integral divisions of the spacing of the mode locked laser 803A (FIG. 15C).

Figure 15E:
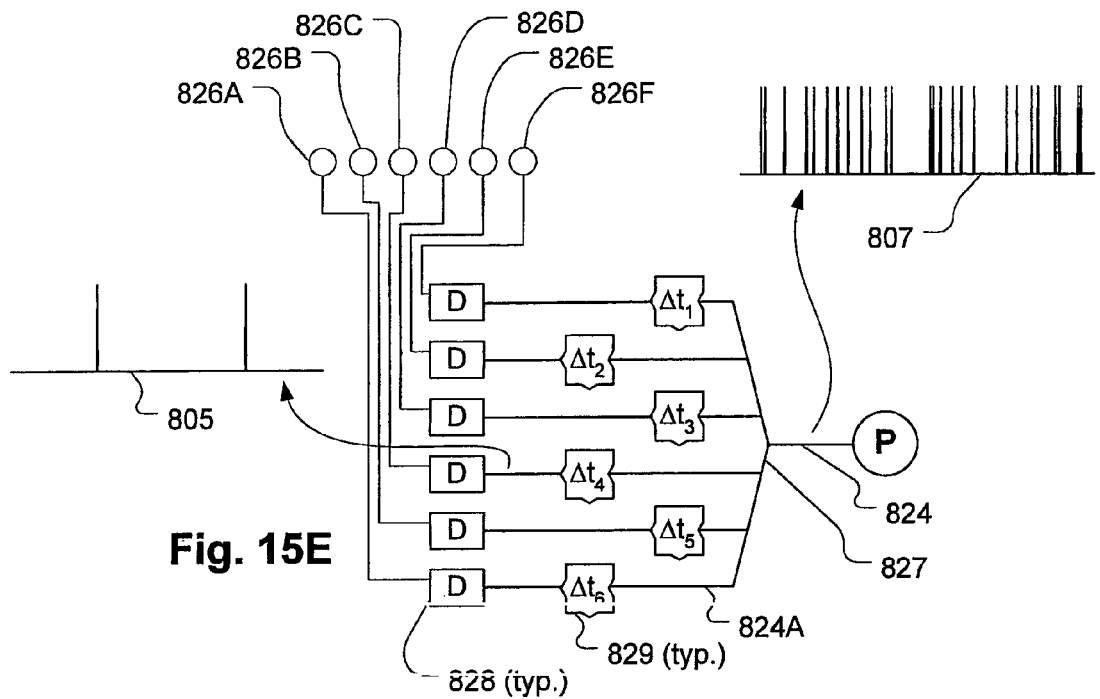
FIG. 15E is a schematic illustration of a demultiplexer designed for self demultiplexing of symbol signals such as the interleaved symbol signals produced by the multiplexer of FIG. 15C.

Referring to FIGS. 15C and 15E, as mentioned, a demultiplexer using gates such as indicated at 829 (typ.) may be used to distribute the multiplexed signal from point P, which is a common input point of the demultiplexer of FIG. 15E and common output point of multiplexer 800 of FIG. 15C among illustrated six parallel channels 824A–824F each with a matching detector 828 (typ.) receiving and processing data at a correspondingly reduced rate. More particularly, the signal 807 from multiplexer 800 is applied, after, for example a lengthy transmission channel such as a long-haul fiber, to a common input 824 which is then distributed by means of a distributor 827 to the six channels typified by the channel indicated at 824A. Distributor 827 may represent any distributor, for example, any distributor of the types 644 illustrated by FIGS. 14A–14D or discussed in their accompanied description. The demultiplexed signals, typified by the representation at 805, are then converted to electrical signals, by detectors 828 (typ.) and may be applied to respective outputs 826A–826F, which may be electrical signals or any other suitable medium. For simplicity, signals 805 are illustrated after gates 829 without any artifact. This may be the case if the coincidence pulses are produced by gates 829 that produce no artifact, as in the embodiments of FIGS. 12A–12K. If otherwise, any coincidence pulses may be distinguished from the artifact pulses by an electronic threshold detector or comparator that may be incorporated within the detectors 828 (typ.) Comparators that generate an output only when a signal is above a predetermined threshold are staple electronic components and their details need not be discussed here.

Here, as with FIG. 15C the number of six channels is chosen arbitrarily and has no practical limitation to the number of data channels (along with respective gates and detectors) that can be used.

Figure 15F:
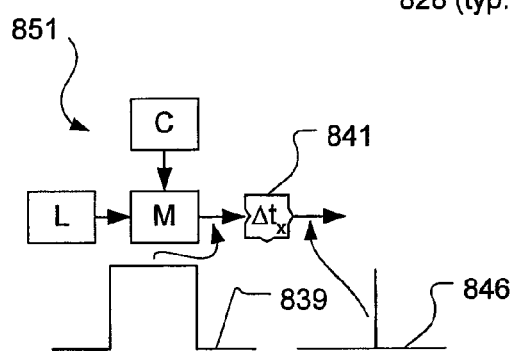
FIGS. 15F and 15G schematically illustrate narrow pulse generators with and without threshold mechanism, respectively.
Figure 15H:
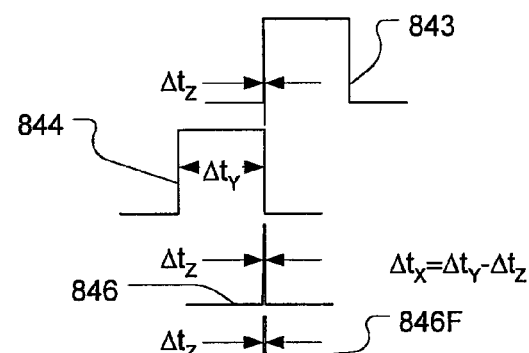
FIG. 15H is a schematic illustration of the signals produced at different locations in the narrow pulse generators of FIGS. 15F and 15G.

Referring now to FIGS. 15F and 15H, another way of forming extremely narrow pulses is to apply a pulse broader than the desired narrow pulse, from a modulated laser source 851 (L indicates the laser, M indicates the modulator, and C indicates the clock) whose width is a wide $\Delta t_Y$ to a gate 841 with a time delay equal to $\Delta t_X = \Delta t_Y - \Delta t_Z$ to obtain pulses whose width are narrow $\Delta t_Z$. Gate 841 splits the applied pulse 839 into two copies 843 and 844 that are overlapping coincident only for the duration of $\Delta t_Z$, thereby determining the width of the resulting pulse 846. Gate 841 may be of the type of gate 101 that includes optical threshold mechanism such as shown in FIGS. 12A–12K. Accordingly, signal 846A resulted from the delayed summing of copies 843 and 844 of original signal 839 appears as signal 846 after passing through the threshold mechanism of gate 841.

Figure 15G:
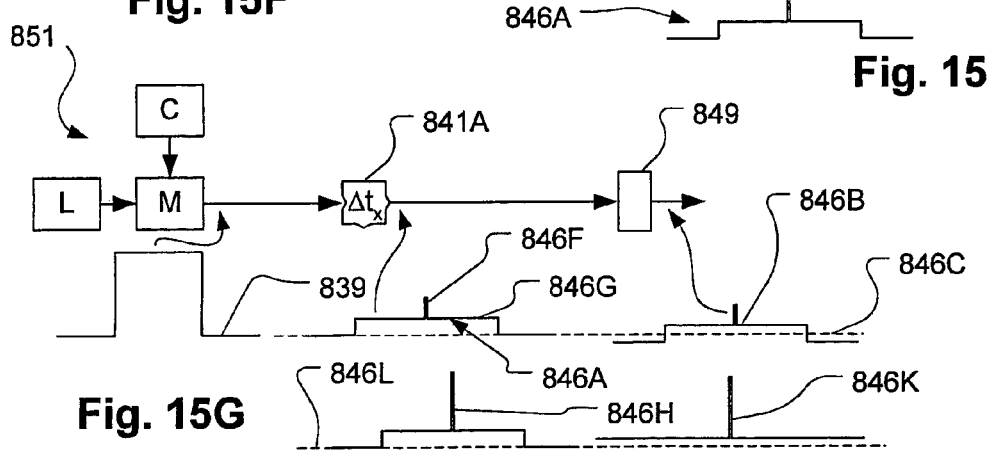

Referring now to FIGS. 15G and 15H, a gate 841A that does not completely eliminate artifacts when it sums can still be used for making pulses. For example, signal 846A is characterized by a coincident portion 846F resulting from the gate 841A splitting the applied pulse 839 into two copies 843 and 844 (FIG. 15H) that are coincident only for the duration of $\Delta t_Z$, thereby determining the width of the coincident portion 846F of the resulting signal 846A. A non-zero artifact portion 846G results at the output of gate 841A where the two copies 843 and 844 do not overlap. As indicated in the previous discussion, gate 841A may add coherently or non-coherently depending on its structure and the nature of the light energy in the incident pulse 839. Thus, the ratio of the height of the pulse portion 846F to that of the non-zero artifact 846G can be up to 4:1 or up to 2:1. If coherent summing is done by gate 841A, as also discussed, the artifact may be reduced to one ninth the amplitude of the coincident portion 846F by a circuit 849, that may represent the device of FIG. 13G, that sums with a signal from a CW laser with the result illustrated 846B, where the zero level is indicated at 846C. The profiles 846A and 846B represent E-field profiles. The power profiles corresponding to signals 846A and 846B are illustrated at 846H and 846K, respectively, with the zero power level indicated at 846L. Similar results in which the power ratio between the coincidence pulses and the artifacts is enhanced to be 9:1 can be achieved when using input pulses with non zero background level. This ratio can even further be increased by complete elimination of the artifact pulses using the optical embodiments illustrated by FIGS. 12A–12K. Alternatively, an electronic threshold device may be used in an end unit that receives the optical signal from gate 841A and, in any case, converts the optical signal it into electronic signal whether an optical threshold mechanism is used or not.

Note that a configuration like that of FIG. 15F or 15G may be used to groom pulses of any optical modulation scheme. For example, rather than regenerate pulses in long haul optical links, pulses may be "chopped" or reshaped using such a configuration with suitable optical amplification to regenerate the power level.

Figure 15J:
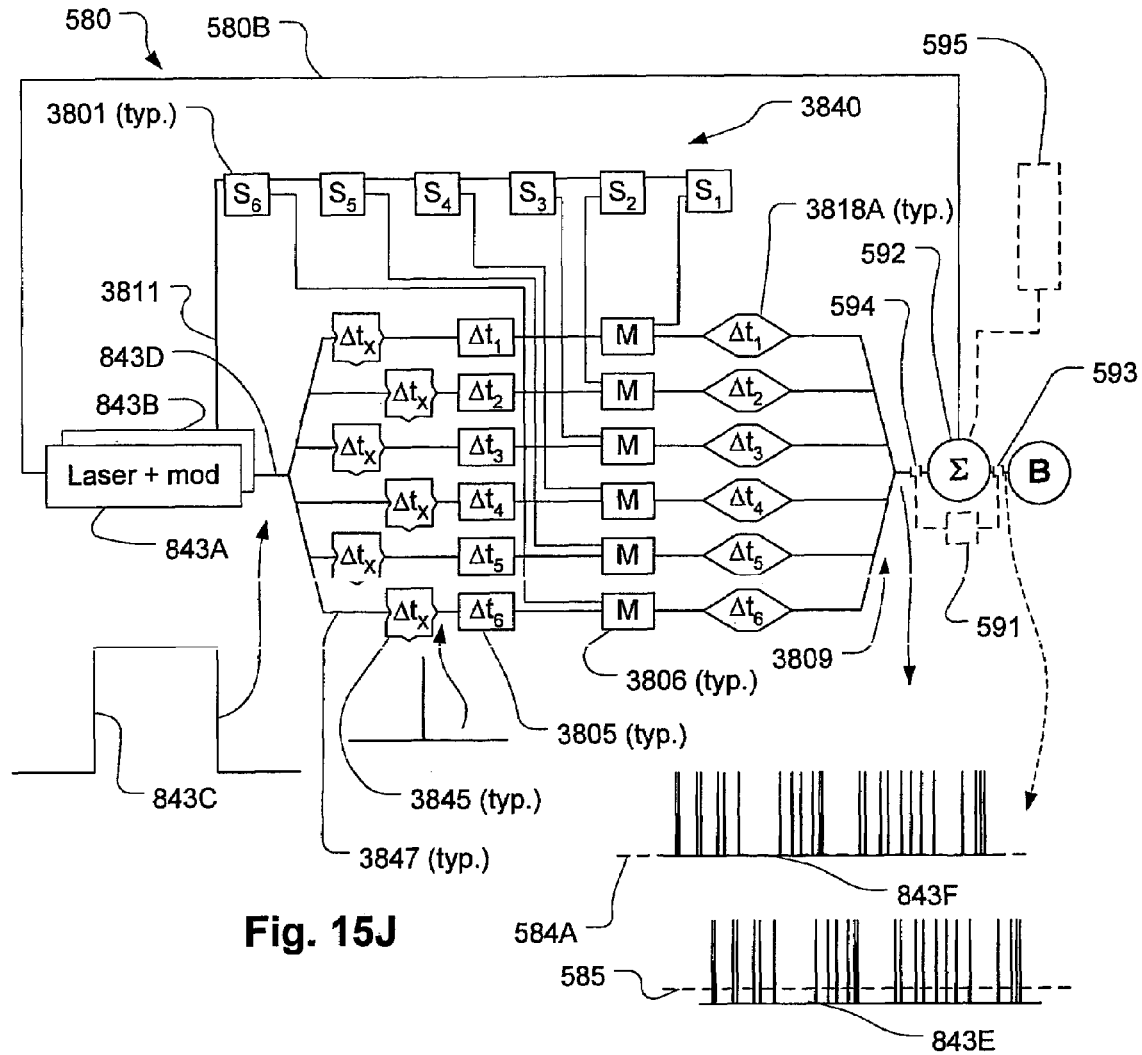
FIG. 15J schematically illustrates a multiplexer that receives optical pulses and interleaves them into high dense symbol signals including pulses that are narrower than the pulses at the input of the multiplexer.

Referring to FIG. 15J, to use such a mechanism in a multiplexer 3840, broad pulses from a laser 843A modulated by a modulator 843B to produce relatively wide pulses 843C at laser output 843D, that are distributed to multiple channels 3847 (typ.) each supplied with a respective gate 3845 (typ.) as described with reference to FIGS. 15F and 15I. Each channel also has a respective time delay as indicated at 3805 (typ.). Modulators 3806 (typ.) on each channel 3847 (typ.) determine whether a pulse is passed on that channel or not in response to a control signal from a respective data source 3801 (typ.). A respective symbol is applied to the signal on each channel 3847 (typ.) by a respective symbolizer 3818A (typ.). As in the embodiment of FIG. 15C, the resulting output at 3809 illustrated by signal 843F may be in the form of a highly dense series of pulses constructed by very dense symbol signals having zero level 584A. Again, a synchronization recovery circuit may be provided and may be integrated in modulator 843B, to ensure that modulators 3806 (typ.) are controlled such that the signals from data sources 3801 (typ.) are properly synchronized with the output 843D of the modulated laser 843A. For example, a synchronization signal 3811 may be generated by a detector in 843B that receives a small portion of the signal that laser 843A emits (not shown separately).

Optionally, to provide a non-zero background which when coherently summed as discussed with regard to FIGS. 10D and 11B, a low-level CW signal 580 may be added to the signal 843F by means of a summer 592 and guide 580B.

Figure 15L:
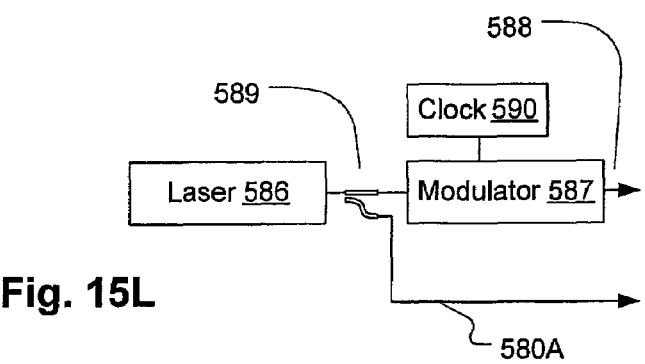
FIG. 15L schematically illustrates a contrast enhancer device used to increase the ratio between coincidence and non coincidence pulses in the multiplexer of FIG. 15J.

The CW signal 580 may be derived from the same source as modulated laser 843A which may be configured to provide one output that is not modulated, as illustrated in FIG. 15L. That is, a CW laser 586 (corresponding to 843A of FIG. 15J) may output to a junction 589 providing a constant signal 580A corresponding to CW signal 580 of FIG. 15J. The other leg of the junction 589 may be applied to a modulator 587 (corresponding to 843B of FIG. 15J), such as an LCD or Mach Zhehnder Interferometer (MZI) modulator with a modulation signal supplied by a clock 590 to produce a regular pulse stream 588 corresponding to output 843D of laser 843A of FIG. 15J as discussed above. Assuming appropriate control of phase and signal level, the output 843F with a background at zero level 584A is converted by summing in summer 592 to a signal 843E with a non-zero floor, as indicated by the zero level 585, to enhance the intensity ratio between the coincidence signals and the artifact signals that might exist in the demultiplexing system (not shown) and as previously illustrated by FIG. 10C. The enhancement system that includes summer 592 and CW signal 580 may not be needed when coincidence gates 3845 (typ.) are of the type of gates 101 that include optical threshold as shown by FIGS. 12A–12K.

In an alternative embodiment, the same role as signal 580 may be played by a laser 595 that is separate from laser 843A as indicated. In such a case the phase matching between laser 595 and the signal 843F may be controlled by a control mechanism for recovering the phase. For example, a detector 593 detects a portion of the power of the signal 843E taped into detector 593 and generates a feedback control input to a controller 591 that controls a phase shift by variable phase shifter 594 to maximize the signal power detected. Such a mechanism performs a function of Phase Locked Loop (PLL). As this is an alternative role for signal 580, it is marked in dashed lines and can be used instead of signal 580 and guide 580B.

Note that in the discussion of figurative illustration of signals, such as 843F and 843E, the same diagram may connote the field or the intensity, which is the square of the field. This should be clear from the context and no contradiction is implied. Thus, in indicating a shift in zero level from signal 584A to signal 585, signal 843F and 843E may be interpreted to represent the field level, but ignoring the zero level indication, they may be interpreted to represent intensity. Note that FIG. 15J may be interpreted to be consistent with the use of a multimode laser within modulated laser 843A. In that case, of course, the non-zero background device 580B, 592, etc. would not be applicable.

Instead of providing a separate gate 3845 (typ.) on each channel 3847 (typ.), a single gate may be located immediately following the single output 843D of the modulated laser 843A to produce narrow pulses that are distributed to all the channels 3847 (typ.)

FIG. 15K illustrates the foregoing multiplexer/demultiplexer combinations and others as a generic schematic. A signal vector source 832, which may consist of any number of signals (having controlled amplitudes and phases) applied by an input channel 833A to modulators of each of multiple parallel channels of a multiplexer 830 outputting onto a multiplexed channel 836. The multiplexed channel 836 applies multiplexed signals to a demultiplexer 834 which applies an output vector to a receiver 838 via an output channel 833B. Multiplexer 830 may represent multiplexers, such as, the multiplexers of FIGS. 15C and 15J. Demultiplexer 834 may represent demultiplexers, such as, the demultiplexers of FIGS. 14A–14D and 15E.

Referring now also to FIGS. 15K and 15M, although the input channel 833A and output channel 833B of FIG. 15K are shown as a single line, it should be understood that they may have many different components representing different subchannels. For example, each component of the signal vector source 832 may represent a data stream from a separate sources of data such as independent devices $S_n$ and $S_m$ (among others not shown) sending data to specific independent devices $S_p$ and $S_q$ (among others not shown), as illustrated in FIG. 15M.

As another example illustrated in FIG. 15N, the signal vector source 832C may be a parallelized signal from a single source spatially multiplexed by a spatial multiplexer 830A (which may be operable in a different medium from that of the multiplexer 830). At the receiving end, the separate channels from the demultiplexer 834 may be multiplexed by a different multiplexer 834A and applied to a receiver 838C.

Referring to FIG. 15P, the pulse-pair symbology discussed with reference to the foregoing embodiments may be used for self control of information flow by multiple layers of gates. For example, when a signal 862, which is the multiplexed signal of separate sources of data such as independent devices $S_a$ and $S_b$, passes through a demultiplexer 864 using multiple gates such as gate 101, energy is output along a chosen one of multiple paths (e.g., 870, 872), each leading to different destinations which may include additional demultiplexers (e.g., 868, 866). From multiple demultiplexers 866 and 868 the demultiplexed signals are received by multiple receivers $S_x$ and $S_y$. The details of the symbology for multiple layers of demultiplexing are discussed below. Note that the demultiplexers in the embodiments of FIGS. 15K–15N may represent demultiplexers for multiple layers, as, the type illustrated by FIG. 15P.

Referring now to FIGS. 15Q and 15R, it should be noted that the structure of the gate-based demultiplexer of FIG. 15E can be used in embodiments other than where access is controlled to a common channel by time division. A more generic embodiment is an array of gates form a demultiplexer as shown in FIG. 15Q where a common signal 895 at input 895A generated by some source and encoded with symbols is distributed by distributor 895B and is passed by a unique gate 890A–890C. For example, such a demultiplexer 893 (FIG. 15R) may be used in a system where the ability of multiple senders 891A–891C to transmit through many-to-one combiner 891D on a common channel 897 is regulated by controller 896. More specifically, contention is resolved by requesting access to the channel from the controller. Each sender 891A, 891B or 891C encodes signals according to the ultimate destination (not shown) and transmits only when the common channel is free. In this configuration various data structures can be sent including information packets. The latter is determined by controller 896 which grants permission to the senders 891A–891C. There is no need for self demultiplexer 893 to have any controls or even suffer a configuration data, as it may direct the data passively. Thus, the controller and its arbitration function can be located at the location of the senders or any other location that is convenient.

Referring to FIG. 15S, an m-by-n cross-connection configuration has m senders 884A, 884B, 884C connected to respective demultiplexers 882A, 882B, 882C. The present configuration allows each of the m senders 884A, 884B, 884C to be granted access to a given one of n channels, 887A, 887B, 887C, each connected to a respective output channel. Arbitration may be performed by controller such as schematically illustrated by controller 889, which grants requests for access to a given channel 887A, 887B, 887C if the channel is free. The signals are encoded, by symbols, for a respective one of n receivers 886A, 886B, 886C and directed to the same by each demultiplexer 882A, 882B, 882C. Contention arises because signals are summed by star couplers 888A, 888B, 888C so that each receiver 886A, 886B, 886C can receive from all senders 884A, 884B, 884C. But in this case, the senders 884A, 884B, 884C contend for access to a given receiver, but can still send to other receivers 886A, 886B, 886C when they are free. Also other senders 884A, 884B, 884C can send to other receivers 886A, 886B, 886C as permitted and determined by controller 889. This assumes that each sender 884A, 884B, 884C has the ability to articulate optical signals according to a protocol appropriately handled by the gates (not shown) within the demultiplexers 882A, 882B, 882C. But, again, arbitration can occur conveniently at the location of the senders because no configuration is required at the cross-connect (the demultiplexers 882A, 882B, 882C). This may provide speed advantages in some applications, since unlike the TDM, in which only one channel can be inserted at each time slot, the configuration of FIG. 15S allows the insertion of all the input channels at the same time to any and each time slot.

Referring now also to FIG. 15T an alternative structure 899J to the branching structure 883 of FIG. 15S, which employed star couplers 888A, 888B, 888C may also be configured using reverse Y-junctions 899G (typ.) that combines multiple ports 899A–899D into a single port 899E. Alternatively a combination of the above structures may be employed with a similar effect, for example where many channels are combined.

Referring now to FIGS. 16A, 16B and 16C the pulse-pair symbology discussed above may be applied in multiple layers of parallel gates 101. To accomplish this, symbol 902 including pulse pair 902B encoding a destination is formed, by duplication of pulse 902A, using symbolizer 901, just as with the duplication of a single pulse (e.g., 819 of FIG. 15B), as discussed with reference to FIGS. 15A and 15B. The time separation between the pulses of pair pulses 902B is equal to the time delay $\Delta t_3$ of symbolizer 901. Signal 902 of FIG. 16B is duplicated in a similar way, by symbolizer 904, to produce symbol 906 containing copies 906A and 906B of pair pulses 902B. Pair of pulses 906A and 906B of symbol 906 are separated by time space that is equal to the time delay $\Delta t_2$ of symbolizer 904. Time delay $\Delta t_2$ corresponds to the delay of an additional gate in an additional demultiplexing/switching layer (not shown) through which signal 906 may be passed before it reaches a gate (also not shown) with a time delay of the respective pulse pair 902B ($\Delta t_3$). The process may continue to repeat itself as needed and shown in FIG. 16C yet another layer of symbology may be added by means of another symbolizer 910. Here, each set of pulses making up each symbol in signal 912 is reproduced at an appropriate interval spacing by another duplicator circuit 910 configured with a delay of $\Delta t_1$. Symbol 912 includes pairs of pulses 912A–912D produced by symbolizer 910 that copies double pairs 906A and 906B of symbol 906 to produce copies of double pairs 912A and 912B and double pairs 912C and 912D separated by time space $\Delta t_1$, equals to the time delay of symbolizer 910. The encoding for the demultiplexing/switching for the three layers represented by the intervals $\Delta t_1$–$\Delta t_3$ can be processed in any desired order.

Referring now to FIG. 16C, illustrating symbol 912 (typ.). Signal 912 includes sets of subgroups of pulses separated by time delays $\Delta t_1$–$\Delta t_3$, each of these delays represents the encoding for different demultiplexing/switching layer. Each set of signals 912 (typ.) represents a single symbol from an original source signal encoded by symbolizers 901, 904 and 910 of FIGS. 16A, 16B and 16C, respectively. Each of the time intervals $\Delta t_1$, $\Delta t_2$, and $\Delta t_3$, selects a unique coincidence gate switch in a given layer of gate systems. Each output of a gate, such as gate 101 (typ.), in a first layer, corresponds to a different and unique value of $\Delta t_1$ (typ.). Each output of a gate in a second layer, corresponds to a different and unique value of $\Delta t_2$ (typ.). Each output of a switch in a third layer, corresponds to a different and unique value of and $\Delta t_3$ (typ.). The encoding order illustrated by FIGS. 16A, 16B and 16C is only one example of many other possible encoding orders. In general, the encoding order is arbitrary and may be chosen as desired.

Signals 912 (typ.) may represent encoded symbol for any number of layers and may be at any desired length. However for maintaining synchronization a specific fixed time frame may be defined capable of including the longest symbol 912 (typ.). Any time frame produces only one coincidence signal by the specific gate 101 (typ.) at the last demultiplexing/switching layer designed to respond to specific symbol 912 that the specific frame includes. Thus in order to maintain synchronization where the propagation of the signals is from left to right, each symbol 912 should start on the left edge of each time frame.

A guard interval between the time frame of symbols 912 (typ.) maintains a distance between adjacent time frames may be any width sufficient to prevent inter-symbol interference, for example, the maximum time delay used for a previous symbol. In case that the artifact pulses are cancelled, the guard zone requirement may only exist at the layer with the highest encoding delay. This is because the time delays that correspond to the other layers are always a fraction of the delay at this layer, the presence of the highest guard interval guarantees that no overlap will occur between successive symbols in the lower layers.

Note that, generally, in the foregoing illustrations, artifact pulses may be left out of signals, even though it may be present in certain embodiments, depending on the nature of the embodiment used for form the pulse-pair symbols.

Refer now to FIG. 16D, which illustrates further how the multilayer signal is processed through multiple layers gates (without showing artifact pulses to simplify the figures, although they may or may not be present). The original signal (e.g. 912 from FIG. 16D) here shown at 940, is applied to a first layer 946 of gates 952A–952F each with a respective time delay $\Delta t_a$–$\Delta t_f$ (illustrating specifically, for example, $\Delta t_1$ that matches gate 952C). Gate 952C, which is within the range of gates 952A–952F (a range which has an arbitrary number of gates within the confines of the encoding range), outputs coincidence signal 930 because it is configured for the matching time interval $\Delta t_1$. Signal 930 may be thought of as containing the structure of one half of the signal 940 and results due to the coincidence effect described for coincidence gates above. The other gates in the layer 946 output no signal, because their time delays have non-matching values.

Signal 930 is applied to the second layer of gates 952N–952R, each with a respective time delay $\Delta t_n$–$\Delta t_r$ (illustrating specifically, for example, $\Delta t_2$ that matches gate 952P). Gate 952P, which is within the range of gates 952N–952R (a range which also has an arbitrary number of gates within the confines of the encoding range), outputs signal 932 because it is configured for the matching time interval $\Delta t_2$. Signal 932 may be thought of as containing the structure of one half of the signal 930 and results due to the coincidence effect described for coincidence gates above. The other gates in the layer 948 output no signal, because their time delays have non-matching values.

Signal 932 is applied to the third layer of gates 952V–952Z, each with a respective time delay $\Delta t_v$–$\Delta t_z$ (illustrating specifically, for example, $\Delta t_3$ that matches gate 952X). Gate 952X, which is within the range of gates 952V–952Z (a range which also has an arbitrary number of gates within the confines of the encoding range), outputs signal 934, because it is configured for the matching time interval $\Delta t_3$. Signal 934 may be thought of as containing the structure of one half of the signal 932 (or a single pulse) and results due to the coincidence effect described for coincidence gates above. The other gates in the layer 950 output no signal, because their time delays have non-matching values. Note that in FIG. 16D, the shapes of the pulse patterns are not necessarily to scale. The decoding order along the multiple decoding layers, illustrated by FIG. 16D, is only one example of many other possible decoding orders. In general, the decoding order is arbitrary and may be chosen as desired. This means that the decoding layers having the respective time delays $\Delta t_n$–$t_r$ may be switched in their orders as needed.

It also should be clear that the self decoding/demultiplexing/switching systems discussed above, such as the systems of FIGS. 14A–14D, 15P and 16D, designed for self routing of information across multiple switching layers may have different configurations. For example, in embodiments where coincidence gates used in the self routing system are of the type 101 designed for cancellation of artifact pulses (non-coincidence pulses) by exemplary means of optical threshold mechanism, the coincidence gates should be distributed along the nodes located at the routing layers. However, where the coincidence gates used in the self routing system are of the type 101 that allows artifact pulses (non-coincidence pulses) which do not include an optical threshold mechanism, the same signal may arrive to all of the ports at the last demultiplexing/switching/routing layer. Accordingly, such coincidence gates may be arranged to be located only at the terminals of the last switching layer. In such a case the switching layers 946, 948, 950 of FIG. 16D may all be located at the output ports of the system. Still, the configuration described above for gates that do not allow artifact pulses in which the gates are distributed along the nodes located at the routing layers, is usable for gates that allow artifact pulses as well.

In addition it should be noted that the system of FIG. 16D may represent a situation where all layers 946, 948 950 are at close vicinity to each other and at the same radiation guide. In such a case, the system of FIG. 16D may represent a configuration of several coincidence gates connected together in series to form a new combined coincidence gate. Such a gate, responses to form main coincidence pulse (as discussed below), only for a specific pattern of a symbol constructed from multiple pulses with a number of pulses greater than two. The specific address (predetermined destination) to which only one specific combined coincidence gate responds, is encoded by the specific time spaces between the multiple pulses forming the specific pattern of a specific symbol.

The main coincidence signal is the coincidence pulse with the highest intensity that exists in the system for a specific symbol. While some other coincidence signals may be produced in the same gate where the main coincidence signal is produced or in other gates, still the main coincidence pulse is the pulse with the highest intensity produced in the system. A main coincidence pulse only outputs at a specific gate that matches the time delays between the pulses of a specific address of a specific symbol.

Note that each gate in the series of gates forming the combined coincidence gate of FIG. 16D may be a combined coincidence gate by itself, such as, the combined coincidence gate formed by multiple coincidence gates connected in parallel and illustrated by the combined coincidence gate of FIG. 22A. Accordingly, a combined coincidence gate may be constructed from coincidence gates connected in series, in parallel or in any combination of serial and parallel connections.

Figure 16G:
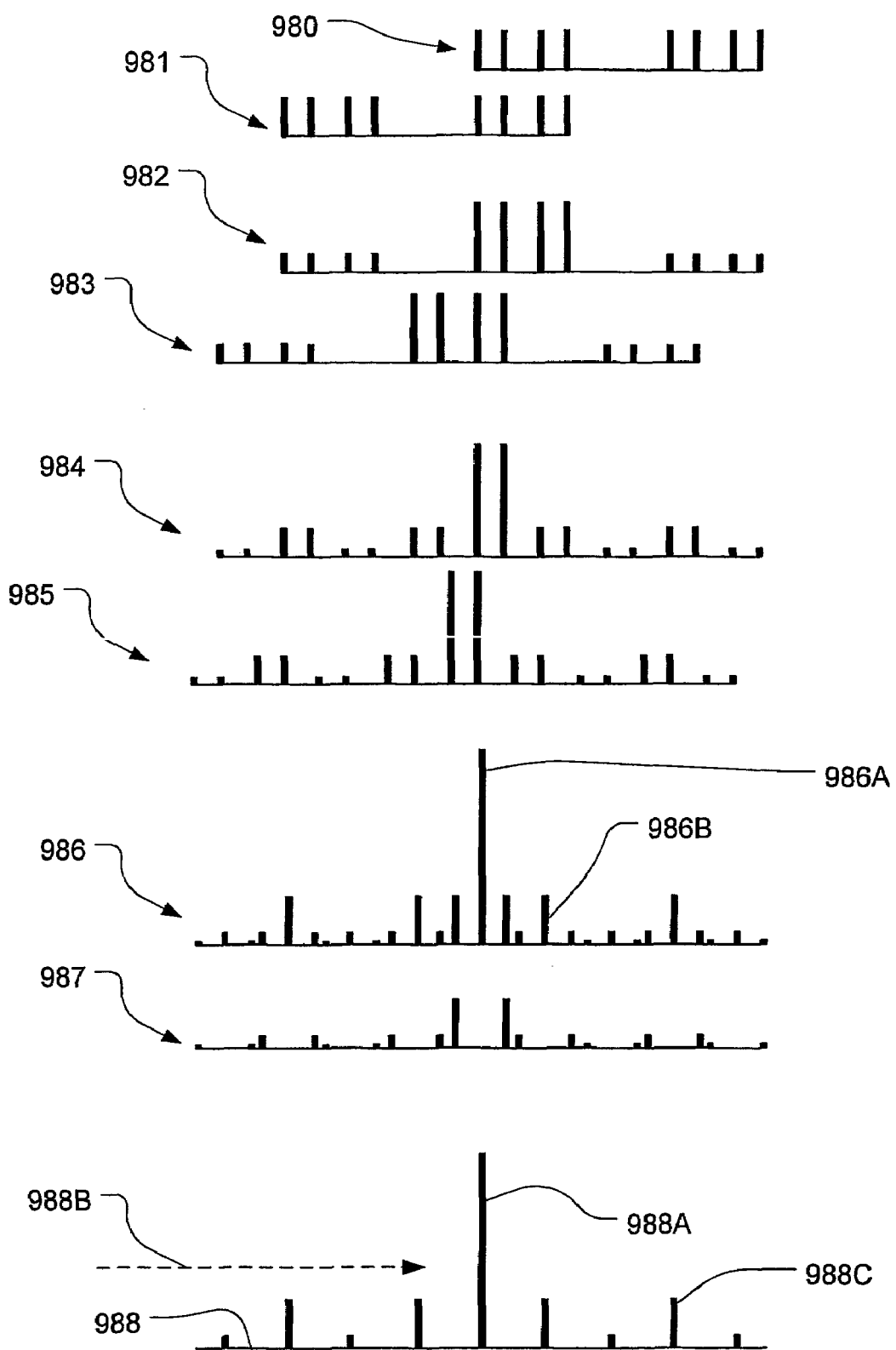
FIG. 16G is a schematic illustration of the coincidence and non-coincidence signals produced at the different layers of self demultiplexing/switching system.

Referring now to FIGS. 16E, 16F and 16G, comparators (differential amplifiers) 990 may be used at the outputs of a multiple layer arrangement of demultiplexers as described with reference to FIG. 15P (three layers) and as indicated with reference to FIG. 16E. First, a signal may be formed as indicated at 980 of FIG. 16G by a suitable modulation scheme such as interleaving several layers as discussed with reference to FIGS. 16A–16C. Then in a first layer of demultiplexing as indicated at layer 946 in FIG. 16D, a delayed image 981 of FIG. 16G of the signal 980 is summed with the signal 980 with the result at the coincidence output as indicated at 982. Then in a second layer of demultiplexing as indicated at layer 948 in FIG. 16D, a delayed image 983 of the signal 982 is summed with the signal 982 with the result at the coincidence output as indicated at 984 of FIG. 16G. Finally, in a third layer of demultiplexing as indicated at layer 950 in FIG. 16D, a delayed image 985 of the signal 984 is summed with the signal 984 with the result at the coincidence output as indicated at 986 of FIG. 16G. The above profiles 982–986 are assumed to be representative of power, not field strength. The final result at the non-coincidence output is shown at 987. If these two signals are applied to respective comparator 990 inputs 990A and 990B, with respective detectors 993A and 993B, as in FIG. 16E, the result at the output 990C will be as indicated at 988 of FIG. 16G. The remaining pulses are those that coincided at the final gate (not shown in the present drawing) with all other artifact being eliminated. Note that the spacing between the remaining pulses including the main coincidence pulse 988A (a pulse that have coincidence in all the layers) and artifact pulses 988C is increased by the elimination of the interstitial pulses coinciding with profile 987. The increase of the space between the pulses has the advantage of allowing the use of slower detectors. The discrimination of main coincidence pulse 988A from the artifact pulses 988C (secondary coincidence pulses that do not have coincidence in all the layers) is performing by setting an optical or electronic threshold level 988B which is adjusted to be in the range between the amplitudes of pulses 988A and 988C. Such threshold level eliminates all the artifact pulses 988C and allows only the propagation of main coincidence pulse 988A.

It should be understood that when the device of FIG. 16E including comparator (differential amplifier) 990 is employed in a way described above but, after the first demultiplexing layer, only the coincidence pulse appears at output 990C of comparator 990. In such a case there is no need for additional threshold mechanism.

Figure 17:
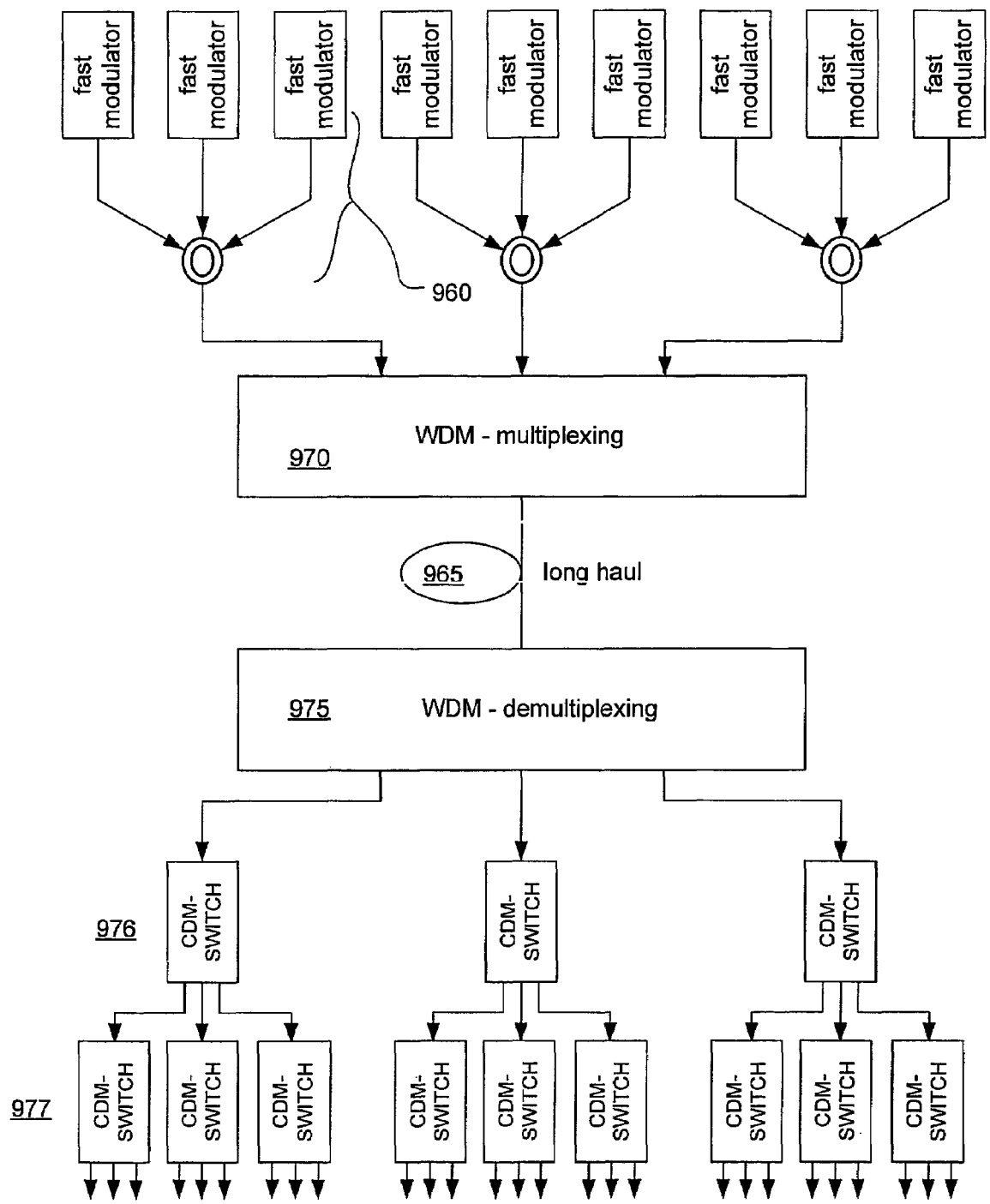
FIG. 17 schematically illustrates a self demultiplexing/switching/routing Wavelength Division Multiplexing (WDM) system including multiple layers of self Code Division Multiplexing/demultiplexing gates.

FIG. 17 illustrates how Wavelength Division Multiplexing (WDM) may be combined with the symbology method of the present invention in a communications system. Multiple instances of the interleaving/multiplexing system described with reference to FIGS. 15A through 15S may be provided, for example as schematically indicated at 960 (typ.). Each of the multiplexed channels may be assigned a frequency channel and multiplexed in a WDM process schematically illustrated by 970 for transmission on a long haul channel 965. Corresponding demultiplexing provided by a WDM demux engine 975 is provided at a receiving end, the respective frequency channels of which may be applied to respective optical demultiplexers 976 (typ.) and 977 (typ), such as those illustrated in FIGS. 15A–15S. The label CDM of switches 976 (typ.) and 977 (typ.) stands for Code Division Multiplexing/Demultiplexing referring to the self routing preformed by the code of the predetermined destination encoded in the symbols constructed at multiplexing systems 960 (typ.) Note that two layers of demultiplexers are shown. These may employ the mechanism for multiple-layer encoding described with respect to FIGS. 16A–16D.

Figure 18A:
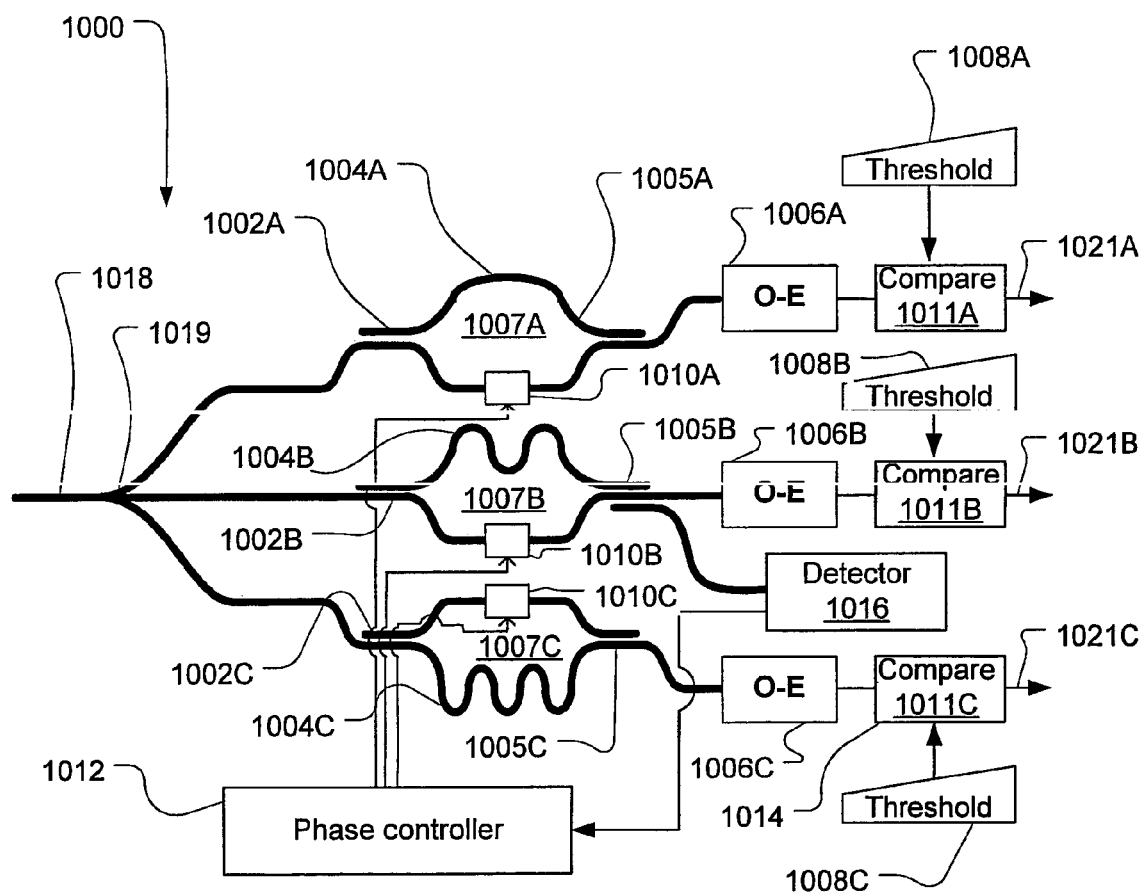
FIG. 18A is a schematic illustrations of a self routing/switching/demultiplexing system made of radiation guides and includes electronic threshold devices.

Referring now to FIG. 18A, elements of a receiver device for converting optical signals output by gates 101 and systems employing them in their various embodiments, are illustrated by a demultiplexing receiver 1000. The demultiplexing receiver 1000 has various features, illustrated figuratively, that indicate how such a device may be fabricated on an optical chip using lithographic techniques that may be known in the field as Planar Circuits (PLC). A signal received on channel 1018 is distributed by a star coupler 1019 to several gates 1007A–1007C. Each gate has a respective directional coupler 1002A–1002C, delay line 1004A–1004C, and directional coupler 1005A–1005C acting as combiners. Directional couplers 1002A–1002C divide the incoming signal into paths with different delays and couplers 1005A–1005C sum them, and apply the summed signal to a optical detector 1006A–1006C.

Each gate 1007A–1007C has a respective phase shifter 1010A–1010C that adjusts the phase so that coincidence pulses result from constructive interference, at couplers 1005A–1005C, provide the maximum ratio of pulse height to background (including non coincidence pulses).

When device 1000 is made from optical fibers, the phase shifters 1010A–1010C can be of the type that applies pressure, by use of a piezoelectric crystal. For device 1000 that is made using planar waveguides, the phase shifters 1010A–1010C can be of the type that thermally changes the refractive index of the waveguide, or semiconductor material fabricated by thin film techniques that change its refractive index due to injection of charge carriers into its guiding media. The change in the refractive index shifts the phase of the radiation propagating in the media of the shifters 1010A–1010C.

Phase matching can be obtained by use of a suitable calibration by closed-loop phase controller 1012. A calibration signal may be obtained from any of the signal paths, for example, by means of a detector 1016 that taps a small portion of signal energy from directional coupler 1005B. The detector 1016 and phase controller 1012 combination may provide an instantaneous or averaged signal and be configured to maximize intensity. Since most properties that affect the phases of the signals within a small embodiment of receiver 1000 are uniform, for example if formed on a chip, a change in properties that affects on signal path should affect all in the same way. Thus, the entire configuration of receiver 1000 may be calibrated such that only one detector is required to provide for control of all the phase shifters 1010A–1010C. Temperature changes, for example, in various optical components may drift, requiring the correction of the phase match. But this correction need only be done at long intervals relative to the rate of data throughput through such devices and therefore does not present a significant obstacle. Suitable control systems for performing calibration are well within the state of the art and can be embodied in many different forms.

Although in the embodiment of FIG. 18A, a single input (from detector 1016) is used to control multiple phase shifters 1010A–1010C, it also possible to control each phase shifter with a separate detector (not shown) for each signal path. In this alternative embodiment (not shown), separate detectors such as 1016 and separate phase controllers such as 1012 are used to control each shifter 1010A–1010C. Note also that the phase shifters 1010A–1010C may be provided with the ability to shift over multiple wavelengths so that they can align pulses. While the pulses are illustrated in the instant specification as square-edged, it is certainly possible and very likely, that real-world pulses would have round edges and in fact be substantially bell-shaped. The strength of a coincidence pulse, as a result, would be expected to be very sensitive to the alignment between the two gate inputs. Thus, the phase shifters 1010A–1010C may be time-delay shifters with enough latitude that they can align pulses that are time–shifted more than a fractional wavelength from optimal. The procedure would be the same in either case: search for the average power intensity peak, which naturally gives greater weight to coincidence pulses.

Threshold inputs 1008A–1008C to respective comparators 1011A–1011C discriminate coincidence pulses from artifact and background by establishing a minimum signal level output from detectors 1006A–1006C. As a result, the comparators 1011A–1011C output pulses 1021A–1021C only when a coincidence pulse is received by them. The threshold inputs 1008A–1008C may be established by various methods. In one embodiment, a handshake from each sender occurs at regular intervals and a test message with a certain number of coincidence pulses and model artifact is sent many times while the threshold level is ramped up and down. Then some midpoint (or another point in the range between the intensities of the coincidence and artifact pulses) may be established in response to the test exchange and then the threshold level may be fixed thereafter in response.

It should be understood that the optical sensors and the electronic thresholds (comparators) components may be an integral part of the demultiplexing device, they may be placed in close vicinity to the demultiplexing device, they may be placed far away from the demultiplexing device, and even may be placed in an end unit. The same is true in the situation that optical thresholds are used to replace the combination of optical sensors and electronic threshold components. Such optical thresholds may be an integral part of the demultiplexing device, they may be placed in close vicinity to the demultiplexing device, they may be placed far away from the demultiplexing device, and even may be placed in an end unit.

Note that device 1000 may be fabricated from Multi Mode (MM) radiation guides, such as fibers or waveguides. In such a case the radiation in combiners 1005A–1005C is summed incoherently and there is no need for the phase control. Accordingly, when MM radiation guides are used in device 1000, detectors 1006A–1006C, controller 1012 and shifters 1010A–1010C may be removed resulting in a simpler device. Though MM device 1000 has the advantage of simplicity, it has a disadvantage of lower contrast between coincidence and artifact pulses.

Figure 18B:
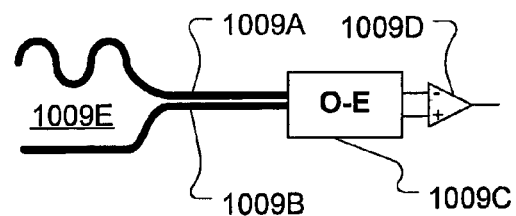
FIG. 18B schematically illustrates an exemplary threshold mechanism for the system of FIG. 18A that includes a comparator.

Referring to FIG. 18B, an example of applying the comparator (differential amplifier) embodiment of FIGS. 16E and 16F is shown. Each or any of gates 1007A–1007C of FIG. 18A (exemplified by gate 1009E in FIG. 18B) may apply their respective coincidence and non-coincidence outputs 1009A and 1009B to respective detectors (not separately shown, but housed in detector device 1009C. The corresponding signals may then be differentially applied to a comparator 1009D to eliminate the artifact pulses.

Fabrication of delay lines on a chip presents some problems because of the minimum radius of turns required to ensure tolerable band loss in the turns. The required radii and the requirement to avoid cross-intersection between the radiation guides may cause the amount of real estate required for large delays to be too great for practical manufacture and even if they can be manufactured, the waste of real estate would make such a configuration uneconomic. A configuration that is much more susceptible to convenient lithographic fabrication on a chip is shown in FIGS. 19, 20A and 20B Referring to FIG. 19, here a series of directional couplers 1028, 1032, 1034, 1036 fabricated on a chip 1030 and associated with radiation guides 1025A–1025E directs a signal 1026 from an input port 1024 to an output port 1038 to form an optical delay line 1020. Edge surfaces are mirrored by cleaving, polishing, or coating and each directional coupler 1028, 1032, 1034 and 1036 has a coupling length that is equal to half of the length required for crossover. In such a case the radiation that enters to any coupler 1028, 1032, 1034, 1036 is distributed along the coupling region of the coupler and is reflected back, from mirror like edges 1040 (typ.), along the same coupling region. Accordingly, the back and forth propagation of the radiation in the coupling region of each coupler 1028, 1032, 1034, 1036 is along a distance that is equal to a coupling distance of a complete crossover. This means that when the radiation enters to couplers 1028, 1032, 1034, 1036 from one port it is completely reflected back from the other port. Thus the light is reflected back and forth along the directional couplers 1028, 1032, 1034, 1036 and light guides 1025A–1025E to create an optical path between input 1026 and output 1038 with little backward reflection.

Referring to FIG. 20A, in a variation on the above, the directional couplers 1028, 1032, 1034, 1036, typified by 1044, employ Bragg-reflector gratings 1046 (typ.) instead of a reflective mirror surface 1040 (typ.) of FIG. 19. The coupling length for complete reflection is achieved by the provision of a directional coupler whose coupling length (measured from the point where total reflection is produced by the Bragg grating) is half of that required for crossover.

In another variation shown in FIG. 20B, the Bragg gratings 1046A and 1046B are provided beyond the coupling regions 1044A (typ.) of the directional couplers 1044B (typ.). The locations of the gratings should be equidistant from the coupling regions 1044A (typ.) so that back-reflection losses are minimal and this may require slightly different offsets for the Bragg grating as indicated in the drawing.

It should be noted that in the configurations shown in FIGS. 19, 20A and 20B, there is no use of large radius bends along the path of the delay lines, resulting in delay lines with a very compact structure with small dimensions across the traverses. Accordingly, such configurations for delay lines are very attractive for on-chip fabrication.

Figure 20C:
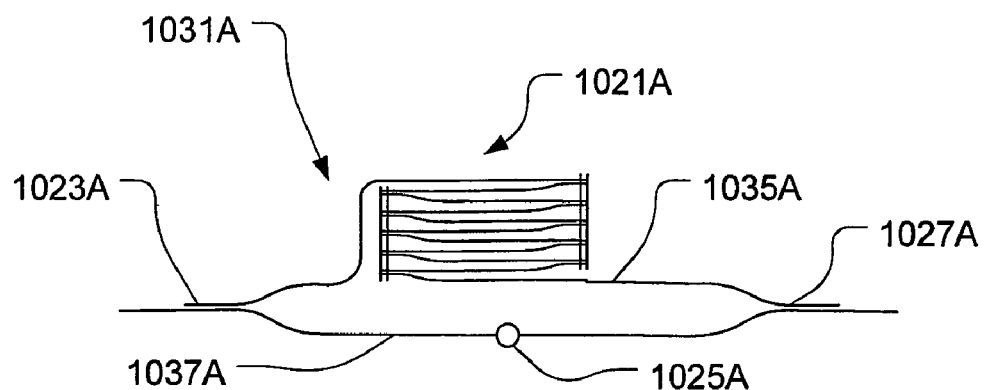
FIGS. 20C and 20D are schematic illustrations of the implementation of the delay line of FIG. 19 in a coincidence gate with and without a phase shifter, respectively.

Referring now to FIG. 20C, in an implementation of the delay embodiments of FIGS. 19, 20A and 20B, a gate 1031A has single mode directional couplers 1023A and 1027A which split a signal entering coupler 1023A into radiation guides 1035A and 1037A and create a sum signal in coupler 1027A. Preferably the coupler 1023A is such that more than 50% of the signal power is sent into the delay branch 1021A, to compensate for possible loss in the delay branch 1021A, such that the delayed and non-delayed signals arriving from guides 1035A and 1037A, respectively, summed in coupler 1027A are substantially equal in power. A phase controller 1025A is provided to ensure phase alignment of the delayed and non-delayed branches is correct for maximizing the difference between coincidence and non-coincidence pulses.

Figure 20D:
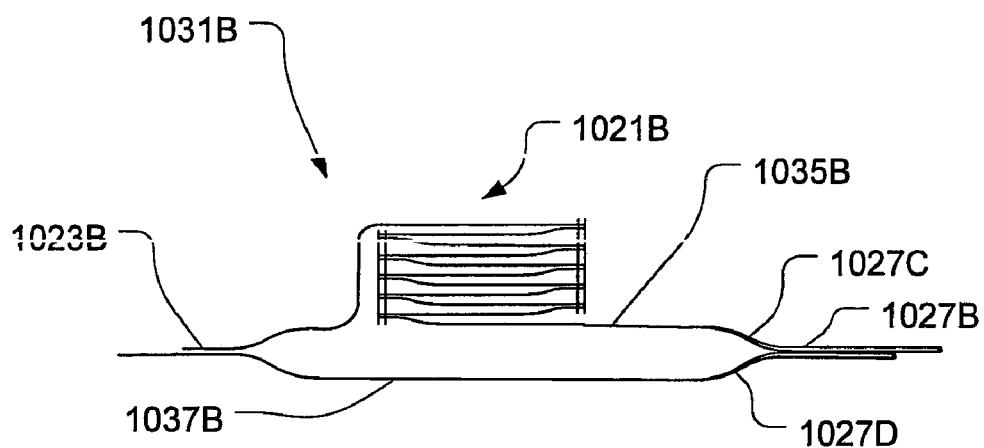

Referring now to FIG. 20D, illustrating an embodiment 1021B that is a variation of the design of embodiment 1021A of FIG. 20C. Embodiment 1021B avoids the need for a phase controller 1025A by employing a multimode coupler 1027B, which has tapered branches 1027C and 1027D that allow adiabatic transmission from single mode radiation guides 1035B and 1027B to multimode coupler 1027B with reduced loss. Coupler 1027B performs power-summing rather than field-summing. In this case, because the summing is non-coherent (as opposed to the use of a single mode directional coupler 1027A of FIG. 20C) there is no need for phase alignment. In this configuration, the segment of the delay line 1021B is made of single mode radiation guides, in whom the coupling length of couplers 1021B is well defined, but the summing coupler 1027B is a multimode (MM) coupler that may avoid the need to use phase shifter 1025A. Coupler 1023B may be similar to coupler 1023A of FIG. 20C.

Figure 20E:
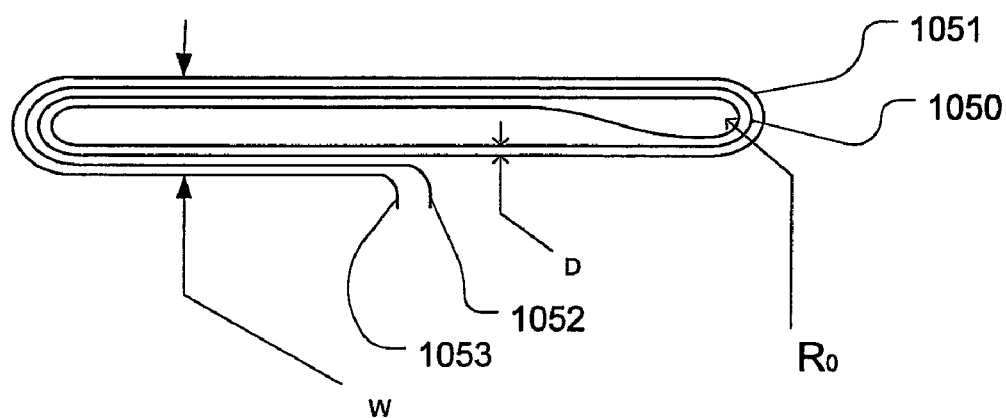
FIG. 20E schematically illustrates a delay line fabricated on a chip that includes an open core of a loop.

Referring now to FIG. 20E, a compact structure for delay lines fabricated on chips that lacks any intersections between its radiation guides 1050 and 1051 including their input and output 1052 and 1053 is illustrated. The delay line is configured by a core of open loop 1050 around which the pair of radiation guides 1051 and 1052 are looped together. The structure has an initial radius $R_0$ and pitch between the guides of D. Each turn of the guides adds D to the total radius of the bend and 2*D to the width W of the group of delay lines. The total width of the delay lines for N turns is $2*(R_0+N*D)$. For example, a conventional delay line (constructed from an optical guide that is routed back and forth with a turning region of some minimum radius) with the same length and $R_0$ would have a width of $2*N*R_0$. Since $D<<R_0$, the width of the delay line shown in FIG. 20E is much smaller than that of another delay line, having the same delay, and fabricated conventionally on a chip. The delay line of FIG. 20E may be useful for on chip fabrication and may be used in the devices of FIGS. 20C and 20D, to replace respective delay lines 1021A and 1021B.

Figure 21A:
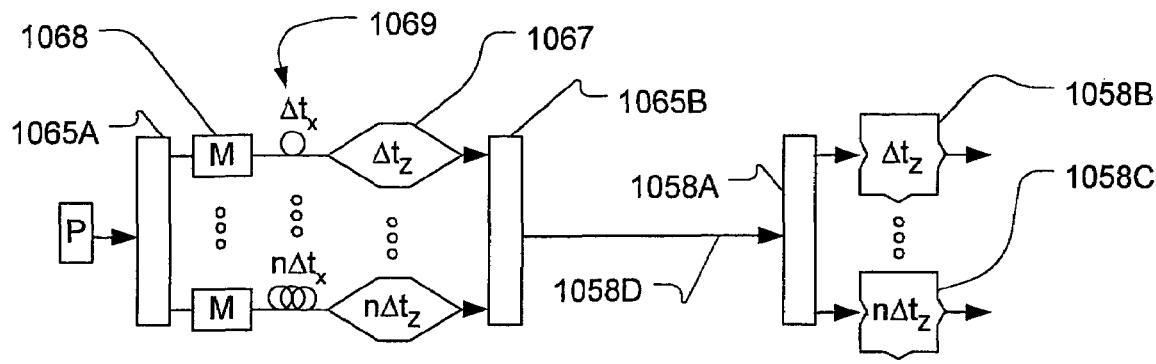
FIGS. 21A, 21B, 21C and 21D schematically illustrate four versions of multiplexing/demultiplexing systems for symbol signals.
Figure 21B:
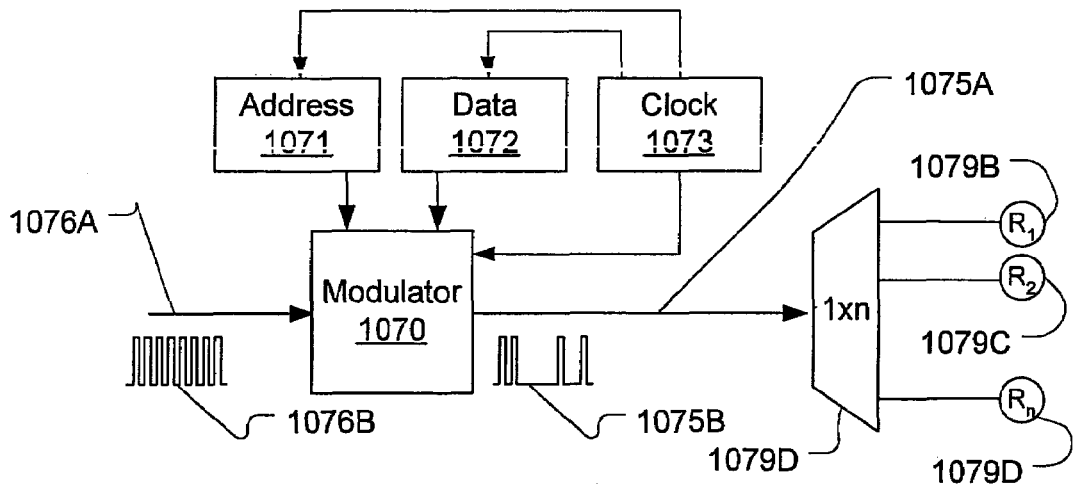
Figure 21C:
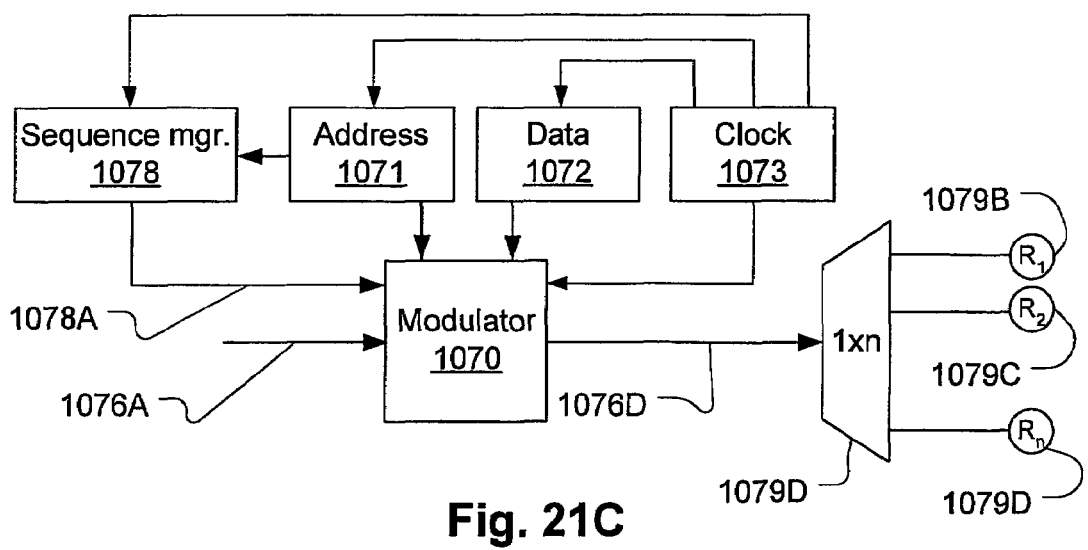

Referring now to FIGS. 21A, 21B and 21C, various mechanisms for modulating and demodulating are shown. In FIG. 21A, a first modulation/demodulation mechanism that is similar to the embodiment of FIG. 15C. Here a pulse source P distributes pulses using a distribution device 1065A, for example a star coupler, a cascade of directional couplers, a cascade of Y-junctions, or a cascade of other splitters, to multiple modulators as shown at 1068 (typ.). Each modulator 1068 feeds into a respective time delay 1069 (typ., but with different delays $\Delta t_X - n\Delta t_X$) and duplicator 1067 (typ., but with different delays $\Delta t_Z - n\Delta t_Z$). The delays space apart the signals generated by the modulators 1068 so that the symbols generated by duplicators (symbolizers) 1067 (typ.) are interleaved, without collisions, into combiner 1065B that merges them onto a common data path 1058D. For maintaining synchronization, the interleaved symbols at common data path 1058D may be interleaved into fixed size of time frames where each of the symbols may start at the delayed edge of each time frame.

For demodulating, the symbols from common data path 1058D are distributed, by device 1058A, into an array of gates 1058B–1058C (typ. but with different delays $\Delta t_Z - n\Delta t_Z$) and are demultiplexed by this array of gates in a manner similar to earlier embodiments.

Referring to FIG. 21B, data may be directly modulated onto a single channel 1075A using a modulator 1070 under control of a clock 1073 and address (predetermined destination) and data sources 1071 and 1072 to form symbols, at channel 1075A, as previously discussed. The symbol stream on channel 1075A may be split among multiple channels, as discussed in prior embodiments, using a demodulator 1079D and sent to respective destinations 1079B–1079D that may include receivers $R_1$–Rn.

Referring to FIG. 21C, illustrating a system similar to the system of FIG. 211B with an additional sequence manager. In the alternative embodiment of FIG. 21 C, a sequence manager 1078 receives address data from address (predetermined destination) source 1071 and a clock signal from clock 1073. The sequence manager 1078, which may be implemented as a programmable processor or preferably a simple state machine such as an ASIC (application specific integrated circuit), generates a pulse, through electrical lead 1078A, that is used to control modulator 1070. The sequence manger 1078 controls when the next symbol should be output, at channel 1076D, by the modulator 1070 responsively to address source 1071. The symbols generated at guide 1076D, by modulator 1070, are demultiplexed, as discussed above, by demultiplexer 1079D having output terminals 1079B–1079D that may include receivers R,-R,. The reason for making the symbol rate responsive to the address is to minimize the delay between symbols required to avoid inter-symbol interference, as explained with reference to FIG. 21E, as described below.

Figure 21D:
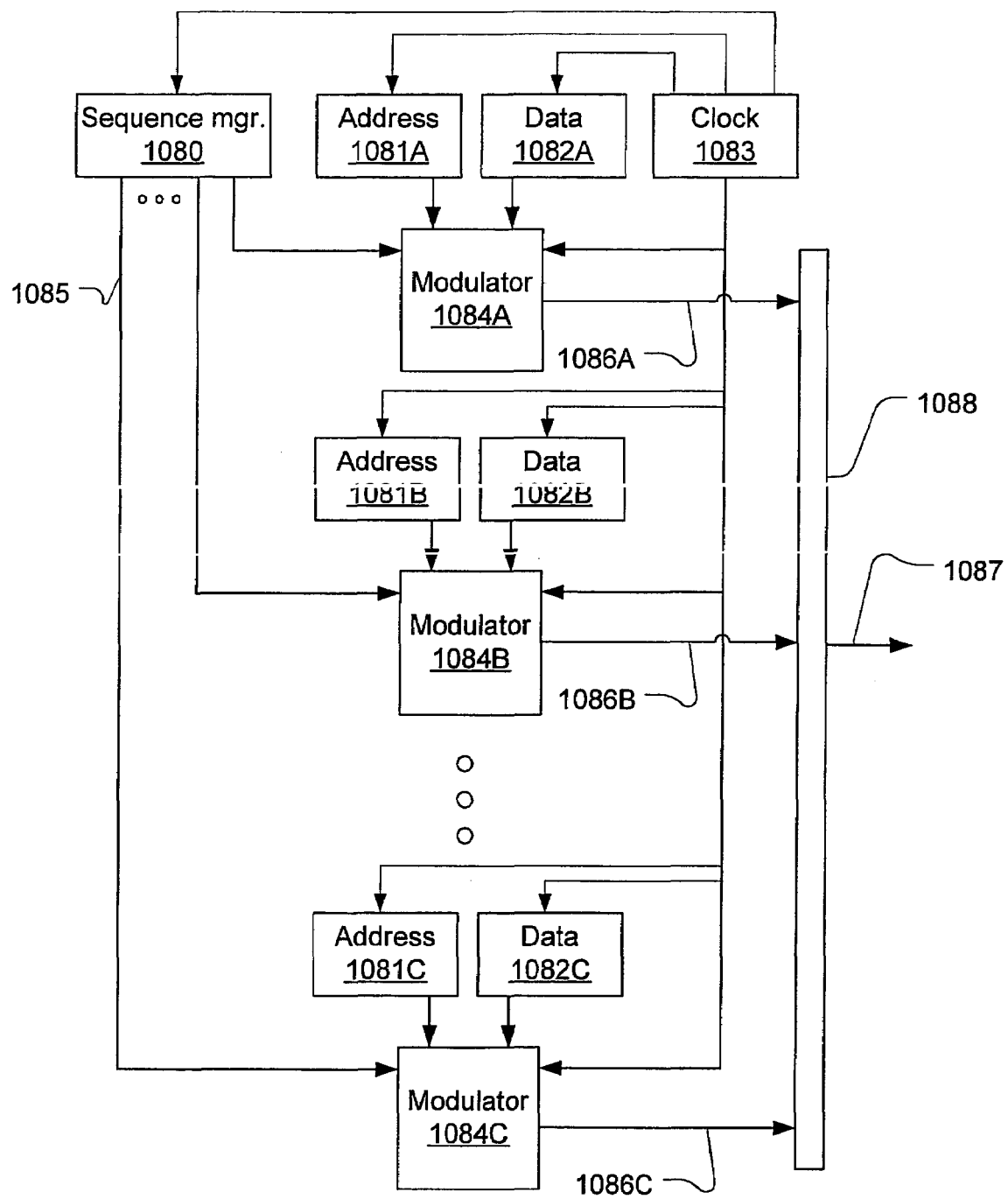

Referring now to FIG. 21D, multiple modulators 1084A–1084C governed by a common clock 1083 and transmitting for multiple respective addresses 1081A–1081C and data 1082A–1082C may be governed by a common sequence manager 1080. The output signals from each modulator 1084A–1084C, propagating on channels 1086A–1086C, may be interleaved by a combiner 1088, onto a single channel 1087. In this case, the sequence manager 1080 also manages for collision avoidance, since multiple independent data streams from channels 1086A–1086C may vie for the same channels space at common channel 1087.

Referring now to FIG. 21K, highly dense pulse streams can be generated using electronic modulation not only to determine whether a coincidence pulse will be generated at a final destination as in foregoing embodiments, but also to actually determine the particular symbol (e.g., spaced pulse) as well. In other words, the system may perform the symbol modulation electronically.

First a stream of narrow pulses generated by means of any of the foregoing mechanisms is generated on each of a number of parallel channels 1228A–1228P. The spacing of the pulses (e.g., 1224B typ.) on each channel (e.g. 1228A typ.) may be equal to the size of the time slots multiplied by the number of channels and synchronized across all the channels 1228A–1228P such that every time slot has a single pulse in one of the channels according to a repeatable scheme. Modulators A–P 1122 (typ.) control whether pulses on respective channels 1228A–1228P are passed to a signal combiner 1226 to be emitted from port 1227. If all the pulses were passed by all the modulators A–P 1222 (typ.), the resulting train of pulses would be equally spaced pulses a single time slot apart. The modulators A–P 1222 (typ.) are all controlled by a controller 1230 to form spaced-pulse symbols according to a desired data stream (not indicated) on a single output channel 1227. The resulting signal, illustrated at 1226 may include a series that includes the pulse timing positions of pulses 1224A, 1224B, 1224C and others, illustrated by pulses 1225A, 1225B, 1225C and others, respectively, with the inter-symbol spacing as well as the selection of the symbol from the symbol space being determined by the controller and contributed to by all the channels in concert.

It is clear that using the same method, symbols including number of pulses greater than two, such as symbols 912, 940–944 and 1130–1134 of FIGS. 16C, 16D and 22A, respectively, can be produced at port 1227.

In another embodiment, a similar system of FIG. 21K, is illustrated at FIG. 21L. Modulators 1244 (typ.), combiner 1240, output channel 1241 and controller 1238 of FIG. 21L may be the same as indicated by 1222 (typ.), 1226, 1227 and 1230 of FIG. 21K, respectively. The data modulated onto the output channel 1241 may come from a buffer 1236 such as a FIFO to drive the controller 1238 that controls the modulators 1244 (typ.). Buffer 1236 receives multiple parallel channels such as 1234A–1234C. A pulse former 1242 may be present in each channel to reduce the width of pulses as described with reference to FIGS. 15F or 15G. One or more sources of pulses 1248 may be provided and the pulses distributed to each channel as discussed with respect to FIGS. 15C and 15J.

Note that although the above figures refer to the address symbols (e.g., 1071 of FIGS. 21B and 21C or 1081A–1081C of FIG. 21D) and data (e.g. 1072 of FIGS. 21B and 21C or 1082A–1082C of FIG. 21D) as being different, it is possible for them to be one and the same. That is, the symbology may encode data that is sent to a single destination, and it may represent any data, not just destination data. That is, the data may be encoded such that each pulse-spacing symbol indicates a datum, for example, such that the number of bits carried is $\log_2(N,)$ where N is the number of time slots. By providing a mechanism for generating pulses on selected channels, therefore, messages may be received by associating each channel with a particular degree of freedom of a message format.

The delay following each symbol that is required to prevent inter-symbol interference (called a guard band) may depend on the particular symbols and decoding gates used in the decoding system. For example, this may be the case when a pulse-spacing symbology is used with gates that allow artifact pulses as discussed below and shown in FIG. 21E.

Figure 21E:
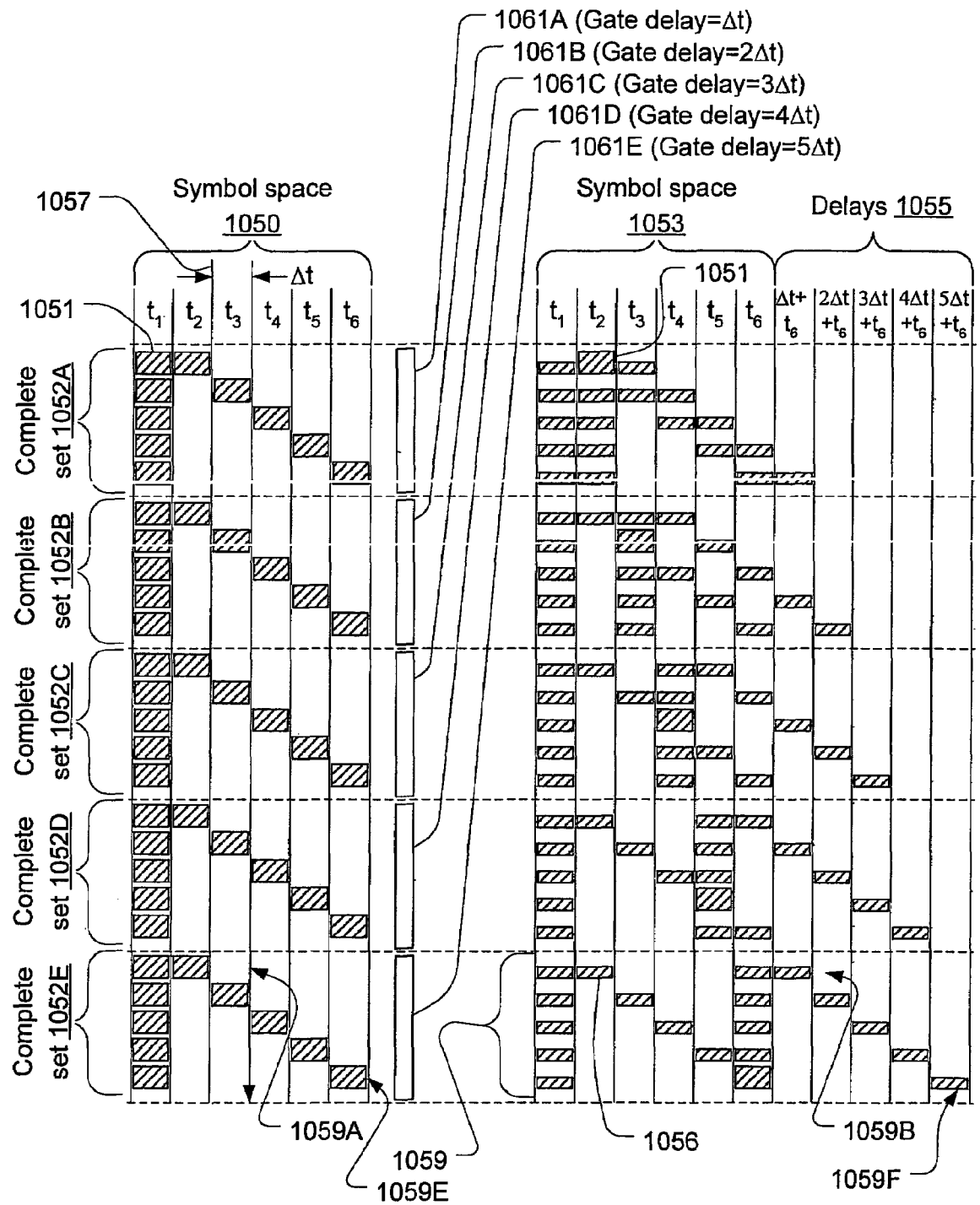
FIGS. 21E, 21F, 21G, and 21J schematically illustrate symbol signals, the artifact pulses that they produce and various arrangements of guard bands between the symbols.

FIG. 21E illustrates 5 identical groups 1052A–1052E of encoded symbols. In each group 1052A–1052E there are 5 different encoded symbols. The space between the pulses of the shortest symbol is $\Delta t$ and the space between the pulses of the longest symbol is $5\Delta t$. Groups 1052A–1052E are each the same, but the effect of passing each through a different gate (indicated at 1061A through 1061E) is illustrated in the regions 1053 and 1055. The effect of passing through gates 1061A–1061E, shown in regions 1053 and 1055, is equivalent to summing of the symbols with their delayed copies where each of gates 1061A–1061E produces a different delay. The shortest delay is of gate 1061A and is equal to $\Delta t$. The longest delay is of gate 1061E and is equal to $5\Delta t$. Gates 1061A–1061E having time delays $\Delta t$, $2\Delta t$, $3\Delta t$, $4\Delta t$ and $5\Delta t$, respectively. Region 1053 represents a time frame that is capable of including the largest symbol used in the decoding system. Region 1055 represents the time guard band between frames 1053 (typ.) that should be maintained to avoid unwanted inter-symbol interference. It can be seen that all the coincidence signals produced by gates 1061A–1061E for the symbols of groups 1052A–1052E appear in region (time frame) 1053. Region 1055 (guard band) includes only artifact pulses. Each shaded rectangle, for example 1051 (typ.) represents a pulse. Artifact pulses such as indicated at 1056 are indicated as being at half the height of coincidence pulses (non-coherent summing), for example, as indicated at 1051. As can be seen from the figure, the maximum number of time slots occupied by artifact pulses (e.g., 1056) is equal to the maximum delay of the gates 1061A–1061E. This maximum ($5\delta t$) is produced by gate 1061E with the greatest delay which produces the coincidence pulses and artifact pulses shown at 1059. The minimum inter-symbol guard band is shortest for symbols 1059A having pulses spaced only one time slot apart ($\Delta t$) 1057 as indicated in the top row of the last group at 1059B. The delay is one time slot spacing longer ($\Delta t$) 1057 when the pulse spacing is one time slot longer and so on. The size of the guard band should be at least the size that avoids inter-symbol interference for the longest symbol 1059E that produces artifact pulse 1059F when passing through gate 1061E (having delay of $5\Delta t$). Accordingly, the size of guard band 1055 is $5\Delta t$ which is equivalent to the length of the longest symbol used in the system.

Figure 21F:
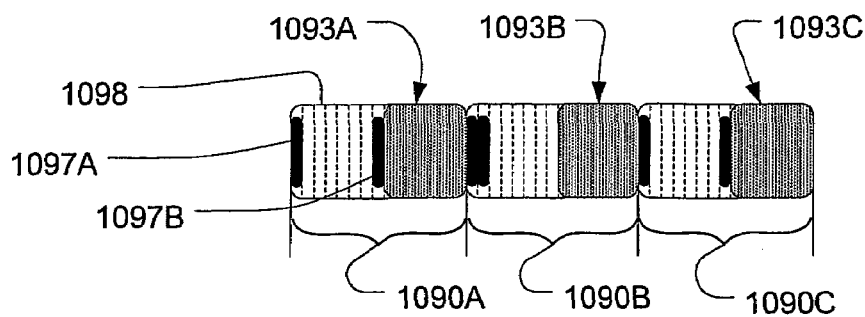

Referring now to FIG. 21F, three pulse-spacing symbols 1090A–1090C, with respective guard bands 1093A–1093C (indicated by a dot-filled region) following each symbol, are shown. Each symbol has first and second pulses, for example symbol 1093A has the pulses 1097A and 1097B. The pulses 1097A and 1097B are each located in one of eight, for example, allowed time slots indicated at 1098 (typ.). The guard bands 1093A–1093C may be fixed in size as shown. Each symbol may be spaced a fixed interval apart as shown, the interval being the maximum delay between spaced pulses plus the maximum length of each symbol. For example, the pulse spacing illustrated for symbol 1090A is the largest permitted with a spacing of seven time slots giving it a symbol length of eight time slots. The guard band is the maximum delay of each gate, which is seven time slots. The spacing between each symbol is therefore 15 time slots, which is the maximum required to prevent, in any case, artifact pulse from a leading symbol from overlapping in a gate with a trailing symbol's pulses. The fixed symbol spacing may be obtained using any of the foregoing modulators in FIGS. 21A–21C or any pulse-spacing modulators discussed elsewhere in the specification.

Figure 21G:
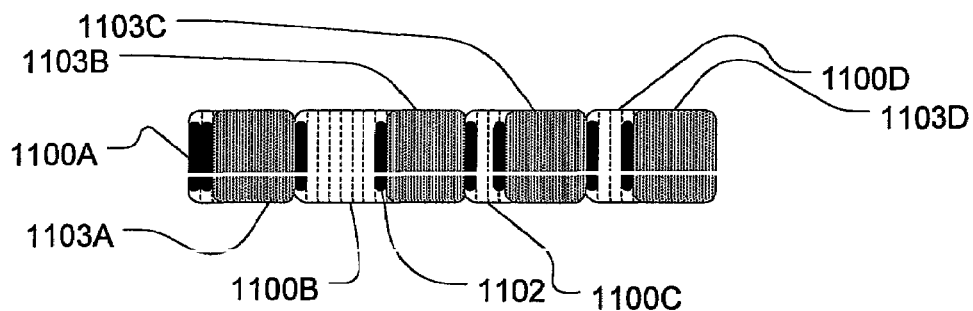

Referring now to FIG. 21G, a more efficient spacing of symbols employs a variable delay such as may be provided by modulators 1068 of FIGS. 21A, 1070 of FIGS. 21B–21C and 1084A–1084C of FIG. 21D, and sequence managers 1078 of FIG. 21C and 1080 of FIG. 21D. Here, the guard band following each symbol 1103A–1103D begins immediately after the second pulse of each symbol 1100A–1100D and its size is equal to the delay of the gate having the longest delay. Since the maximum delay between a pulse and any artifact produced from it is equal to the longest delay of a gate (as can be verified by inspection of FIG. 21E), this arrangement will produce no inter-symbol interference for a single layer system.

Figure 21J:
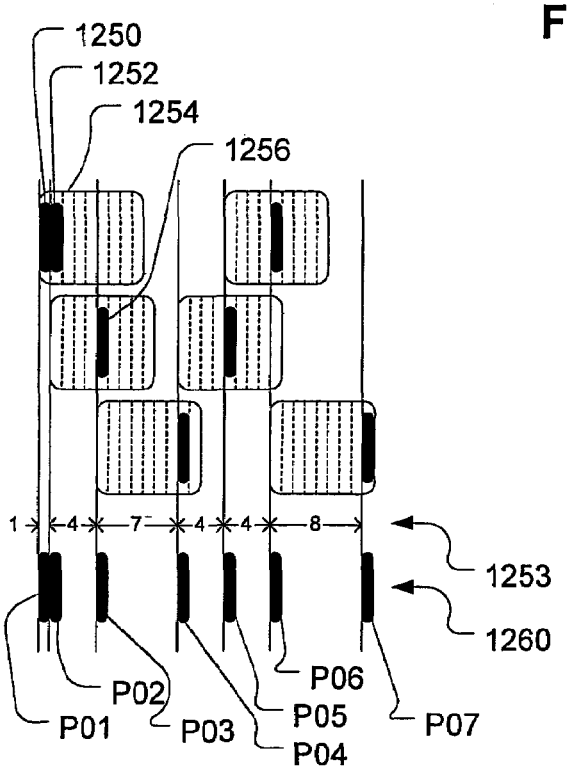

Referring to FIG. 21J, the guard band delay can be eliminated in a series of time delay symbols 1260 while still preventing inter-symbol interference in the above embodiments and thereby increase symbol density. To do this, each pulse (e.g., 1250, 1252, 1256 and so on) may be employed to define the time delay for a current symbol and as a reference pulse for the formation of a following symbol. More specifically, let pulse 1250 be a first reference pulse. Then pulse 1252 would produce a coincidence pulse in a gate with a time spacing of 1 time slot (having a 1 time slot difference between pulses 1250 and 1252). The Pulse 1256 would then produce a coincidence pulse in a gate with a time delay of 4 time slots (having a 4 time slots difference between pulses 1252 and 1256) and 1257 a coincidence pulse in a gate with a time delay of 7 time slots and so on. Delays are indicated in dimensional designations as shown at 1253. Each pulse 1250–1256 thus serves a double role in indicating the time delay for a current symbol and serving as a reference for a following symbol. Several consecutive examples are shown in succession at P01 through P07.

Using such a technique is very useful when multiple symbols are sent to the same destination. In such a case, a stream of pulses spaced by a specific time delay corresponding to a specific gate destination may be formed to direct information to this specific gate. In this case, each pulse serves double duty, as a pulse indicating the delay (time space) of a current symbol (data/control pulse) and as a reference pulse for the next following symbol (control/data pulse). This configuration allows saving in the number of pulses used to demultiplex information into the desired destinations.

The protocol of FIG. 21J can be implemented using a device as described with reference to any of the above modulators susceptible to dynamic control.

Figures 23A, 23B, 23C:
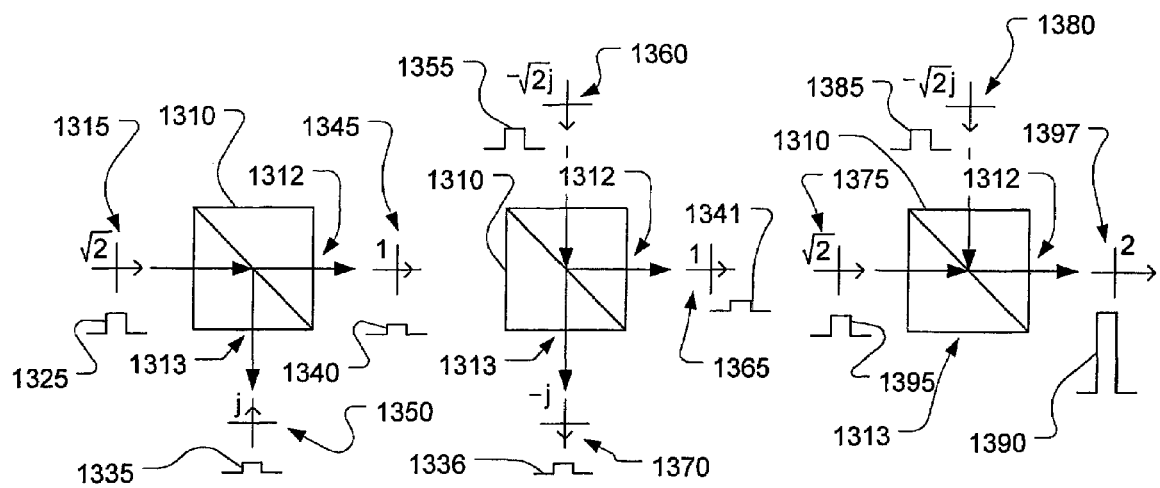
FIGS. 23A–23F schematically illustrate the output signals at the outputs of a beam splitter for various input beams having various relative phases.

Referring now to FIGS. 23A, 23B, and 23C, gates, exemplified here by a dielectric beam splitter 1310 may provide signal control based on the relative phases of input signals. A signal 1315 at a first port includes a pulse 1325 whose phase is indicated as 0 with a field amplitude of $\sqrt{2}$, results in outputs at the ports 1312 and 1313 of signals whose field amplitudes are both equal to unity. The phases of the outputs at ports 1312 and 1313 are indicated as 0 at 1345 and $\pi/2$ (j) at 1350, respectively, because these represent the relative phase shift that occurs due to transmission and reflection by the beam splitter 1310 as discussed above.

A signal 1360 (FIG. 23B) incident at a second port includes a pulse 1355 whose phase is indicated as $3\pi/2$ (−j) with a field amplitude of Hi, results in output pulses 1341 and 1336 at the ports 1312 and 1313, respectively, of signals whose field amplitudes are both equal to unity. The phases of the outputs at ports 1312 and 1313 are indicated as 0 at 1365 and $3\pi/2$ (−j) at 1370, respectively, because these represent the relative phase shift that occurs due to transmission and reflection by the beam splitter 1310 as discussed above.

When pulses 1395 and 1385 of FIG. 23C are incident together with respective phases $3\pi/2$ and 0, all the energy is output at port 1312 as pulse 1390 whose field amplitude is 2 and whose phase is indicated as 0 at 1397. No energy emerges from the second port 1313.

Figures 23D, 23E, 23F:
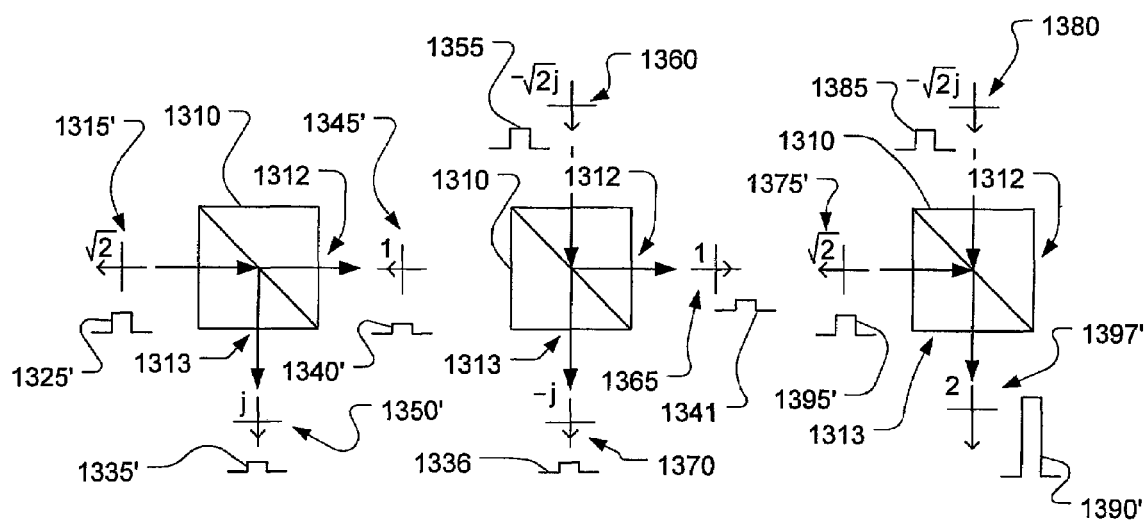

Referring now to FIGS. 23D–23F, showing same gate 1310 of FIGS. 23A–23C, having output ports 1312 and 1313. Analyzing FIG. 23D similarly as discussed above with respect to FIG. 23A, if the phase of one of the input signals, e.g., 1315', is rotated by $\pi$, the similar results obtain for singly-incident pulses, but the port from which all of the output energy emerges when the input pulses are coincident shifts to the other port as will be observed. That is, a signal 1315' at the first port includes a pulse 1325' whose phase is indicated as $\pi$ with a field amplitude of $\sqrt{2}$, results in outputs at the ports 1312 and 1313 of signals whose field amplitudes are both equal to unity. The phases of the outputs at ports 1312 and 1313 are indicated as −$\pi$ at 1345' and $3\pi/2$ at 1350', respectively, because these represent the relative phase shift that occurs due to transmission and reflection by the beam splitter 1310 as discussed above.

FIG. 23E is identical to that of FIG. 23B. It is illustrated for the completeness of the steps towards the similar analysis of FIG. 23F. The situation in FIG. 23F is identical to that in FIG. 23C. When pulses 1385 and 1395' are incident together with respective phases $3\pi/2$ and −$\pi$, all the energy is output at port 1313 as pulse 1390' whose field amplitude is 2 and whose phase is indicated as $3\pi/2$ at 1397'. No energy emerges from the second port 1312.

As will be observed, by controlling the relative phases of pulses at two input ports, the port from which energy is emitted can be controlled. The above effect is used in several switching and gating systems that are now discussed. An illustration of a means by which the relative phase may be used for a symbology is illustrated in FIGS. 23G and 23H.

It is clear that similar behavior may be achieved with other summing devices and especially with those illustrated by FIGS. 1A–1D, 2A–2C, 3A–3C, 4A–4E, 5A–5C, 6A–6C, 7A–7B and 8A–8E.

Figure 23G:
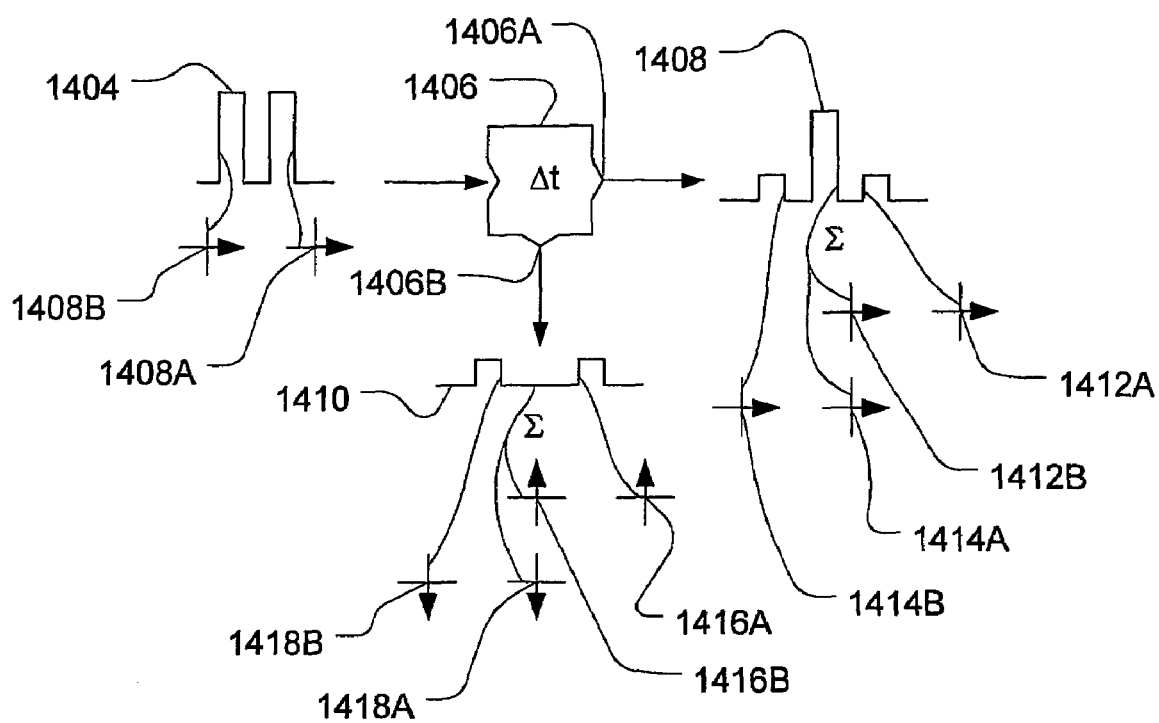
FIGS. 23G and 23H illustrate the coincidence and the non-coincidence signals at the outputs of a coincidence gate for a data symbol signal encoded by time and phase modulation.
Figure 23H:
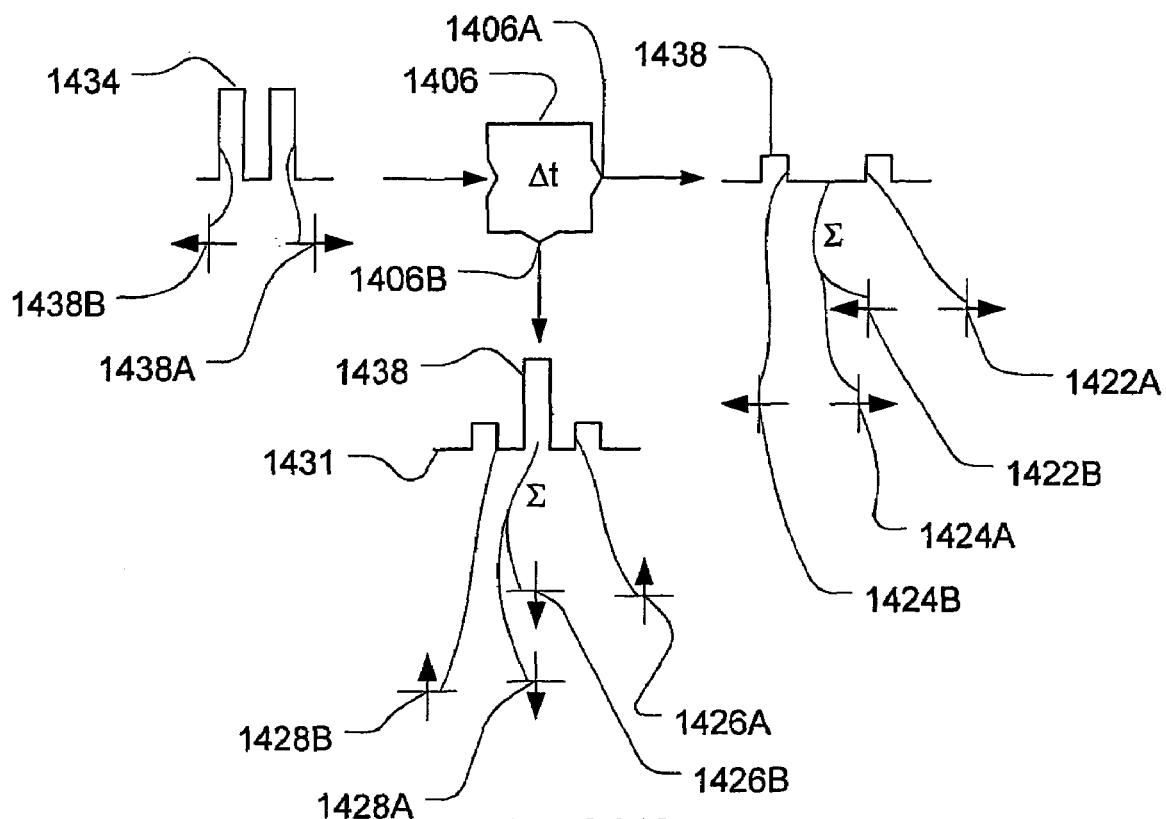

Referring now to FIGS. 23G and 23H, a spaced pulse symbol 1404 with first and second pulses 1408A and 1408B having a spacing such that when the first pulse 1408A is delayed and coherently summed in a gate 1406, a coincidence pulse 1408 is produced at a first output 1406A. The summing process that produces the coincidence pulse is illustrated by the vector representations with 1412A and 1412B representing the undelayed result of passing signal 1404, and 1414A and 1414B representing the delayed result of passing signal 1404. The configuration of the gate 1406 is such that the delayed and undelayed pulses 1412B and 1414A are coherently summed to produce coincidence signal 1408. At the second output 1406B, the interaction of the delayed and undelayed pulse pairs indicated at 1416A, 1416B and 1418A, 1418B, respectively, produce a destructive interference of pulses 1416B and 1418A and no coincidence pulse emerges from the second output 1406B. Thus, $\sqrt{2}/2$ of the field amplitude of the first pulse 1408A is combined with $\sqrt{2}/2$ of the field amplitude of second pulse 1408B so the power in the coincidence pulse 1408 is double the power of either the first or second pulse 1408A, 1408B. The energy at the non coincidence output 1406B is zero and thus the total energy in the inputs is preserved at the outputs.

Referring in particular to FIG. 23H, the power of a single pulse can be preserved in a coincidence pulse emerging from the second output 1406B of the same gate 1406 by providing a phase difference between incoming pulses 1438A and 1438B of $\pi$ radians from the phase difference of pulses 1436A and 1436B (of FIG. 23G). Here, a spaced pulse symbol 1434 with first and second pulses 1438A and 1438B having a spacing such that when the first pulse 1438A is delayed and coherently summed in the gate 1406, a coincidence pulse 1438 is produced at the second output 1406B. The summing process that produces the coincidence pulse 1438 at output 1406B is illustrated by the vector representations with 1426A and 1426B representing the undelayed result of reflected signal 1434, and 1428A and 1428B representing the delayed result of passing signal 1434. The configuration of the gate 1406 is such that the delayed and undelayed pulses 1426B and 1428A are coherently summed. At the first output 1406A, the interaction of the delayed and undelayed pulse pairs indicated at 1422A, 1422B and 1424A, 1424B, respectively, produce a destructive interference of pulses 1422B and 1424A and no coincidence pulse emerges from the first output 1406A. Thus, $\sqrt{2}/2$ of the field amplitude of the first pulse 1438A is combined with $\sqrt{2}/2$ of the field amplitude of the second pulse 1438B so the power in the coincidence pulse 1438 is double the power of either the first or second pulse 1438A, 1438B. The energy at the non coincidence output 1406A is zero and thus the total energy in the coincidence pulses of the inputs is preserved at the outputs.

It should be noted that the pulses in FIGS. 23G and 23H are presented by their intensity and their phase as illustrated by the phase arrows as discussed above.

Figure 23I:
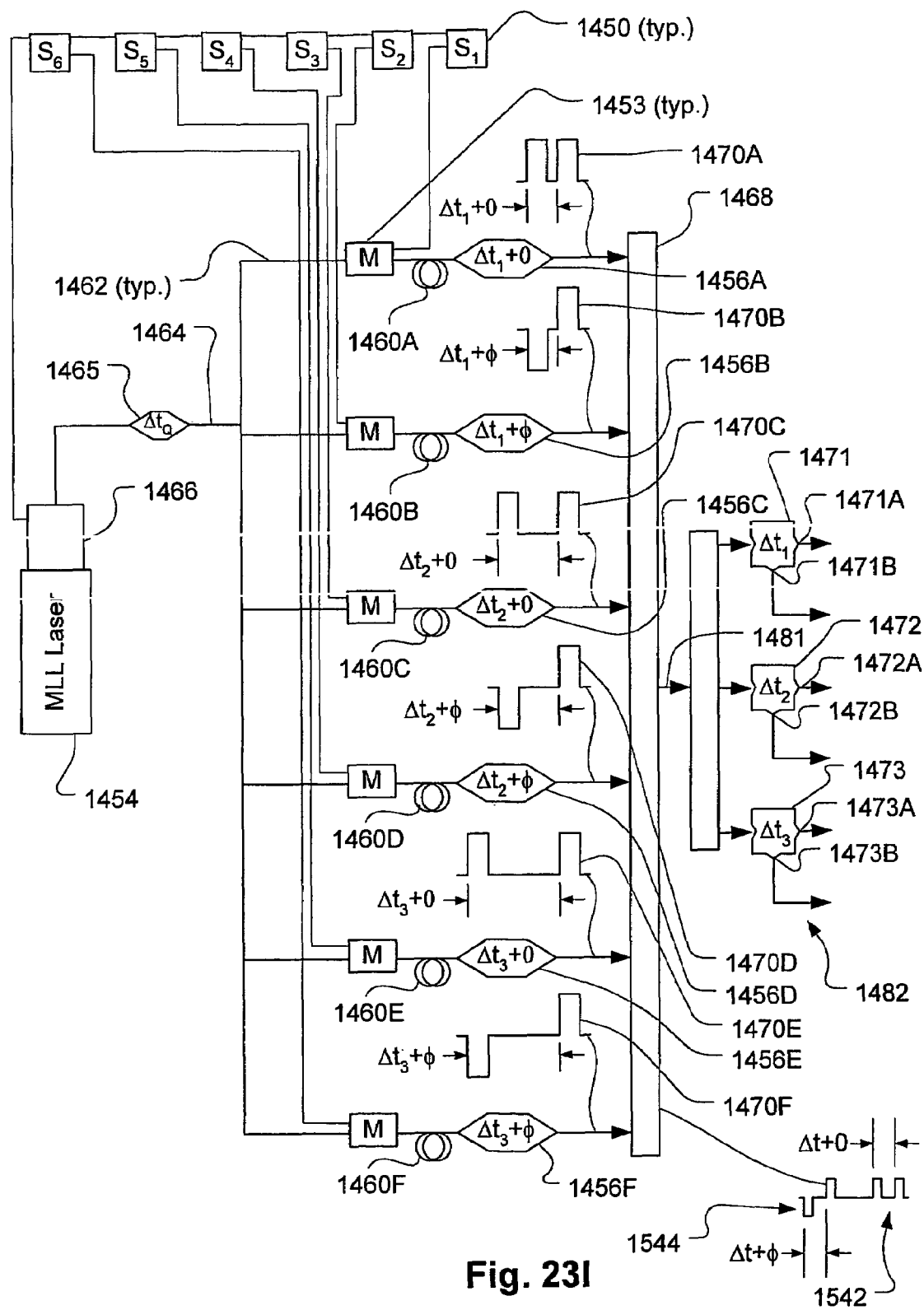
FIG. 23I and 23J illustrate multiplexing and demultiplexing systems for data symbol signals modulated by time space and relative phase between the pulses of the symbols.

Referring to FIG. 23I, the pulses spacing and the relative phases of spaced pulses can be used to create a symbology for selecting output ports. Each pulse duplicator (1456A–1456F) output port is characterized by a pulse spacing, which selects a gate as discussed with regard to previous embodiments, and the relative phases of the pulses selects one of two output ports of the gate. A multiplexer receives pulses from a source, for example a mode locked laser as indicated at 1454. As in prior embodiments, the pulses can be duplicated by a pulse duplicator 1465 (similar to duplicator 803D of FIG. 15C) to increase their density and distributed by a manifold 1464 to multiple parallel channels 1462 (typ.) such that pulses are applied to each channel 1462 (typ.), perhaps with a respective delay relative to those applied to the other channels 1462 (typ.) Relative delays (for interleaving) may be introduced by way of delays 1460A–1460F in respective channels 1462 (typ.). The modulators 1453 (typ.) control whether a pulse passes or not on a specific channel as required by a source signal 1450 (typ.) which may represent separate signals or elements of a single signal (vector).

Pulse duplicators 1456A–1456F each duplicate an output pulse from a respective modulator 1453 (typ.) with a unique combination of pulse spacing plus phase difference as indicated by symbols 1470A–1470F. The latter are interleaved onto a common channel 1481 by a combiner 1468 which transmits it to a receiver 1482. The received signal from common channel 1481, which may be miles long or just a fraction of an inch, is distributed among multiple gates, exemplified by three 1471, 1472 and 1473. Each gate 1471, 1472 and 1473 has two outputs: 1471A and 1471B for gate 1471, 1472A and 1472B for gate 1472, and 1473A and 1473B for gate 1473. Each output 1471A and 1471B for gate 1471, 1472A and 1472B for gate 1472, and 1473A and 1473B for gate 1473 corresponds to a particular symbol 1470A–1470F such that only one will produce a coincidence pulse when a given symbol is sent through the common channel 1481. Each output 1471A and 1471B for gate 1471, 1472A and 1472B for gate 1472, and 1473A and 1473B for gate 1473 corresponds to a unique combination of pulse spacing 1542 indicated by time $\Delta t$ (typ.), which selects one gate 1471, 1472 or 1473 and phase difference 1544 indicated by the phase $\phi$ (typ.) between the pulses, which selects the output 1471A or 1471B if gate 1471 is selected, 1472A or 1472B if gate 1472 is selected, or 1473A or 1473B if gate 1473 is selected. Note that pulses drawn upside down represent a phase shift of $\pi$ radians.

As will be evident from the above description by using a combination of phase and time delay, the number of outputs that can be selected can be doubled over using time delay alone. Also, the dilution of signal energy is reduced by half because the pulse intensity is preserved across a gate that adds coherently and energy does not have to be diluted among ports of a given gate.

Figure 23J:
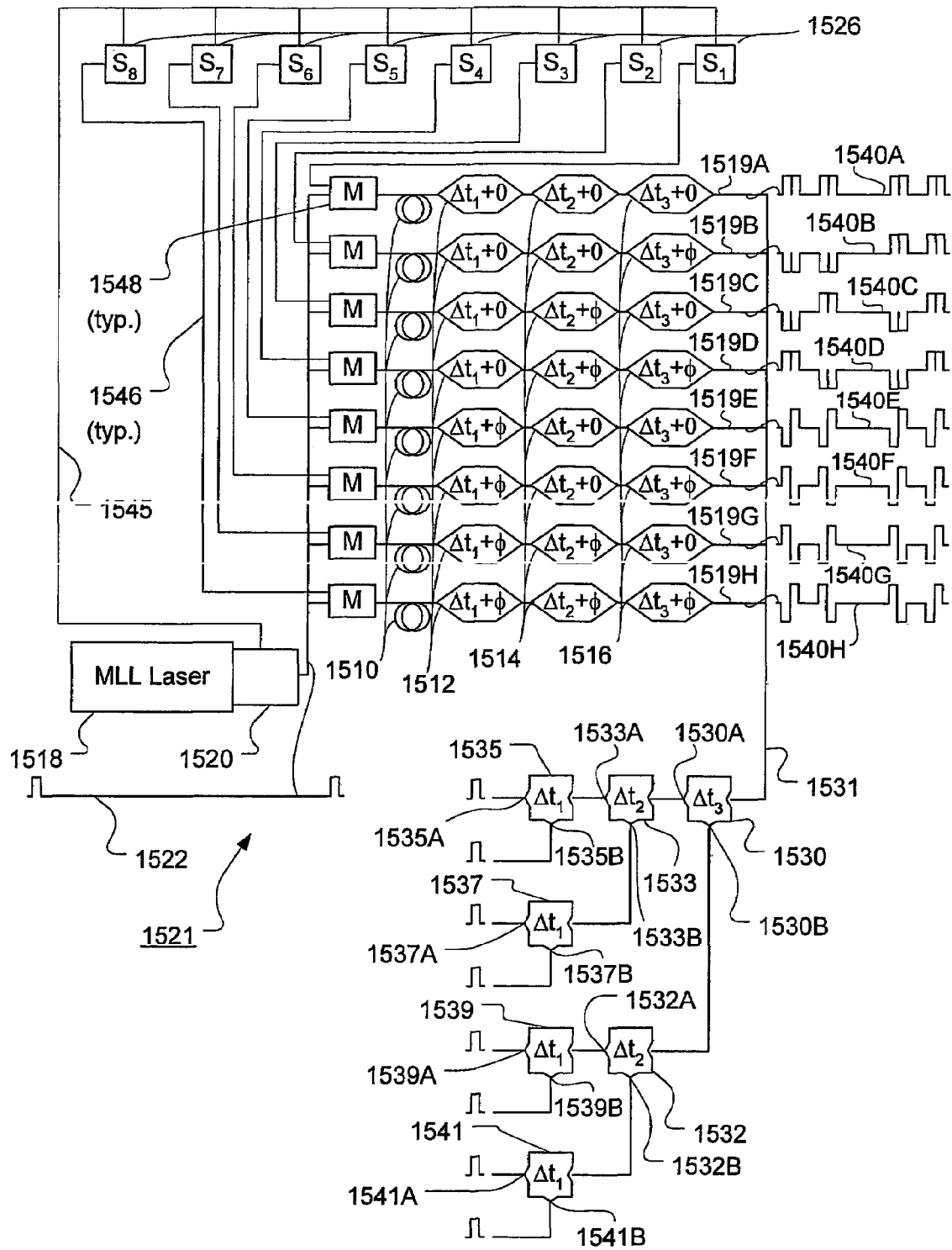

Referring now to FIG. 23J, a multiplexer 1521 places the signals from eight data channels 1519A–1519H (the number of channels being arbitrarily chosen for illustration) onto a single data channel 1531 in which each channel is "labeled" with different symbols 1540A–1540H consisting of a combination of pulses with respective phase relationships. Referring momentarily in particular to FIGS. 23K and 23M, each symbol, here exemplified by that for channel 1519A has eight pulses P1–P8. The first four pulses P1–P4 are summed as indicated by the relationship between signals 1543A and 1543B to produce a coincidence signal (plus artifact) as indicated at 1543C. This summing occurs in the first gate 1530 of a binary tree structure of FIG. 23J.

Figure 23K:
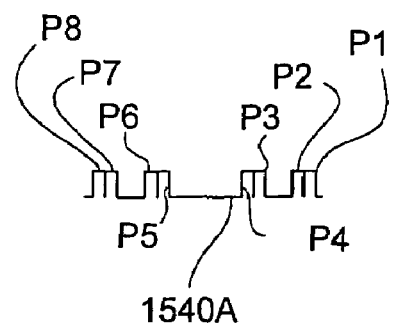
FIGS. 23K, 23L and 23M are schematic illustrations of data symbol signals appearing at various locations of the systems illustrated by FIGS. 231 and 23J.
Figure 23L:
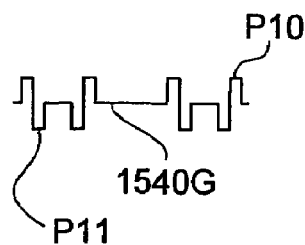
Figure 23M:
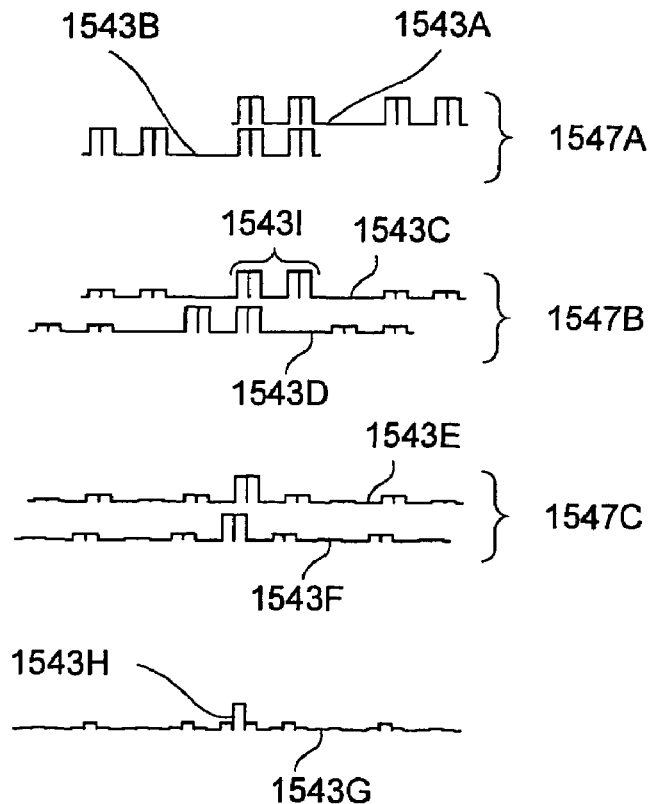

Referring now also to FIGS. 23K, 23L, 23M in particular, in the example signal 1540A and another sample signal 1540G, high-going pulses such as P10 of FIG. 23L represent pulses with a particular phase angle and low-going pulses such as P11 of FIG. 23L represent pulses with a phase angle that is $\pi$ radians ahead, or behind, that of high-going pulses such as P10. The first four pulses P1–P4 of symbol 1540A are summed (summation shown at 1547A) based on a time difference such that the time shift is indicated by the relationship between signals 1543A and delayed 1543B (as shown at 1547A) to produce a coincidence signal (plus artifact) as indicated at 1543C. That is, the time shift (internal delay) of the first gate 1530 is equal to the spacing between pulse P1 and P5. The resulting coincidence signal 1543C emerges from one of the outputs of gate 1530, in the embodiment, output 1530A of FIG. 23J. The coincidence signal 1543C contains a portion 1543I that results from summing so it is enhanced with the remainder being non-coincidence and so its amplitude is diminished. If P1–P4 had the opposite phase, the summing would have produced the coincidence signal from output 1530B instead of output 1530A.

Another summation 1547B occurs in gate 1533, which results in a coincidence signal 1543E and is output from output 1533A. Finally, yet another summation 1547C occurs in gate 1535, which results in a final coincidence signal 1543G and is output from output 1535A. It will be observed from the foregoing that the height of the coincidence pulse 1543H incurs substantially zero degradation through the gates 1530, 1533 and 1535 at ports 1530A, 1533A and 1535A, respectively, because phase is used to perform the gating through the successive layers.

It may be confirmed by inspection that the various pulses patterns 1540A–1540H shall propagate accordingly:

Pattern 1540A will produce a coincidence pulse at output 1535A as discussed above.

Pattern 1540B will choose output 1530B, but will thereafter propagate through 1532A and out from output 1539A.

Pattern 1540C will choose output 1530A of gate 1530 and output 1533B of gate 1533 and then output 1537A of gate 1537.

Pattern 1540D will choose output 1530B of gate 1530, output 1532B of gate 1532 and output 1541A of gate 1541.

Pattern 1540E will choose output 1530A of gate 1530, output 1533A of gate 1533 and output 1535B of gate 1535.

Pattern 1540F will choose output 1530B of gate 1530, output 1532A of gate 1532 and output 1539B of gate 1539.

Pattern 1540G will choose output 1530A of gate 1530, output 1533B of gate 1533 and output 1537B of gate 1537.

Pattern 1540H will choose output 1530B of gate 1530, output 1532B of gate 1532 and output 1541B of gate 1541.

As may be also be confirmed by inspection, the above binary tree format may be extended to any number of final outputs and the eight shown here was a number arbitrarily chosen for illustration.

Figure 23N:
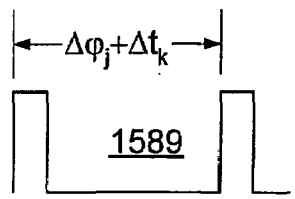
FIG. 23N is a schematic illustration of a code, encoded by time space and phase difference between the pulses that construct the code.
Figure 23P:
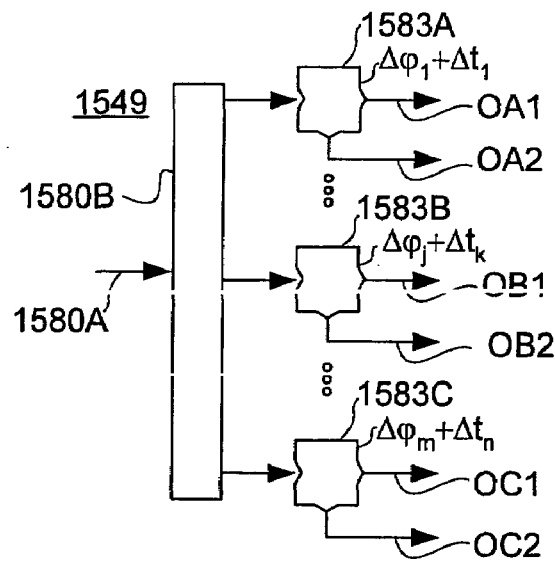
FIG. 23P schematically illustrates a demultiplexing system for the codes illustrated by FIG. 23N.

Referring to FIG. 23N, as in the embodiment of FIG. 23I, a combined pulse-spacing $\Delta t_k$ and phase-difference $\Delta \phi_j$ construct encoded symbol (code) 1589 (a phase-difference symbol $\Delta \phi_j$ being the difference between the phases of two pulses forming a pulse pair and a pulse spacing $\Delta t_k$ symbol being the temporal spacing of the two pulses of a pulse pair)

may be employed to advantage for switching. Also, as discussed above, phase difference of pulses alone can be employed for switching. A generalization of these systems is illustrated by FIG. 23P, which shows a generalized receiver 1549. A signal 1580A containing pulses is applied by means of a distributor 1580B to an array of gates 1583A, 1583B, 1583C of arbitrary number. Each gate has two respective outputs OA1, OB1, OC1 and OA2, OB2, OC2. These outputs OA1, OB1, OC1 and OA2, OB2, OC2, may be connected to successive layers of gates (not shown) as illustrated in previous embodiments.

Figure 23Q:
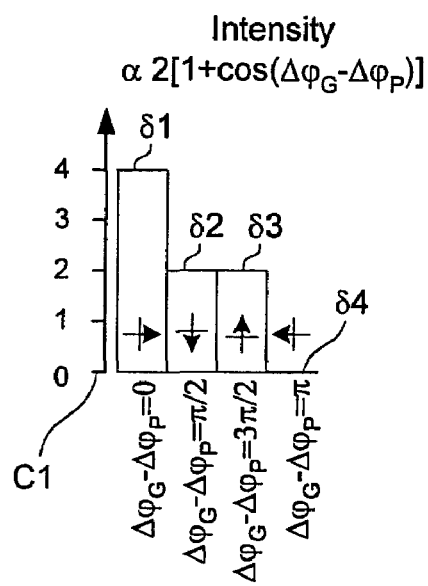
FIG. 23Q illustrates the amplitudes of the output signals at outputs of the system of FIG. 23P when various codes of FIG. 23N are received at the system input.

In one embodiment, each gate 1583A, 1583B, 1583C of FIG. 23P may correspond to a unique combination of pulse spacing $\Delta t_k$ and phase difference $\Delta \phi_j$ and employ only one of the illustrated outputs, for example OA1, OB1, OC1. Referring also to FIG. 23Q, in this case we assume the number of phase differences between pulse pairs 1589 of FIG. 23N, as well the pulse spacing is arbitrary. For example, let there be four phase differences permitted, 0, $\pi/2$, $\pi$, and $3\pi/2$. If a pulse pair symbol arrives at a given gate, it will only potentially produce a coincidence pulse if the pulse spacing matches the gate. In the present system, we have assumed that there are four possible phase differences between the pulses in a pulse pair so there would be four gates for each pulse spacing, each with the same time delay to match the pulse spacing, but each having a unique phase difference between adjacent pulses. Therefore the number of gates may be the number of allowed pulse spacings multiplied by the number of allowed phase differences. A chart C1 of FIG. 23Q indicates the intensity levels that are output by a gate whose pulse spacing $\Delta t$ matches that of a symbol, but whose phase shift $\Delta \phi$ differs by the indicated $\Delta \phi_G - \Delta \phi_P$, which is the difference between the gate phase difference (i.e., shift) $\Delta \phi_G$ and the signal phase difference $\Delta \phi_P$. This intensity is proportional to $2[1+\cos(\Delta \phi_G - \Delta \phi_P)]$. Again, it is assumed the spacing of the pulses is such that the gate's time delay $\Delta t$ would cause them to produce a coincidence pulse assuming phase alignment; i.e., that the pulse spacing matches that of the delay within the gate.

In the example, there are four possible relationships between the phase difference $\Delta \phi_P$ of a pulse-pair symbol and the phase shift $\Delta \phi_G$ integral to the delay of a gate 1583A, 1583B, 1583C:

1. the gate delay includes a phase shift that differs from the difference in the phases of the pulses by 0 radians;
2. the gate delay includes a phase shift that differs from the difference in the phases of the pulses by $\pi/2$ radians;
3. the gate delay includes a phase shift that differs from the difference in the phases of the pulses by $\pi$ radians; and
4. the gate delay includes a phase shift that differs from the difference in the phases of the pulses by $3\pi/2$ radians.

In chart C1, if the phase difference of the pulses differs from the shift imposed by the gate by 0 radians (i.e., they match perfectly $\Delta \phi_G - \Delta \phi_P = 0$) the intensity of the coincidence pulse at the respective output OA1, OB1, OC1 (i.e., the one satisfying the first of the four conditions listed above) is 4 in arbitrary units as indicated at $\delta 1$. If the phase difference differs from the gate by $\pi/2$ or $3\pi/2$ (i.e., $\Delta \phi_G - \Delta \phi_P = \pi/2$ or $3\pi/2$) the intensity of the coincidence pulse at the corresponding outputs among OA1, OB1, OC1 is 2 in arbitrary units as indicated at $\delta 2$ and $\delta 3$, respectively. If the phase difference differs from the gate by $\pi$, the (i.e., $\Delta \phi_G - \Delta \phi_P = \pi$), the intensity of the coincidence pulse at the corresponding output OA1, OB1, OC1 is 0 in arbitrary units as indicated at $\delta 4$.

According to an example protocol, only pulses with an intensity of 4 constitute passing the signal. Thus, any mismatch in phase would result in the blocking of the signal. In previous embodiments, it was discussed how artifact may be eliminated either by detection, threshold or by optical filtering and any of those may be used, electronically or optically, to eliminate signal resulting from phase mismatch. In other words, signals $\delta 2 \delta 4$ may be treated as artifact and filtered or discriminated as discussed above with regard to artifact pulses.

In an alternative embodiment, both respective outputs OA1, OB1, OC1 and OA2, OB2, OC2 of the gates 1583A, 1583B, 1583C of the receiver 1549 of FIG. 23P are employed. This allows some gates to be eliminated. Consider a system in which a first gate is selective of a first pulse phase difference so that it outputs a maximal coincidence pulse at its first output port (e.g., corresponding to $\delta 1$ in FIG. 23Q) when the first pulse phase difference is applied to it and a second gate is selective of a second pulse phase difference so that it outputs a maximal coincidence pulse at its first output port (e.g., corresponding to $\delta 1$ in FIG. 23Q) when the second pulse phase difference is applied to it. Now consider the situation where the first and second pulse spacings differ by $\pi$. The second output of the first gate will produce a maximal coincidence pulse when the second pulse phase difference is applied to it and the second output of the second gate will produce a maximal coincidence pulse when the first pulse phase difference is applied to it. Thus, the second output of the first gate generates the same output as the first output of the second gate, which means the second gate can be eliminated.

In the present embodiment, rather than providing separate gates for pulse-pair symbols whose phase differences differ by $\pi$, one gate provides outputs for both. Thus, when a pulse pair has a phase difference of 0 radians, one of the outputs OA1, OB1, OC1 will be selected and when the phases of pulses differ by $\pi$ radians, the other of the outputs OA2, OB2, OC2 will be selected. This is because, as discussed previously, where the maximal coincidence pulse is generated at a first output of certain types of gates when the phase difference $\Delta \phi_j$ of the input code (having index j) is of a certain relationship such that the pulses of the code totally reinforce each other through the first output and completely cancel each other at the second output, a change in the phase difference $\Delta \phi_j$ of the code by $\pi$ will cause the pulses of the input code to cancel each other at the first output and totally reinforce each other at the second output. Thus, in a four phase protocol, if a maximal coincidence output is generated when the pulses of the input code are at 0 phase difference (zero being arbitrarily assigned, since in the present discussion, the only attribute contemplated is the difference in phase when the pulses of the input code are merged into the same channel such that they interfere, any arbitrary amount of change of phase being possible from the inputs of the gates to the point at which the signals are merged being possible) then a difference in phase between the pulses of the input code either by $\pi/2$ or $3\pi/2$ would produce a low level signal at both outputs of the gate since a phase difference of $\pi$ selects only one output (the other gate's output is 0) while a phase difference of 0 only selects the other output (the first gate's output is 0).

Figure 23R:
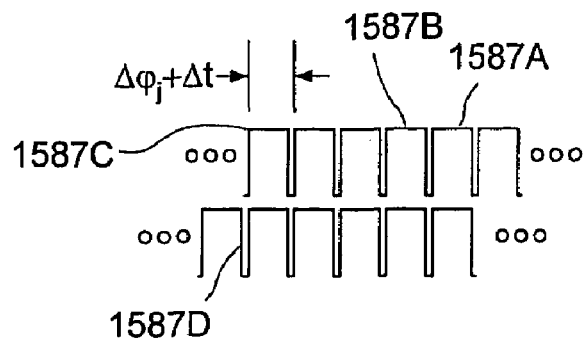
FIG. 23R is a schematic illustration of a stream of encoded pulses and their delayed image where the encoding done by different phases between the pulses with a constant time space between them.

Referring to FIG. 23R, in a further variation, time spacing of pulses is limited to a single spacing such that all gates in a receiver such as 1549 (FIG. 23P) have identical delays $\Delta t$ but different phase shifts $\Delta \phi_G$. In such an embodiment, each pulse, for example 1587B, defines a phase difference relative to a preceding pulse, for example 1587A. The pulse spacing is identical for all pulses and equal $\Delta t$ so that every gate produces time coincidence but, a maximal coincidence signal is produced only when the phases $\Delta\phi_j$ of (images of) adjacent pulses are merged within the gate with a phase difference $\Delta\phi_G - \Delta\phi_P$ of zero. Thus, each gate has a delay equal to $\Delta t$ and a specific phase shift $\Delta\phi_G$. For each gate j there is a specific phase shift $\Delta\phi_{Pj}$ between adjacent pulses at the input that results with phase relationships $\Delta\phi_{Gj} - \Delta\phi_{Pj} = 0$ producing a maximum (main) coincidence signal only at gate j. Accordingly, the value of the phase shift between adjacent pulses dictates at which of the gate a main coincidence signal is produced.

Thus, each pulse is coincident in time with its successor to form a new output based only on the phase difference of a pulse with the adjacent pulse with which its own image is made to be coincident with its neighbor's image. A main coincidence signal is produced only at the specific gate corresponding to the specific phase different between adjacent pulses that fulfill $\Delta\phi_{Gj} - \Delta\phi_{Pj} = 0$ Thus, the signal 1587C is coincident with its delayed version 1587D producing main coincidence pulse at different gates according to the different phase shifts between the adjacent pulses at the input. Thus, every pulse cooperates to form a symbol by the spacing and phase difference from its predecessor as well as a symbol by the spacing of its successor. This means that each pulse has double duty to serve both, as an information pulse (being the first of each pair of adjacent pulses) and as a control pulse (being the second of each pair of adjacent pulses).

In an example configuration, if four allowed phase differences are defined, four possible output ports may be selected. This phase modulation may be obtained by any of the, above-described modulation techniques.

According to the foregoing description, the highest amplitude coincidence pulse is produced at the gate's output when both time coincidence and phase coincidence occur at a gate. Time coincidence occurs when the temporal spacing of a pulse pair equals the delay of a gate. Phase coincidence occurs when the difference between the phases of the symbol's pulses is such that the gate produces a maximal coincidence ($\Delta\phi_{Gj} - \Delta\phi_{Pj} = 0$) between the delayed and direct images of the pulses in a pulse pair.

Figure 23S:
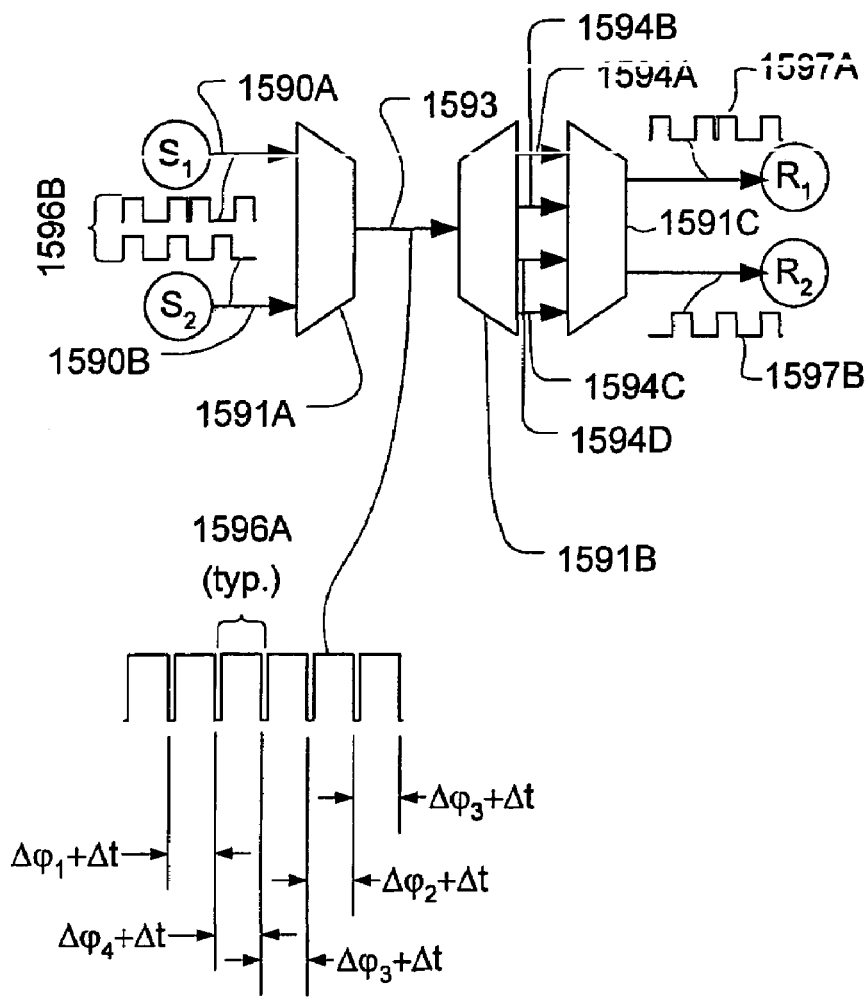
FIG. 23S is an illustration of a 2:1 optical data compression system using the input encoded signals illustrated by FIG. 23R.

Referring to FIG. 23S, in an example application of the phase-only modulation scheme discussed with reference to FIG. 23R, a pair of signals $S_1$ and $S_2$, which may or may not be synchronous, arrive at a multiplexer 1591A and are modulated such that every pulse 1596A (typ.) (for example, each representing a bit) represents data encoded as a one of several allowed phase differences existing between itself and an adjacent pulse with which it is made to be coincident in a gate (not shown) of a demodulator 1591B. Modulated signal 1596A is a single stream of pulses propagating in single guide 1593 and is encoded to include the information of both streams of signals 1590A and 1590B. The pulses 1596A may be spaced at regular intervals which means a single gate time delay can be used in which each pulse produces a coincidence output. Thus, each pulse represents data in the form of the phase difference between an image of itself and a delayed image of its predecessor pulse that coincide in a gate, i.e., each represents a single phase-difference symbol. The pulses could be samples from a single signal $S_1$ or $S_2$ or one from each signal $S_1$ and $S_2$ which may require the use of a buffer if the signals $S_1$ and $S_2$ are not synchronous. Assume the following correspondence between phase-difference symbols and bit pairs:

TABLE 2

Example of a Phase-difference symbol map for two synchronous data streams

| $S_1$ | $S_2$ | Phase difference between two adjacent pulses in a signal stream carried by guide 1593 |
|---|---|---|
| 0 | 0 | $\Delta\phi_1 = 0$ |
| 0 | 1 | $\Delta\phi_2 = \pi/2$ |
| 1 | 0 | $\Delta\phi_3 = \pi$ |
| 1 | 1 | $\Delta\phi_4 = 3\pi/2$ |

Assume one pulse from each channel is used to form the symbol as indicated in the above table. Thus, the first pulses of the signal streams 1590A ($S_1$) and 1590B ($S_2$) are 1 and 0, respectively. The phase difference symbol modulated on the channel 1593 by modulator 1591A would then be $\Delta\phi_3 = \pi$. The next pulses of the signal streams 1590A and 1590B are 0 and 1, respectively, so the phase difference symbol modulated on the channel 1593 by modulator 1591A would then be $\Delta\phi_2 = \pi/2$. The next respective pulses of the signal streams 1590A and 1590B are 1 and 0 again so the phase difference symbol modulated on the channel 1593 by modulator 1591A would then be $\Delta\phi_3 = \pi$. The next pulses of the signal streams 1590A and 1590B are 1 and 1, respectively, so the phase difference symbol modulated on the channel 1593 by modulator 1591A would then be $\Delta\phi_4 = 3\pi/2$. The next pulses of the signal streams 1590A and 1590B are 0 and 0, respectively, so the phase difference symbol modulated on the channel 1593 by modulator 1591A would then be a $\Delta\phi_1 = 0$.

The signal 1593 is first demodulated by a demultiplexer 1591B, which may be configured for example, as the demultiplexer device 1549 of FIG. 23P to generate four data streams of coincidence pulses 1594A–1594D corresponding to the four phases of modulation used to encode signal 1596A. The latter four streams 1594A–1594D may then be modulated by a multiplexer 1591C onto respective channels 1597A and 1597B applied to respective receivers $R_1$ and $R_2$. The multiplexer 1591C may convert the signals from their form on the channels 1597A and 1597B, e.g., optical, to electronic form to permit reconstruction using any of the modulation schemes discussed above. Thus, each pulse pair symbol arriving from channel 1593 produces a pair of pulses from the original signals 1590A and 1590B at inputs $S_1$ and $S_2$, respectively, thereby providing a 2:1 compression ratio.

Referring now to FIG. 23U, the phase difference between adjacent pulses discussed so far can be any number of phase differences provided the capability of discriminating the intensities of coincidence pulses is enabled. The teachings of the present specification include various methods of providing some minimum threshold such that coincidence pulses generated from, for example, incident pulses differing in phase by $\Delta\phi_G - \Delta\phi_P = \pi/3$ or more, are distinguished from coincidence pulses generated from incident pulses differing in phase by $\Delta\phi_G - \phi_P = 0$. In a scheme in which pulses can differ by six possible phase angles, the highest coincidence pulse intensity still results from a perfect match of a gate's phase shift to the phase difference between pulses in a pulse pair. However, the next-best match, in a gate whose phase shift is one sixth of $2\pi$, or $\pi/3$, produces a coincidence pulse whose intensity is 75% (as discussed below) of that of a perfect match. Here, a chart C2 shows the intensities of coincidence pulses resulting from various differences between phase difference symbols and gate phase shifts ($\Delta\phi_{Gj} - \phi_{Pj}$).

Referring also to FIG. 23P, in another embodiment, each gate 1583A, 1583B, 1583C may correspond to a unique combination of pulse spacing and phase difference symbols and employ only one of the illustrated outputs, for example OA1, OB1, OC1 or both outputs may be used OA1, OB1, OC1, OA2, OB2, OC2 as discussed above with reference to FIGS. 23P–23Q. In this case assume there are six phase differences permitted, 0, $\pi/3$, $2\pi/3$, $\pi$, $4\pi/3$ and $5\pi/3$. If a pulse pair symbol arrives at a given gate, it will only be potentially passed if the pulse spacing matches a port. Chart C2 indicates the intensity levels that are output by a gate whose pulse spacing matches that of a symbol, but whose phase spacing differs by the indicated $\Delta\phi_G - \Delta\phi_P$. Again, this intensity is proportional to $2[1+\cos(\Delta\phi_G - \Delta\phi_P)]$, where $\Delta\phi_G - \Delta\phi_P$ is the difference between the gate phase difference (shift) and the signal phase difference (when they interfere). The spacing of the pulses may be made such that the gate's time delay would cause them to produce a coincidence pulse assuming phase alignment; i.e., that the pulse spacing matches that of the delay within the gate.

In the example, there are six possible relationships between the phase difference of a pulse-pair symbol and the phase difference of a gate 1583A, 1583B, 1583C. In the chart C2, if the phase difference differs from the phase shift of one of the gates by 0 radians (i.e., they match perfectly) the intensity of the coincidence pulse at one of the outputs OA1, OB1, or OC1 is 4 in arbitrary units as indicated at δ5. If the phase difference differs from one of the gate by $\pi/3$ or $5\pi/3$, the intensity of the coincidence pulse at the outputs of these gates OA1, OB1, or OC1 is 3 in arbitrary units as indicated at δ6 and δ7, respectively. If the phase difference differs from the gate by $2\pi/3$ or $4\pi/3$ the intensity of the coincidence pulse at the outputs of these gates OA1, OB1, or OC1 is 1 in arbitrary units as indicated at δ8 and δ9. Finally, if the phase difference is $\pi$, the coincidence pulse is 0 as indicated at δ0. Again, signals δ6–δ9 and δ0 may be treated as artifact and filtered as discussed above with regard to artifact pulses that may be removed using electronic or optical threshold mechanisms.

FIG. 23Y shows a train of pulses 1504 that are modulated with phase difference symbols. The stream of pulses 1504 is received by a coincidence gate 1502, which causes an image of each pulse 1505 (typ.) to be coherently added (with or without a phase shift) to an image of a neighboring pulse 1505 (typ.), which will obtain when the gate 1502 delay matches the pulse 1505 spacing. The phase of each differs from the neighbor's by one of several permitted phase differences $\Delta\phi_P$ such that the coherent summing produced by the gate 1502 produces coincidence pulses of certain discrete magnitudes, each corresponding to a one of the permitted phase differences $\Delta\phi_P$. The phase shift $\Delta\phi_G$ produced by the gate 1502 may be calibrated to such magnitude as to maximize the distinctiveness of the possible coincidence pulse magnitudes for each pulse spacing $\Delta\phi_P$ thereby making it possible to classify each coincidence pulse by magnitude. For example, this may be done if the range of the allowed differences between gate phase shift $\Delta\phi_G$ and pulse phase difference $\Delta\phi_P$ is maximized by including in the allowed values of $\Delta\phi_P$ those values such that $\Delta\phi_G - \Delta\phi_P$ includes the values of 0 and $\pi$, where $\Delta\phi_G$ is fixed and produces a coincidence pulse with an amplitude that is unique for each relative phase $\Delta\phi_P$. The other pulse phase difference $\Delta\phi_P$ values may be equidistant between those values or may be values such that the magnitudes of the coincidence pulses they produce are equidistant. That is, the series may be $D\phi_{P,j} = \alpha \cos[j(1-2/(N-1))]$ where j=0 through N-1. Other alternatives are possible, as long as the magnitudes are distinguishable. For example, the range cover equal steps in phase angle between 0 and $\pi$ as example by N=4 to produce 0, $\pi/3$, $2\pi/3$ and $\pi$. Note that there are two solutions for each element of the series $\Delta\phi_{P_j}$ between (and not including) 0 and $\pi$ and either may be used for each element of the range.

As an example, the series using N=4 may be used to produce four distinguishable magnitudes for the coincidence output, each corresponding to a respective phase difference in the signal $\Delta\phi_P$. A detector has an optical sensor 1598P and magnitude classifier 1598L, which may function as a window discriminator for distinguishing between the different values of the amplitudes of the coincidence signals produced by gate 1502 and are illustrated by C3. Chart C3 has a presentation similar to chart C2 of FIG. 23U. The possible magnitude states in the output signal 1503A, as illustrated, are 0, $a[\cos(\frac{1}{3})]=0.34a$, $a[\cos(\frac{2}{3})]=0.73a$, and $\pi$, where a is the amplitude of the pulses of the encoded signals at input 1599Q of gate 1502.

The embodiment of FIG. 23Y may be used for compression as described with reference to FIG. 23S, with multiple bits of one or more streams are symbolized by a single phase-difference symbol using the N-level embodiment described with reference to FIG. 23Y. The compression may be obtained by using the N-level embodiment of FIG. 23Y in which each coincidence pulse may get N different values. In such an application the compression is given by $\log(N)/\log(2)$.

Note that in the above discussions where phase differences were assumed between pulse-pair symbols, it should be clear that polarization-based embodiments would function in an analogous manner and may be substituted in all such cases. Thus, all discussion and drawings in which the coincidence gates are triggered by phase modulation may also be triggered by polarization modulation. For example, the vector diagrams in the various drawings may represent either relative phases or relative polarizations of the pulses making up symbols. The behavior and outcome are the same in both cases. Fur example, the vectors illustrated in chart C3 of FIG. 23Y may represent a state of relative phase or relative polarization orientation.

Figure 24:
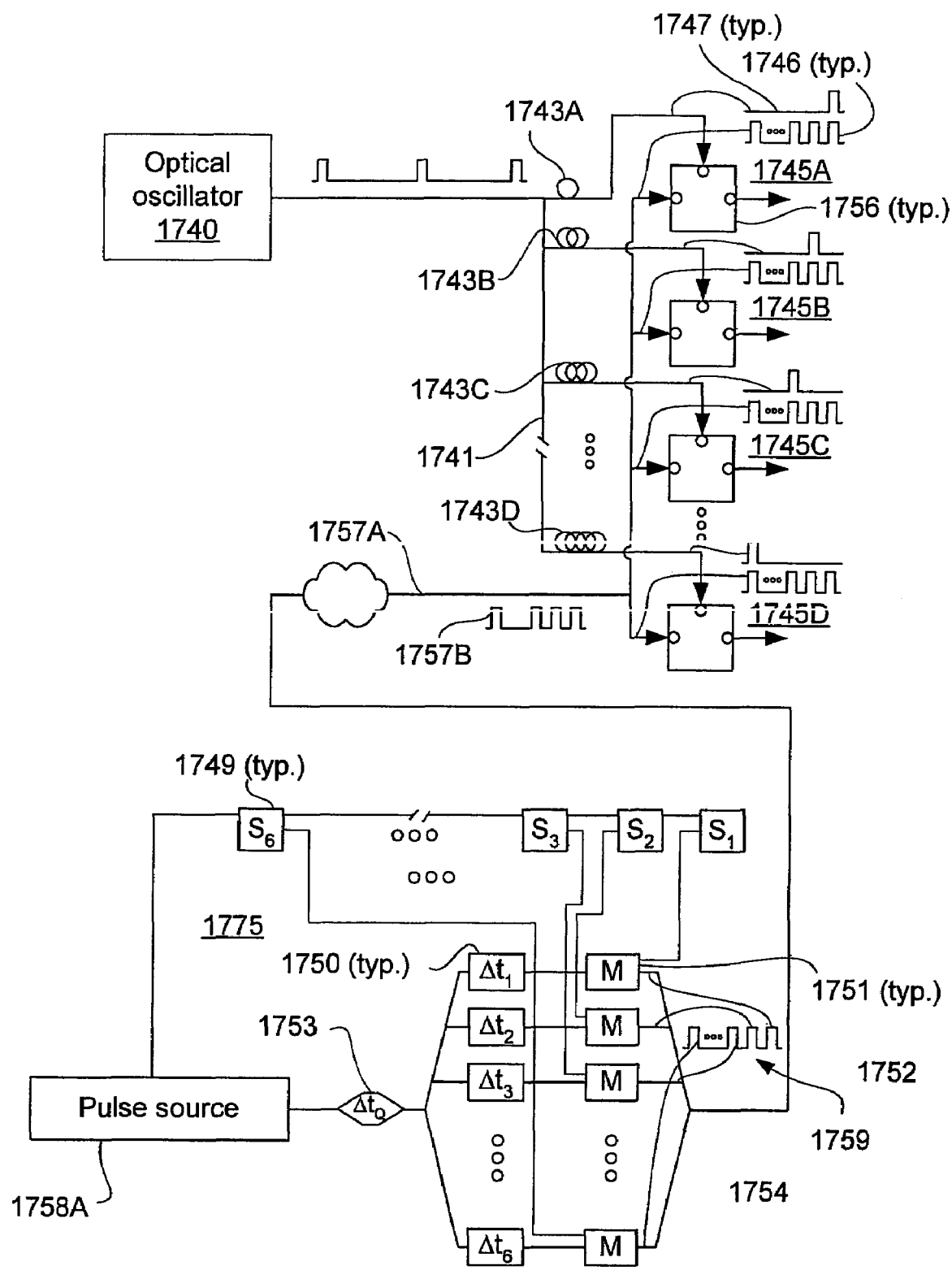
FIG. 24 is a schematic illustration of optical Time Division Multiplexing/Demultiplexing (TDM) systems.

Referring now to FIG. 24, an optical oscillator 1740 generates a series of pulses that are distributed to various gated channels 1745A–1745D, each including a gate 1756 (typ.). One input of each gate receives a pulse from the optical oscillator 1740 whose duty cycle is equal to the inverse of the number of channels 1745A–D. The pulses from the optical oscillator 1740 are delayed by a respective delay for each channel 1745A–D by a respective one of the delay elements 1743A–D. The delays are such as to cause a control pulse 1747 (typ.) arriving from the optical oscillator 1740 to be coincident with every $N^{th}$ pulse data pulse in a signal pulse 1746 (typ.) arriving from a data source such as a multiplexer indicated generally at 1775. The power levels and phase angles in the circuit shown may be such that the each data pulse is enhanced by (i.e., generates a coincidence output from a respective typical gate 1756 due to its coincidence with) the pulse from optical oscillator 1740. Thus, the optical oscillator 1740 may be said to sample or take a snapshot of a different pulse on each channel that is respective to the particular time slot coinciding with the arrival of the oscillator pulse. It will be apparent to those of skill in the art and in view of the present disclosure that the outputs on each channel 1745A–D each corresponds to a time division demultiplexing (TDM) multiple access (TDMA) channel. The artifact pulses that may exist in the TDM channels may be eliminated by the different methods discussed above.

Figure 25A:
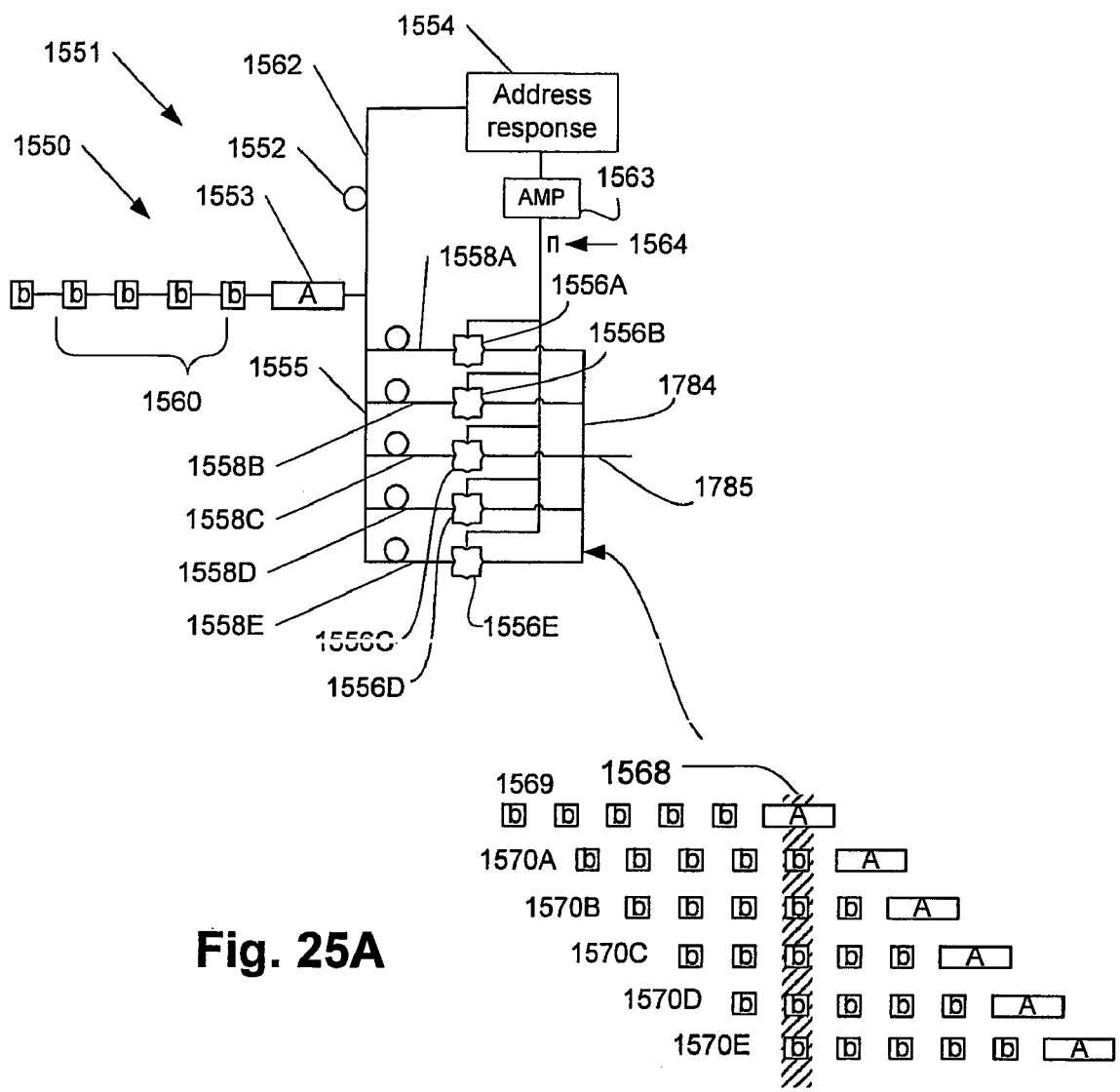
FIG. 25A illustrates an optical packet routing system using coincidence gates.

To generate a signal for use in such a TDM system, a multiplexer that is similar to the embodiment of FIG. 15C and other embodiments discussed or with similar functionality may be employed. Here multiplexer 1775 has multiple modulators 1751 (typ.) that are controlled by signal sources 1749 (typ.) to selectively permit the passage of pulses from a pulse source 1758A (which may include one or more pulse duplicators 1753 to increase the pulse density). The pulses permitted to pass by the modulators 1751 (typ.) are interleaved onto a common channel according to respective time delays 1750 (typ.) Note that the result of demultiplexing in the embodiment of FIG. 24 is that there is no need for pulse-spacing symbology since regular time division channels are employed. However, synchronization recovery and phase control may be required to ensure alignment of received pulses with locally generated pulses and coherent summing in the gates 1756 (typ.) Referring now to FIG. 25A, a mechanism for switching multiple data pulses using a single symbol representing an address (header), for example a spaced-pulse symbol, for control, is shown. A signal 1550 includes a series of data pulses 1560 trailing behind a single address symbol 1553. The address symbol 1553 corresponds to a respective output channel. The address symbol generates a coincidence pulse when the address symbol 1553 corresponds to the address (time delay Δt) of coincidence gate 1554, designated as "Address response". The coincidence pulse is output from address response coincidence gate 1554 on a distributing header coincidence signal 1564 which may be amplified by amplifier 1563, and applies a share of its energy to each of a set of coincidence gates 1556A–1556E. Each of the delay channels 1558A–1558E receives a share of the energy 1555 from the incoming signal 1550 by way of distributing data and header pulses 1555. Each delay channel 1558A–1558E delays a respective signal 1570A–1570E (an image of 1550) such that a respective one of the pulses indicated by highlighting 1568 is incident on a respective coincidence gate 1556A–1556E when the coincidence pulse 1564 from the address response coincidence gate 1554 arrives at the respective coincidence gate 1556A–1556E. The propagation delays of the various channels defined by the distributing headers and data 1564 and 1555 are such that the each channels respective pulse 1560 and the coincidence pulse 1564 are precisely synchronized. Automatic phase correction may be required and introduced as indicated by way of example in foregoing embodiments to ensure that a coincidence pulse is output when a data pulse 1560 is coincident with the address coincidence pulse 1564. Therefore the entire configuration of FIG. 25A operates as a coincidence gate for an entire payload of pulses 1560 controlled by a single address symbol 1553. The pulses passed by the coincidence gates 1556A–1556E are further interleaved onto a single channel 1785 by a consolidation header 1784 configured with proper delays (not shown) to cause a passed signal to provide the same inter-pulse spacing as the original signal 1550.

Figure 25B:
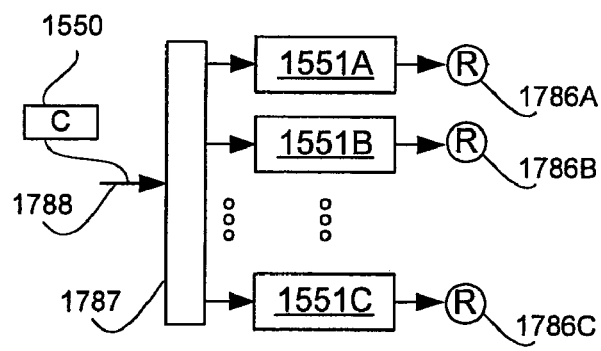
FIG. 25B illustrates an optical demultiplexing system for packets (cells) using the packets coincidence-gates of FIG. 25A.

Referring now also to FIG. 25B, to create a switch using the configuration of FIG. 25A, it should be apparent from the above description together with the teachings of foregoing embodiments that the entire configuration of FIG. 25A (cell coincidence gate 1551) may be used to gate cells (packets) 1550 (payload 1560 with or without the header 1553), for a single channel, for example 1551A. Respective cell coincidence-gates 1551A–1551C block or pass cells 1550 arriving on a common channel 1788 and distributed by a distributor 1787 to each cell coincidence-gate output channel 1551A–1551C. Passed cells are output to each possible destination 1786A–1786C depending on the address configuration for the cell coincidence gate 1551A–1551C as described with reference to FIG. 25A. Coincidence gates similar to coincidence gates 1556A–1556E (FIG. 25A) may also be provided for permitting the address symbol 1553 to be transmitted onto the channel 1786 with suitable increase in the number of channels 1558A–1558E.

Figure 25C:
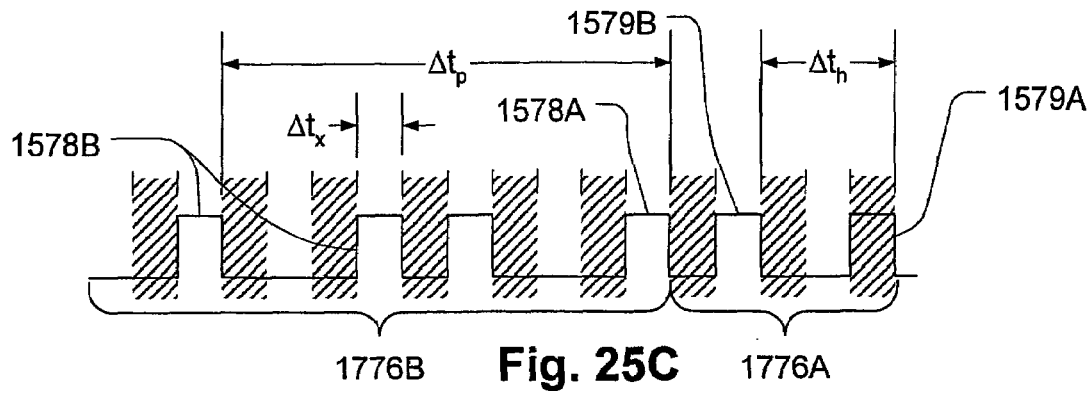
FIGS. 25C and 25D illustrate methods for avoiding the production of coincidence signals, at the header coincidence-gate, by the pulses of the payload.
Figure 25D:
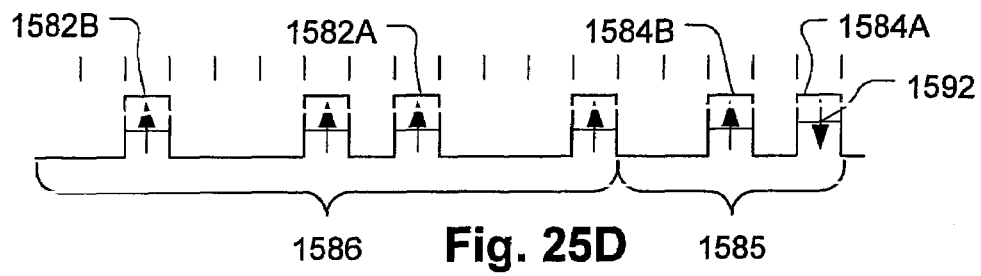
Figure 25E:
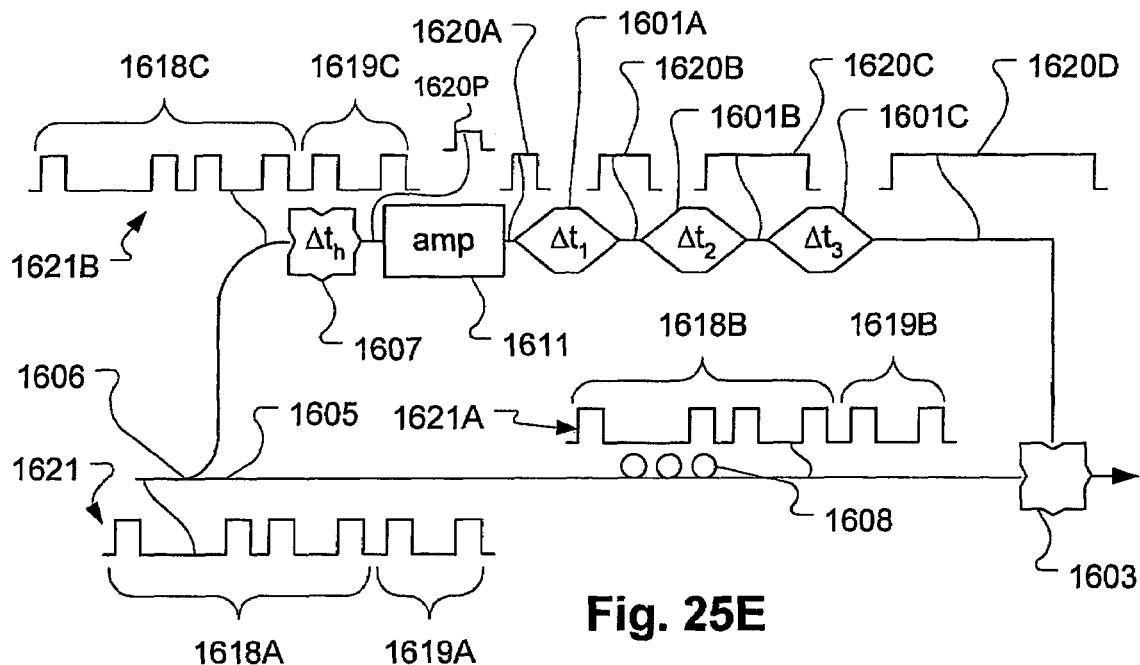
FIG. 25E illustrates an additional design for optical packet routing system using coincidence gates.
Figure 25F:
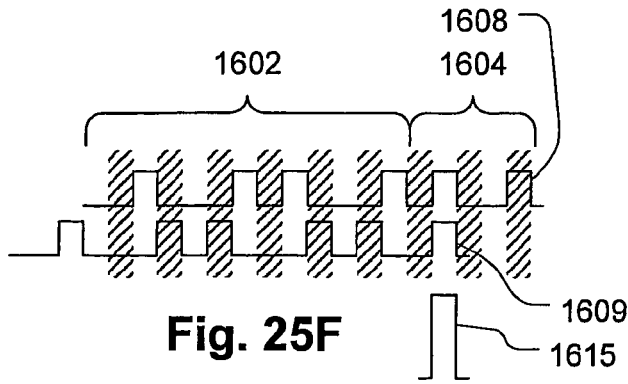
FIG. 25F is a schematic illustration of the relations between an optical packet and its delayed image.
Figure 25H:
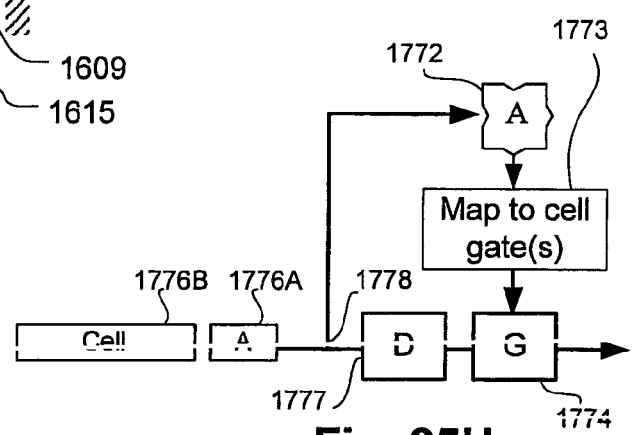
FIG. 25H is a schematic illustration of an all-photonics demultiplexing system for optical packets.

Referring now to FIGS. 25C, 25D, and 25H, the embodiment of FIG. 25A may be described more schematically as including an address coincidence-gate to produce a coincidence pulse and apply it to a mechanism 1773, as illustrated by FIG. 25H, for mapping the coincidence pulse to one or more coincidence gates 1774 (FIG. 25H). In FIGS. 25C and 25D, the cells (packets) include headers 1776A and 1585 and payloads 1776B and 1586, respectively. Pulses 1579A and 1579B of the header symbol are separated by time space $\Delta t_h$ corresponding to the time delay of the specific coincidence-gate of this header. The payload has a length that is equal to $\Delta t_p$. between pulses 1578A and 1578B. The pulse width of the payload pulses, the header pulses and the spaces between these pulses is $\Delta t_x$ wide. Images of the pulse stream of FIG. 25 are transmitted to each of the address coincidence gate 1772 and a delay device 1777 of FIG. 25H. The latter is configured to ensure that the output of the mapping mechanism 1773 coincides with one or more coincidence gates 1774 (FIG. 25H). Schematically, the mapping mechanism may be considered to subsume within it the delay device 1777, since it cooperates in the mapping process. The foregoing description relating FIG. 25C applies also to the embodiment of FIG. 25F discussed below.

Referring now also to FIGS. 25D and 25E, a scheme may be used to prevent data pulses 1560 (FIG. 25A) from generating address coincidence pulses in header coincidence-gate 1554 (FIG. 25A). This may be necessary if it is desired to prevent payload pulses 1560 from causing an undesired gating effect. A variety of mechanisms for preventing this are possible, such as a straightforward yet ineffective scheme of using separate physical channels to carry the address and payload signals. Two schemes that effectively avoid the generation of address coincidence pulses are shown in FIGS. 25C and 25D.

In FIG. 25C, the address symbol is assumed to be a spaced-pulse type symbol in which the spacing of pulses 1579A and 1579B are permitted to be only at even integral multiples of a predefined interval $\Delta t_x$. Payload pulses 1578B (typ.) are permitted to be placed only odd integral multiples of the predefined interval $\Delta t_x$. The above protocol wastes every other time slot for the payload data but reduces the overhead for each data pulse substantially by permitting switching via a single address symbol. It can be seen that the foregoing embodiments may be used with non-coherent types of coincidence gates.

Another way to avoid triggering address coincidence pulses by payload pulses 1550 is to configure the address response coincidence-gate 1554 of FIG. 25A so that constructive interference occurs only when there is a certain phase relationship between the two pulses forming the address symbol 1584A and 1584B (FIG. 25D). Here the relative phases of pulses is indicated by the arrows 1592 (typ.) with oppositely directed arrows being π radians out of phase. The address response coincidence-gate 1554 of FIG. 25A is configured to produce a coherently coincidence pulse when simultaneously-incident pulses have the relationship illustrated by pulses 1584A and 1584B. It follows that if the address response coincidence-gate 1554 is so-configured, pulses with the relationship of 1582A and 1582B will cancel and produce no coincidence pulse in the address response coincidence-gate 1554. It can be confirmed by inspection therefore that the only way to produce a coincidence pulse in the address response coincidence-gate 1554 is the pair of pulses 1584A and 1584B. Thus, no pulses other than those forming the address symbol will generate an address coincidence pulse. Other combinations will destructively interfere in the address response coincidence-gate 1554.

Note that another way of preventing payload pulses from generating a coincidence output in the address header is to polarize the pulses differently in a manner that is analogous to the discussion of FIG. 25D. That is, the arrows 1592 would represent polarization instead of phase.

Referring now to FIG. 25E, an alternative configuration for switching a payload 1618A of an arbitrary number of pulses using a single address symbol 1619A uses a single coincidence gate for the entire switched signal. An input signal 1621 (including header 1619A and payload 1618A) is applied to a junction 1606 that divides some of the energy of the input signal 1621 to send an image 1621B (including header 1619C and payload 1618C) thereof to an address coincidence-gate 1607 and a corresponding image 1621A (including header 1619B and payload 1618B) through a delay line 1605 with delay device 1608 (e.g., delay loops). The image sent to the address coincidence-gate 1607 generates a coincidence pulse 1620P if the address symbol portion 1619C (image of 1619A) matches the address coincidence-gate 1607 configuration (for example, a spaced-pulse symbol). This works in a manner that is identical to that disclosed with respect to FIGS. 25A–25D. The coincidence pulse 1620P may be amplified by an amplifier 1611 and the resulting output pulse 1620A expanded temporally by duplicating it with a pulse duplicator 1601A to yield a broadened pulse 1620B. Successive expansions by duplicators 1601B and 1601C result in successively broader pulses 1620C and 1620D, respectively. Although not illustrated, the duplication process may necessarily result in a diminution in amplitude in the resulting expanded pulse. Such diminution may be compensated by amplifier 1611.

Figure 25G:
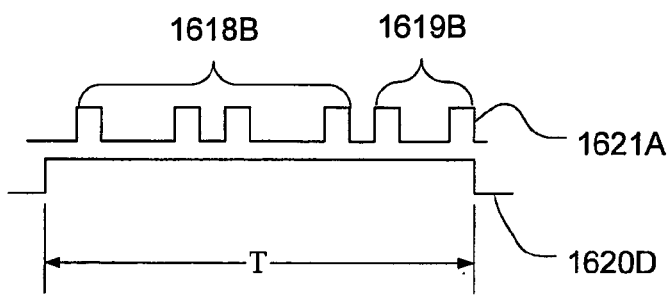
FIG. 25G is a schematic illustration of the relation between an optical packet and its corresponding broadened header coincidence-signal.

Referring also to FIGS. 25E, 25F and 25G, the width T of the pulse 1620D may be as great as the images 1621A–1621B of the received signal 1621. The timing delay of the delay line 1605 is arranged such that the leading edge of signal 1621A and the leading edge of broad pulse 1620D are both incident on coincidence gate 1603 at the same instant. The pulse 1620D and signal 1621A produce coincidence pulses in the coincidence gate 1603 for each pulse in the signal 1621 because the broad pulse 1620D overlaps all of them. Such a situation is illustrated by FIG. 25G which shows that pulse 1620D (having a width T) is wide enough to produce coincidence, at gate 1603, with all the pulses of the signal 1621A (including payload 1618B and header 1619B). The width T of pulse 1620D may be adjusted to exclude header 1619B (1619A). In such a case, only payload 1618B (1618A) will be transmitted by coincidence gate 1603.

The output of the coincidence gate 1603 will be an image of the incoming signal 1621 if address symbol 1619C (1619A) produces a coincidence pulse in the address coincidence-gate 1607. This is because the broad pulse (FIG. 25E or FIG. 25G) generated by the address coincidence-gate 1607 and duplicators 1601A–1601C is coincident with every pulse of the signal 1621. If the address symbol does not generate a coincidence pulse, no coincidence pulses are generated in the coincidence gate 1603 and therefore the signal 1621 may be said to be blocked by the apparatus of FIG. 25E. Only the address symbol 1604 (FIG. 25F) may generate a coincidence pulse 1615 in the address coincidence-gate 1607 using some non-interference scheme, for example the method of FIG. 25C which may confirmed with reference to FIG. 25F. The packet pulses 1602 do not generate a header coincidence pulse as can be seen from the relations between signal 1608 and its delayed image 1609. This may be confirmed by inspection for the odd even pulse scheme discussed with reference to FIG. 25C.

Figure 25J:
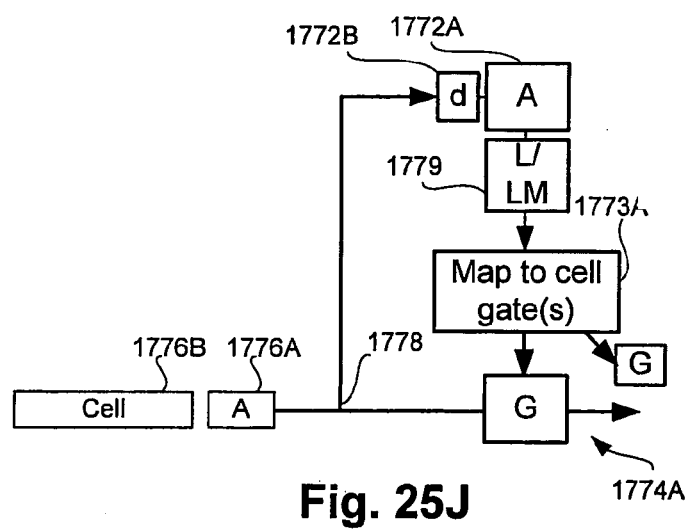
FIG. 25J is a schematic illustration of an all-optical demultiplexing system for optical packets that uses an electrical control unit.

Referring to FIG. 25J, another means by which data may be switched using one or more coincidence gates 1774A is to resolve and actuate the address header 1776A electronically. For example, the address header 1776A may be applied to an optoelectric detector 1772B to generate responsive signals providing the address to a recognition circuit 1772A which controls one or more lasers or laser modulators 1779 that provide signals upon positive recognition to a mapping mechanism 1773A. The latter applies light to one or more coincidence gates 1774A. Each coincidence gate may correspond to a respective address in the present configuration. Thus, laser or modulator 1779 may have multiple output channels, each carrying a signal to a different coincidence gate, that may output for the incoming data cell, including payload 1776B, and with accordance to its header 1776A.

Figure 25K:
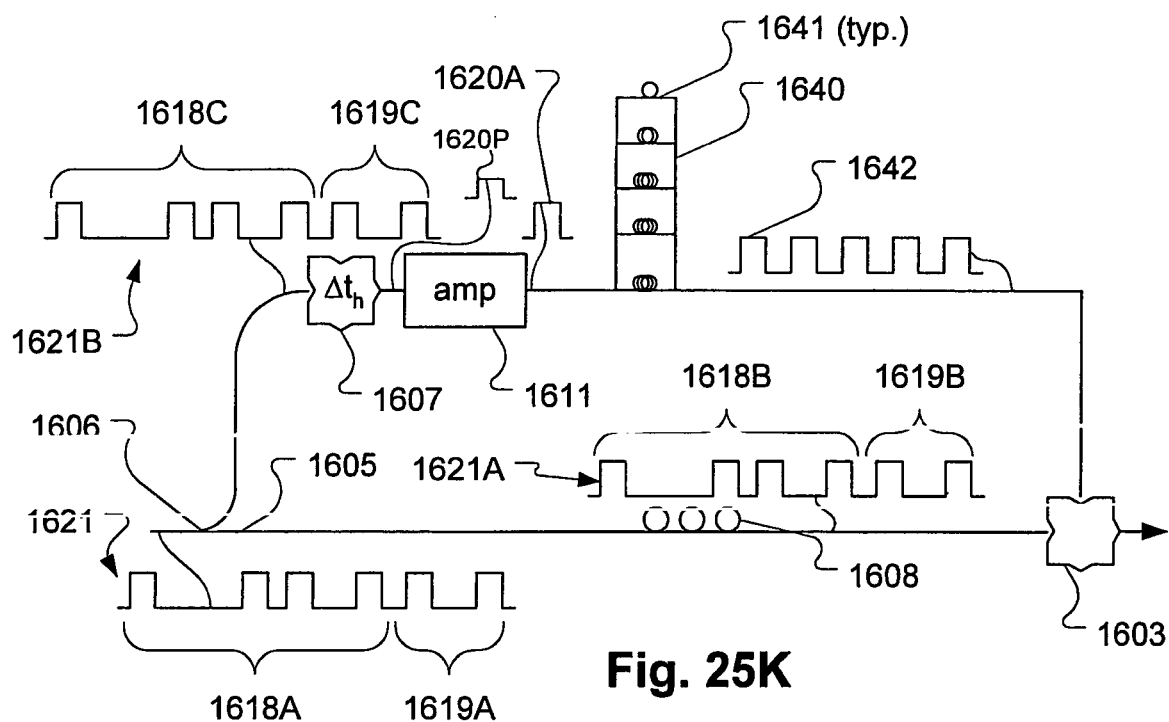
FIG. 25K illustrates an additional design for optical packet routing system using coincidence gates.
Figure 25L:
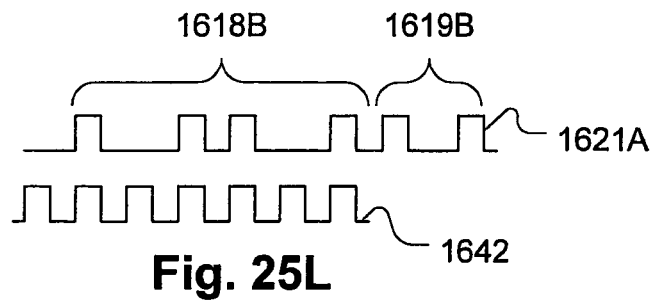
FIG. 25L is a schematic illustration of the relation between an optical packet and its corresponding multiplied header coincidence-signal.

Referring to FIG. 25K, an alternative mechanism for employing a single coincidence gate to selectively block or pass a data cell (packet) 1621 is to send the address coincidence pulse 1620P into a cascade of delays 1640, having multiple leayers 1641 (typ.) connected in parallel, to produce a series 1642 of differently delayed images of the coincidence pulse 1620P. The series 1642 is simultaneously incident on the coincidence gate 1603 with the signal image 1621A. Those pulses in the image 1621A that coincide with the pulses in the series will be passed by the coincidence gate 1603. Since the pulses in the image 1621A can only be in certain locations, the pulses in the series 1642 may be arranged so that they always pass the pulses in the image 1621A as may be confirmed by inspection of FIG. 25L which shows that each payload 1618B is coincident with a particular series 1642 pulse thereby causing all the payload 1618B pulses to produce a coincidence pulse from the coincidence gate 1603 and therefore transmitted out of coincidence gate 1603. Although FIG. 25L illustrates only the payload 1618B being "transmitted," it should be evident from the drawing and other descriptions that the series 1642 may be expanded to include the address symbol if desired.

Various techniques for canceling non-coincidence signals (artifacts) below a certain threshold level were discussed with reference to FIGS. 12A–12K. The application discussed there was the elimination of side pulses below a certain magnitude. Recall that these devices canceled all pulses below a certain magnitude that corresponded to some level defined by the nonlinear behavior of a piece of material or an optical amplifier. Essentially, these devices pass only the portion of an input signal above a specified threshold. For example, in the embodiment of FIG. 12A, an input signal applied at 614 would produce zero output at 613A for all input signal magnitudes below a saturation level of the optical amplifier 615. An input signal above the saturation level would be reduced by level of the saturation (assuming unity gain, otherwise the output above the saturation level would be magnified/reduced by the gain of the overall device). In other words, the cancellation devices of FIGS. 12A–12K pass only the portion of the input signals above a predefined level corresponding to the nonlinear gain curve (e.g., FIG. 12B or 12F) characterizing the cancellation device.

Figure 26A:
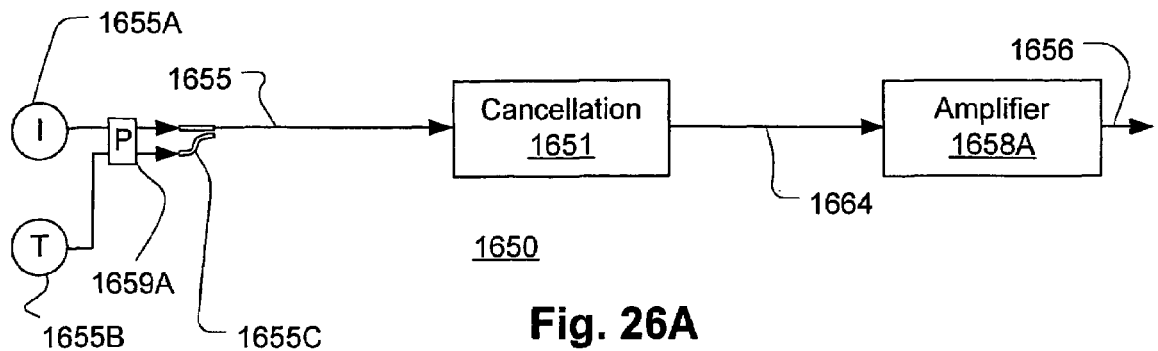
FIGS. 26A and 26B are schematic illustrations of an optical comparator and its electrical equivalent, respectively.

Referring now to FIG. 26A, a cancellation device 1651 exhibits the behavior described above of passing only the portion of an input signal above a threshold level. Activation and threshold inputs 1655A and 1655B received by terminals I and T, respectively, are combined coherently such that they interfere destructively in a reverse Y-junction 1655C to generate a combined signal 1655 representing the difference of the activation and threshold signals 1655A and 1655B. The activation input signal 1655A and threshold input signal 1655B may be named thus because the threshold signal 1655B increases the magnitude the input signal must reach in order to produce a positive signal 1655 at the output of combiner 1655C. Phase alignment effective to ensure the coherent subtraction may require the use of a phase compensation devices 1659A and one or more others within the cancellation device 1651.

In the embodiment of FIG. 26A, the combined signal 1655 is applied to a cancellation device 1651, which may be as illustrated and described with reference to FIG. 12A, for example. The output signal 1664 from the cancellation device 1651 may be applied to an amplifier 1658A with high gain and nonlinear signal-limiting behavior (as described, for example, with reference to FIGS. 12B and 12F, so that any small output at 1664 will be amplified at output 1656, by amplifier 1658A, to a saturation level of the amplifier 1658A.

The signal at 1655 represents a difference between the activation input signal 1655A and a threshold signal 1655B. The cancellation device 1651 outputs only the portion of this difference signal 1655 above the threshold determined by the type and configuration of the cancellation device 1651. The amplifier 1658A amplifies this output 1664 with high gain up to a level of another threshold corresponding to the saturation level of the amplifier 1658A. In other words, the output 1656 is clamped to the saturation level of the amplification 1658A when the activation input signal 1655A goes above a level determined by the threshold signal 1655B. Thus, the threshold signal 1655B may be used to vary the activation input signal 1655A signal that triggers device 1650 output 1656 to clamp to the saturation level.

Figure 26B:
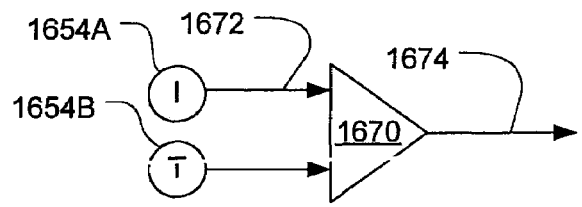

Referring now also to FIG. 26B, the configuration of 1650 acts substantially as a comparator 1670 with a threshold at a threshold input 1654B causing an output 1674 to be near zero when a signal at an "activation" input 1654A is below a certain threshold level at threshold input 1654B. Comparator 1670 is responsive to an activation signal 1654A, at output 1674, when activation signal 1654A is above the certain threshold level 1654B. Thus, changing the threshold input 1654B effectively raises or lowers the signal level required at the activation input to trigger a high level output at 1674.

Referring again to FIG. 26A, in an alternative embodiment, the cancellation device 1651 is omitted and the difference signal 1655 is applied directly to the amplifier 1658A. In this embodiment, the output 1656 may not fall to zero if the activation input signal 1655A is below the level imposed by the threshold input 1655B. However, the effect of the threshold signal 1655B is still to raise and lower the level to which the activation signal 1655A must rise to clamp the output 1656. Thus, its behavior is substantially similar to that of FIG. 26A.

Note that although not shown, phase alignment of the various signals required to produce the effects discussed may be maintained by phase shifters controlled by a controller in a closed loop (not shown) according to principles discussed in the present specification.

Figure 27A:
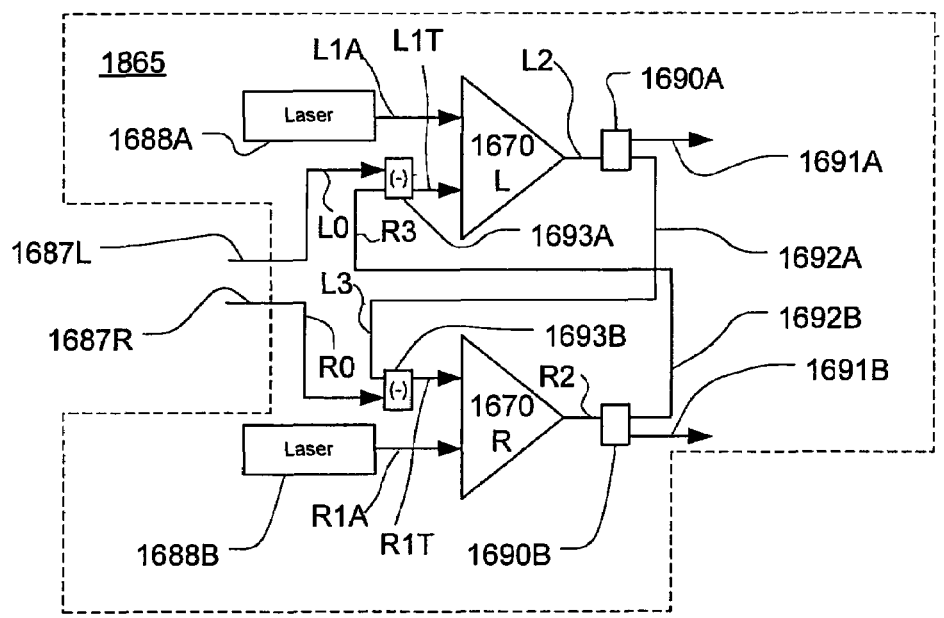
FIG. 27A illustrates an optical bistable device using optical comparators similar to the comparator illustrated by FIG. 26A.

Referring now to FIG. 27A, a bistable (flip-flop) device 1865 has left and right inputs 1687L and 1687R, respectively. Left and right comparators 1670L and 1670R, have respective threshold, L1T and R1T, and activation inputs, L1A and R1A. The left and right comparators 1670L and 1670R may be configured such that their respective outputs L2 and R2 are not necessarily zero when in a low-output state, for example by using a configuration such as shown in FIG. 26A without the cancellation device 1651.

Inputs L1A and L1T correspond, respectively, to activation and threshold inputs 1654A and 1654B discussed with respect to FIG. 26B. Similarly, inputs R1A and R1T correspond to activation and threshold inputs 1654A and 1654B discussed with respect to FIG. 26B. Signal subtractors (couplers) 1693A and 1693B coherently add incoming signals such that they destructively interfere. Thus, signal subtractors 1693A and 1693B are configured to act as signal subtractors or inhibitors because a high level signal at L0 will inhibit a signal R3 propagating through the subtractor 1693A. Similarly, a high level signal at R0 will inhibit a signal L3 propagating through the subtractor 1693B.

Signal taps 1690A and 1690B tap some of the signal energy in respective feedback lines 1692A and 1692B to provide outputs 1691A and 1691B, respectively. The taps 1690A and 1690B may include y-junctions, directional couplers, beam splitters or any suitable devices. The percentage of the energy tapped by them may be low and optical amplification may be used to make the outputs 1691A and 1691B suitable drivers for upstream processing (not illustrated). Lasers 1688A and 1688B generate continuous constant signal levels. Although shown as two devices they may indeed be a single laser source combined with a splitter or other source of narrow band light divided into multiple streams by an optical header (not shown).

To understand the bistability of the circuit, one can assume for a moment that a first current stable state (R-high) exists in which channel 1692B carries a high level signal. The signal may be high enough to raise the threshold input L1T to a level such that laser 1688A does not clamp the comparator 1670L output L2 to its maximum level. The signal at L2 will thus be at a low level. The low level signal L2 propagates to L3, via guide 1692A, where it passes through subtractor 1693B providing a low level threshold to comparator 1670R allowing laser 1688B to clamp the output R2 to a high level. The signal at R2 then propagates to R3 where the cycle repeats. The device in the above-described R-high state thus remains in that state and this state is therefore stable. Assume a second current stable state (L-high) in which channel 1692A carries a high level signal that is high enough to raise the threshold input R1T to a level such that laser 1688B does not clamp the comparator 1670R output R2 to its highest level. The signal at R2 will thus be at a low level. The low level signal R2 propagates to R3, via guide 1692B, where it passes through subtractor 1693A providing a low level threshold to comparator 1670L allowing laser 1688A to clamp the output L2 to a high level. The signal at L2 then propagates to L3 where the cycle repeats. The device in the second above-described state thus remains in that state and this state is therefore stable.

If a high level signal is applied at the left input 1687L while the current state is R-high, the left input signal inhibits the signal at R3 lowering the threshold input L1T. If the input on 1687L is sufficiently strong, it causes the signal at L2 to reverse because it allows the laser signal L1A to clamp the output at L2 to a high level. The L2 signal propagates through the feedback channel 1692A thereby raising the threshold for the right comparator 1670R and switching the state to L-high. If a high level signal is applied at the left input 1687L while the current state is L-high, nothing happens because the input simply further diminishes the R3 signal causing the threshold level L1T to lower. The decrease in L1T does not substantially affect the intensity at output L2, which has already been clamped to a high level; even before the high signal 1687L was applied to input L0 to lower threshold L1T. If a low level signal 1687L were applied to input L0, even at a phase that caused the signal 1687L to be added constructively to R3 by subtractor 1693A, it might still be insufficient to increase the threshold L1T to a level that overcomes the laser signal at L1A and thereby would not cause device 1865 to change its state to R-high and the device would remain in the L-high state.

If a high level signal is applied at the right input 1687R while the current state is L-high, the right input signal inhibits the signal at L3, thereby lowering the threshold input R1T. If the input is sufficiently strong, the signal at R2 will reverse allowing the laser signal R1A to clamp the output at R2 to a high level. The R2 signal propagates through the feedback channel 1692B thereby raising the threshold for the left comparator 1670L and switching the state to R-high. If a high level signal is applied at the right input 1687R while the current state is R-high, nothing happens because the input simply further diminishes the L3 signal to lower the threshold level R1T. The decrease in R1T results in no change in the intensity level at output R2, which was already clamped to a high level even before a high signal 1687R was applied to input R0 to lower threshold R1T. If a low level signal 1687R were applied to input RO, even at a phase that caused the signal 1687R to be added constructively to L3 by subtractor 1693A, it still might be insufficient to increase the threshold R1T to a level that overcomes the laser 1688B signal at R1A and, as a result, not cause device 1865 to change its state to L-high.

The net gain (including amplifications, losses, and attenuations) along the complete optical loop that starts and ends at L3 and includes R2, R3, and L2 is preferable higher than 1. This helps to ensure bistable operation. To make the intensity at the output 1691A or 1691B of device 1865, when in a low state, close to zero, the clamped intensity at R2 or L2 may be made to have a magnitude similar to that received from the lasers 1688A or 1688B at L1A or R1A.

The bistable device 1865 of FIG. 27A, as should be clear from the above description, acts as a stable memory cell in which the application of a signal at one input either switches it to a state corresponding to that input or has no impact if the state corresponding to that input already exists. If the first input corresponds to a first state, a signal applied to the first input ensures the device is in that state. The output state is indicated by the signals of the outputs 1691A or 1691B. When on output 1691A (or 1691B) is high, the other output 1691B (or 1691A) is low Referring now to FIG. 27B, an alternative configuration for a bistable device is shown generally at 1810. As will be recalled, certain gate devices may be configured such that the entire energy incident on both inputs is emitted from one output or the other depending on the phase relationship between the two signals applied at the inputs. For example, such a gate may include a dielectric beam splitter or a directional coupler. The bistable device 1810 employs a gate 1806 illustrated as a dielectric beam splitter. Laser light from a laser source 1802 is incident at a first port 2706 of the gate 1806. Light from the laser 1802 can follow one of two possible paths 2712 and 2714 to a second port 2702. A right path 2712 goes through a first right junction 2710, through a second right junction 2720, through a phase shifter 2529, through a middle junction 2728, through an optical amplifier 1804, with an attenuator 2716, and into the second port 2702. A left path 2714 goes through a first left junction 2708, through a second left junction 2722, through a phase shifter 2528, through the middle junction 2728, through the optical amplifier 1804, with an attenuator 2716 and into the second port 2702.

The total delays (phase shifts) in the right path 2712 are preferably such that a right beam 2740 following the right path 2712 constructively interferes with a portion of a laser beam 2744 that is transmitted through the gate 1806 and out through the port 2704. This portion 2704 is injected back into the right path 2712 producing a self-enhancement effect. To constructively interfere with the transmitted portion of the laser beam 2744, and thereby reinforce the right beam 2740, the right beam phase may be adjusted to a proper phase by a phase shifter 2529 to provide for proper phase alignment. The gate 1806 is preferably such that when the right beam 2740 constructively interferes with the transmitted portion to the laser beam 2744, it destructively interferes with the reflected portion of the laser beam 2744 which passes through the port 2732 and into the left path 2714. Thus, light returning to the gate 1806 through the right path 2712 through port 2702 reinforces the proportion of the laser beam 2744 transmitted through the gate 1806 and into the right path 2712 and diminishes the proportion of the laser beam 2744 reflected into the left path 2714. As a result, the stronger the right beam 2740, the more the left beam 2742 is starved and the more the right beam 2740 is fed.

The configuration of the left path may be such as to provide an analogous function of making the left beam 2742 self-reinforcing as well. That is, the total delays in the left path 2714 are preferably such that the left beam 2742 constructively interferes with the portion of a laser beam 2744 that is reflected through the gate 1806 and out the port 2732. To constructively interfere with the reflected portion of the laser beam 2744, the left beam phase may be adjusted to the proper phase by phase shifter 2528. When the left beam 2742 constructively interferes with the reflected portion of the laser beam 2744 exiting through port 2732, it destructively interferes with the transmitted portion passing through the port 2704 and into the right path 2712. Thus, light returning through left path 2714 and through port 2702 reinforces the proportion of the laser beam 2744 reflected into the left path 2714 and diminishes the portion transmitted into the right path 2712. As a result, the stronger the left beam 2742, the more the right beam 2740 is starved and the more the left beam 2742 is fed.

In order to provide the phase relationships required to make each of the left and right beams 2742 and 2740 self-reinforcing as described, when the two beams 2742 and 2740 are merged by junction 2728, they destructively interfere with each other. As a result of the destructive interference, the only light remaining entering the gate 1806 through port 2702 is a residual resulting from a subtraction of a dominant beam, i.e., the stronger of left and right beams 2742 and 2740, from the subordinate one of the two beams 2742 and 2740.

If the dominant beam is right beam 2740, the residual entering port 2702 will be of such phase as to cause constructive interference with the portion of the laser beam 2744 transmitted in the gate 1806 and cause destructive interference with the portion reflected in the gate 1806. The analogous effect occurs with respect to the left beam 2742. If the dominant beam is left beam 2742, the residual entering port 2702 will be of such phase as to cause constructive interference with the portion of the laser beam 2744 reflected in the gate 1806 and cause destructive interference with the portion transmitted in the gate 1806. The combination of optical amplifier 1804 and attenuator 2716 preferably has a nonlinear transfer function characterized by a gain curve with a linear gain region and a relatively flat saturation region, such as embodiments discussed with reference to FIGS. 12A to 12K. The transfer function preferably also provides a net amplification that overcomes all sources of attenuation in the left and right paths (2714 and 2712) such that the net gain at the saturation region is at least one. When the optical amplifier 1804 and attenuator 2716 combination provides this transfer function, the dominant one of left and right beams 2742 and 2740 will increase until the optical amplifier 1804 saturates. At this point, the intensity of the residual applied at the port 2702 will preferable be substantially equal to the intensity of the laser beam 2744 applied at port 2706. When these conditions exist, it should be clear from the foregoing that all of the laser beam 2744 will be directed into the path 2712 or 2714 of the dominant beam 2740 or 2742 and substantially none of the laser beam 2744 will be directed into the path of the 2714 or 2712 of the subordinate beam 2742 or 2740.

The optical amplifier 1804/attenuator 2716 combination preferably have a gain and saturation plateau (e.g., as indicated at 561A and 516A and described with respect to FIG. 12B) that ensures the self-reinforcement process progresses toward a "clamped" stable state without continuing to arbitrarily-high dominant-beam magnitudes. In the absence of inherent bias in the system, if one of the beams 2740 and 2742 becomes dominant, for example due to noise or other perturbation, the process of positive feedback will iterate continuously with the residual of the dominant beam reinforcing the dominant beam after the completion of a cycle along the dominant beam's path 2714 or 2712. To assure enhanced return of the residual of the beam that arrives from path 2714, the total amplification (including the amplification of amplifier 1804, the attenuation loss at the junctions and the attenuator 2716, the propagation and scattering loss and other losses) along paths 2714 and 2712 may be made to be greater than 1. Accordingly after each cycle along the paths 2712 and 2714 the intensity at port 2702 of the residual of the beam will increase. This process continues until the amplifier 1804 saturates, thereby stopping the continuous increase of the dominant beam and clamping to provide a fixed intensity at port 2702. As stated, preferably, the intensity of the clamped residual beam arriving at 2702 is comparable in magnitude to that of the laser beam 2744 when the amplifier 1804 and attenuator 2716 reach the saturation plateau. By adjusting the attenuation or amplification, the combination of amplifier 1804 and attenuator 2716 allows the magnitude of the saturation plateau to be adjusted. The amplifier 1804 ensures the feedback signal is strong enough to overcome losses, while limited amplification to a maximum level of the saturation plateau.

To summarize, the dominant beam is diminished by the subordinate beam in 2728, which subtracts one beam from the other. Diminution of the subordinate beam increases the residual passed into 2702 by the junction 2728 because of the enhanced difference between the dominant and subordinate beams. Thus, the dominant beam enhances itself and diminishes the subordinate beam. Due to inherent loss in junctions 2710, 2708, 2722, 2720, and 2728 and also in attenuator 2716, the gain of amplifier 1804/attenuator 2716 combination should be adjusted to a value that ensures bistable operation. The residual, which is applied at 2702 enhances the dominant beam and diminishes the subordinate beam by increasing the flow of laser energy through the gate 1806 and into the path (2712 or 2714) of the dominant beam.

Once a light path 2714 is clamped to a high level, gate 1806 directs most of the energy toward path 2714 and very little or none of the energy is directed by gate 1806 into path 2712. This state in which the intensity at output 2718 is high and the intensity at output 2730 is low, or nulled, is stable and may be identified as L-high. A similar process starting with a dominant beam arriving from 2712 will result in a stable state that may be identified as R-high. In the R-high state, the intensity at output 2730 goes high and the intensity at output 2718 goes low and ends up substantially nulled. The paths 2714 and 2712 may be configured such that their propagation delays are only slightly different. For example, such that their phases are $\pi$ radians different at port 2702, such that they reinforce or reduce the intensity of the respective light from the laser 1802 reflected or transmitted by the gate 1806, as described above.

From the above description, it should be clear that if the total net gain in the optical loops along paths 2714 and 2712 that start and end at 2702 is greater than 1, and there is no substantial bias favoring the initial fraction of the energy from the laser 1802 that is transmitted through the left 2714 or right 2712 path, the bistable device 1810 will be unstable. If the energy in both paths 2714 and 2712 is equal, the intensity at port 2702 will be nulled and the self-reinforcement process will stop, but the equilibrium is unstable. Since each path 2714 and 2712 is self-reinforcing, if equal shares of energy are directed along the left 2714 and right 2712 paths, the slightest perturbation cause it to shift to one of the two stable states R-high or L-high.

Some of the energy may be tapped from each of the left and right paths 2714 and 2712, by way of junctions 2708 and 2710, respectively, into respective outputs 2718 and 2730. Use of these tapped signals may include driving upstream optical circuits. Using the outputs 2718 and 2730, it may be determined which is the current state of the bistable device either by comparing the two outputs 2718 and 2730 or by detecting the signal level on one to infer the state of the other. The bistable device 1810 is similar to the bistable device 1865 of FIG. 27A in having one state in which a right path 2712 has a high signal level (R-high) and another in which a left path 2714 has a high signal level (L-high).

To change a current state of the bistable device 1810, right input 2726 and left input 2724 are used. A signal applied at a certain phase angle to the input 2726 may suppress the light traveling through the right path 2712 by interference. The input signal may be strong enough to switch the phase of the light traveling through the right path 2712. The suppressed or reversed beam in path 2712 then propagates through right path 2712 and combines with any beam in path 2714 in the middle junction 2728. If the input signal applied at 2726 is sufficiently strong, the total signal going through the port 2702 will be in the phase of the light in the left path 2714. This phase will enhance the portion of the laser 1802 light that is directed to the left path 2714 by constructive interference, in the gate 1806, with laser 1802 light causing the light in the left path 2714 to be reinforced. At the same time, the light from the laser 1802 directed by the gate 1806 into the right path 2712 will be diminished by the same interference effect in gate 1806.

Alternatively, instead of suppressing the dominant beam in the right path 2712, a subordinate beam in the left path 2714 can be enhanced by applying a signal of appropriate phase to the left input 2724. This has the same effect, on the combined signal inserted through the port 2702, as suppression of the signal in the right path 2712. This is because all the signals (those in the left 2714, right 2712, and the input signal applied at either input 2726 or 2724) are added coherently and linearly to the beam ultimately inserted through port 2702. The phase of an enhancement signal applied at input 2724 is identical to the phase of a suppression signal applied at input 2726 and both arrive at the same destination.

Thus, a signal entering right input 2726 or one entering left input 2724 may be used to shift the state of the bistable device 1810 to L-high. Once the signal is placed in this state, it remains in a stable state. It should be clear that a signal entering left input 2724 or right input 2726 may be used to shift the state of the bistable device 1810 from L-high to R-high by suppressing the signal in the left path 2714 or enhancing the signal in the right path 2712.

The amplifier 1804 may include a nonlinear device to limit the intensity of the signal arriving at port 2702. This may amplify the difference between the R-high state and the L-high state. Preferably, in the stable state, the signal at optical path 2702 matches the laser 1802 signal intensity so that all of the laser light will be directed along one path or the other 2714 or 2712. In that case, the difference between the R-high and L-high states will be as high as possible. If the signal at path 2702 is too high, residual signal will remain (in opposite phase) in the subordinate path 2712 or 2714. Such a residual signal may be undesirable for detection or the driving of some upstream processes with the subordinate output signals 2718 or 2730. The input signal intensity should be such that the signal at 2702 is of a phase that reinforces the signal on the right path 2712 or left path 2714, whichever is desired to be dominant. The input signal must be intense enough to ensure this phase whether the device starts in L-high state or R-high state. For example, when the input signal is applied to switch the state to R-high while the device 1810 is in state L-high, the input should be intense enough that the residual of the dominant left path 2714 signal is dominated leaving a residual at 2702 in the phase of the right path 2712 signal.

It is not essential that the net amplification into 2702 have any particular value. Higher gain will result in a faster clamping process. This applies to all the bistable embodiments described above and below. If the intensity resulting from the saturated gain is higher than needed to null the energy at one of the paths 2714 or 2712, the residual energy is injected into the path that is currently at the low state (the one that is preferably nulled) with a reverse phase so that when it combines at 2728 with the dominant beam in high state, this residual energy constructively interferes with the dominant beam. As a result, this only accelerates the clamping, but the intensity of the subordinate beam would be different from zero. This may make detection and discrimination of states more difficult.

Similarly, if the intensity of the saturated gain is lower than needed to null the energy at one of the paths 2714 or 2712, the intensity at the subordinate beam would be different from zero as well.

It should be clear that high gain accelerates the transition of device 1810 from one state to another, since the higher the gain the fewer iterations that are needed to clamp the amplifier. It should also be recognized that the saturation level of the combination of amplifier 1804 and attenuator 2716 determines how close to zero the intensity of the output at the lower state will be.

The amplification in the optical loops that contain paths 2714 and 2712 and which start and end at port 2702 is related to the linear slope of the gain curve of the transmission function of the combination of amplifier 1804 and attenuator 2716. The saturation region of this combination is independent of the linear slope of the gain. Accordingly, the gain and the saturation level can be adjusted independently and may have at the same time high gain and a correct saturation level to provide rapid convergence to one of the stable states and has, at its outputs, an intensity very close to zero when that output is derived from the subordinate beam.

Note that phase shifters 2528 and 2529 may be needed to ensure the phases of the feedback signals carried in left and right paths 2714 and 2712 have the proper phase alignment to perform the functions described. That is, they are used to ensure that the signals in the left and right paths 2714 and 2712 satisfy the following conditions:

1. They are opposite in phase when combined to form a feedback signal, e.g., the signal applied to the gate 1806 at port 2702.

2. They are applied at the gate 1806 such that the left side 2714 signal reinforces itself by constructively interfering with reflected light from the laser to direct it into path 2714. If the above conditions are satisfied, the right path 2712 signal will direct laser light into the right path 2712 by the same process.

Figure 27B:
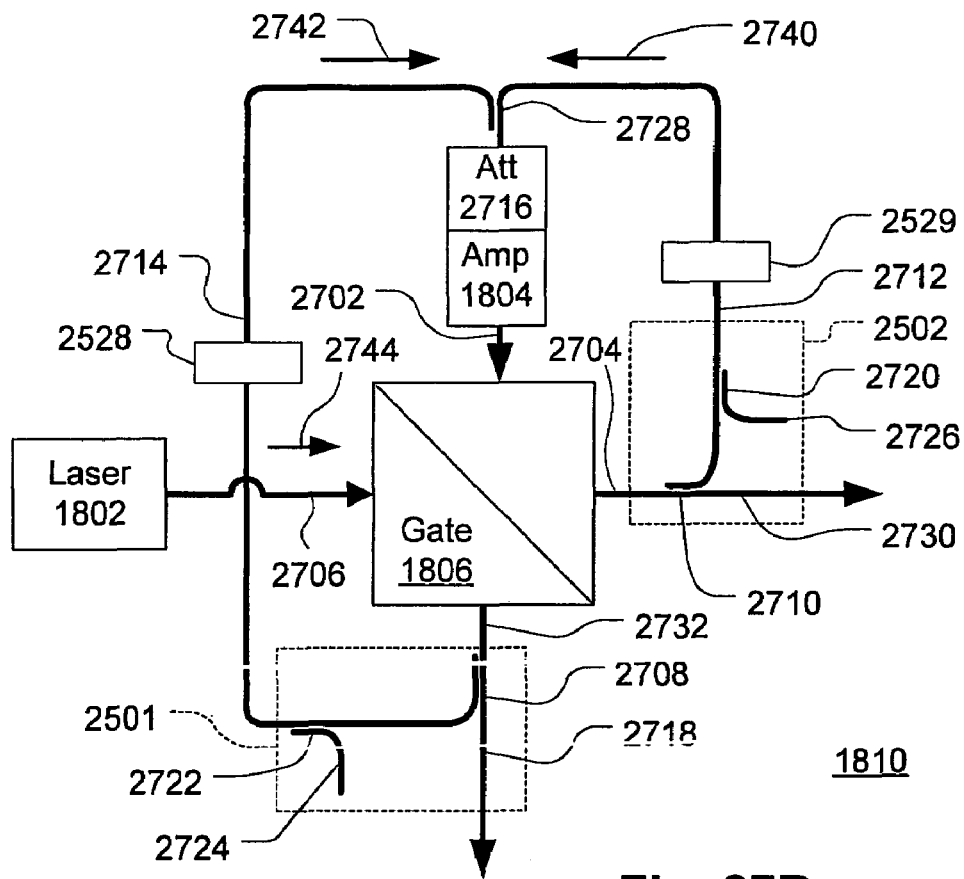
FIG. 27B is a schematic illustration of an optical bistable device including two optical feedback loops.

Phase shifters may be used in other parts of the configuration of FIG. 27B as well.

Figure 27C:
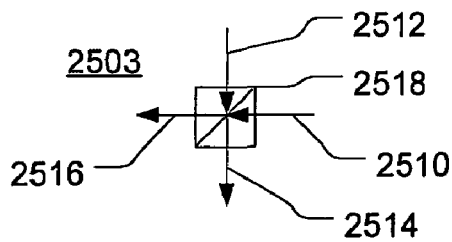
FIG. 27C illustrates the use of a beam splitter for input/output ports of the device of FIG. 27B.

Referring now also to FIG. 27C, the basic configuration of FIG. 27B may be modified in various ways. For example, the functions of junctions 2708 and 2722 (FIG. 27B) may be performed by a single beam splitter 2518. Equivalently, the analogous functions of junctions 2720 and 2710 (FIG. 27B) may also be performed by the single beam splitter 2518. Thus, each configuration indicated by outlined box 2501 (or 2502) of FIG. 27B may be replaced by a configuration 2503 as shown in FIG. 27C. For example, an input beam 2510 may serve as FIG. 27B input 2724 and an output 2514 may serve as it's output 2718. The path 2714 of FIG. 27B corresponds to the beam 2512 reflected into beam 2516. Similarly, using the same type of beam splitter 2518, the configuration indicated by outlined box 2502 may be replaced with the configuration of 2503.

Figure 27D:
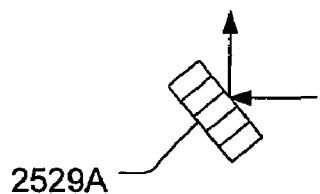
FIG. 27D illustrates the use of a mirror for directing the beams of the device of FIG. 27B.
Figure 27E:
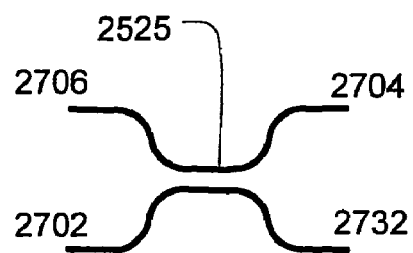
FIG. 27E illustrates the use of a directional coupler for the gate of the device of FIG. 27B.

Referring now also to FIG. 27E, the embodiment of FIG. 27B may also modified to replace the beam splitter gate 1806 with one based on a directional coupler 2525. The input and output ports 2706 and 2702 and 2704 and 2732 perform substantially the same functions as the beam splitter 1806, as long as each is configured properly as will be understood by those of skill in the relevant art. Thus, a laser applied at 2706 will direct its energy into a bar beam output at 2704 and a cross beam output at 2732. As should be evident to those of skill in the art, the directional coupler 2525 may be configured such that properly phase-aligned return paths will provide the same behavior in directional coupler 2525 as described with respect to beam splitter 1806 in the configuration of FIG. 27B as long as proper phase shifts will be used.

Referring to FIG. 27B, although the paths 2714 and 2712 and others are illustrated in FIG. 27B in a manner that is suggestive of waveguides, it is clear that mirrors 2529A of FIG. 27D could be used to guide the beams on left and right paths 2714 and 2712 as well as others. A beam splitter (not shown) may be used in place of junction 2728 to join the two beams on paths 2712 and 2714 guided by mirrors, such as mirror 2529A of FIG. 27D, into the port 2702. In such a configuration, the functions of junctions 2720, 2710, 2722, and 2708 may be performed by beam splitters (not shown) as well. Note also that the illustrations of the paths 2712 and 2714, which are suggestive of waveguides, are schematic only and in a real structure may be curved gradually to minimize attenuation.

Figure 28A:
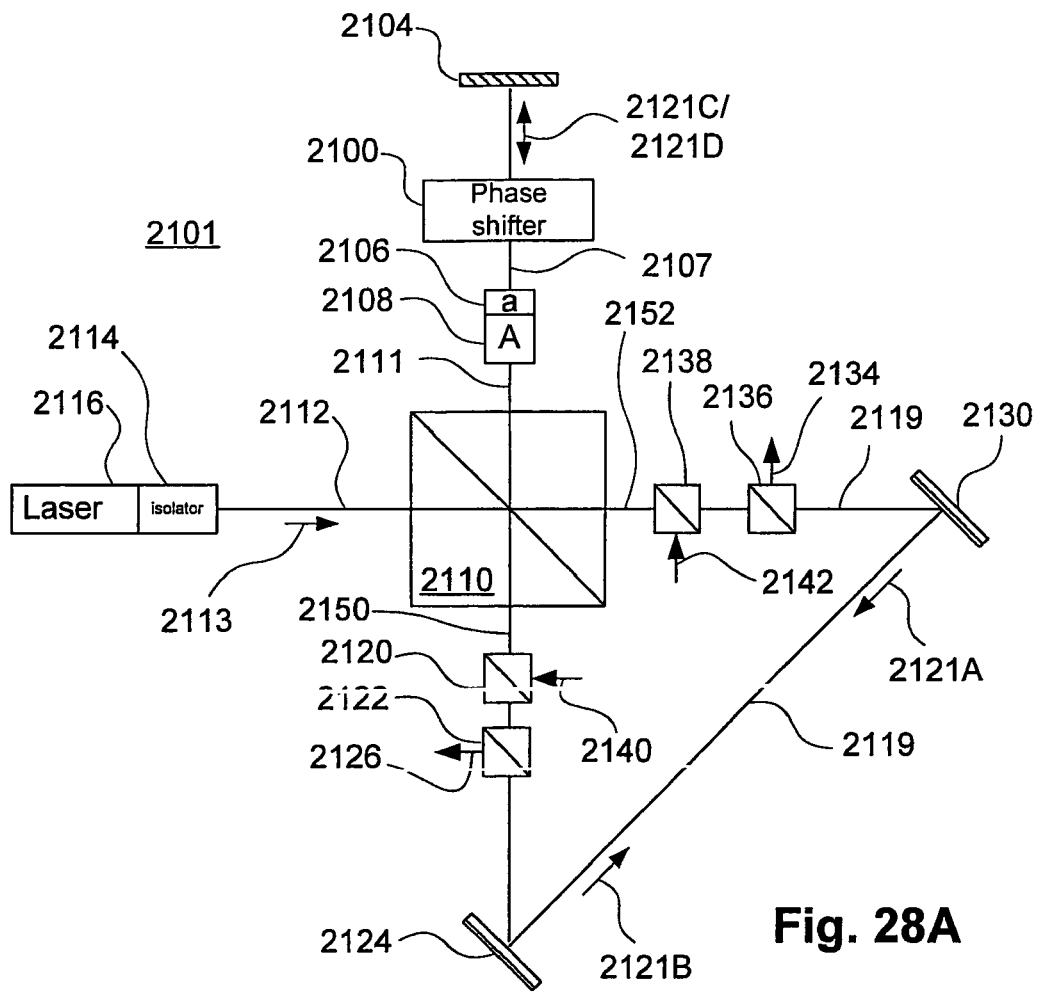
FIG. 28A is an illustration of an optical bistable device using a structure of an optical mirror loop.

Referring to FIG. 28A, another embodiment of a bistable device 2101 employs a laser source 2116 to inject a continuous beam 2113 through an isolator 2114 into a port 2112 of a beam splitter 2110, for example a dielectric beam splitter. The isolator 2114 prevents light returning from the same port 2112 from entering the laser source 2116. Light from the laser is applied to the beam splitter 2110 and divided thereby into a transmitted beam 2121A (going clockwise around the path 2119) and a reflected beam 2121B (going counterclockwise around the path 2119), which flow in opposite directions along the same path 2119. The transmitted beam 2121A is transmitted by the beam splitter 2110 and therefore suffers no phase change compared to the reflected beam 2121B, which suffers a $\pi/2$ radian phase change after being reflected by the beam splitter 2110. The transmitted and reflected beams 2121A and 2121B are guided around the path 2119 by reflectors 2124 and 2130 back to the beam splitter 2110.

At the beam splitter, part of the transmitted beam 2121A is transmitted again by the beam splitter 2110 into a path 2107 and part of the reflected beam 2121B is reflected again by the beam splitter 2110 into the same path 2107. The now twice-reflected beam 2121B and the twice transmitted beam 2121A are simultaneously inserted via the beam splitter 2110 into the same path 2107. The beams 2121A and 2121B propagate toward a reflector 2104 and back along the same path 2107 to the beam splitter 2110. Since the reflected beam 2121A is reflected twice, it suffers two phase rotations of $\pi/2$ radians compared to the transmitted beam 2121A whose phase is not rotated at all. Because of the opposite phases of the two beams 2121A and 2121B, when they propagate along path 2107, they cancel each other along this path, causing all of the light to propagate toward the isolator 2114 where it is blocked from entering back into the laser 2116. This is because on the path 2107, the reflected beam 2121B is $\pi$ radians out of phase with the transmitted beam 2121A, and on the path out the port 2112, they are in phase.

As the two beams 2121A and 2121B propagate along path 2107, they are amplified by an optical amplifier 2108 and an attenuator 2106 cooperating to produce a nonlinear gain curve similar to that discussed with regard to FIG. 12B, above. The two beams 2121A and 2121B pass through a phase shifter 2100 which adjusts the phase angles at which the two beams 2121A and 2121B interfere with the beam 2113 from the laser 2116 within the beam splitter 2110. Both the transmitted and reflected beams 2121 A and 2121B are adjusted by the same amount, since their paths 2107 are identical.

Initially, since the two beams 2121A and 2121B cancel each other along the path 2107, when they return to the beam splitter 2110, they have no effect on the beam 2113 from the laser 2116. However, if some perturbation (or inherent bias) causes one of the two beams 2121A or 2121B to be slightly stronger than the other, the dominant beam will not be completely canceled by the subordinate beam and a residual of the dominant beam will be applied at the port 2111 of the beam splitter 2110. The phase shifter 2100 may be adjusted such that the dominant beam reinforces itself by directing a larger fraction of the laser beam 2113 to be transmitted along in its direction along the path 2119. For example, if the dominant beam is the transmitted beam 2121A, the residual applied at 2111, assuming the phase adjustment is correct, will interfere constructively with the portion of the laser beam 2113 that is transmitted by the beam splitter 2110 and thereby added to the transmitted beam 2121A. Similarly, if the dominant beam is the reflected beam 2121B, the residual applied at 2111, assuming the phase adjustment is correct, will interfere constructively with the portion of the laser beam 2113 that is reflected by the beam splitter 2110 and thereby added to the reflected beam 2121B.

The path 2119 contains multiple beam splitters 2120, 2122, 2138, and 2136, which cause significant attenuation of the beams 2121A and 2121B. In addition, reflectors 2124, 2130, and 2104, the beam splitter 2110, the phase shifter 2100, and the free paths 2119 and 2107 may be responsible for attenuation as well. As a result, the residual may be relatively weak compared to the laser beam 2113 and have little biasing impact on it, unless compensated by the optical amplifier 2108. To overcome the net attenuation of the various paths, the amplifier 2108/attenuator 2106 combination may be configured such as to cause sufficient gain to overcome these losses such that the residual of the dominant one of beams 2121A and 2121B will progressively increase itself through the feedback mechanism of constructively interfering with the portion of the laser beam 2113 that feeds the dominant beam and destructively interfering with the portion that feeds the subordinate beam. The amplifier 2108/attenuator 2106 combination is preferably configured to provide a maximum output (i.e., when the optical amplifier 2108 is saturated) that substantially matches that of the laser beam 2113. Thus, when the dominant beam progresses toward the maximum defined by saturation of the amplifier 2108, it will cause the entire beam 2113 to be fed into the dominant beam path by constructive interference in the beam splitter 2110. Correspondingly, all of the subordinate beam will be nulled by destructive interference by the same dominant beam residual.

First and second outputs 2126 and 2134 are obtained by tapping some of the energy from the two beams 2121A and 2121B by means of the respective beam splitters 2122 and 2136, respectively. Some of the light in the transmitted beam 2121A is tapped by the beam splitter 2122 to form a first output 2126 and some of the light in the reflected beam 2121B is tapped by the beam splitter 2136 to form a second output 2134. The first and second outputs 2126 and 2134 may be used to determine which of the transmitted and reflected beams 2121A and 2121B is dominant, thereby to indicate a current state of the bistable device 2101. To change the state of the bistable device 2101, input signals 2140 and 2142 may be added in a phase alignment such that they interfere with the transmitted and reflected beams 2121A and 2121B, respectively. That is, input 2140 may be used to inhibit transmitted beam 2121A, by destructive interference in beam splitter 2120 and input 2142 may be used to inhibit reflected beam 2121B, by destructive interference in beam splitter 2138. Alternatively, input 2140 may be used to enhance transmitted beam 2121A, by constructive interference in beam splitter 2120 and input 2142 may be used to enhance reflected beam 2121B, by constructive interference in beam splitter 2138.

By reducing transmitted beam 2121A, using the input 2140, the state of the bistable device 2101 may be changed from a state where the transmitted beam 2121A is high to a state where the reflected beam 2121B can become the dominant beam and thereby progress toward a stable state in which the reflected beam 2121B receives all the laser beam energy 2113 by interference in beam splitter 2110. By enhancing transmitted beam 2121A, using the input 2140, the state of the bistable device 2101 may be changed from a state where the reflected beam 2121B is high to a state where the transmitted beam 2121A can become the dominant beam and thereby progress toward a stable state in which the transmitted beam 2121A receives all the laser beam energy 2113 by interference in beam splitter 2110. Analogous effects can be achieved by enhancing or suppressing the reflected beam 2121B by means of a suitable input 2142 applied to beam splitter 2138. In both instances, enhancing one of the beams 2121A or 2121B requires a phase of the corresponding input signal 2140 or 2142 to be opposite the phase used to suppress the one of the beams 2121A or 2121B.

Note that because some of the energy in the reflected beam 2121B is transmitted back toward the laser 2116 by the beam splitter 2110 and some of the energy in the transmitted beam 2121A is reflected back toward the laser 2116 by the beam splitter 2110, the isolator 2114 prevents this light from entering the laser cavity.

It should be clear from the above description that the device of FIG. 28A has two stable states which start with an initial unstable equilibrium generated by the device. It should also be clear that there is a substantial analogy between device 1810 of FIG. 27B and the device 2101 of FIG. 28A in terms of how they operate and the bistable behavior achieved. In both, a process begins with an unstable state in which all the light is directed by an interference device (e.g., 2110) away from a feedback path (e.g., 2107) and no light is directed along the feedback path (e.g., 2107) due to destructive interference between the portions of the beams that arrive back at the interference device (e.g. 2110). A transition to a certain stable state starts due to some perturbation that makes one of the beams (e.g. 2121A or 2121B) dominant or it is inherent due to bias in the system. The residual of the dominant beam returns to the interference device 2110 and enhances the intensity of the light following its own path while diminishing the intensity of the light in the subordinate path. This process continues as the residual of the dominant beam is reinforced by one or more iterations through the circuit. The process continues till the intensity at the feedback path is clamped to a saturation level by means of a nonlinear amplification device.

To assure on going transition to a stable state, the net gain along the feedback path (e.g., 2107 or 2119) should be greater than 1. To assure that the intensity of the subordinate beam, tapped by the outputs (e.g., 2126 or 2134), is close to zero, the clamped intensity of the residual beam on the feedback path (e.g., 2107) should be similar to the intensity of the beam from the laser arriving at the interference device (e.g., 2110).

To flip the stable state of the device (that is, to reverse it to its other stable state), an input signal is inserted at an input that suppresses the dominant beam or enhances the subordinate beam. The intensity at the input should be strong enough to inhibit the light intensity of the dominant beam so the residual beam at the feedback path 2107 will be dominated by the previously subordinate (and now-dominant) beam, thereby reversing the subordinate and dominant beams.

As mentioned, instead of suppressing the dominant beam using an input signal, the bistable can be switched by choosing the phase of a respective input signal to enhance the subordinate beam. In this case, the intensity of the input beam should be strong enough to increase the light intensity of the subordinate beam such that the subordinate beam overcomes the dominant beam. Once that is true, the once-subordinate beam residual will enhance itself and suppress the once-dominant beam by feedback. As soon as the process starts, it flywheels until the new stable state is reached. The switch from one beam dominating to the other in the residual beam along common path 2107 results in the switching between the stable states of the device.

Figure 28B:
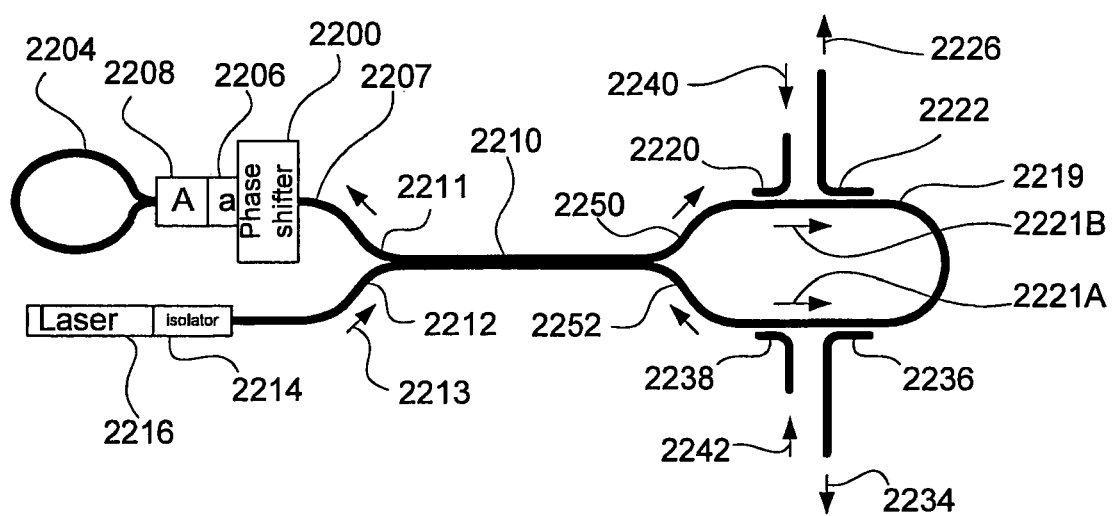
FIG. 28B illustrates an optical bistable device made of waveguides or planar waveguides.

Referring to FIG. 28B, another embodiment of a bistable device made of planar waveguides or fiber optics employs a laser source 2216 to inject a continuous beam 2213 through an isolator 2214 along a path 2212 into a directional coupler 2210. An isolator 2214 prevents light returning from the same port 2212 from entering back into the laser source 2216. Light from the laser is applied to the directional coupler 2210 and divided thereby into a bar beam 2221A (going counter-clockwise around the path 2219) and a cross beam 2221B (going clockwise around the path 2219), which flow in opposite directions along the identical path 2219. The bar beam 2221A is transmitted by the directional coupler 2210 and therefore suffers no phase change compared to the cross beam 2221B, which suffers a $\pi/2$ radian phase change after crossing over the directional coupler 2210. The bar and cross beams 2221A and 2221B are guided around the path 2219 which may be implemented as a waveguide, back to the directional coupler 2210.

At the directional coupler 2210, part of the bar beam 2221A passes again in a bar direction through the directional coupler 2210 into path 2207 and part of the cross beam 2221B again crosses over the directional coupler 2210 into round trip path 2207 terminated by a reflecting loop 2204. The cross beam 2221B crosses over the directional coupler 2210 twice and the bar beam 2221A passes through it twice in a bar direction. Both are simultaneously inserted via the directional coupler 2210 into the same path 2207 which progresses toward loop 2204 and back along the same path 2207 to the directional coupler 2210. Since the cross beam 2221B crosses the directional coupler 2210 again, it suffers another phase rotation of $\pi/2$ radians compared to the bar beam 2221A whose phase is not rotated at all. When the bar and cross beams 2221A and 2221B are merged on path 2207, they cancel each other along this path, causing all of the light to propagate toward the isolator 2214 where it is blocked from entering the laser 2216. This is because on the path 2207, the cross beam 2221B is or radians out of phase related to the bar beam 2221A, and on the path out the port 2212, they are in phase.

As the two beams 2221A and 2221B propagate along path 2207, they are amplified by an optical amplifier 2208 and an attenuator 2206 cooperating to produce a nonlinear gain curve similar to that discussed with regard to FIG. 12B, above. The two beams 2221A and 2221B pass through a phase shifter 2200 which adjusts the phase angles at which the bar and cross beams 2221A and 2221B interfere with the beam 2213 from the laser 2216 within the directional coupler 2210. Both the bar and cross beams 2221A and 2221B are adjusted by the same amount, since their paths 2207 are identical.

Initially, since the two beams 2221A and 2221B cancel each other along the path 2207, when they return to the directional coupler 2210, they have no effect on the laser beam 2213 from the laser 2216. However, if some perturbation (or inherent bias) causes one of the two beams 2221A or 2221B to be slightly stronger than the other, the dominant beam will not be completely canceled by the subordinate beam and a residual of the dominant beam will be applied at the port 2211 of directional coupler 2210. Phase shifter 2200 may be adjusted such that the dominant beam reinforces itself by directing a larger fraction of the laser beam 2213 to be transmitted along in its direction along the path 2219. In addition, the subordinate beam is further diminished by the self-reinforcement of the dominant beam because the interference that reinforces the dominant beam also inhibits the subordinate beam. For example, if the dominant beam is the bar beam 2221A, the residual applied at 2211, assuming the phase adjustment is correct, will interfere constructively with the portion of the laser beam 2213 that is sent in the bar direction by the directional coupler 2210 and thereby added to the bar beam 2221A. It will concomitantly suppress the portion of the laser beam 2213 that is sent in the cross direction by the directional coupler 2210 and thereby reduce the cross beam 2221B. The constructive interference with the portion of the laser beam 2213 that goes in the bar direction over the directional coupler 2210 also results in a diminution of the portion that crosses over into the bar beam 222 1B. Similarly, if the dominant beam is the cross beam 2221B, the residual applied at 2211, assuming the phase adjustment is correct, will interfere constructively with the portion of the laser beam 2213 that is crossed over by the directional coupler 2210 and thereby added to the cross beam 2221B. The constructive interference with the portion of the laser beam 2213 that goes in the cross direction over the directional coupler 2210 also results in a diminution of the portion that goes in the bar direction into the bar beam 2221B.

The path 2219 contains multiple optical couplers 2220, 2222, 2238, and 2236, which cause significant attenuation of the beams 2221A and 2221B. In addition, the directional coupler 2210 and the phase shifter 2200, etc. may be responsible for attenuation as well. As a result, the residual may be relatively weak compared to the laser beam 2213 and have little biasing impact on it, in the absence of amplification to compensate. To overcome the attenuation of the various paths, the amplifier 2208/attenuator 2206 combination may be configured such as to cause sufficient gain to overcome these losses such that the residual of the dominant one of beams 2221A and 2221B will progressively increases itself through the feedback mechanism. The feedback mechanism includes the residual constructively interfering with the portion of the laser beam 2213 that feeds the dominant beam and destructively interfering with the portion of the laser beam 2213 that feeds the subordinate beam. The amplifier 2208/attenuator 2206 combination is preferably configured to provide a maximum output that coincides with a saturation condition of the optical amplifier 2208/attenuator 2206 combination also referred in the instant specification as "clamped" intensity that substantially matches that of the laser beam 2213. Thus, when the dominant beam progresses toward its maximum, it will cause the entire beam 2213 to be fed into itself by constructive interference in the directional coupler 2210. At the same time, the portion of the laser beam 2213 that goes into the subordinate beam is nulled.

First and second outputs 2226 and 2234 are obtained by tapping some of the energy from the two beams 2221A and 2221B by means of the respective optical couplers 2222 and 2236. Some of the light in the bar beam 2221A is tapped by the optical coupler 2222 to form a first output 2226 and some of the light in the cross beam 222 1B is tapped by the optical coupler 2236 to form a second output 2234. The first and second outputs 2226 and 2234 may be used to determine which of the bar and cross beams 2221A and 2221B is dominant, thereby to detect a current state of the bistable device 2201.

To change the state of the bistable device 2201, input signals 2240 and 2242 may be added in a phase alignment such that they destructively interfere with the bar and cross beams 2221A and 2221B, respectively. That is, input 2240 may be used to inhibit bar beam 2221A, by destructive interference in optical coupler 2220 and input 2242 may be used to inhibit cross beam 2221B, by destructive interference in optical coupler 2238. Alternatively, the state of the bistable device 2201 may be changed by input signals 2240 and 2242 by adding in a phase alignment such that they constructively interfere with the bar and cross beams 2221A and 2221B, respectively. That is, input 2240 may be used to enhance the bar beam 2221A and input 2242 may be used to enhance the cross beam 2221B. By reducing bar beam 2221A using the input 2240, the state of the bistable device 2201 may be changed from a state where the bar beam 2221A is high to a state where the cross beam 2221B can become the dominant beam and progress toward a stable state in which the cross beam 2221B receives all the laser beam 2213 energy by interference in directional coupler 2210. In this state, the bar beam 2221A receives substantially none of the laser beam 2213 energy. By increasing the bar beam 2221A using the input 2240 in an opposite phase, the state of the bistable device 2201 may be changed from a state where the cross beam 2221B is high to a state where the bar beam 2221A can become the dominant beam and progress toward a stable state in which the bar beam 2221A receives all the laser beam energy 2213. In this state, the cross beam 2221B receives substantially none of the laser beam 2213 energy. In analogous manner, the cross beam 2221B may be enhanced to switch from a state where the bar beam 2221A is dominant or diminished to switch the bistable device 2101 from a state where the cross beam 2221B is dominant.

Note that because some of the energy in the bar and cross beams 2221A and 2221B is transmitted back toward the laser 2216 by the directional coupler 2210 and Some of the energy in the bar beam 2221A is reflected back toward the laser 2216 by the directional coupler 2210, the isolator 2214 prevents this light from entering the laser cavity.

It should be clear from the above description that the device of FIG. 28B has two stable states that start with an initial unstable equilibrium existing at the initial state of the device 2201. It should also be clear that there is substantial analogy between devices 1810 of FIG. 27B, 2101 of FIG. 28A, and the device 2201 of FIG. 28B in terms of how they operate and the bistable behavior achieved. In both, a process begins with an unstable state in which all the light is directed by an interference device (e.g., 2210) away from a feedback path (e.g., 2207) and no light is directed along the feedback path (e.g., 2207) due to destructive interference between the portions of the beams that arrive back at the interference device (e.g. 2210). A transition to a certain stable state starts due to some perturbation that makes one of the beams (e.g. 2221A or 2221B) dominant or it is inherent due to bias in the system. The residual of the dominant beam returns to the interference device and enhances the intensity of the light following its own path while diminishing the intensity of the light in the subordinate path. This process continues as the residual of the dominant beam is reinforced by each iteration through the circuit. The process continues till the intensity at the feedback path is clamped to a saturation level by means of a nonlinear amplification device. To assure on going transition to a stable state, the net gain along the feedback path (e.g., 2207 or 2219) should be greater than 1. To assure that the intensity of the subordinate beam, tapped by the outputs (e.g., 2226 or 2234) is close to zero, the clamped intensity of the residual beam on the feedback path (e.g., 2207) should be similar to the intensity of the beam from the laser (e.g. 2216) arriving at the interference device (e.g., 2210).

To flip the stable state of the device and thereby reverse it to an opposing stable state, an input signal is inserted at an input that suppresses the dominant beam or enhances the subordinate beam. The intensity at the input should be strong enough to reverse the difference between the current dominant and subordinate beams such that the residual's phase switches to that of the subordinate component. This can be done by enhancing the subordinate beam or suppressing the dominant beam.

Figure 28C:
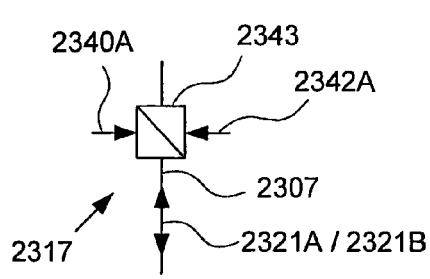
FIG. 28C illustrates a configuration in which a single beam splitter is used to couple two input signals into the device of FIG. 28D.
Figure 28D:
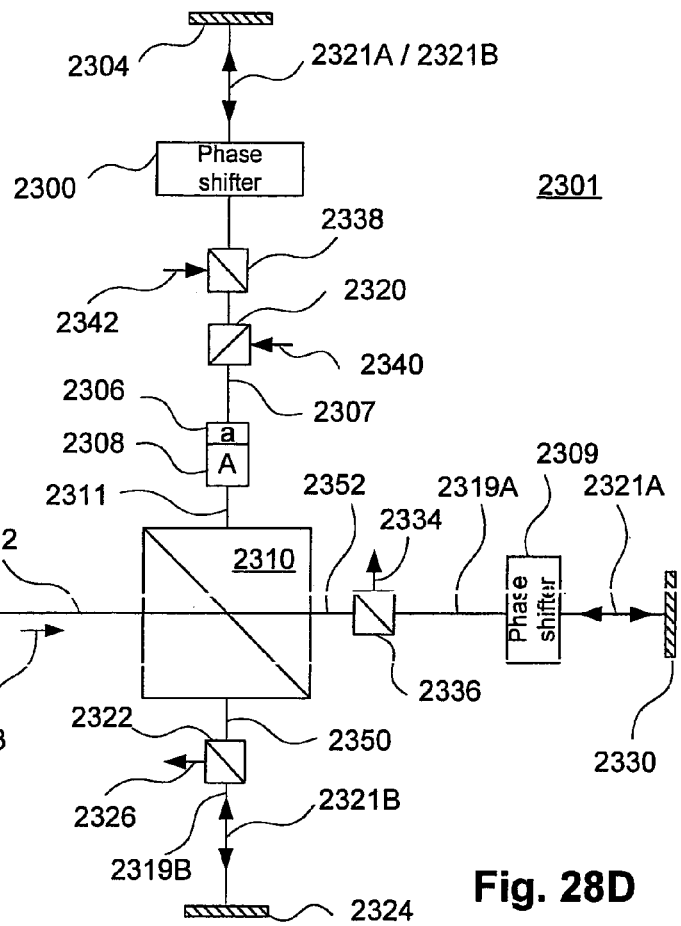
FIG. 28D is an illustration of an optical bistable device using retro reflectors.

Referring now to FIG. 28D, a bistable embodiment that is similar to that of FIG. 28A directs transmitted and reflected beams 2321A and 2321B from a beam splitter 2310 along separate transmitted and reflected paths 2319A and 2319B. Recall that in the embodiment of FIG. 28A, the transmitted and reflected beams 2121A and 2121B went in opposite directions along an identical path 2119 (FIG. 28A). Both beams 2321A and 2321B return to the beam splitter 2310 after being reflected by respective reflectors 2330 and 2324 and are directed into a common path 2307 by beam splitter 2310. To arrive at common path 2307, reflected beam 2321B is transmitted through the beam splitter 2310 and transmitted beam 2321A is reflected by the beam splitter 2310. That is, the transmitted beam 2321A returns to the beam splitter 2310 backwardly along the path 2319A and is reflected into the path 2307. Similarly, since the reflected beam 2321B returns to the beam splitter 2310 backwardly along the path 2319B, it is transmitted into the path 2307.

Each beam 2321A and 2321B suffers one reflection and one transmission through the beam splitter 2310. This is in contract to the situation in the embodiment of FIG. 28A where the reflected beam 2121B suffered two reflections and the transmitted beam 2121A suttered two transmissions. Thus, both beams 2321A and 2321B are phase-rotated by $\pi/2$ radians by the respective reflections. Another difference in the present embodiment from that of FIG. 28A is that since the two paths 2319A and 2319B are completely different, one beam, either transmitted beam 2321A or reflected beam 2321B can arrive at common path 2307 with a different phase from that of the other. A phase shifter 2309 in path 2319A can be used to adjust the relative phases of the transmitted and reflected beams 2321A and 2321B when they are inserted into path 2307. If the phase shifter 2309 is adjusted properly, the phase angle between the beams 2321A and 2321B will be $\pi$ and the two beams 2321A and 2321B will cancel each other at path 2307. Note that the phase shifter 2309 can be located on path 2319B to provide the same function. The transmitted and reflected beams 2321A and 2321B return to the beam splitter 2310 and are subsequently transmitted and reflected by it again and interfere with laser light 2313 from the laser 2316. Some of the beam energy from beams 2321A and 2321B may return to the laser 2316 by passing through port 2312, but this energy will be blocked by isolator 2314.

As discussed above, the phase alignments of transmitted and reflected signals 2321A and 2321B on path 2307 should be such that:

1. They are opposite in phase when combined to form a feedback signal, e.g., the signal in the feedback path 2307 and inserted back into the beam splitter 2310 via port 2311.
2. They are applied to the port 2311 on return to the beam splitter 2310 such that the transmitted signal 2321A reinforces itself by constructively interfering with light from the laser light 2313 transmitted into path 2319A and destructively interfere with laser light 2313 reflected into the path 2319B. If the above conditions are satisfied, the reflected signal 2321B will direct laser light 2313 into the reflected path 2319B.

As in the embodiment of FIG. 28A, if one beam 2321A and 2321B becomes dominant, it will reinforce itself in a manner that is analogous to the behavior of the device of FIG. 28A, which should be clear from the above discussion. The optical amplifier 2308 and attenuator 2306 perform the same functions in the present embodiment and in the embodiment of FIG. 28A.

Other parts of the circuit perform analogous functions to their counterparts in FIG. 28A. That is, the input beam splitters 2338 and 2320 and the output beam splitters 2322 and 2336 perform functions that are essentially the same as performed by the input beam splitters 2138 and 2120 and the output beam splitters 2122 and 2136 in the embodiment of FIG. 28A. Input signals 2340 and 2342 interfere with both beams 2321A and 2321B and thereby may be used to control them to provide for switching of stable states of the system.

Note that the input beam splitters 2338 and 2320 are located in the common path 2307, which corresponds to the common path 2107 of the embodiment of FIG. 28A. This is an alternative location for the input beam splitters 2338 and 2320 which may be applied to the embodiment of FIG. 28A as well, since they have the effect of canceling respective beams 2321A or 2321B by virtue of the relative phase of the input beam 2342 or 2340 to the transmitted and reflected beams 2321A and 2321B.

Referring also to FIG. 28C, note that in either embodiment 2301 of FIG. 28D or 2101 of FIG. 28A, the input beam splitters 2338 and 2320 could be replaced with a single beam splitter as indicated at 2317 with the respective inputs 2342A and 2340A, applied from opposite sides, to achieve the same effect. Note also, that a single input 2342A and 2340A may be used with different phases to switch the bistable device (2301 or any of the others). Also note that an attenuator (not shown) might be required in the path 2319B to balance the effect of the phase shifter 2309 so there is no significant bias in the beams 2321A and 2321B.

While the embodiment 2301 has two input beam splitters 2338 and 2320, a single beam splitter may be used in an alternative configuration indicated generally at 2317 of FIG. 28C. This beam splitter 2343 may be located on the common path 2307 to combine input signals 2340A or 2342A to transmitted and reflected beams 2321A and 2321B. In this configuration, input 2342A may be added to beam 2321A and 2321B to enhance or diminish them respectively, depending on its phase, while the beams are propagating upwardly in the figure and input 2340A may be added to beams 2321A and 2321B to enhance or diminish them, respectively, while the beams are propagating downward. If the phase of either input 2340A or 2342A can be changed selectively, then only one input 2340A or 2342A may be required since the effect of adding one phase may be to diminish a first of the beams while enhancing the second while the effect of adding another opposite phase may be to diminish the second of the beams while enhancing the first.

All the other components of the embodiment 2301 of FIG. 28D, including the phase shifter 2300, reflector 2304, laser 2316, isolator 2314, ports 2350 and 2352 and outputs 2326 and 2334 perform functions that are analogous to the functions of heir counterparts in the embodiment 2101 of FIG. 28A as should be clear from the above discussion. Beam splitters 2336 and 2322 extract some of the energy from beams 2321A and 2321B into output signals 2334 and 2326, respectively, to drive upstream devices (not shown) or indicate a current state of the bistable device 2301. Alternatively, only one output beam splitter 2336 or 2322 may be used because the state of one implies the state of the other.

Figure 28E:
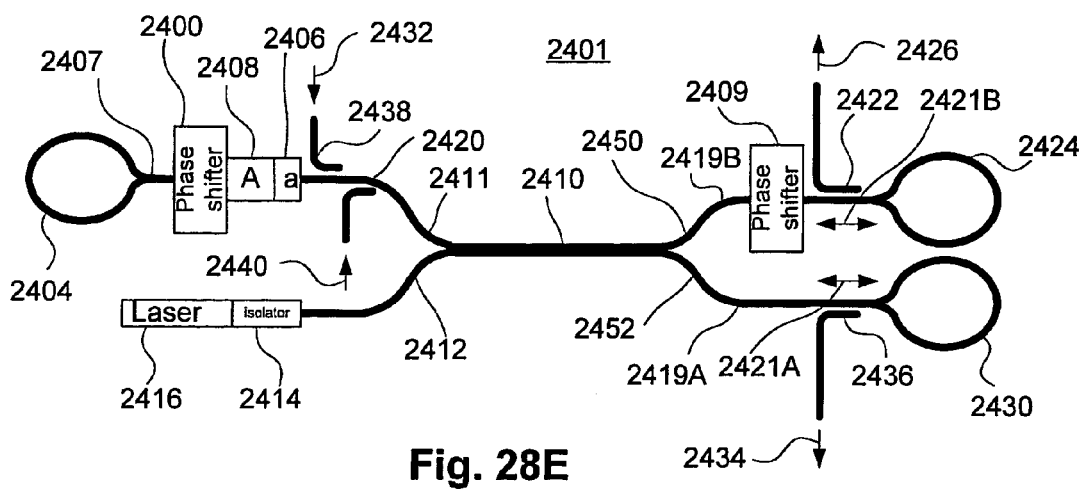
FIG. 28E illustrates an optical bistable device made of waveguides or planar waveguides.

Referring now to FIG. 28E, an embodiment that is similar to that of FIG. 28D, but which uses waveguides and directional coupler devices for beam steering and summing. As in the 2201 embodiment of FIG. 28B, a directional coupler 2410 is used to separate bar and cross beams 2421A and 2421B. However, unlike the FIG. 28B embodiment, and as in embodiment 2301 of FIG. 28D, the bar and cross beams 2421A and 2421B take separate paths 2419A and 2419B, respectively, to be reflected by respective loops 2430 and 2424. These two beams 2421A and 2421B return to the directional coupler 2410 via respective ports 2452 and 2450. The bar beam 2421A returns from its loop 2430 then crosses the directional coupler 2410 through port 2411 and is inserted into a common path 2407 which it loops through a return loop 2404 and back to the port 2411. The cross beam 2421B returns from its loop 2424 then goes in a bar direction through the directional coupler 2410 through port 2411 and is inserted into the common path 2407 which it loops through a return loop 2404 and back to the port 2411. Thus, both beams 2421A and 2421B are combined in common path 2107. A phase shifter 2409 performs a function that is essentially the same as the phase shifter 2309 of the embodiment 2301 of FIG. 28D in that it ensures the phases of the two beams 2421A and 2421B are opposite. That is, it ensures the bar and cross beams 2421A and 2421B are inserted in a common path 2407 such that they are subtracted. When the beams 2421A and 2421B are equal, a null beam is applied to the port 2411 and when they are unequal, a residual of the beams 2421A and 2421B is applied at port 2411.

The residual determines the phase applied at port. A phase shifter 2409 is adjusted to ensure that the beams 2421A and 2421B return to the directional coupler 2410 in such a phase that any residual due to imbalance in the two beams 2421A and 2421B has a self-reinforcing effect on the dominant beam as in the previous embodiments. Specifically, when the residual beam results due to the bar beam 2421 A being dominant, the phase of the residual applied at port 2411 will be opposite the phase applied a port 2411 when the residual beam results due to the cross beam 2421B being dominant. If the cross beam 2421B is dominant, the phase of the residual signal applied at 2411 will constructively interfere in the directional coupler 2410 with the light from the laser 2416 entering port 2412 and leaving through port 2450. At the same time, the same residual will destructively interfere with light from the laser 2416 entering port 2412 and leaving through port 2452. Concomitantly, if the bar beam 2421A is dominant, the phase of the residual signal applied at 2411 will constructively interfere in the directional coupler 2410 with the light from the laser 2416 entering port 2412 and leaving through port 2452. At the same time, the same residual will destructively interfere with light from the laser 2416 entering port 2412 and leaving through port 2450. Thus, the dominant beam will reinforce itself as in other bistable embodiments. Again, as in the other embodiments, an amplifier 2408 and attenuator 2406 provides non-linear amplification to overcome losses in the circuit and ensure state-clamping. Also, light returning to the laser from port 2412 is blocked from entering the laser cavity by isolator 2414.

As in the embodiment of FIG. 28B, optical junctions 2438, 2420, 2422, and 2436 are used as link input 2432 and 2440 and output signals 2426 and 2434, with various portions of the circuit of 2401, respectively. As with other embodiments, it is possible to use only one of the inputs by changing the phase of the applied signal to enhance the subordinate or suppress the dominant beam. Also it is possible to use only one of the output signals 2426 and 2434 to detect the current state of the device 2401. The details of how the bistable 2401 changes state will not be described in further detail here since the roles of the components should be clear from the discussions of FIGS. 28A–28D.

Figure 29A:
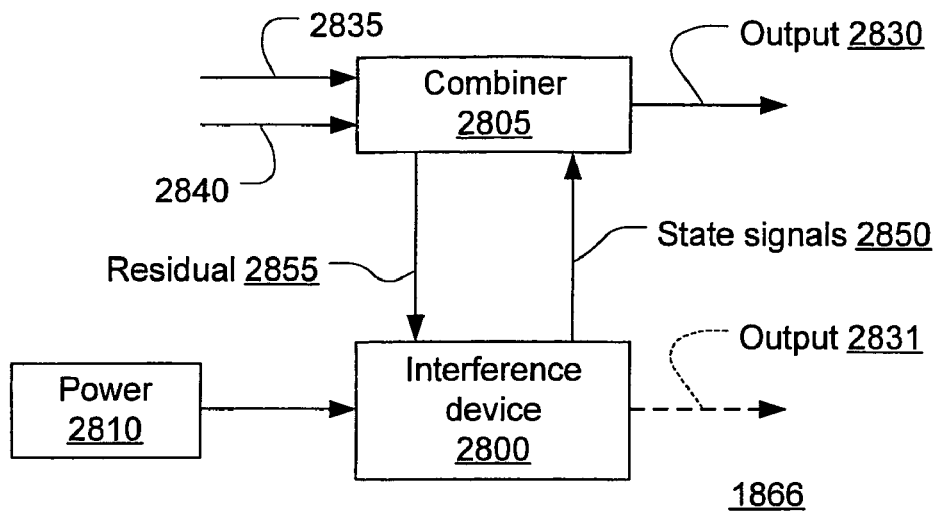
FIG. 29A is a schematic block diagram illustration for the bistable devices illustrated by FIGS. 27A–27E and 28A–28E.

Referring to FIG. 29A, various bistable device embodiments have been discussed. In the further embodiments below, various applications of bistable devices are discussed. For convenience in discussing such applications of bistable devices, a reference embodiment of a bistable device 1866 will now be described.

As should be clear form the foregoing, the bistable devices, exemplified by bistable device 1866, may include one or more inputs. For example, inputs 2835 and 2840, may be provided to introduce biasing signals to change the state of the bistable device. Each input 2835 and 2840 may apply signals of a respective phase to form a residual signal 2855 that is applied to an interference device 2800. Alternatively, a single input (e.g., input 2835) may be used whose phase is changed to effect state-switching of the bistable device 1866. The residual signal 2855 biases the interference device 2800 to direct energy from a power signal 2810 to direct its energy in favor of one of multiple state signals 2850, which are fed back to the combiner 2805.

The combination of state signals 2850 which the one or more inputs 2835 and 2840 as well as an extraction of energy to provide an output 2830 is represented by the single combiner 2805. An alternative location is shown for the output 2830 at 2831. The interference device 2800 receives the residual signal 2855 and coherently combines it with energy from the power source 2810 (e.g., a laser) to form the state signals 2850. Although not shown, the signals may be controlled to ensure proper phase alignment and amplified with a nonlinear amplification device.

The illustration of FIG. 29A is an abstraction in which each part may correspond to one or more parts of an embodiment. For example, in the embodiment of FIGS. 28C and 28D, the combiner 2805 represents the beam splitter 2343, which coherently combines two inputs 2340A and 2342A with the feedback state signal 2850. One or both of the outputs 2334 and 2326 correspond to the outputs 2830 or 2831. The transmitted beam 2321A is represented by the state signals 2850 and the reflected beam is represented by the residual signal passing through the port 2311 into the beam splitter 2310. The laser 2316 corresponds to the power source 2810.

Figure 29B:
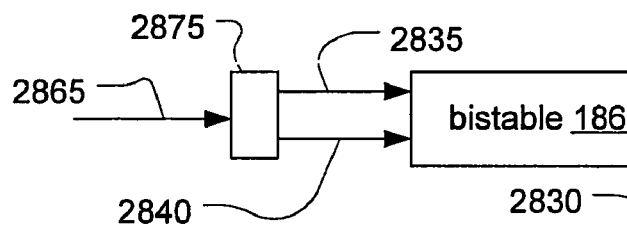
FIGS. 29B and 29C illustrate an optical toggle device and an optical monostable device, respectively.

Referring to FIG. 29B, in a toggle application of the bistable device 1866, the two inputs 2835 and 2840 are used. The output 2830 may be one or more outputs, depending on the configuration and the requirements of an external circuit. A signal splitter 2875 applies a single input signal 2865 to the first and second inputs 2835 and 2840. In this configuration, each input signal flips the state of bistable device 1866 from its current stable state to its other stable state.

Figure 29C:
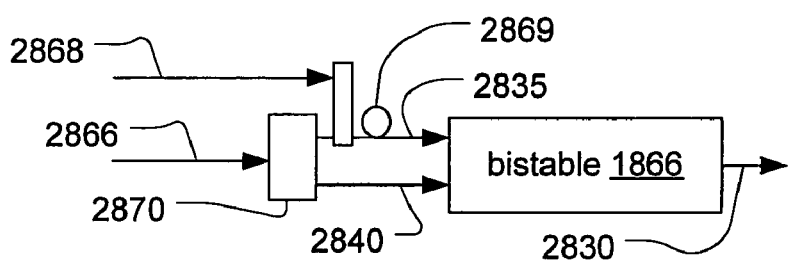

Referring to FIG. 29C, the bistable device 1866 may also be configured to function as a monostable device. The output is identified as 2830 and may be one or both outputs indicated in the foregoing or later embodiments to be discussed. Such a device accepts a single input at 2866 and distributes it through a signal splitter 2870 to a delay line 2869 on the left input 2835 of the bistable device 1866 and to the right input 2840 of the bistable device 1866. Thus, a signal applied to the input 2866 propagates to the right input 2840 immediately and only after a delay to the left input 2835. As a result, the bistable device 1866 goes into the R-high state initially and then reverts to the L-high state. To ensure the bistable device 1866 is in the L-high state initially, a reset 2868 may be used to place it in such state. The need for the reset may depend on the application.

Figure 29D:
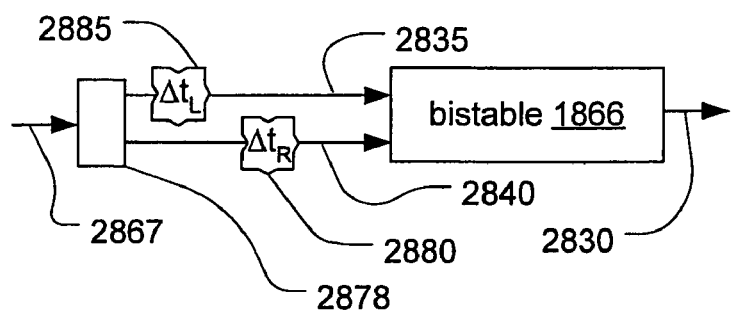
FIG. 29D is an illustration of an optical bistable device that flips its state according to the symbols of the header and the trailer of an optical packet.

Referring to FIG. 29D, the bistable device 1866 may also be configured as an addressable device. The output is identified as 2830 and may be one or both outputs indicated in the foregoing or later embodiments to be discussed. The addressable device may pass a signal to one of the left and right inputs 2835 and 2840 only if it contains a symbol matching one of the gates 2885 and 2880. Thus, a first symbol corresponding to gate 2885 switches the bistable device 1866 to the L-high state and a second symbol corresponding to gate 2880 switches the bistable device 1866 to the R-high state. As seen before, such a device accepts a single input at 2867 and distributes it through a signal splitter 2878 to both branches, passing through a respective symbol matching gates 2885 and 2880, and leading to both inputs 2835 and 2840 of the bistable device 1866.

Figure 30A:
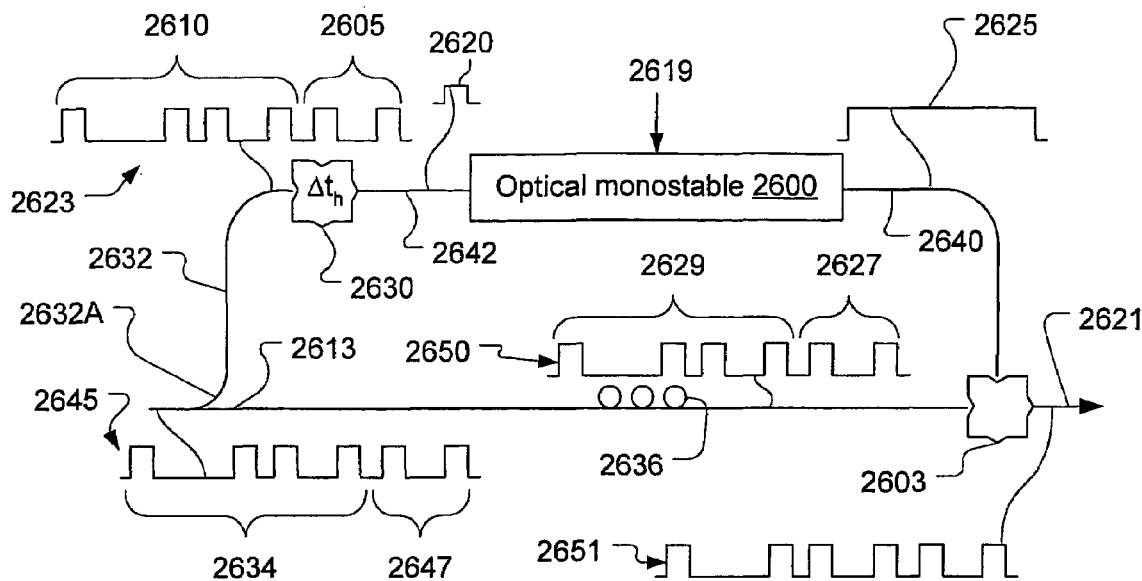
FIG. 30A illustrates a packet/cell gate using a header coincidence-gate and an optical monostable device.

Referring now to FIG. 30A, an application of the optical monostable discussed with reference to FIG. 29C, is used to switch a cell 2645. The cell 2645 is substantially the same as the cell 1621 as described with reference to FIG. 25E in that it contains a header 2647 and payload 2634. The header 2647 and payload 2634 are configured to have pulses with different phase relationships or different (odd vs. even) spacing as described with reference to FIGS. 25C and 25D for the same reasons. Cell (packet) 2645 is divided into two images, image 2623, containing header 2605 and payload 2610, that is directed through guide 2632 to header coincidence-gate 2630, and image 2650, containing header 2627 and payload 2629, that is directed by guide 2613 to coincidence gate 2603. That is, the header 2605 (image of 2647) triggers a coincidence pulse 2620 at the output 2642 of header gate 2630 when the delay of the header gate 2630 matches pulse spacing of the header 2605 (2647). As explained above, the cell (packet) 2645 is split into two images by a junction 2632A, one of which 2623 is applied to the header gate 2630 and the other of which 2650 propagates along a delay path 2613, having a delay 2636. If the coincidence pulse 2620 is generated, it triggers the optical monostable 2600 which generates a long pulse 2625 on a single output 2640.

As should be clear from the foregoing discussion and particularly the discussion of the monostable shown in FIG. 29C, the output 2640 may be either of the outputs that taps energy from one of the two feedback loops of any of the bistable embodiments. For instance, the output 2640 may be the output 2134 of the embodiment of FIG. 28A. In that case, the optical monostable 2600 would be initially in a state in which the transmitted beam 2121A of FIG. 28A was the dominant beam. The operation of optical monostable device 2600 of FIG. 30A is explained with the assistance of the illustrations of device 2101 and 1866 shown in FIGS. 28A and 29C, respectively. A first image of the coincidence pulse 2620 on the direct line 2840 (FIG. 29C) would be applied to either the input 2140 or 2142 (FIG. 28A) at such phase as either to suppress the dominant transmitted beam 2121A or enhance the subordinate reflected beam 2121B. If need be, the image of the pulse 2620 may be amplified. This causes the bistable to switch its state until the second image of the coincidence pulse 2620 on the delayed line 2835 (FIG. 29C) arrives on the other input (or same input) either to suppress the dominant reflected beam 2121B or enhance the subordinate transmitted beam 2121A. While the reflected beam 2121B is dominant, the output 2134 has a high signal and thus, for this interval, a long pulse is generated as indicated at 2625 (FIG. 30A). This pulse 2625 is applied, to coincidence gate 2603, in a manner similar to the pulse 1620D in FIG. 25E to cause cell (packet) 2650 to be passed through the coincidence gate 2603 and to appear at output 2621 as call (packet) 2651.

As in the embodiment of FIG. 25B that is used for the purposes of cells and packets routing, multiple instances of the cell (packet) switch of FIG. 30A may be tied to a common input 1788 (FIG. 25B), each corresponding to the blocks labeled 1551A–1551C and including any number of cell (packet) switches. The result, as discussed with reference to FIG. 25B, is a demultiplexer capable of switching any size of cells and packets. It should be clear that in the embodiment of FIG. 30A, the amount of energy that is required in the coincidence pulse 2620 need only be sufficient to trigger the monostable. As such, the cell (packet) length that can be handled is independent of the energy of this pulse, unlike the embodiment of FIGS. 25A, 25E, and 25K, which must spread the energy of the coincidence pulse over many pulses of the cells (packets). Note that the delay 2636 is preferably sized to ensure that the cell image 2650 coincides at the gate 2603 with the long pulse 2625 and in the proper phase to cause it to produce a coincidence image at the output port 2621. Port 2619 of optical monostable 2600 is the reset port of device 2600 and is used, similar to port 2868 of FIG. 29C, to determine the initial state of device 2600.

Figure 30B:
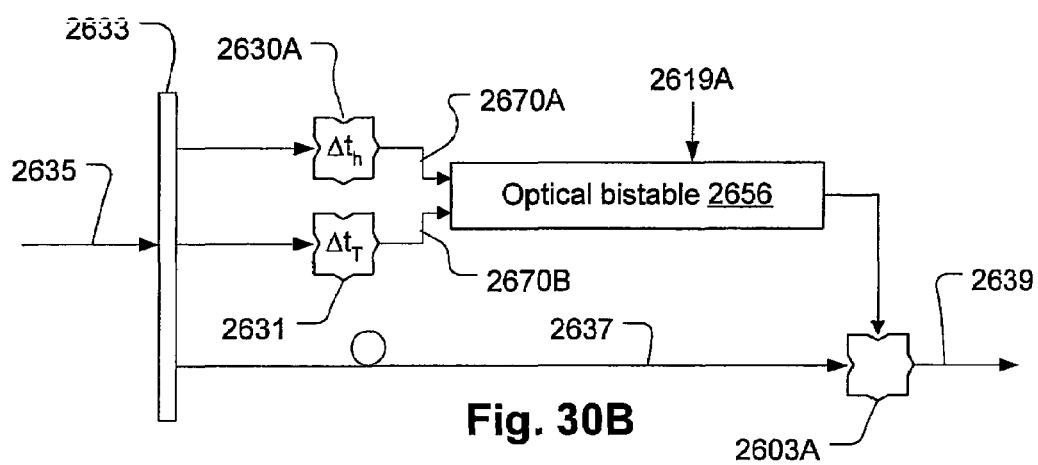
FIG. 30B illustrates a packet/cell gate having optical header and trailer coincidence-gates and an optical bistable device.

Referring to FIG. 30B, in another switch embodiment an optical bistable 2656 with respective turn-on and turn-off inputs 2670A and 2670B. The latter may correspond to the inputs 2835 and 2840 of the bistable devices 1866 illustrated in FIGS. 29B–29D and be used to inhibit the dominant beams respective to different states of the bistable device 2656. Images of a packet applied at an input 2635 to a distributor 2633 are applied to header and tail gates 2630A and 2631, each of which selects a particular symbol to output a coincidence pulse to the respective on/off the turn-on and turn-off inputs 2670A and 2670B. An image is also applied to a delay line 2637 which leads to a gate 2603A. Port 2619A of optical bistable 2656 is the reset port of device 2656 and is used, similar to port 2619 of FIG. 30A, to determine the initial state of device 2656.

Figure 30C:
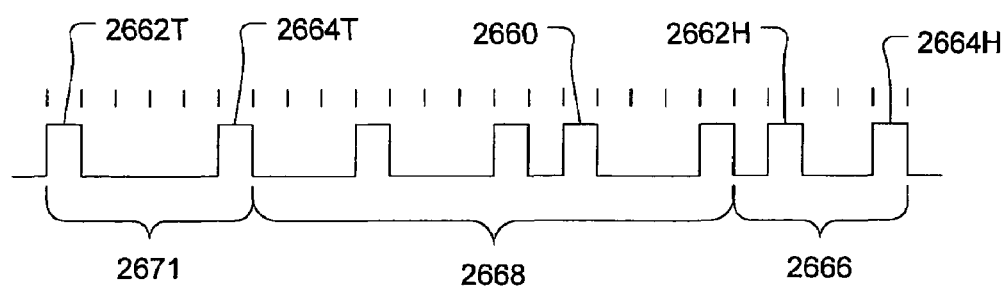
FIG. 30C is an illustration of an optical packet that is gated by the gate of FIG. 30B, having a header and a trailer.

Referring also to FIG. 30C, when a header symbol 2666 arrives at the header gate 2630A of FIG. 30B and matches the gate's delay time, a coincidence pulse is applied to the turn-on input 2670A. When a tail symbol 2671 arrives at the tail gate 2631 and matches the gate's delay time, a coincidence pulse is applied to the turn-off input 2670B. The header and tail gates 2630A and 2631 may be configured with delays between pulses 2664H and 2662H and 2664T and 2662T, respectively, having the same allowed time slots to prevent pulses 2660 (typ.) of payload 2668 from triggering a coincidence pulse in either. With appropriate timing in the delay line 2637, the bistable device 2656 will generate a long control pulse which will be applied to the gate 2603A to cause the payload 2668 to be imaged onto the output 2639 (with or without header 2666 and/or tail and 2671) by causing the gate 2603A to form a coincidence signal therefrom.

Note that in the embodiment of FIG. 30B and the method of FIG. 30C, the header gate 2630A and the tail gate 2631 may be configured to be responsive only to spaced pulse symbols 2666 and 2671 separated by an odd (or even) number of time slots while the payload pulses 2660(typ.) are located in time slots separating them by an even (or odd-different from the header and tail symbols) number of time slots. Alternatively, the header and tail symbols 2666 and 2671 may employ a different phase difference between pulse pairs (e.g. 2662H and 2664H or 2662T and 2664T), that differs from the phase difference between pulses 2660 (typ.) of payload 2668, as in the embodiment of FIG. 25D. Yet another alternative is to employ phase only or phase plus pulse-spacing control or be of a different polarization from the payload pulses 2668. The above may benefit from the use of threshold devices. As should be clear with respect to all of the bistable embodiments above, some minimum level of the input signal will be required to cause the bistable to switch to a target state. This inherent level-discriminating capacity may be employed to advantage by permitting the use of a symbol scheme in the address and tail (or address-only for the monstable embodiment), which produces many different output levels. For example, a gate in the six-phase scheme described with respect to FIG. 23U produces a coincidence pulse only 33% higher, when the phase-symbol matches, that the closest missing pulse (where the phase-symbol does not match, but is as close as allowed with matching). It should be clear that the optical monostable 2600 (FIG. 30A) or bistable 2656 (FIG. 30B) (or other bistable embodiments) may be configured such that it does not change its state in response to a pulse whose magnitude is 33% lower than the maximal pulse but does change its state when the magnitude of the pulse (e.g. 2620 of FIG. 30A) is at the maximal level. The above applies equally to other schemes described in the current specification such as polarization. Thus, the bistable embodiments may be capable of discriminating coincidence pulse levels that are close to the "matching" level, (main coincidence pulses) giving a designer the ability to provide higher symbol density. Of course the header and tail symbols may also employ polarization in a similar manner and may include pulse spacing as well. Thus the bistable and the monostable optical devices described above may be used also to perform the cancellation of artifact pulses (such as done by the threshold devices described above) by not responding to pulses having amplitude lower than the amplitude of the main coincidence pulses.

Note that in any of the foregoing embodiments, a reset may be provided to initialize the bistable device to an initial expected state in applications where an initial state may not be guaranteed. For example, a reset is illustrated at 2868, 2619, 2619A in FIGS. 29C, 30A, and 30B, respectively.

Figure 30D:
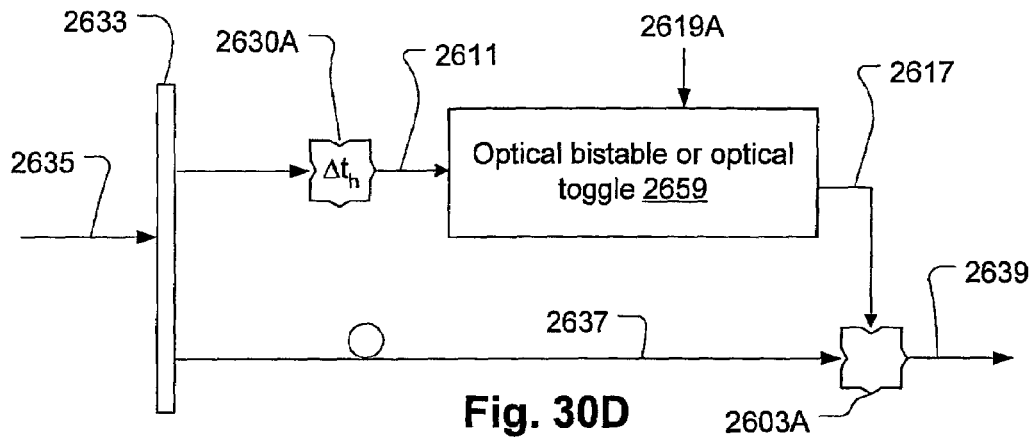
FIG. 30D illustrates a packet/cell gate having optical header coincidence-gates and an optical toggle device.

Referring to FIG. 30D, another implementation of a bistable for switching employs either an optical toggle or optical bistable 2659 using a single input 2611. As FIG. 30D is a slight modification of the embodiment describing FIG. 30B, the major of numerical references is kept. In the case of a toggle 2659, the configuration of FIG. 29B, implemented in the design of FIG. 30B, may be used with the single input 2611 (FIG. 30D) corresponding to input 2865 (FIG. 29B). Alternatively, the single input 2611 may correspond to an input for any of the bistable embodiments, which applies its signal to either of the beams (the dominant beam or the subordinate beam). Thus, the input device may be for example 2140 or 2142 of FIG. 28A, 2240 or 2242 or FIG. 28B, 2340 or 2342 of FIG. 28D, etc.

As discussed with reference to FIG. 29B, when a pulse is received on the input line 2611 of a toggle, the bistable 2659 may switch from one state to the other. If the output 2617 is an output indicating the state of the subordinate signal of the bistable within the toggle device 2659, then change of state will cause it to indicate the dominant signal and therefore it will go high. This may happen when a coincidence pulse is generated by a header symbol (not shown) as previously discussed with regard to FIGS. 30A and 30B. However, in the present embodiment, the tail symbol (not shown) may be identical to the header symbol. This is because a second coincidence pulse from the gate 2630A will switch the toggle device 2659 again back to the state where the output 2617 goes low again. It should be clear, in such a case, that if an image of a cell (packet) is carried on the delay line 2637, the on-state will produce a long pulse that coincides with the image of the data cell at the gate 2603A causing it to be transmitted (with or without the header or the tail).

Figure 30E:
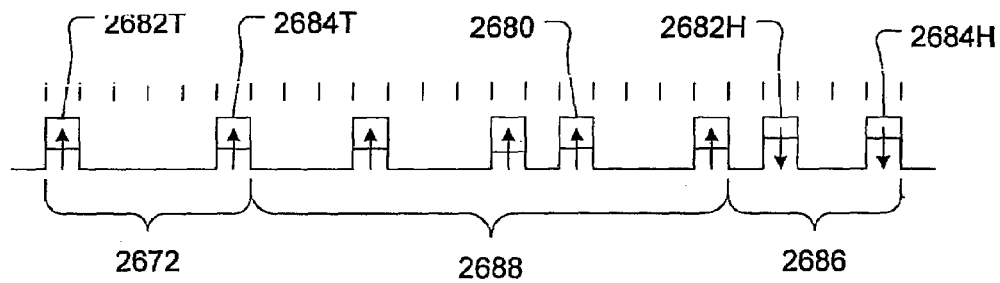
FIG. 30E is an illustration of an optical packet that is gated by the gate of FIG. 30D, having a header and a trailer encoded by time and phase modulation.

In the alternative embodiment where the optical bistable or optical toggle 2659 is an optical bistable, the header and tail symbols may be configured as shown in FIG. 30E. The relative phases of the pulses are illustrated. A header code, including first pulse 2684H and a second header pulse 2682H have a certain phase relationship, both indicated as being $3\pi/2$ radians. The payload 2688 pulses, 2680 (typ.), have a phase that corresponds to the phase that can not produce a main coincidence pulse at header coincidence gate 2630A and thus can not trigger any bistable or toggle device such as device 2659 of FIG. 30D. Pulses 2680 (typ.) of payload 2688 are indicated as being at $\pi/2$ radians, but this may be any value different than the header symbol's pulse phases. The tail symbol 2672 has two pulses 2684T and 2682T whose phases are opposite those of the header symbol 2686.

As should be clear from the discussion of gates, the relative phases of two coincidence pulses determines which output of the gate a pulse will emanate from. If both pulses are phase-rotated by an arbitrary amount, it changes the phase of the coincidence pulse by the same amount. Thus, the phase of the coincidence output pulse may be determined by the phase of the input pulses. In the embodiment of FIG. 30E, the header symbol 2686 will produce a coincidence pulse in the address gate 2630A that is opposite in phase to that of the coincidence pulse 2672 produced by the tail symbol. It should be clear that the bistable 2659 may be configured such that if the input is received at one phase, it may enhance the subordinate beam and if received in the opposite phase, it may diminish the dominant beam. In either case, it will select a different state.

Figure 30F:
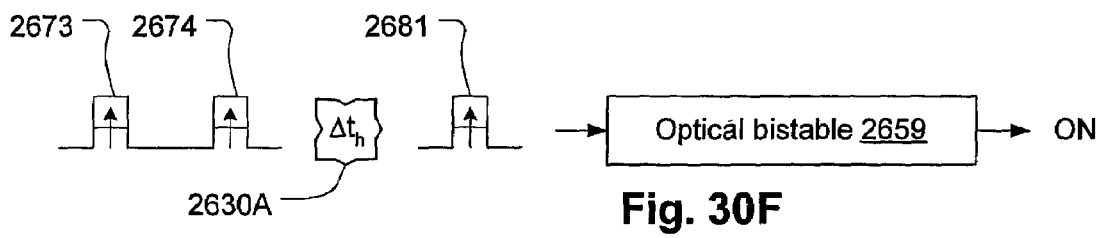
FIGS. 30F and 30G illustrate the main coincidence pulses amplitude and phase as they are produced by the header or trailer coincidence-gate of FIG. 30D.
Figure 30G:
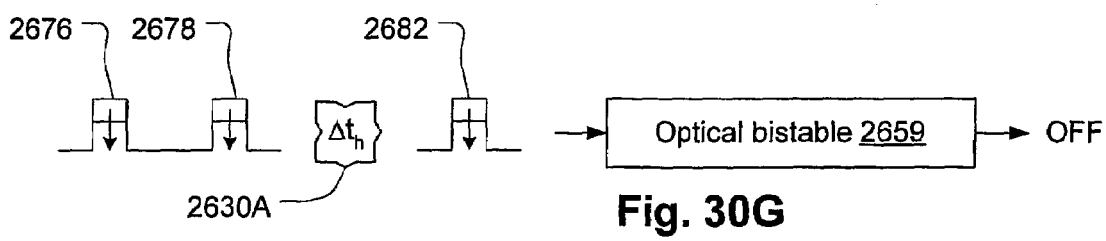

Referring now also to FIGS. 30F and 30G, thus, the header symbol pulses 2674 and 2673, by producing a main coincidence pulse 2681, at coincidence gate 2630A, of one phase, may place the bistable device 2659 in one state and the tail symbol pulses 2678 and 2676, by producing a main coincidence pulse 2682, at coincidence gate 2630A, of opposite phase, may place the bistable device 2659 in the other state. These may provide for the bistable device 2659 to turn on in response to the header symbol 2686 (FIG. 30E) and to turn off in response to the tail symbol 2672 (FIG. 30E).

While the above description contains many details, these should not be considered as limitations on the scope of the invention, but as examples of the presently preferred embodiments thereof. Many other ramifications and variations are possible within the teachings to the invention.

For example the all-optical switches, modulators, encoding and decoding systems, interleaving and multiplexing systems, and demultiplexing systems have been described for use in communication networks. However they can be used in other optical systems as well, such as systems used for optical backplanes, optical storage networks and optical computing. They also can be used as optical components, devices, and systems in Ethernet systems. Although the invention been described using the examples of Dense Time Division Multiplexing (DTDM) and self-triggered CDM it can be used for producing very narrow pulses to perform standard techniques, such as TDM, ATM and packets routing.

Although some systems have been described as modulators they also can be operated as switches. While some all-optical encoding and multiplexing systems have been described using sub-units operating as modulators, the situation can be reversed, i.e., the operation of these same sub-units can be change to serve as switches in decoding and demultiplexing systems. Though some switches and modulators have been described with one output they can include multiple outputs. While the modulators and the switches have been described as containing gratings or phase arrays, they can also include other interference devices that are capable of changing their pitch according to the illumination conditions. Although the gratings and phase arrays have been described as having one ore three interference orders, they are not limited to these numbers of interference orders. While some of the switches and the modulators are illustrated without optical amplifiers they can be integrated with optical amplifiers, such as a Europium Doped Optical Fiber Amplifiers (EDOFA), Solid-state Optical Amplifiers (SOA) or Linear Optical Amplifiers (LOA).

While some coincidence gates are illustrated when receiving the signal at their inputs from a single source they may receive the signals from different sources.

While some of the embodiments illustrated in media of open space, radiation guides, fiber optics, waveguides, planar waveguides on a chip, each of them may be produced in any of these media.

Thus the scope of the invention should be determined by the appended claims and their legal equivalents, and not by the examples given.

It will be evident to those skilled in the art that the invention is not limited to the details of the foregoing illustrative embodiments, and that the present invention may be embodied in other specific forms without departing from the spirit or essential attributes thereof.

The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. An all-optical bistable device, comprising:
   a) a splitting device having first and second inputs and first and second outputs, for receiving first light beam at said first input and directing said first beam as second and third beams propagating through respective first and second outputs;
   b) first optical path between said first output and said second input and second optical path between said second output and said second input for creating combined optical path for said first and said second beams at said second input;
   c) said combined optical path includes a saturable optical amplifier for enhancing and diminishing one of said second and said third beams for driving said optical amplifier into a saturation state to create one of two stable states in which one of said second and said third beams is an enhanced beam and the other beam is a diminishing beam;
   d) at least one tapping device for tapping output signal from one of said first and said second optical paths, and
   e) at least one coupling device for coupling input signal into one of said first and said second optical paths to flip between said two stable states by converting said enhanced beam into said diminishing beam.

2. The bistable device of claim 1 wherein said splitting device is a beam splitter.

3. The bistable device of claim 1 wherein said splitting device is a directional coupler.

4. The bistable device of claim 1 wherein said bistable device is made of optical fibers.

5. The bistable device of claim 1 wherein said bistable device is made of optical planar waveguides.

6. The bistable device of claim 1 wherein said optical amplifier is a solid state optical amplifier.

7. The bistable device of claim 1 wherein said at least one of said fist and second optical paths includes a phase shifter.

8. The bistable device of claim 1 wherein said combined optical path includes a phase shifter.

9. The bistable device of claim 1 wherein said combined optical path includes an attenuator.

10. The bistable device of claim 1 wherein said tapping device selected from a group of beam splitters and directional couplers.

* * * * *